Sept. 27, 1960 D. E. ECKDAHL ET AL 2,954,166
GENERAL PURPOSE COMPUTER
Filed Dec. 10, 1952 76 Sheets-Sheet 1

INVENTORS:
Donald E. Eckdahl
Richard E. Sprague
Willis E. Dobbins
Bernard T. Wilson
Hrant H. Sarkissian By Mason, Mason & Sheridan
PATENT ATTORNEY INVENTORS:
Donald E. Eckdahl
Richard E. Sprague
Willis E. Dobbins
Bernard T. Wilson
Krant H. Sarkissian By Mason, Mason & Sheridan
Patent Attorney Sept. 27, 1960 D. E. ECKDAHL ET AL 2,954,166

GENERAL PURPOSE COMPUTER

Filed Dec. 10, 1952 76 Sheets-Sheet 3

INVENTORS:
Donald E. Eckdahl
Richard E. Sprague
Willis E. Dobbins
Bernard T. Wilson
Hrant H. Sarkissian By Mason, Mason & Sheridan
Patent Attorney

Fig. 8

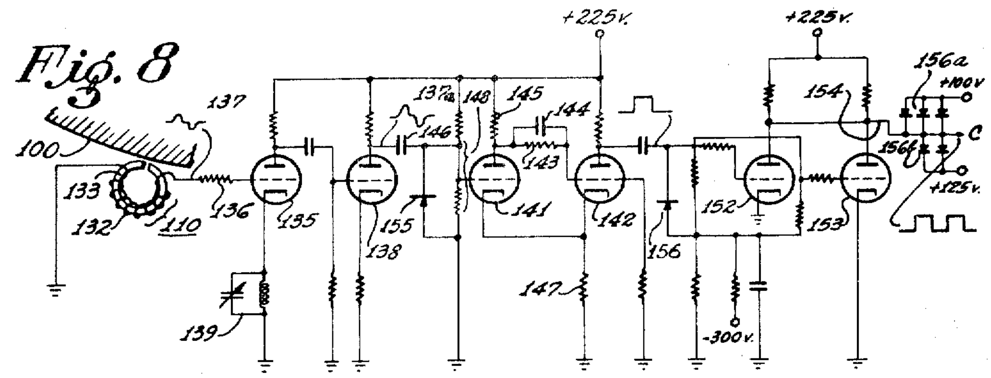

Fig. 6a

| Number Information | | $O_{13}$ $P_2$ | $P_1$ | $P_0$ | $O_{12}$ $P_2$ | $P_1$ | $P_0$ |
|---|---|---|---|---|---|---|---|
| − | NO OVERFLOW | 0 | 0 | 0 | 0 | 0 | 0 |
| + | NO OVERFLOW | 0 | 0 | 0 | 0 | 0 | 1 |
| − | OVERFLOW | 0 | 0 | 0 | 0 | 1 | 0 |
| + | OVERFLOW | 0 | 0 | 0 | 0 | 1 | 1 |

Fig. 6b

| | Instruction | $O_{13}$ $P_2$ | $P_1$ | $P_0$ | $O_{12}$ $P_2$ | $P_1$ | $P_0$ |
|---|---|---|---|---|---|---|---|
| H | HALT | 0 | 1 | 1 | 1 | 1 | 1 |
| F | FILL (From Instr.) | 0 | 1 | 1 | 1 | 0 | 1 |
| P1 | Record Address & Word on Tape | 0 | 1 | 1 | 0 | 1 | 1 |
| P2 | Print Address & Word on Typewriter | 0 | 1 | 1 | 0 | 0 | 1 |
| P3 | Record Word on Tape | 0 | 1 | 0 | 1 | 1 | 1 |
| P4 | Print Word on Typewriter | 0 | 1 | 0 | 1 | 0 | 1 |
| $T_o$ | TEST OVERFLOW | 0 | 1 | 0 | 0 | 1 | 1 |
| T | TEST DIFFERENCE | 0 | 1 | 0 | 0 | 0 | 1 |
| E | EXTRACT | 0 | 0 | 1 | 1 | 1 | 1 |
| S | SUBTRACT | 0 | 0 | 1 | 1 | 0 | 1 |
| A | ADD | 0 | 0 | 1 | 0 | 1 | 1 |
| Sh | SHIFT | 0 | 0 | 1 | 0 | 0 | 1 |
| M | MULTIPLY | 0 | 0 | 0 | 1 | 1 | 1 |
| D | DIVIDE | 0 | 0 | 0 | 1 | 0 | 1 |

I

Fig. 7

| | FLIP-FLOPS A5 | A4 | A3 | A2 | A1 |
|---|---|---|---|---|---|
| Ch0 | 0 | 0 | 0 | 0 | 0 |
| Ch1 | 0 | 0 | 0 | 0 | 1 |
| Ch2 | 0 | 0 | 0 | 1 | 0 |
| Ch3 | 0 | 0 | 0 | 1 | 1 |
| Ch4 | 0 | 0 | 1 | 0 | 0 |
| Ch5 | 0 | 0 | 1 | 0 | 1 |
| Ch6 | 0 | 0 | 1 | 1 | 0 |
| Ch7 | 0 | 0 | 1 | 1 | 1 |
| Ch8 | 0 | 1 | 0 | 0 | 0 |
| Ch9 | 0 | 1 | 0 | 0 | 1 |
| Ch10 | 0 | 1 | 0 | 1 | 0 |
| Ch11 | 0 | 1 | 0 | 1 | 1 |
| Ch12 | 0 | 1 | 1 | 0 | 0 |
| Ch13 | 0 | 1 | 1 | 0 | 1 |
| Ch14 | 0 | 1 | 1 | 1 | 0 |
| Ch15 | 0 | 1 | 1 | 1 | 1 |
| Ch16 | 1 | 0 | 0 | 0 | 0 |
| Ch17 | 1 | 0 | 0 | 0 | 1 |

INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS.
Donald E. Eckdahl
Richard E. Sprague
Willis E. Dobbins
Bernard T. Wilson
Hrant H. Sarkissian By Mason, Mason & Sheridan
PATENT ATTORNEYS.

INVENTORS:
Donald E. Eckdahl
Richard E. Sprague
Willis E. Dobbins
Bernard T. Wilson
Hrant H. Sarkissian By Mason, Mason & Sheridan
Patent Attorney $R_1 = [E_2(\#44+\#70)+G_2\,\#32]\,P_2O_{13}'$ $R_2 = (E_2'+P_2O_{13})(\#44+\#70)+(G_2'+P_2O_{13})\,\#32$ INVENTORS:
Donald E. Eckdahl
Richard L. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian
By Mason, Mason & Sheridan
Patent Attorney INVENTORS:-
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorneys Fig. 15
| FLIP-FLOPS | | |
|---|---|---|
| B1 | B2 | |
| 0 | 0 | $P_0 = B_1' B_2'$ |
| 1 | 0 | $P_1 = B_1$ |
| 0 | 1 | $P_2 = B_2$ |
Fig. 16
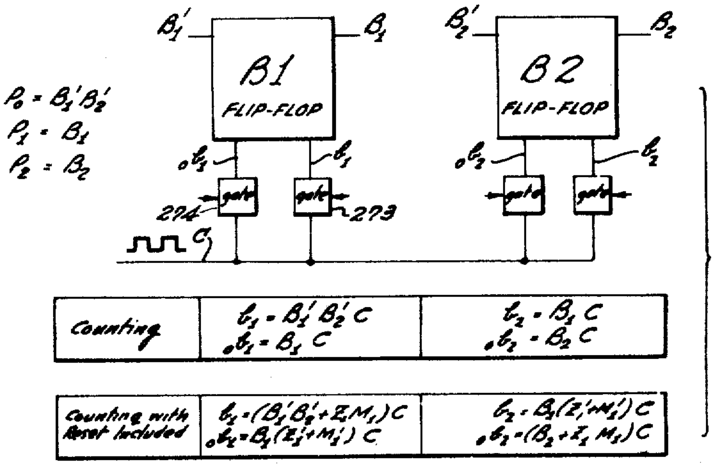
Fig. 17
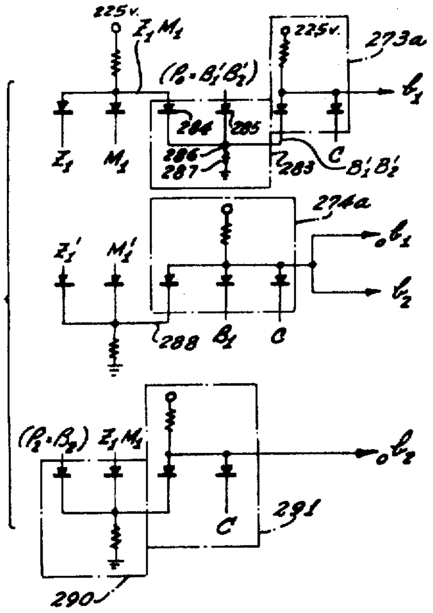
Fig. 18
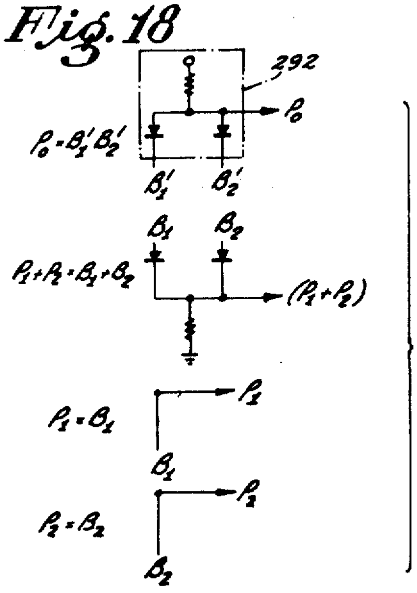
INVENTORS:
Donald E. Eckdahl
Richard E. Sprague
Willis E. Dobbins
Bernard T. Wilson
Hrant H. Sarkissian
By Mason, Mason & Sheridan
Patent Attorney INVENTORS:-
Donald E. Eckdahl
Richard E. Sprague
Willis E. Dobbins
Bernard T. Wilson
Hrant H. Sarkissian By Mason, Mason & Sheridan
Patent Attorney

| | FLIP-FLOPS | | | |
|---|---|---|---|---|
| | D1 | D2 | D3 | D4 |
| $O_0$ | 0 | 0 | 0 | 0 |
| $O_1$ | 1 | 0 | 0 | 0 |
| $O_2$ | 0 | 1 | 0 | 0 |
| $O_3$ | 1 | 1 | 0 | 0 |
| $O_4$ | 0 | 0 | 1 | 0 |
| $O_5$ | 1 | 0 | 1 | 0 |
| $O_6$ | 0 | 1 | 1 | 0 |
| $O_7$ | 1 | 1 | 1 | 0 |
| $O_8$ | 0 | 0 | 0 | 1 |
| $O_9$ | 1 | 0 | 0 | 1 |
| $O_{10}$ | 0 | 1 | 0 | 1 |
| $O_{11}$ | 1 | 1 | 0 | 1 |
| $O_{12}$ | 0 | 0 | 1 | 1 |
| $O_{13}$ | 1 | 0 | 1 | 1 |

INVENTORS:
Donald E. Eckdahl
Richard E. Sprague
Willis C. Dobbins
Bernard T. Wilson
Hrant H. Sarkissian
By Mason, Mason & Sheridan
Patent Attorney INVENTORS
Donald E. Eckdahl
Richard E. Sprague
Willis E. Dobbins
Bernard T. Wilson
Hrant H. Sarkissian By Mason, Mason & Sheridan
Patent Attorney Sept. 27, 1960 D. E. ECKDAHL ET AL 2,954,166

GENERAL PURPOSE COMPUTER

Filed Dec. 10, 1952 76 Sheets-Sheet 15

INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian
By Mason, Mason & Sheridan
Patent Attorney INVENTORS:
Donald E. Eckdahl
Richard E. Sprague
Willis E. Dobbins
Bernard T. Wilson
Arent H. Sarkissian By Mason, Mason & Albright Patent Attorney INVENTORS:-
Donald E. Eckdahl
Richard E. Sprague
Willis E. Dobbins
Bernard T. Wilson
Hrant H. Sarkissian
By Mason, Mason & Albright
Patent Attorney INVENTORS:-
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorney Fig. 30d
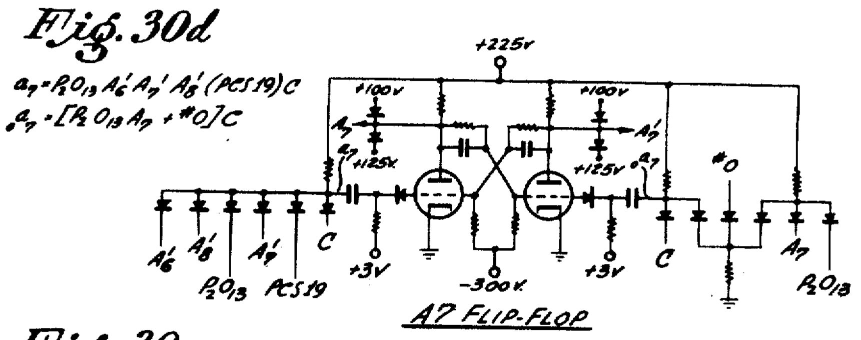
Fig. 30c
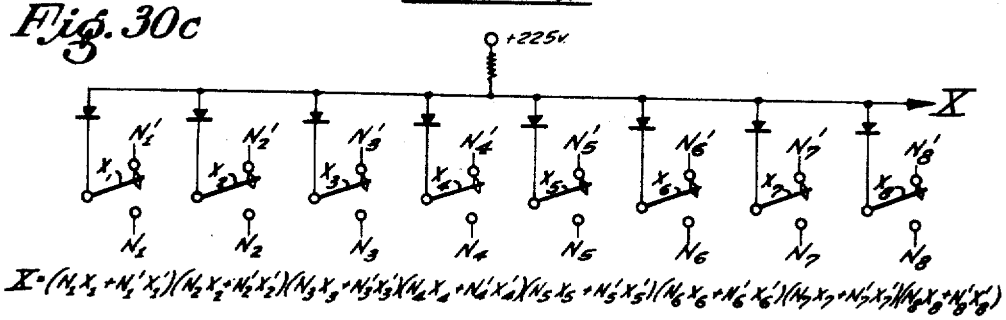
Fig. 30a
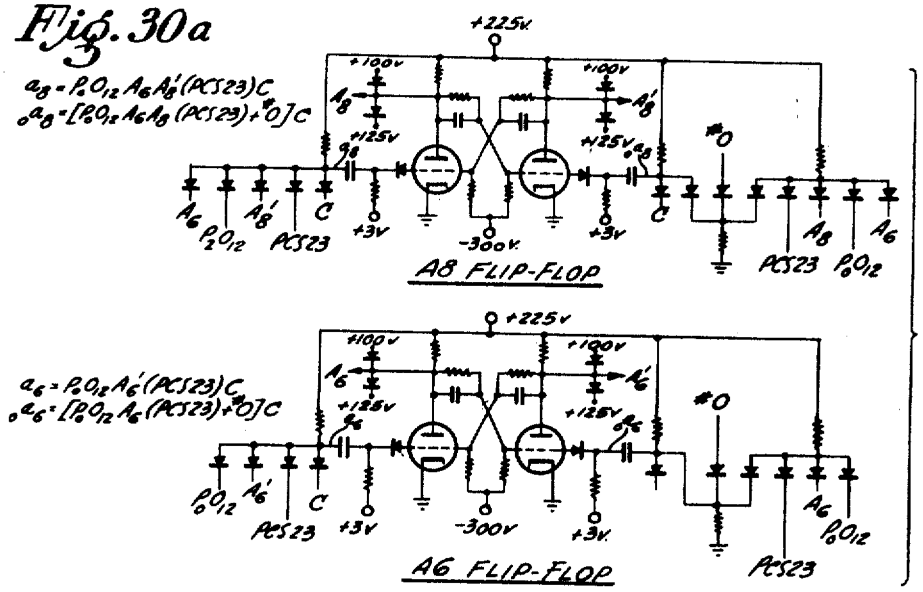
Fig. 30b
| Flip-Flop | A6 | A8 | |
|---|---|---|---|
| Stages | $2^0$ | $2^1$ | |
| | 0 | 0 | $A_6' A_8'$ |
| | 1 | 0 | $A_6 A_8'$ |
| | 0 | 1 | $A_6' A_8$ |
| | 1 | 1 | $A_6 A_8$ |
INVENTORS:-
Donald E. Eckdahl
Richard E. Sprague
Willis E. Dobbins
Bernard T. Wilson
Hrant H. Sarkissian
By Mason, Mason & Sheridan
Patent Attorney INVENTORS:-
Donald E. Eckdahl
Richard E. Sprague
Willis E. Dobbins
Bernard T. Wilson
Hrant H. Sarkissian By Mason, Mason & Sheridan
Patent Attorney $n_1 = [N_1'K_1'A_6'A_8'\alpha_1' + K_1(\#46+\#60+\#80+\#108+\#138+\#154+\#164+\#196) + N_1'K_1'A_6'A_8'(\#0+Y_1)\alpha_1]X'P_2O_{13}C$ $_0n_1 = \{[N_1K_1'A_6'A_8 + K_1(\#47+\#63+\#65+\#71+\#133+\#141)]P_2O_{13} + Z_1 + XP_2O_{13}\}C$ $n_2 = [N_1N_2'K_1'A_6'A_8' + K_1(\#28+\#77+\#80+\#133+\#141) + \alpha_2'\#0K_1'Y_2]X'P_2O_{13}C$ $_0n_2 = \{[N_1N_2K_1'A_6'A_8 + K_1(\#46+\#63+\#66+\#71+\#134+\#150)]P_2O_{13} + Z_1 + XP_2O_{13}\ C$ INVENTORS:
Donald E. Eckdahl
Richard E. Sprague
Willis E. Dobbins
Bernard T. Wilson
Hrant H. Sarkissian By Mason, Mason & Shonde
Patent Attorney $$n_3 = [N_1 N_2 N_3' K_1' A_6' A_8' + K_1(\#59 + \#138) + \alpha_2' \#0 K_1' Y_3] X' P_2 O_{13} C$$

$$_o n_3 = \{[N_1 N_2 N_3 K_1' A_6' A_8' + K_1(\#12 + \#46 + \#60 + \#61 + \#71 + \#93 + \#108)] P_2 O_{13} + Z_1 + X P_2 O_{13}\} C$$

$$n_4 = [N_1 N_2 N_3 N_4' K_1' A_6' A_8' + K_1(\#146 + \#149 + \#150 + \#151) + \alpha_2' \#0 K_1' Y_4] X' P_2 O_{13} C$$

$$_o n_4 = \{[N_1 N_2 N_3 N_4 K_1' A_6' A_8' + K_1(\#8 + \#24 + \#44 + \#169 + \#172)] P_2 O_{13} + Z_1 + X P_2 O_{13}\} C$$

INVENTORS:
Donald E. Eckdahl
Richard E. Sprague
Willis E. Dobbins
Bernard T. Wilson
Hrant H. Sarkissian By Mason, Mason & Sheridan
Patent Attorney $n_5 = [N_1N_2N_3N_4N_5'K_1'A_6'A_8' + K_1(\#33+\#77+\#133+\#138+\#164) + \sigma_2'\#0K_1'Y_5]\, X'P_2O_{13}C$ ${}_0n_5 = \{[(N_1N_2N_3N_4N_5K_1'A_6'A_8') + K_1(\#28+\#53+\#60+\#61+\#84+\#93+\#149+\#150+\#185)]P_2O_{13} + Z_1 + XP_2O_{13}\}C$ $n_6 = [N_1N_2N_3N_4N_5N_6'K_1'A_6'A_8' + K_1(\#9+\#26+\#27+\#28+\#93+\#141+\#154) + \sigma_2'\#0K_1'Y_6]\, X'P_2O_{13}C$ ${}_0n_6 = [K_1(\#44+\#169+\#178+\#191)\, P_2O_{13} + Z_1 + XP_2O_{13}\, C$ INVENTORS:
Donald E. Eckdahl
Richard E. Sprague
Willis E. Dobbins
Bernard T. Wilson
Hrant H. Sarkissian By Mason, Mason & Sheridan
Patent Attorney.

$$n_7 = \{[K_1(\#1+\#2+\#3+\#9+\#10+\#13+\#18+\#24+\#25+\#129)]+[\delta_2'\#0K_1'Y_7]\}X'P_2O_{13}C$$

$${}_0n_7 = [K_1(\#65+\#66+\#71+\#76+\#77+\#84+\#93+\#108+\#196)P_2O_{13}+Z_1+XP_2O_{13}]C$$

$$n_8 = \{[K_1(\#11+\#12+\#76+\#77)]+[\delta_2'\#0K_1'Y_8]\}X'P_2O_{13}C$$

$${}_0n_8 = [K_1(\#134)P_2O_{13}+Z_1+XP_2O_{13}]C$$

INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian
By Mason, Mason & Sheridan
Patent Attorney

| Manual Input | FLIP-FLOPS A4 | A3 | A2 | A1 |
|---|---|---|---|---|
| 0 | 1 | 0 | 0 | 0 |
| 1 | 1 | 0 | 0 | 1 |
| 2 | 1 | 0 | 1 | 0 |
| 3 | 1 | 0 | 1 | 1 |
| 4 | 1 | 1 | 0 | 0 |
| 5 | 1 | 1 | 0 | 1 |
| 6 | 1 | 1 | 1 | 0 |
| 7 | 1 | 1 | 1 | 1 |
| Tab | 0 | X | 1 | 0 |
| Space | 0 | X | X | 1 |
| Start | 0 | X | 0 | 0 |

INVENTORS:
Donald E. Eckdahl
Richard E. Sprague
Willis E. Dobbins
Bernard T. Wilson
Hrant H. Sarkissian By Mason, Mason & Sheridan
Patent Attorneys INVENTORS:
Donald E. Eckdahl
Richard E. Sprague
Willis E. Dobbins
Bernard T. Wilson
Hrant H. Sarkissian
By Mason, Mason & Sheridan
Patent Attorney Sept. 27, 1960    D. E. ECKDAHL ET AL    2,954,166

GENERAL PURPOSE COMPUTER

Filed Dec. 10, 1952    76 Sheets-Sheet 31

INVENTORS:
Donald E. Eckdahl
Richard E. Sprague
Willis E. Dobbins
Bernard T. Wilson
Hrant H. Sarkissian By Mason, Mason & Sheridan Patent Attorney Sept. 27, 1960 D. E. ECKDAHL ET AL 2,954,166

GENERAL PURPOSE COMPUTER

Filed Dec. 10, 1952 76 Sheets-Sheet 32

INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Albright.
Patent Attorney.

INVENTORS:
Donald E. Eckdahl
Richard E. Sprague
Willis E. Dobbins
Bernard T. Wilson
Hrant H. Sarkissian
By Mason, Mason & Sheridan
Patent Attorney Sept. 27, 1960 D. E. ECKDAHL ET AL 2,954,166

GENERAL PURPOSE COMPUTER

Filed Dec. 10, 1952 76 Sheets-Sheet 35

INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian
By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorney Sept. 27, 1960 D. E. ECKDAHL ET AL 2,954,166

GENERAL PURPOSE COMPUTER

Filed Dec. 10, 1952 76 Sheets-Sheet 42

INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Albright
Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan Patent Attorney

Fig. 64

DIVISION

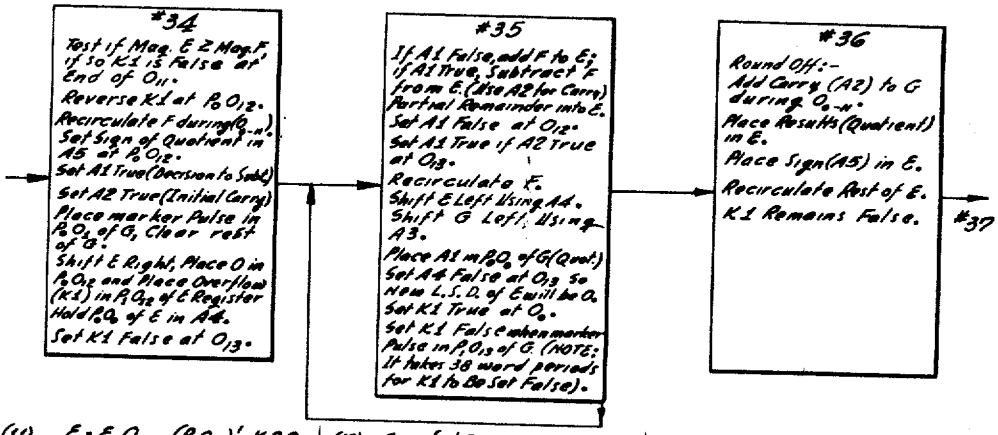

(11) $E_0 = E_1 O_{0-11} (P_2 O_{11})' + K_1 P_1 O_{12}$
(9) $F_0 = F_2 O_{0-11}$
(10) $G_0 = P_0 O_1$
(10) $k_1 = [E_2' F_2 O_{0-11} + K_1' O_{12}] C$
(11) ${}_0k_1 = [E_2 F_2' O_{0-11} + K_1 O_{12} + O_{13}] C$
(1) $a_1 = \#34 C$
(1) $a_2 = \#34 C$
(8) $a_4 = E_2 P_0 O_0 C$
(6) ${}_0a_4 = E_2' P_0 O_0 C$
(3) $a_5 = (E_2 F_2 + E_2' F_2') P_0 O_{12} C$
(1) ${}_0a_5 = O_{11} C$

(12) $E_0 = \{A_1' [F_2 A_4 A_2 + F_2 A_4' A_2' + F_2' A_4 A_2' + F_2' A_4' A_2] + A_1 [F_2' A_4 A_2 + F_2' A_4' A_2' + F_2 A_4 A_2' + F_2 A_4' A_2]\} (O_{0-11} + P_0 O_{12}) + E_2 O_{0-11}' (P_0 O_{12})'$
(1) $F_0 = F_2$
(11) $G_0 = A_1 P_0 O_0 + A_3 (P_0 O_0)'$
(1) $k_1 = O_0 C$
(12) ${}_0k_1 = G_2 P_1 O_{13} C$
(10) $a_1 = A_2 O_{13} C$
(10) ${}_0a_1 = O_{12} C$
(9) $a_2 = \{(F_2 A_1' + F_2' A_1) A_4 (O_{0-11} + P_0 O_{12})\} C$
(10) ${}_0a_2 = \{(F_2' A_1' + F_2 A_1) A_4' (O_{0-11} + P_0 O_{12})\} C$
(5) $a_3 = G_2 C$
(5) ${}_0a_3 = G_2' C$
(7) $a_4 = E_2 O_{13}' C$
(7) ${}_0a_4 = (E_2' O_{13}' + O_{13}) C$

(13) $E_0 = (G_2 A_2' + G_2' A_2) O_{0-11} + A_5 P_0 O_{12} + E_2 O_{0-11}' (P_0 O_{12})'$
(11) ${}_0a_2 = G_2' O_{0-11} C$

INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorneys INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Arant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian
By Mason, Mason & Shields
Patent Attorneys INVENTORS:
Donald E. Eckdahl
Richard E. Sprague
Willis E. Dobbins
Bernard T. Wilson
Hrant H. Sarkissian
By Mason, Mason & Sheridan
Patent Attorney INVENTORS:
Donald E. Eckdahl
Richard E. Sprague
Willis E. Dobbins
Bernard T. Wilson
Hrant H. Sarkissian
By Mason, Mason & Sheridan
Patent Attorney Sept. 27, 1960 D. E. ECKDAHL ET AL 2,954,166

GENERAL PURPOSE COMPUTER

Filed Dec. 10, 1952

76 Sheets-Sheet 55

INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian
By Mason, Mason & Sheridan
Patent Attorney Sept. 27, 1960 D. E. ECKDAHL ET AL 2,954,166

GENERAL PURPOSE COMPUTER

Filed Dec. 10, 1952 76 Sheets-Sheet 59

INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian
By Mason, Mason & Sheridan
Patent Attorney INVENTORS:
Donald E. Eckdahl
Richard E. Sprague
Willis E. Dobbins
Bernard T. Wilson
Hrant H. Sarkissian
By Mason, Mason & Sheridan
Patent Attorney INVENTORS:
Donald E. Eckdahl
Richard E. Sprague
Willis C. Dobbins
Bernard T. Wilson
Hrant H. Sarkissian By Mason, Mason & Sheridan
Patent Attorney Sept. 27, 1960 D. E. ECKDAHL ET AL 2,954,166

GENERAL PURPOSE COMPUTER

Filed Dec. 10, 1952 76 Sheets-Sheet 64

INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorney PCS1 = (#0-#6) + (#8-#16) + (#18-#34) + (#37-#43) + #46 + #58 + #59 + (#67-#70) + (#89-#91) + (#105-#108) + #131 + #161 + (#163-#175) + (#176-#178) + (#181-#185) + (#187-#191) + #194 + #196

PCS3 = #0 + (#3-#6) + (#8-#18) + (#20-#22) + (#24-#33) + #35 + (#37-#39) + (#41-#43) + #47 + (#49-#51) + #59 + (#68-#70) + (#89-#91) + (#105-#108) + #129 + #130 + #131 + (#141-#146) + (#155-#158) + #161 + (#164-#169) + (#174-#178) + (#181-#185) + (#187-#191) + #194.

PCS6 = #130 + #142 + #155 + #165

PCS15 = #4 + #14 + #20 + #29 + #37 + #41 + #46 + #82 + #89 + #129 + #159

PCS16 = #4 + #14 + #20 + #29 + #37 + #41 + #49 + #67 + #89 + #159

PCS17 = #4 + #14 + #20 + #29 + #37 + #41 + #67 + #89 + #159

PCS18 = #4 + #14 + #20 + #29 + #37 + #41 + #49 + #89 + #129 + #154 + #159

PCS20 = #6 + #16 + #22 + #31 + #34 + #39 + #43 + #69 + #91 + #161

PCS23 = PCS17 + #6 + #16 + #22 + #31 + #39 + #43 + #69 + #91 + #161

INVENTORS:
Donald E. Eckdahl
Richard E. Sprague
Willis E. Dobbins
Bernard T. Wilson
Hrant H. Sarkissian By Mason, Mason & Sheridan
Patent Attorney

PCS4 = (#147-#149) + (#170-#172)

PCS5 = (#0-#6) + (#14-#17) + (#20-#22) + (#29-#32) + (#37-#39) + (#41-#44) + #46 + #47 + (#58-#61) + #63 + #65 + (#67-#70) + #74 + #76 + #80 + #82 + #84 + (#89-#92) + #93 + (#105-#108) + #129 + #132 + #134 + #136 + #138 + #140 + #141 + (#146-#151) + #154 + #159 + (#160-#164) + (#169-#172) + #178 + #185 + #191 + #195 + #196

PCS8 = #174 + #181 + #187 + #193

PCS14 = #4 + #37 + #41 + #140 + #141 + #146 + #159 + #164 + #174 + #181 + #187 + #193

PCS22 = (#7-#13) + #18 + (#24-#28) + #33 + #35 + #44 + #47 + #53 + #63 + #76 + #83 + #84 + #93 + #134 + #138 + #149 + #151 + #172 + #178 + #185 + #191 + #196

INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorney

Fig. 92

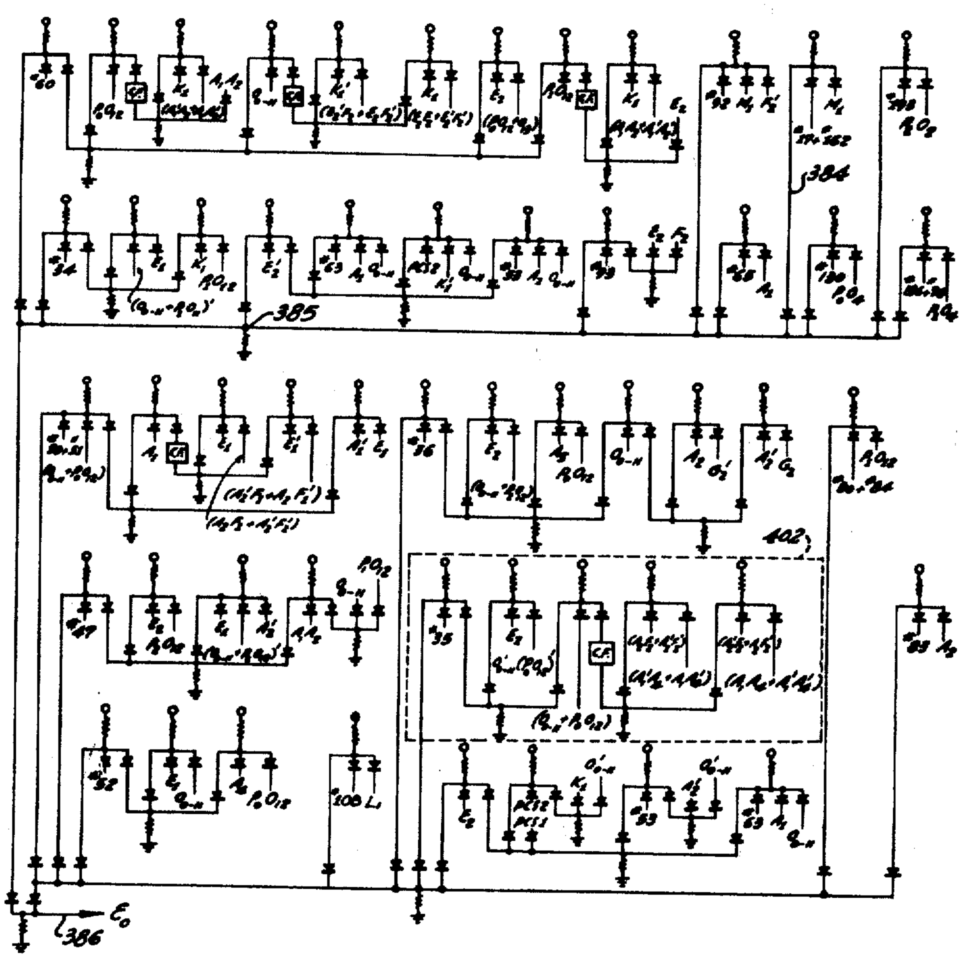

$$E_0 = {}^{\#}60\{P_0O_{12}[K_1(A_1'A_2+A_1A_2')+A_1A_2]+O_{0-N}[K_1'(E_2'F_2+E_2F_2')+K_1(E_2F_2+E_2'F_2')]+(P_2O_{12}+O_{13})E_2$$
$$+P_1O_{12}[K_1(A_1A_2+A_1'A_2')+E_2]\}+(P_0O_{12}+O_{0-N})({}^{\#}50+{}^{\#}51)\{A_1[E_1(A_2F_2+A_2'F_2')+E_1'(A_2'F_2+A_2F_2')]$$
$$+A_1'E_1\}+{}^{\#}35\{E_2O_{0-N}'(P_0O_{12})'+(P_0O_{12}+O_{0-N})[(A_2F_2+A_2'F_2')(A_1'A_4+A_1A_4')$$
$$+(A_2'F_2+A_2F_2')(A_1A_4+A_1'A_4')]\}+E_2\{PCS1+PCS2(K_1+O_{0-N}')+{}^{\#}53(A_2'+O_{0-N}')+A_1{}^{\#}63\}$$
$$+{}^{\#}36\{E_2(P_0O_{12})'O_{0-N}'+A_5P_0O_{12}+O_{0-N}(A_2G_2'+A_2'G_2)\}+E_2'(A_1'{}^{\#}63+K_1'O_{0-11}PCS2$$
$$+A_2O_{0-11}{}^{\#}53)+{}^{\#}47\{E_2P_0O_{12}+E_1A_2'O_{0-N}(P_2O_{11})'+A_1A_2(O_{0-N}+P_1O_{12})\}$$
$$+{}^{\#}52(E_1O_{0-N}+A_4P_0O_{12})+{}^{\#}34\{E_1O_{0-N}(P_2O_N')+K_1P_1O_{12}\}+A_1{}^{\#}65+L_1{}^{\#}108$$
$$+P_0O_4{}^{\#}130+P_2O_2{}^{\#}193+P_1O_4({}^{\#}136+{}^{\#}94)+\underline{M_1({}^{\#}37+{}^{\#}162)}+P_1O_{12}({}^{\#}80+{}^{\#}82)$$
$$+A_2{}^{\#}83+M_1F_2'{}^{\#}92+(E_2+F_2){}^{\#}93$$

INVENTORS:
Donald E. Eckdahl
Richard E. Sprague
Willis E. Dobbins
Bernard T. Wilson
Hrant H. Sarkissian By Mason, Mason & Sheridan
Patent Attorney $$F_0 = F_2\{PCS3 + O_{0-11}(\#38 + \#49 + \#34) + \#46(K_1' + O_{0-11}')\} + F_2'\{\#38\,P_0O_{12} + K_1O_{0-11}\,\#46\} + M_1(\#23 + O_{4-7}\,\#7) + (A_2F_2 + A_2'F_2')\#63 + G_2O_{4-7}\,\#19 + O_{11}\,\#140 + F_1\,PCS4 + O_{13}\,\#163 + \#92\,E_2F_2$$

INVENTORS:
Donald E. Eckdahl
Richard E. Sprague
Willis E. Dobbins
Bernard T. Wilson
Hrant H. Sarkissian By Mason, Mason & Sheridan
Patent Attorney

Fig. 94

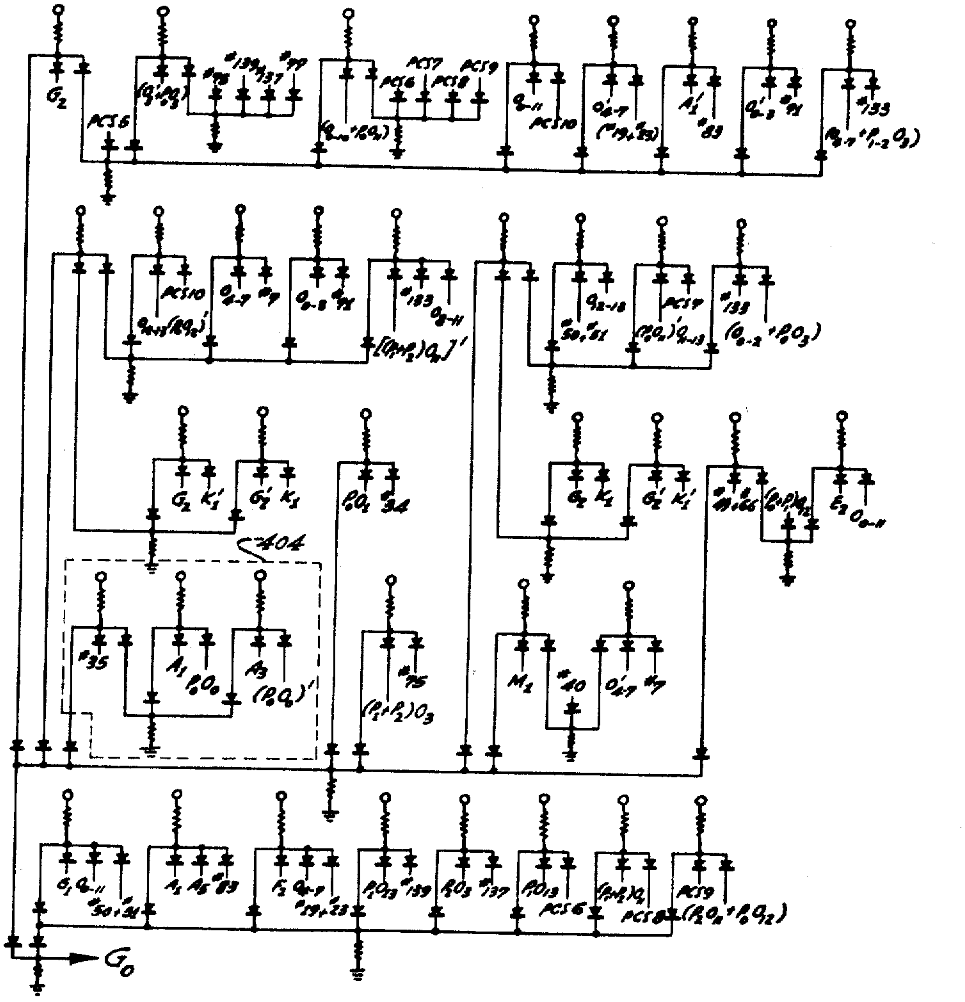

$$G_0 = G_2\{PCS5 + (O_3' + P_0 O_3)(\#75 + \#139 + \#137 + \#79) + (O_{0-10} + P_0 O_{11})(PCS6 + PCS7 + PCS8 + PCS9) + O_{0-11}\,PCS10 + O_{4-7}'(\#19 + \#23) + A_1'\,\#83 + O_{0-3}'\,\#71 + (O_{4-7} + P_{1-2} O_3)\#133\} + (G_2 K_1' + G_2' K_1)\{O_{12-13}(P_0 O_{12})'\,PCS10 + O_{4-7}\,\#7 + O_{0-3}\,\#71 + O_{8-11}[(P_1 + P_2) O_{11}']\#133\} + (G_2 K_1 + G_2' K_1')\{O_{12-13}(\#50 + \#51) + (P_0 O_{11})' O_{11-13}\,PCS7 + \#133(O_{0-2} + P_0 O_3)\} + M_1(\#40 + O_{4-7}'\,\#7) + (\#49 + \#66)\{(P_0 + P_1) O_{12} + E_2 O_{0-11}\} + \#35\{A_1 P_0 O_0 + A_3 (P_0 O_0)'\} + G_1 O_{0-11}(\#50 + \#51) + P_0 O_1\,\#34 + (P_1 + P_2) O_3\,\#75 + A_1 A_5\,\#83 + F_2 O_{4-7}(\#19 + \#23) + P_1 O_3\,\#139 + P_2 O_3\,\#137 + P_1 O_{13}\,PCS6 + (P_1 P_2) O_{11}\,PCS8 + PCS9(P_2 O_{11} + P_0 O_{12}).$$

INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian By Mason, Mason & Sheridan
Patent Attorney INVENTORS:
Donald E. Eckdahl
Richard E. Sprague
Willis E. Dobbins
Bernard T. Wilson
Hrant H. Sarkissian
By Mason, Mason & Sheridan
Patent Attorneys

GENERAL PURPOSE COMPUTER

Filed Dec. 10, 1952

$a_3 = \{[(\#16+\#161)O_{10}+(\#6+\#22)O_6+(\#43+\#69+\#91)O_2+\#141F_2]G_2P_2+(\#164F_2P_2+\#65)E_2 + \#0(④ + ⑤ + ⑥ + ⑦)+(\#35+\#83)G_2+\#129\}C.$ ${}_0a_3 = \{[(\#16+\#161)O_{10}+(\#6+\#22)O_6+(\#43+\#69+\#91)O_2+\#141F_2]G_2'P_2+(\#164F_2P_2+\#65)E_2' + \#0(⓪ + ① + ② + ③)+(\#35+\#83)G_2'+PCS17+Z_1\}C.$

INVENTORS:
Donald E. Eckdahl
Richard E. Sprague
Willis E. Dobbins
Bernard T. Wilson
Hrant H. Sarkissian By Mason, Mason & Sheridan
Patent Attorney

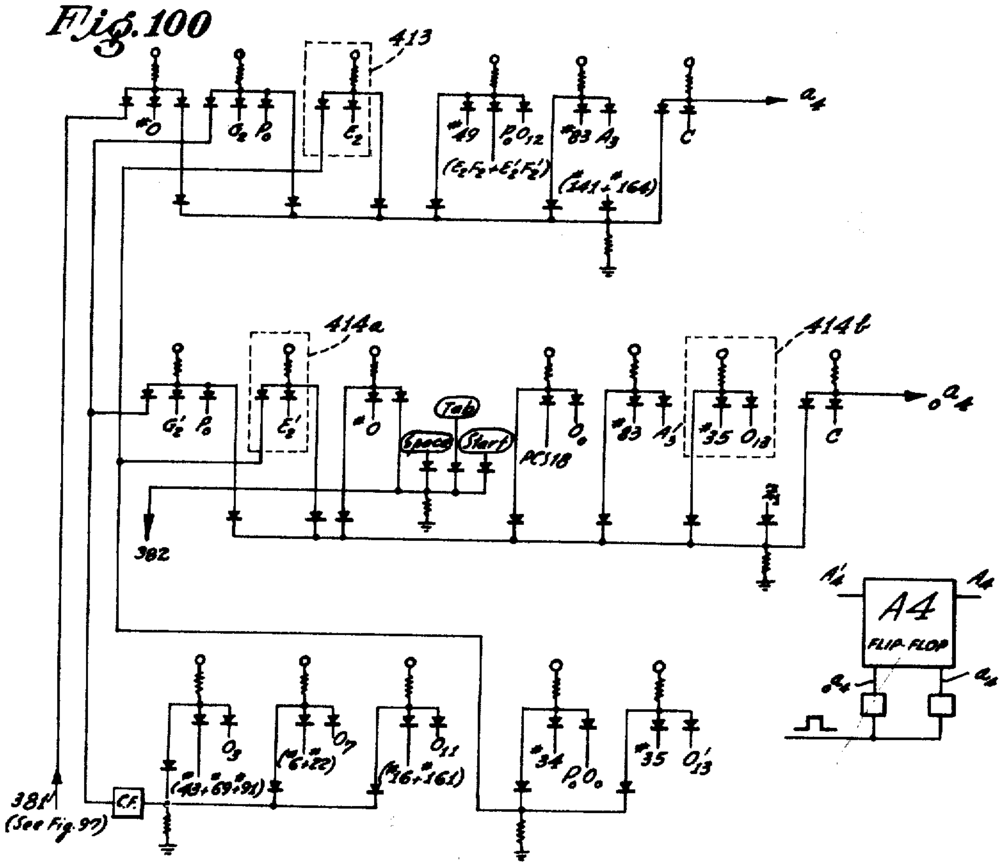

Fig. 100

$$a_4 = \{\#0(⓪ + ① + ② + ③ + ④ + ⑤ + ⑥ + ⑦) + [(\#43 + \#69 + \#91)O_3 + (\#6 + \#22)O_7 + (\#16 + \#161)O_{11}]G_2P_0 + (\#34P_0O_0 + \#35O_{13}')E_2 + \#49(E_2F_2 + E_2'F_2')P_0O_{12} + \#83A_3 + (\#141 + \#164)\}C$$

$${}_oa_4 = \{[(\#43 + \#69 + \#91)O_3 + (\#6 + \#22)O_7 + (\#16 + \#161)O_{11}]G_2'P_0 + (\#34P_0O_0 + \#35O_{13}')E_2' + \#0(\text{Space} + \text{Tab} + \text{Start}) + (PCS18)O_0 + \#83A_3' + \#35O_{13} + Z_1\}C$$

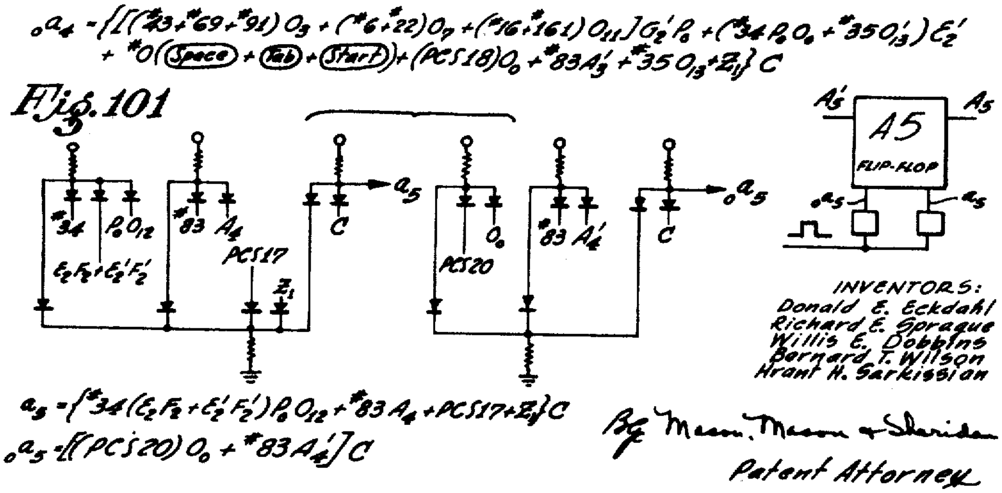

Fig. 101

$$a_5 = \{\#34(E_2F_2 + E_2'F_2')P_0O_{12} + \#83A_4 + PCS17 + Z_1\}C$$

$${}_oa_5 = [(PCS20)O_0 + \#83A_4']C$$

INVENTORS:
Donald E. Eckdahl
Richard E. Sprague
Willis E. Dobbins
Bernard T. Wilson
Hrant H. Sarkissian By Mason, Mason & Sheridan
Patent Attorney

United States Patent Office 2,954,166

Patented Sept. 27, 1960

2,954,166

GENERAL PURPOSE COMPUTER

Donald E. Eckdahl and Richard E. Sprague, Torrance, Willis E. Dobbins, Manhattan Beach, Bernard T. Wilson, Los Angeles, and Hrant H. Sarkissian, Pacific Palisades, Calif., assignors, by mesne assignments, to The National Cash Register Company, a corporation of Maryland Filed Dec. 10, 1952, Ser. No. 325,144

68 Claims. (Cl. 235—159)

This invention relates to electronic digital computers and more particularly to a large-scale, automatic-sequence-controlled, general purpose computer employing a magnetic drum memory.

One of the objects of this invention is to provide a highly compact general purpose digital computer utilizing a minimum number of vacuum tubes.

Another object of this invention is to provide a highly flexible, reliable, small computer capable of automatically performing a plurality of arithmetic and logical operations as required to solve a particular problem when supplied with coded instructions and numerical data.

Another object of this invention is to combine a large number of simple operations into an automatic high-speed complex sequence so as to be able to calculate the answers to many difficult computational and statistical problems whose solution otherwise would be impractical in any reasonable time or energy sense.

Another object of this invention is to provide a computer with a high degree of choice such that the machine may be able to decide at the end of any word period during its operation which of two conditions has occurred, and determine its future sequence of operation accordingly.

Another object of this invention is to provide a novel digital computer whose circuitry and operation may be completely defined by means of logical equations using the notations of Boolean algebra. That is, the connections or relationships between bistable state elements representing logical propositions in the computer may be expressed by these equations.

Another object of this invention is to provide a novel arithmetic unit whose circuits, representing complex inter-relationships between bistable state circuits, have been simplified by the use of symbolic logic.

Another object of this invention is to use short recirculating loops on a rotating magnetic drum as novel serial arithmetic registers.

Another object is to provide a novel arithmetic unit for operating in conjunction with a plurality of short recirculating loops on a magnetic drum representing arithmetic registers.

Still another object of this invention is to provide a plurality of circuits for performing basic digital operations, each of which can be serially performed in one word period, and means for combining these circuits into various combinations to form relatively complex operations which can be performed during a word period.

Another object of this invention is to provide a decision flip-flop which functions in conjunction with a program counter to provide an operation similar to what is known by coders of general purpose computers as a transfer of control command.

Another object of this invention is to provide novel circuitry whereby control information and arithmetic information may be simultaneously stored for use as required in three one-word recirculating registers arranged on a revolving drum.

Another object is to provide a novel means for locating a designated arc of a revolving drum memory by serially comparing a coded address placed in a recirculating register on the drum with a coded address permanently recorded on a circumferential channel of the drum.

Another object of this invention is to provide novel circuitry whereby the same set of flip-flops may be shared for manual placing of information into the drum memory, for selecting channels on the memory, for arithmetic manipulation, and for reading information from the memory.

Another object of this invention is to divide all the operations of the computer into a series of step operations each of which is to be performed in one word period.

Another object of this invention consists of utilizing a program counter to automatically sequence the computer through various one-word operations depending on: built-in circuitry, supplied coded information, and the results of the computations in previous word operations.

Another object of this invention is to provide novel means wherein the sub-sequences required to carry out an instruction are built into the program counter circuitry.

Still another object of this invention is to provide novel circuitry for initiating the program counter into taking over the sequencing of the various instructions to be carried out.

Still another object of this invention is to divide the read-out routines provided for the computer into one-word operation sequences and to enable these read-out routines to share certain common operations.

Still another object of this invention relates to novel means whereby the results of the computer performance may be tested after any of its word operations, or series of word operations.

Other objects of this invention will be pointed out in the following description and claims, and illustrated in the accompanying drawings which disclose, by way of example, the principle of the invention and the best mode which has been contemplated of applying that principle.

Figure 3:
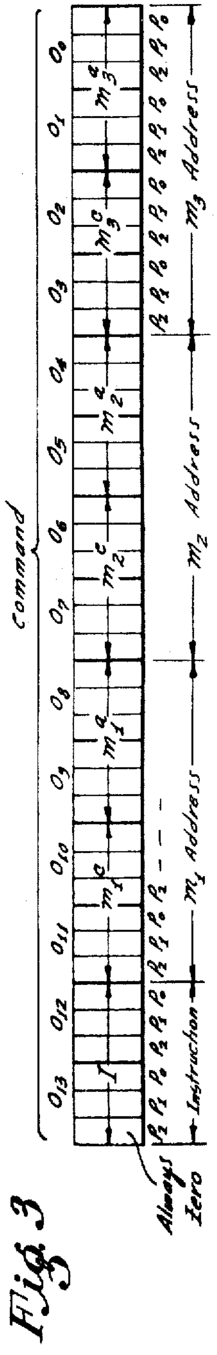
Fig. 3 shows a detail of the code pattern employed during a word period to represent a command.
Figure 3A:
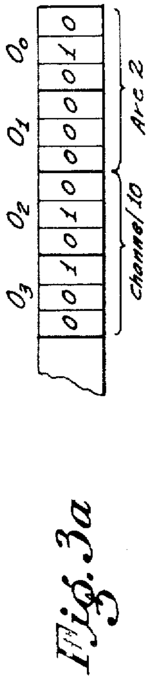

Fig. 3*a* shows an example of a particular memory address located in a portion of a command.

Figure 4:
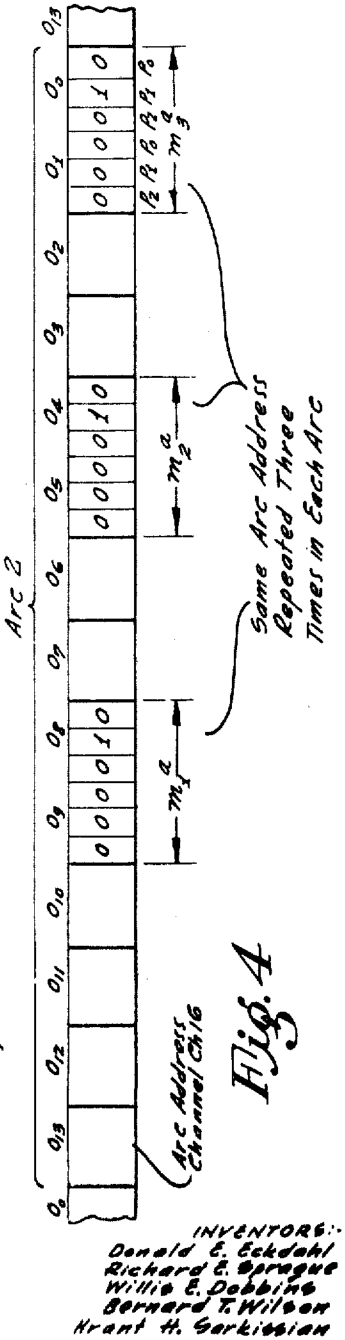

Fig. 4 shows one word period of the arc address channel revealing how the code pattern of an arc address is located thereon.

Figure 5:
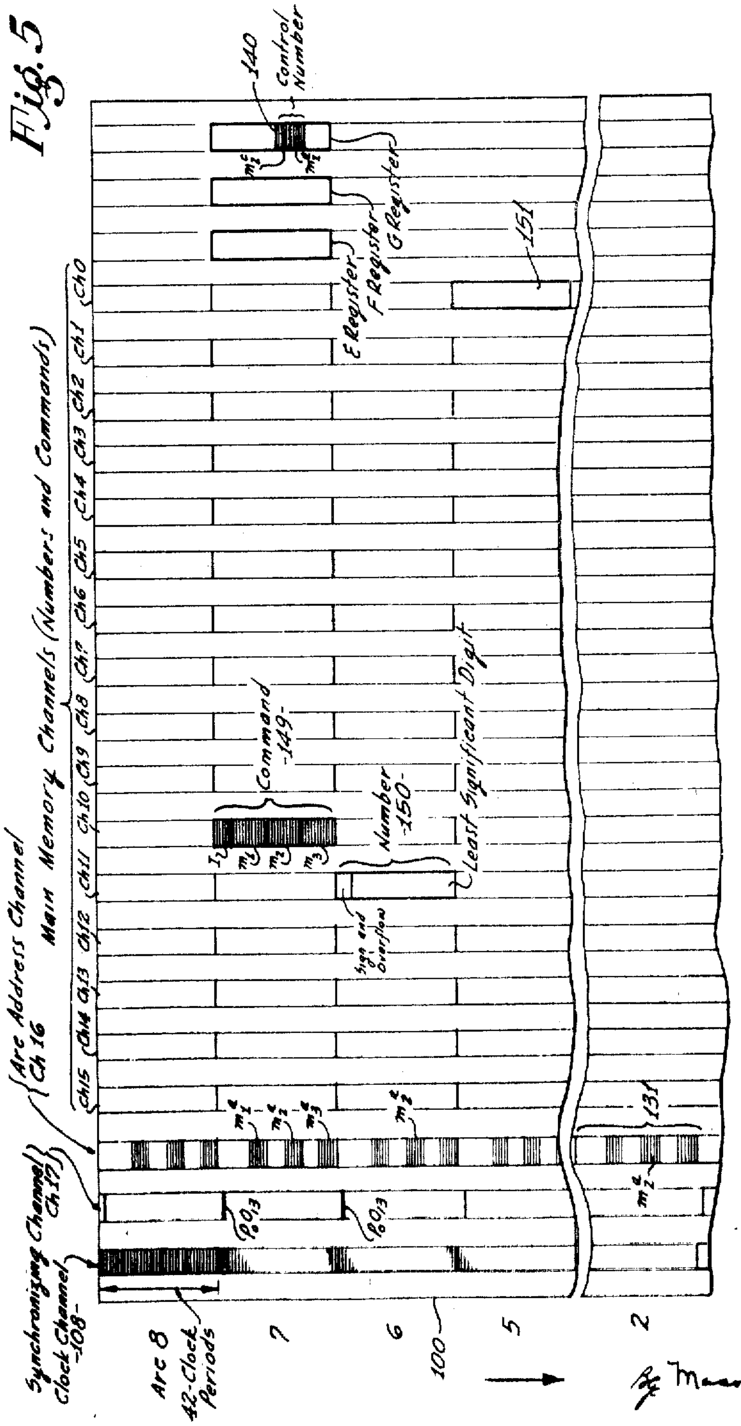

Fig. 5 is a plan view of the magnetic drum memory showing the channels and arrangement of the information thereon.

Fig. 6*a* is a table indicating the coded information used for representing the sign and overflow conditions of a number.

Fig. 6*b* is a table indicating the coded information used for representing each of the instructions provided for in the computer.

Fig. 7 is a table showing the states assumed by the A1 to A5 flip-flops when used as the channel selector register.

Fig. 8 is an electrical diagram of the clock channel pickup circuitry provided for generating the clock pulses.

Figure 9:
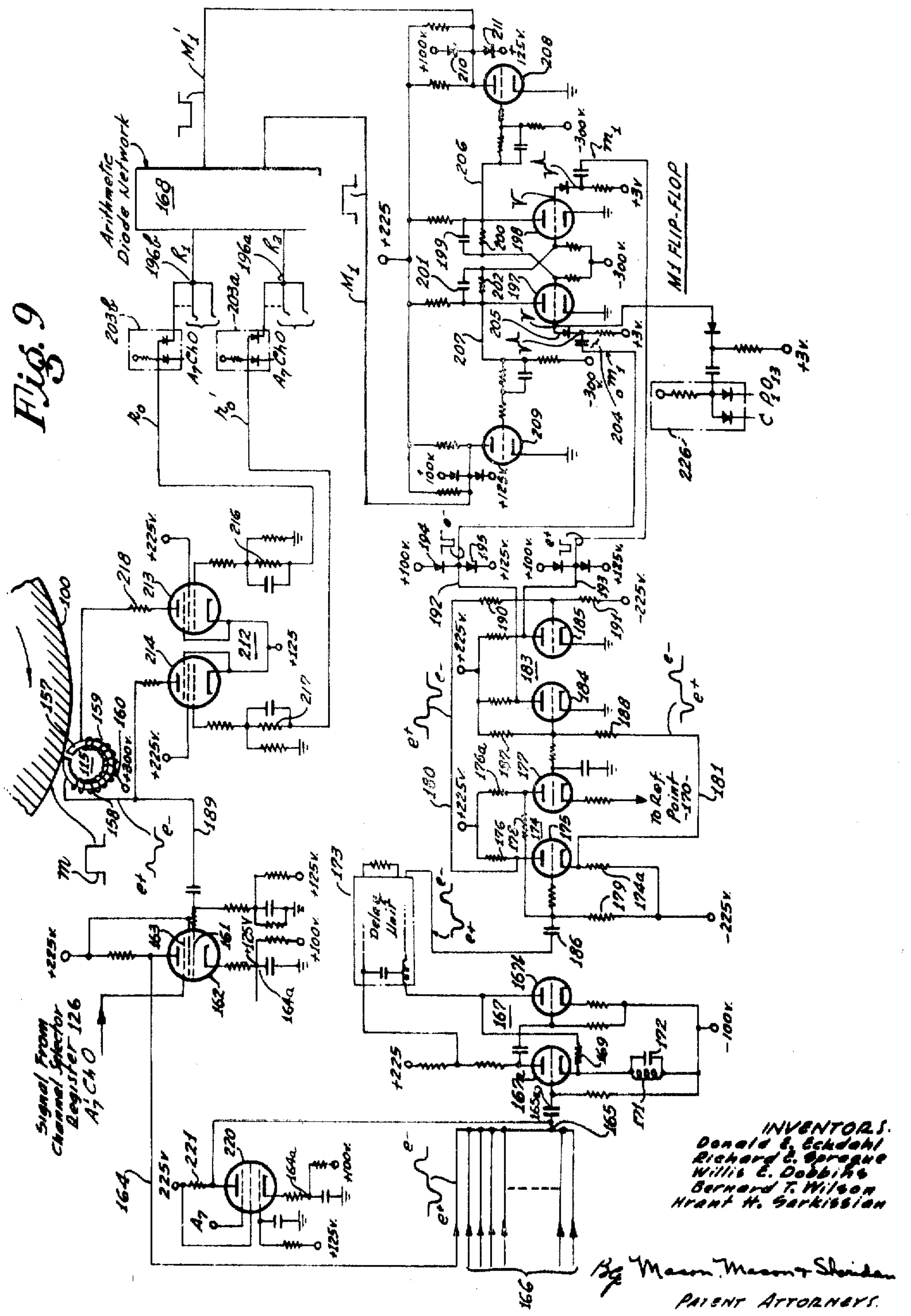

Fig. 9 is an electrical diagram of the pickup and record circuits provided for the main memory channels on the drum.

Figure 10:
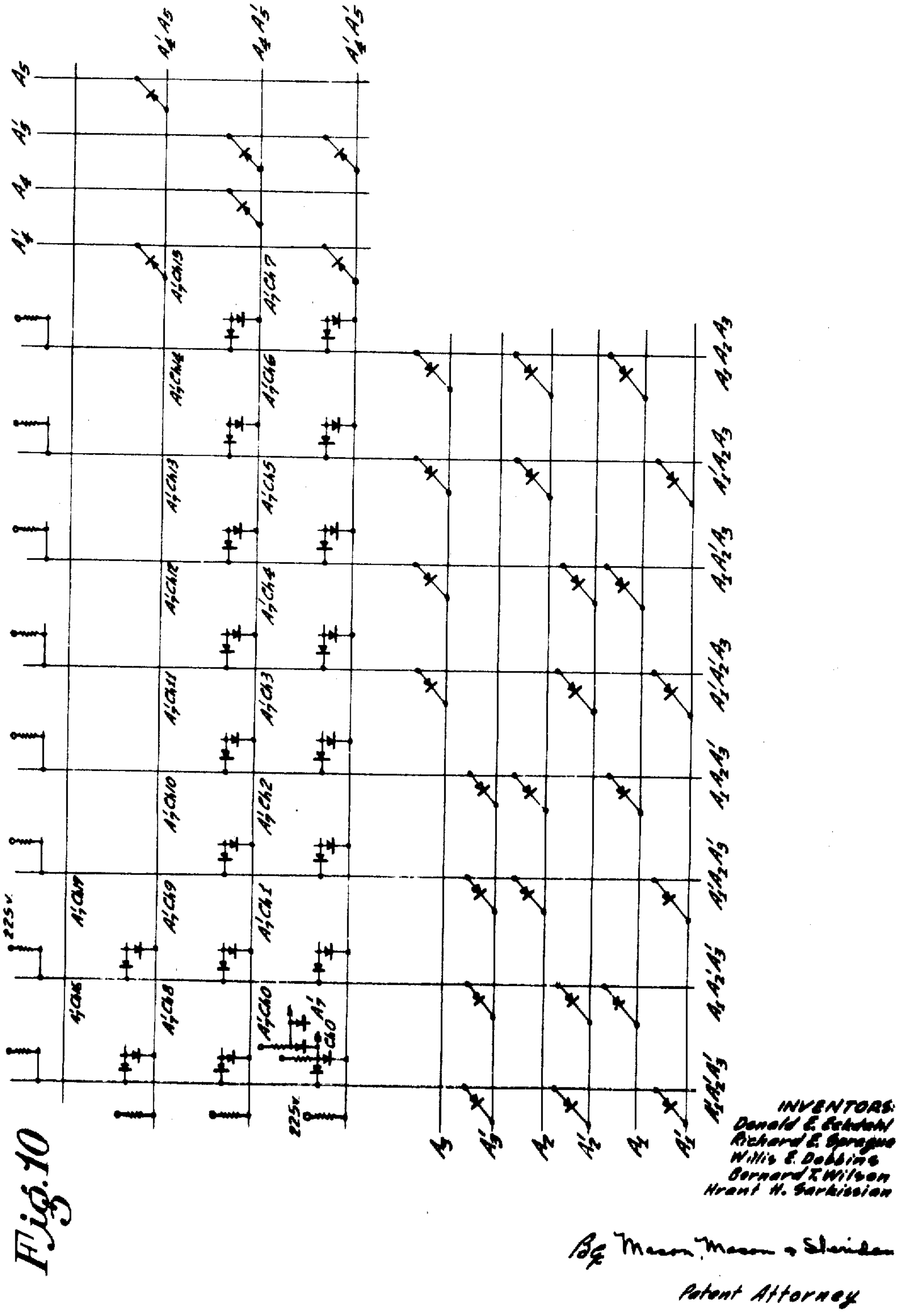

Fig. 10 is a circuit diagram of the channel selector register matrix used in conjunction with the pickup circuitry.

Figure 11:
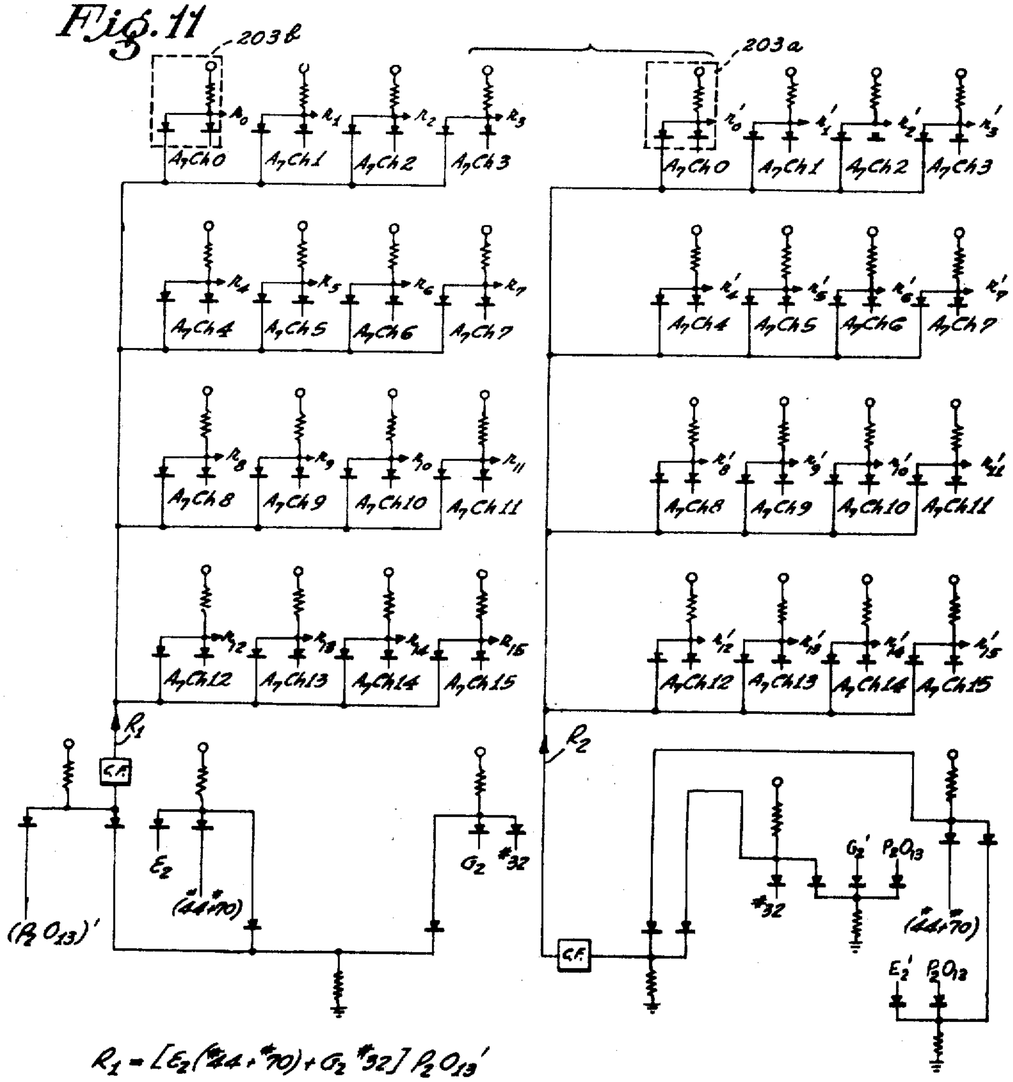

Fig. 11 is a circuit diagram of the channel recording diode network.

Figure 12:
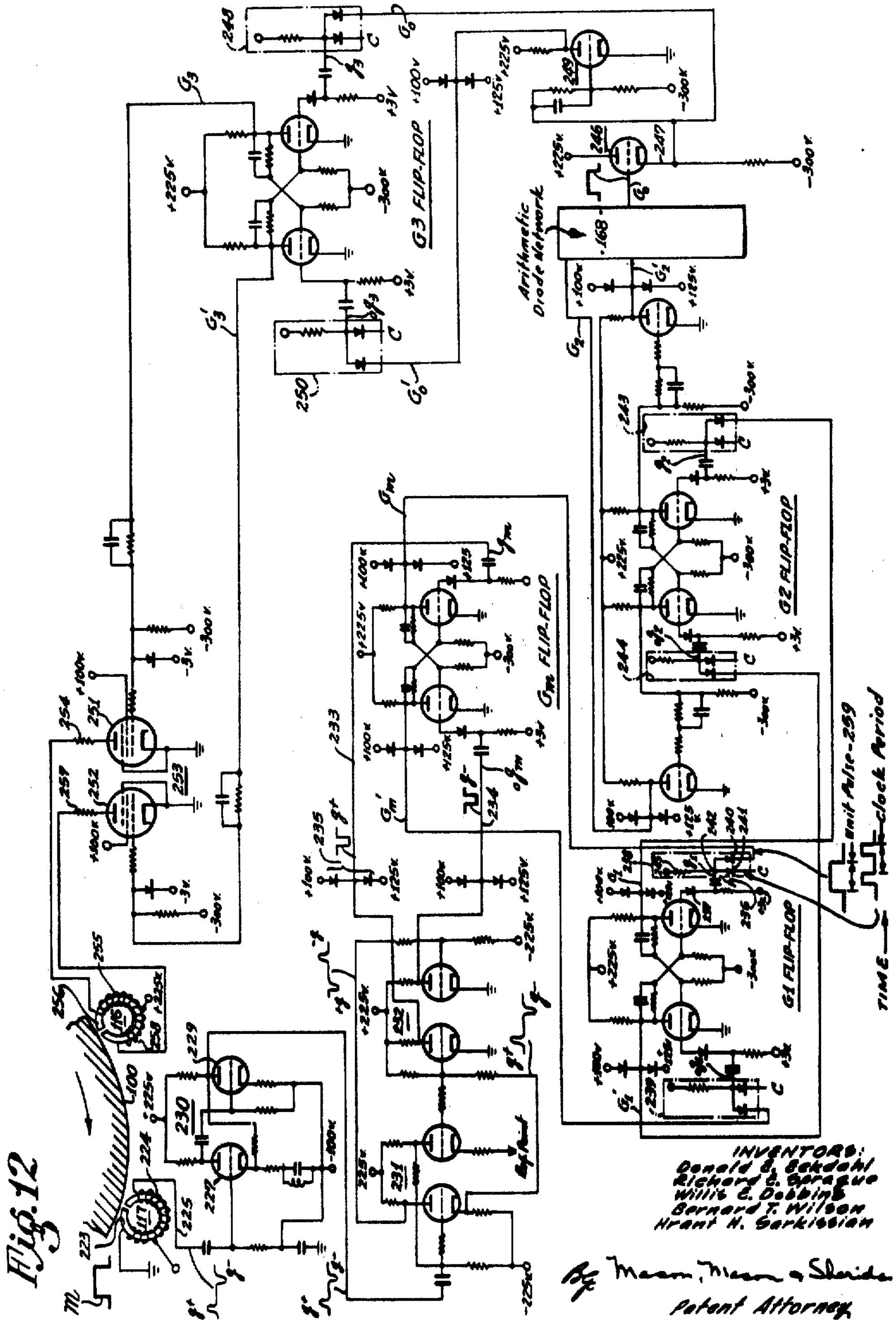

Fig. 12 is an electrical diagram of the circuits provided for the G recirculating register.

Figure 13:
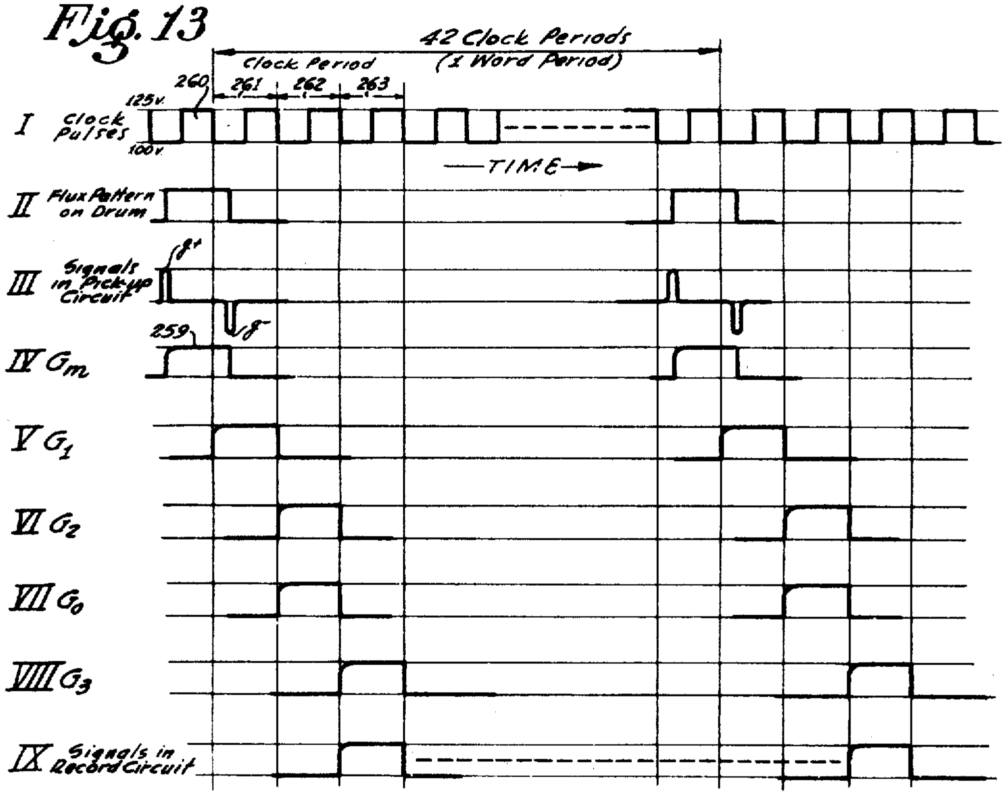

Fig. 13 is a chart of graphs indicating how a unit of information is recirculated in the G recirculating register.

Figure 14:
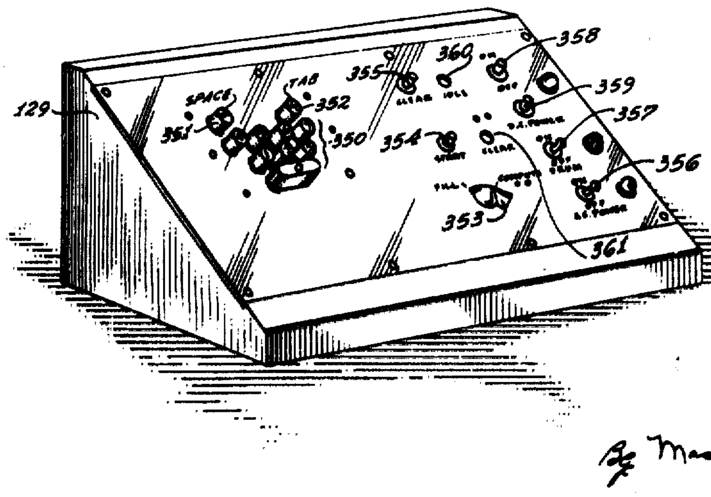

Fig. 14 is a perspective view of the manual control panel provided for the computer.

Figure 14A:
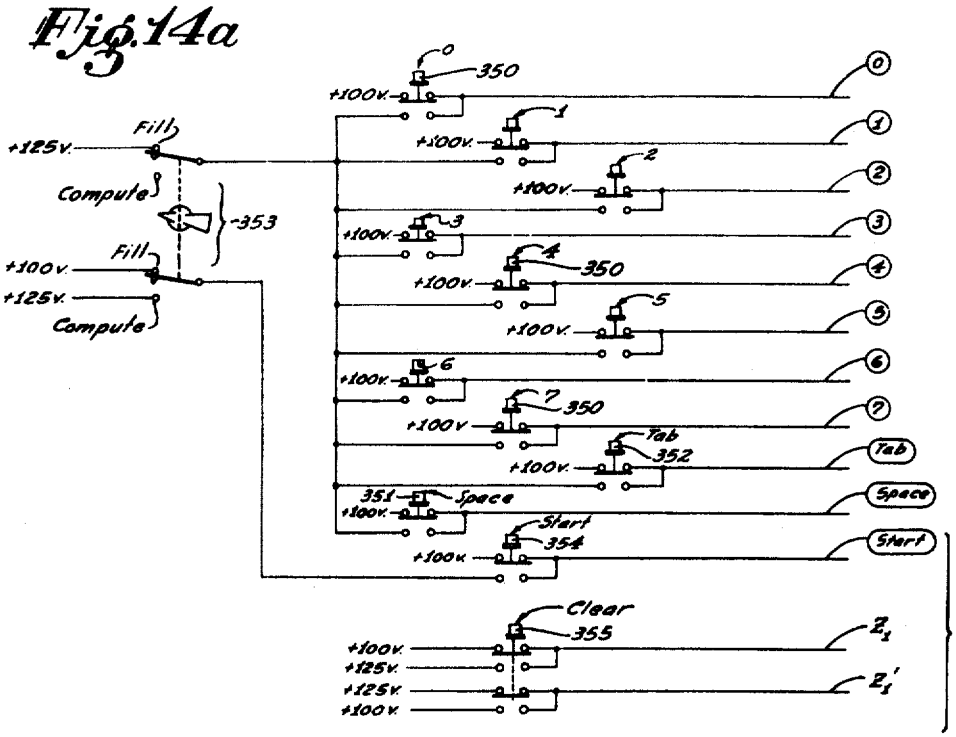

Fig. 14*a* is a partial wiring diagram of the control panel shown in Fig. 14.

Fig. 15 is a table showing the states of the B1 and B2 flip-flops which define the pulse positions of a coded octal digit.

Fig. 16 shows block diagrams of the B1 and B2 flip-flops, together with the logical equations defining the mode of energizing their trigger inputs.

Fig. 17 is an electrical diagram of the diode networks for generating the trigger input equations shown in Fig. 16.

Fig. 18 is an electrical diagram of the diode network for generating the P counter outputs.

Figure 19:
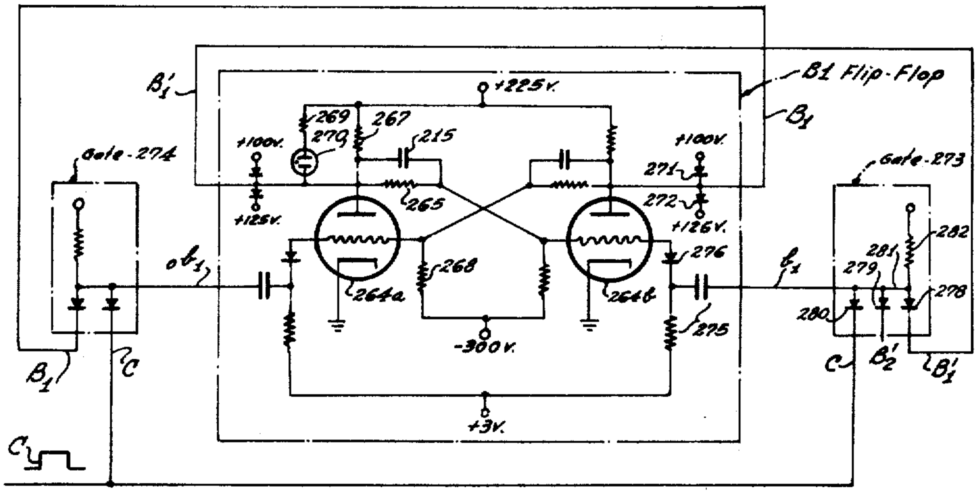

Fig. 19 is a detailed circuit diagram of the B1 flip-flop used in the P counter.

Figure 20:
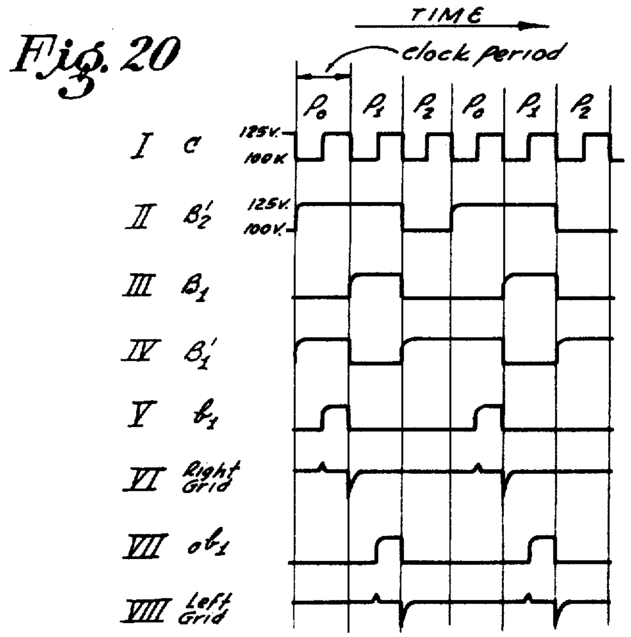

Fig. 20 is a graph of the waveforms which are referred to in explaining the operation of the B1 flip-flop.

Figures 21, 22, 25:
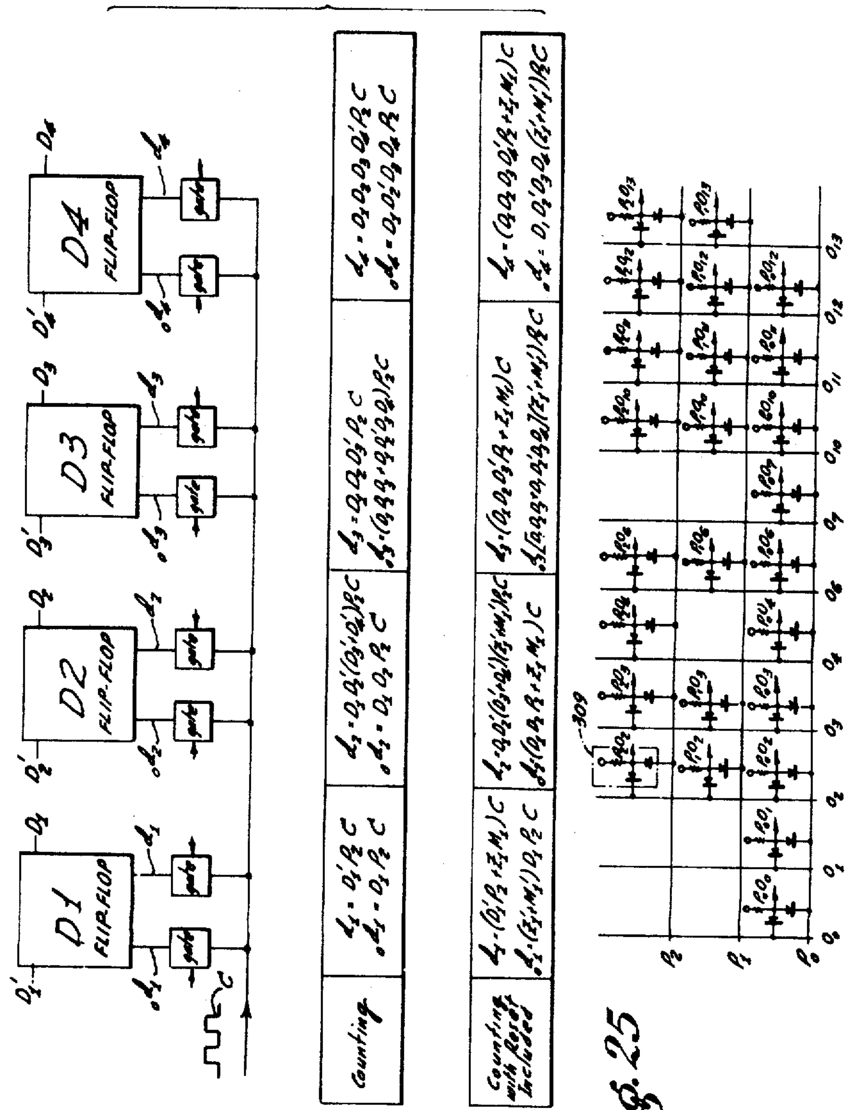

Fig. 21 is a table showing the states of the D1–D4 flip-flops which define the octal digit positions in a word.

Fig. 22 shows block diagrams of the D1–D4 flip-flops, together with the logical equations defining the mode of energizing their trigger inputs.

Figure 23:
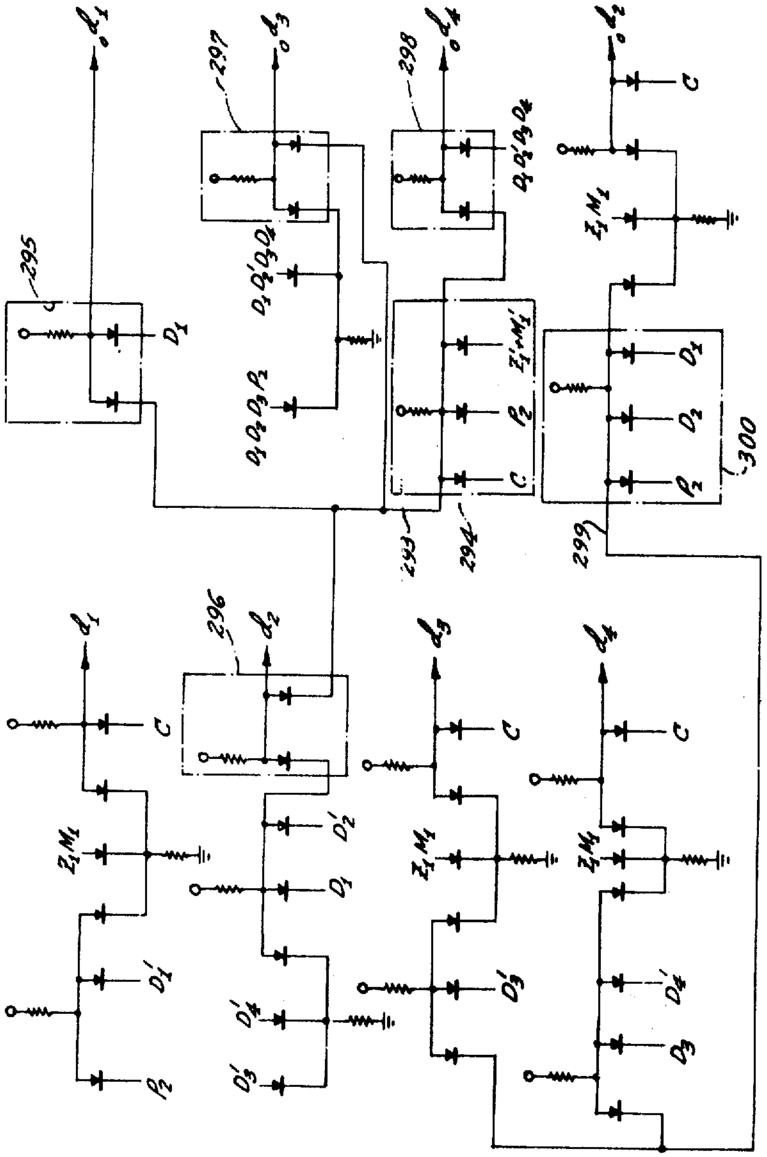

Fig. 23 is an electrical diagram of the diode networks for generating the trigger input equations shown in Fig. 22.

Figure 24:
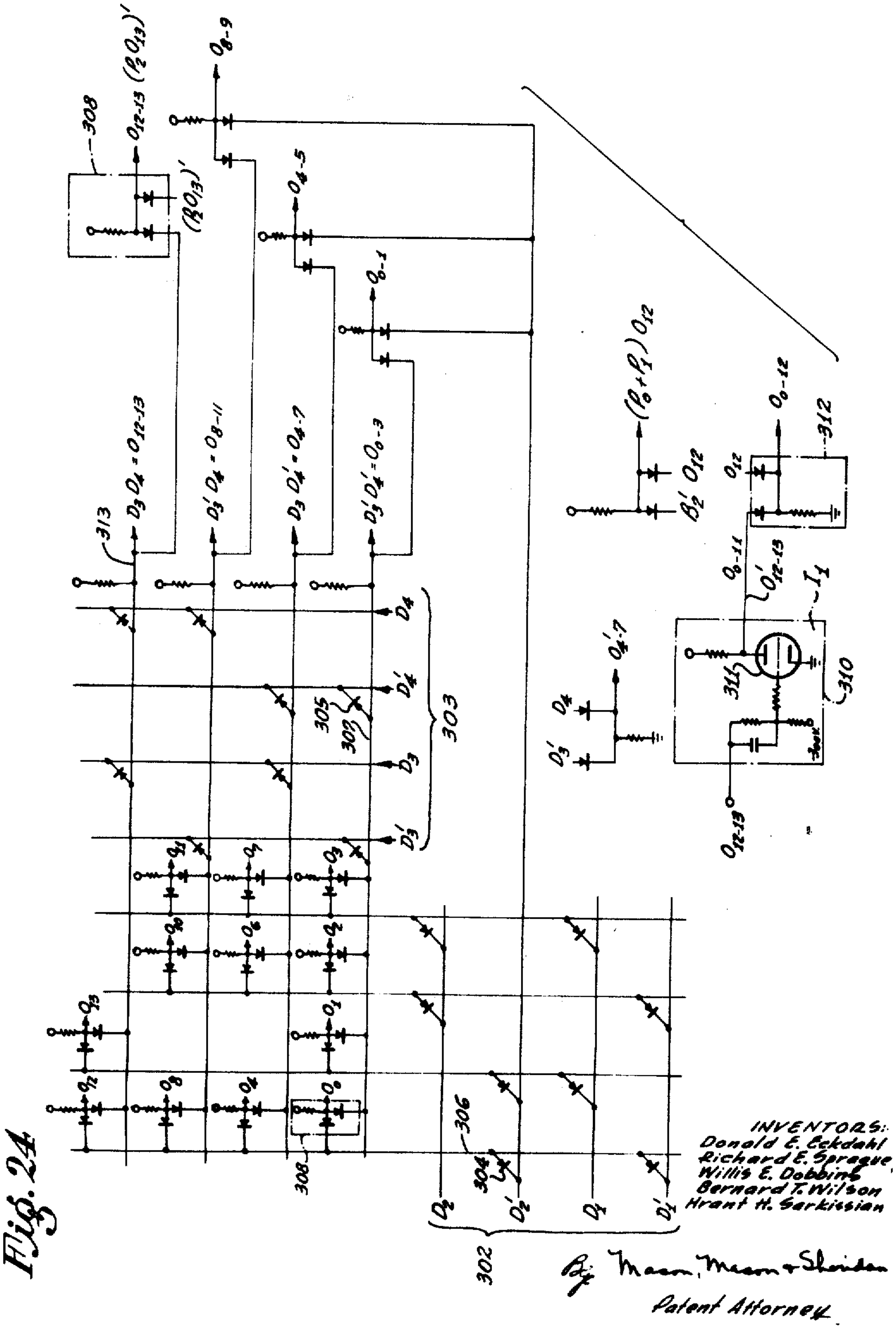

Fig. 24 is an electrical diagram of the diode matrix for generating octal digit outputs and ranges of octal digit outputs needed for the operations in the arithmetic unit.

Fig. 25 is an electrical diagram of the diode matrix for generating the P and O digit combinations needed for the operations in the arithmetic unit.

Figure 26:
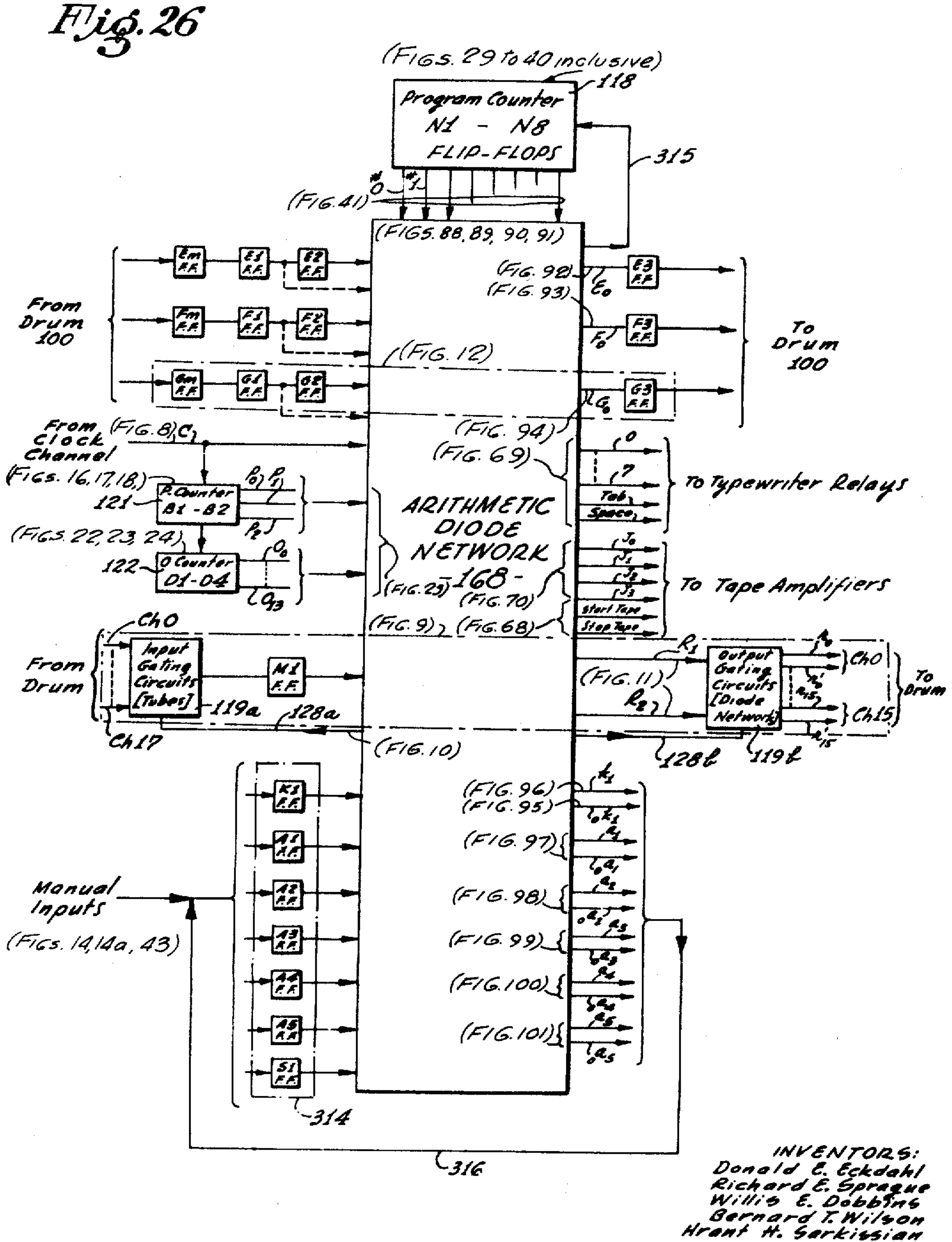

Fig. 26 is an overall diagram of the arithmetic unit showing the inputs, outputs, and storage flip-flops.

Figure 26A:
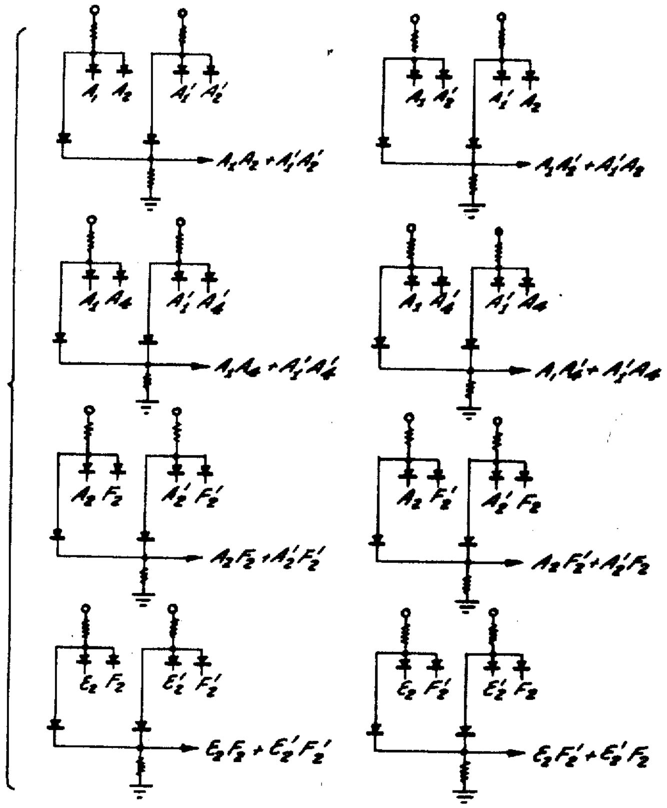

Fig. 26*a* shows a portion of the product and sum networks provided in the arithmetic diode network.

Figure 27:
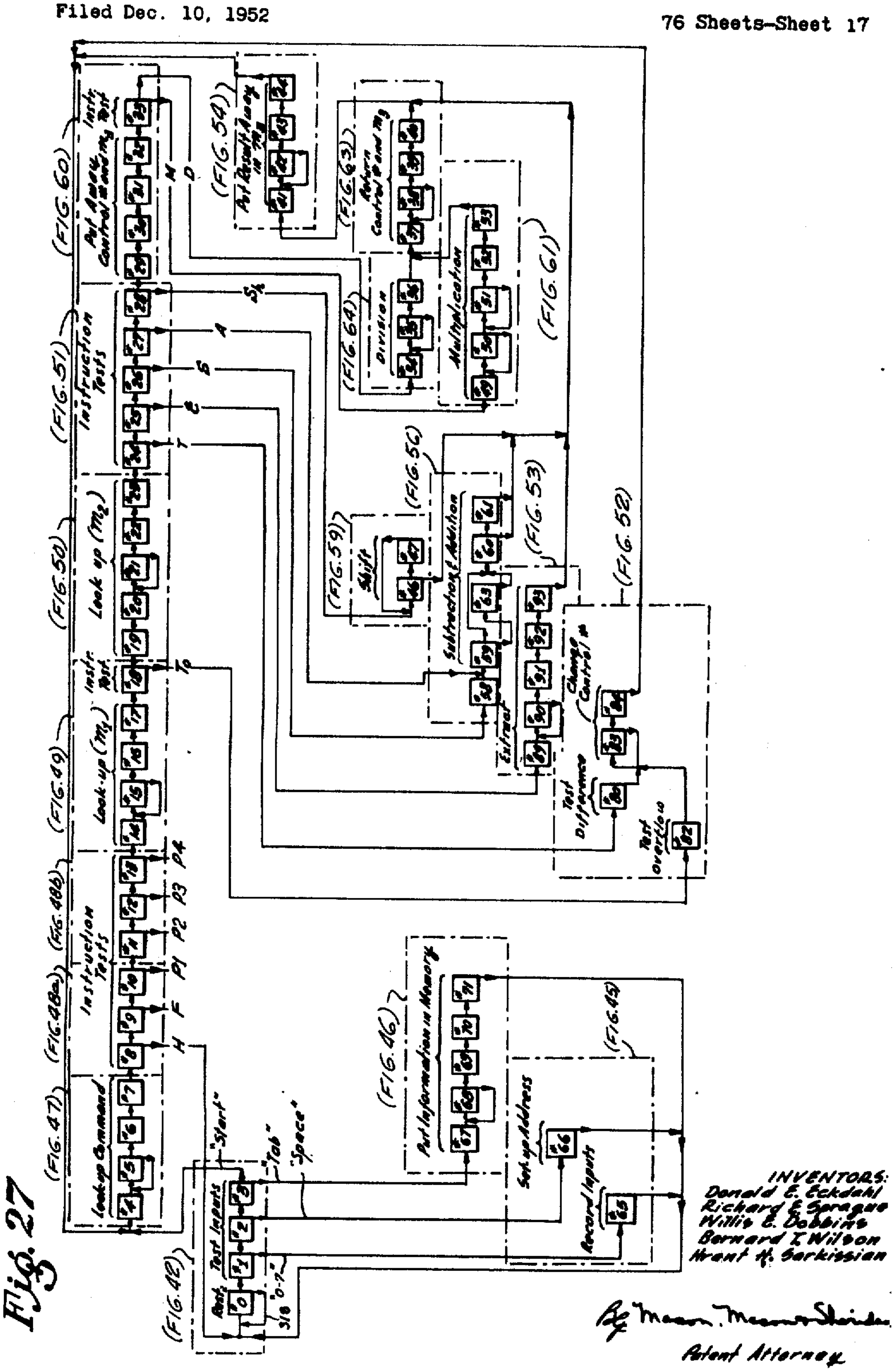

Fig. 27 is a functional flow diagram of the one-word operations performed by the computer.

Figure 28:
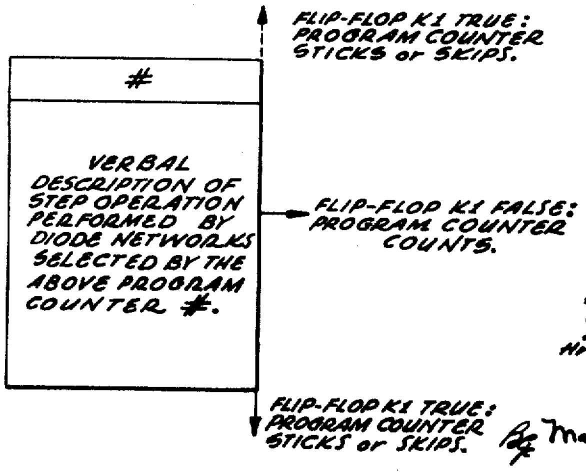

Fig. 28 shows a diagram indicating the significance attached to the outputs from the box used for describing each of the one-word operations in the flow diagram.

Figure 29:
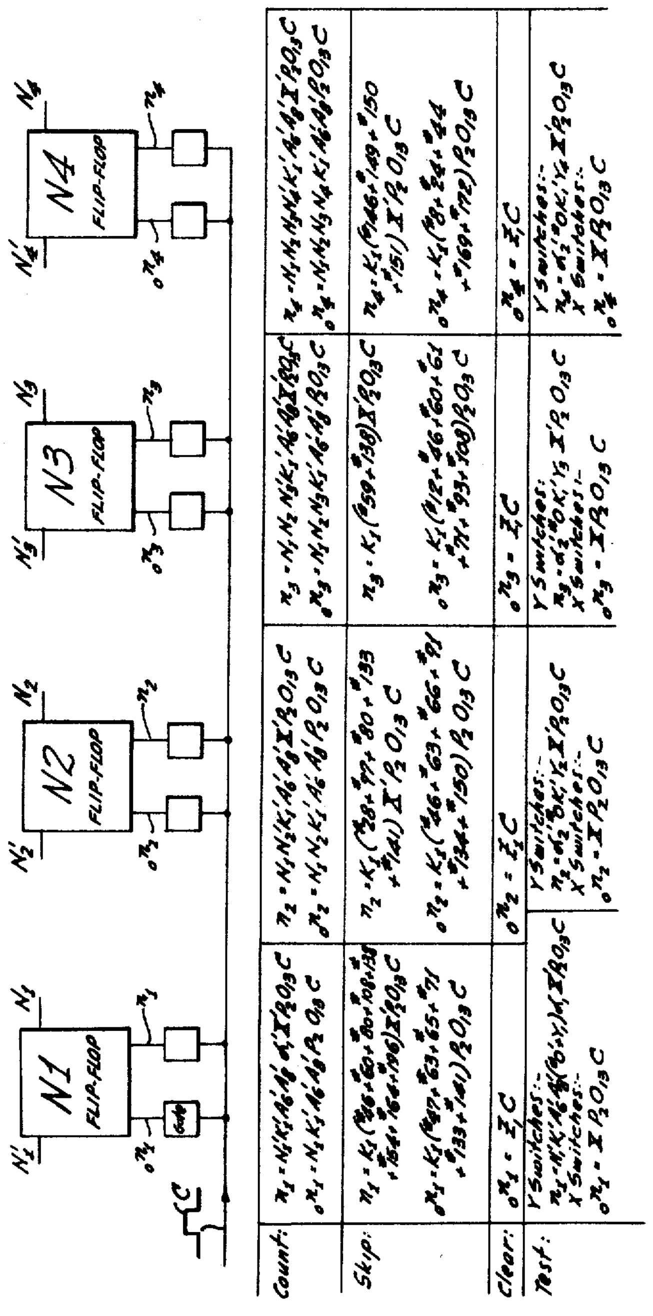
Figure 30:
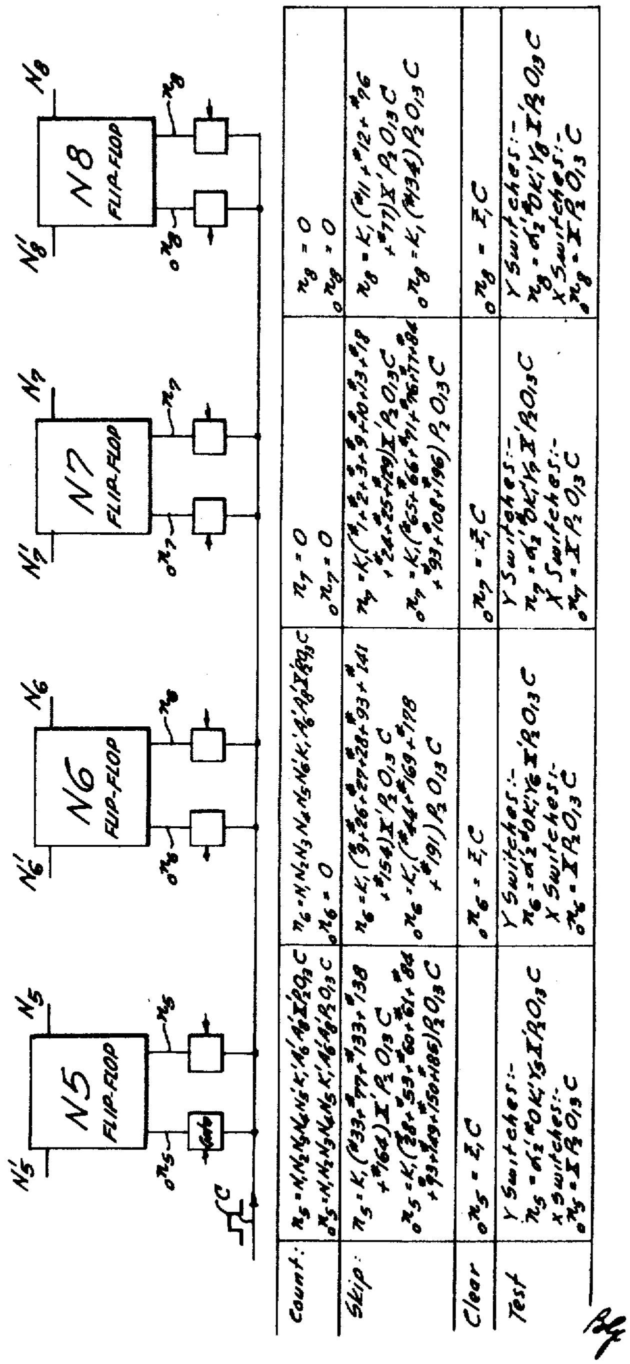

Figs. 29 and 30 show block diagrams of the N1 through N8 flip-flops comprising the program counter, together with the logical equations defining counting, skipping, clearing, and testing operations.

Fig. 30*a* shows the circuitry for the A6 and A8 flip-flops comprising the auxiliary delay counter.

Fig. 30*b* is a table showing the counting cycle of the auxiliary delay counter.

Fig. 30*c* shows the switching circuitry for generating the X test proposition.

Fig. 30*d* shows the circuitry for the A7 flip-flop used for controlling the main memory gating circuitry.

Figure 31:
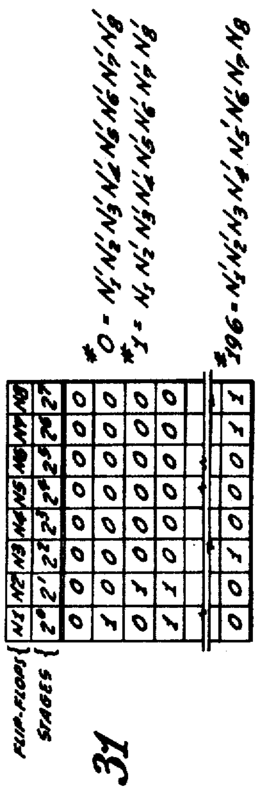

Fig. 31 is a table showing the states of the N1 through N8 flip-flops which in combination define each of the program counter word operation numbers.

Figure 32:
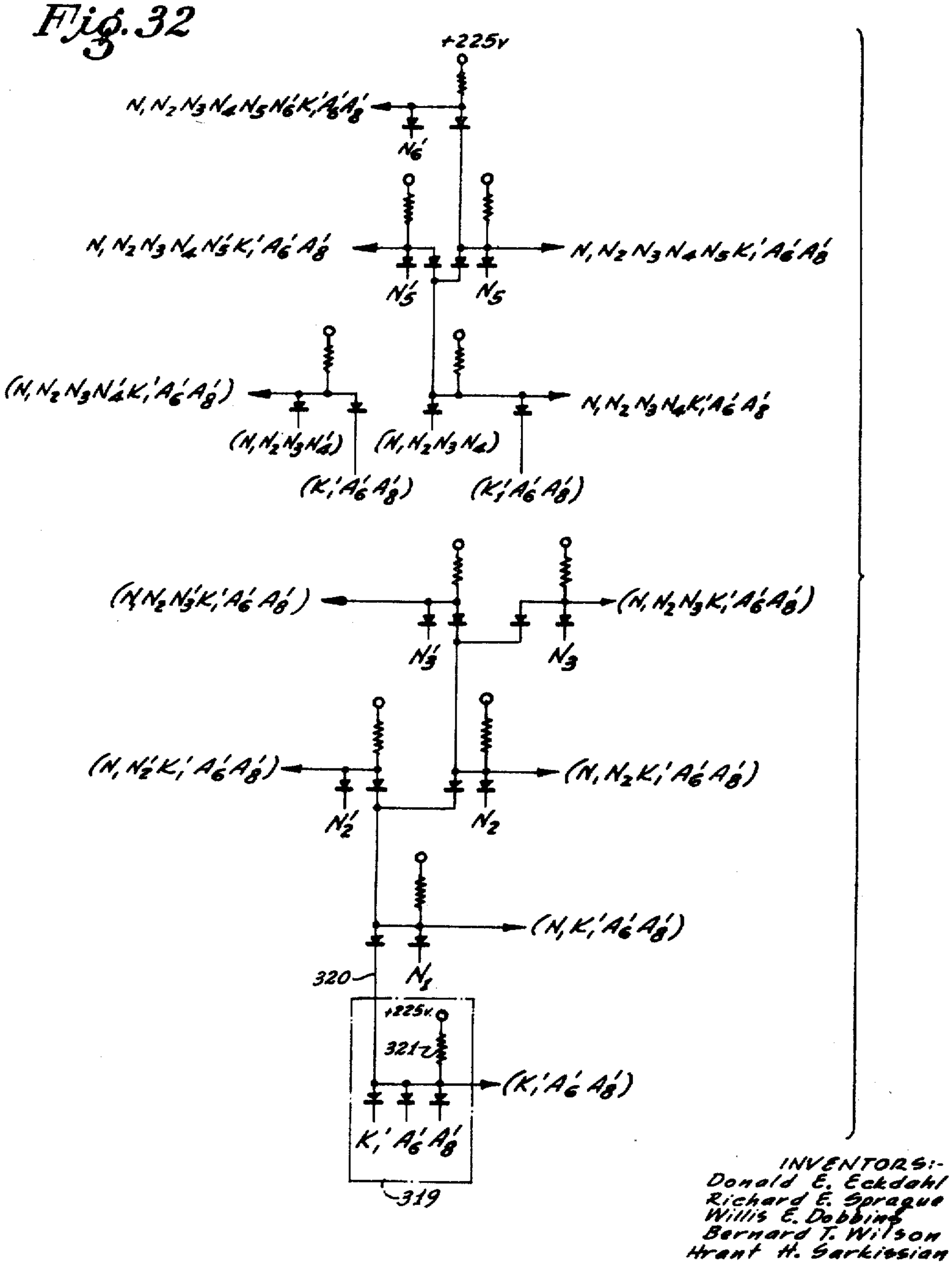

Fig. 32 is a diode network showing how portions of the counting equations for the program counter flip-flops are generated.

Figure 33:
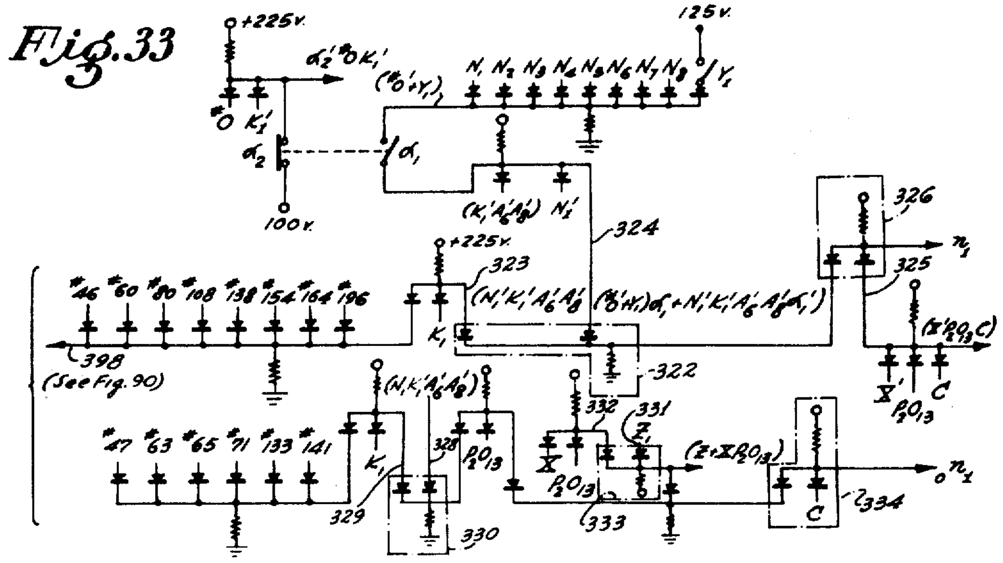

Fig. 33 is a composite diode network for the N1 flip-flop triggering equations.

Figure 34:
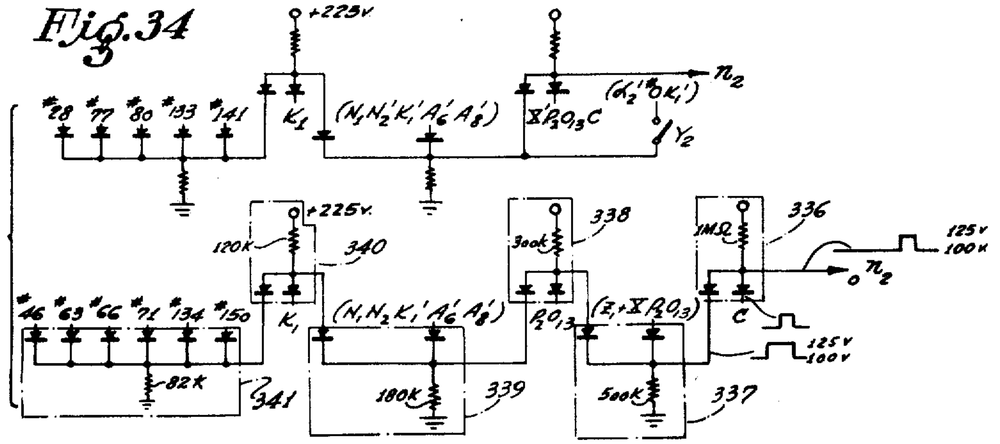

Fig. 34 is a composite diode network for the N2 flip-flop triggering equations.

Figure 35:
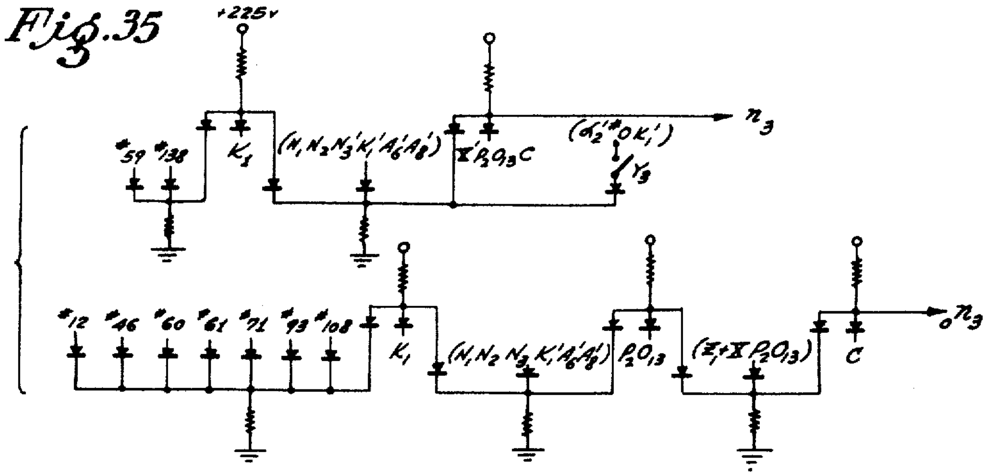

Fig. 35 is a composite diode network for the N3 flip-flop triggering equations.

Figure 36:
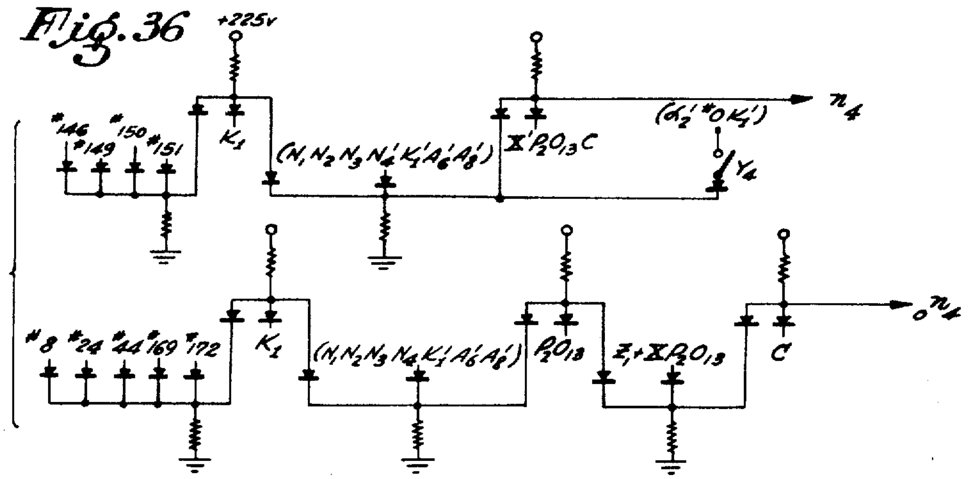

Fig. 36 is a composite diode network for the N4 flip-flop triggering equations.

Figure 37:
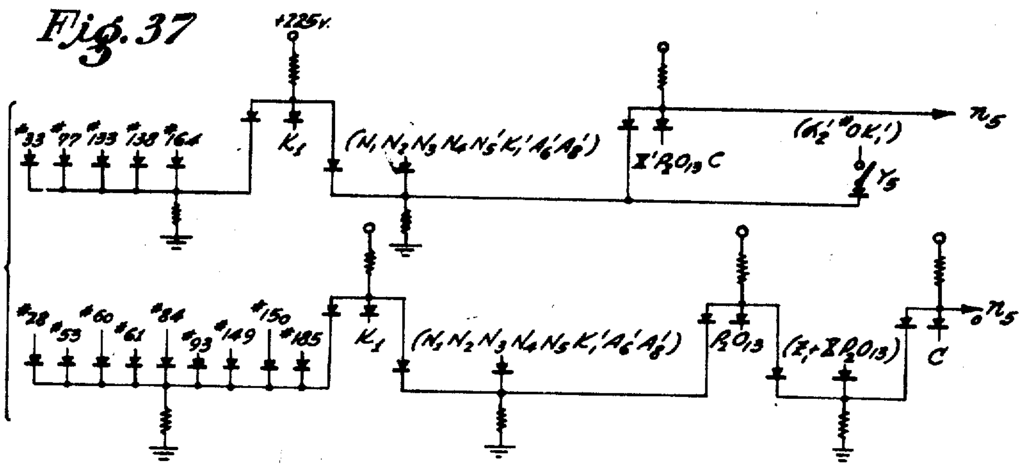

Fig. 37 is a composite diode network for the N5 flip-flop triggering equations.

Figure 38:
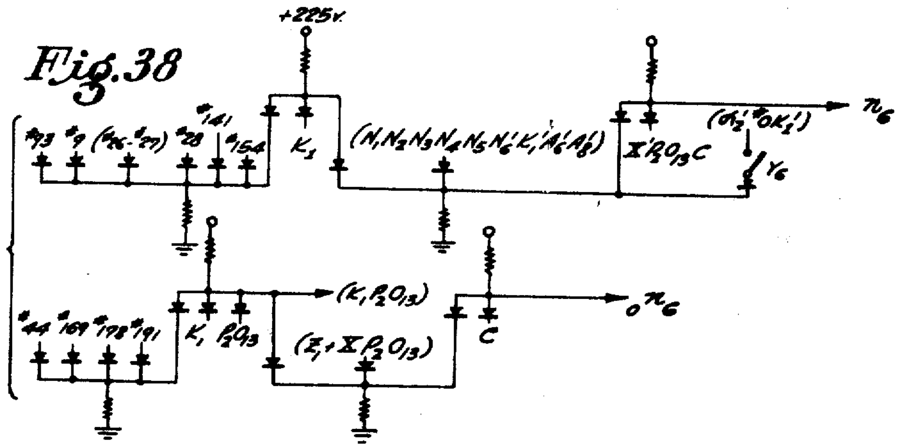

Fig. 38 is a composite diode network for the N6 flip-flop triggering equations.

Figure 39:
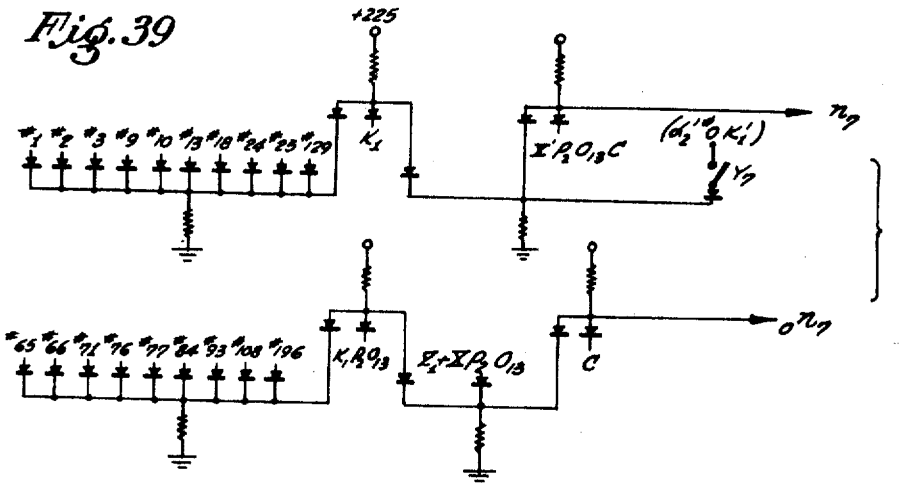

Fig. 39 is a composite diode network for the N7 flip-flop triggering equations.

Figure 40:
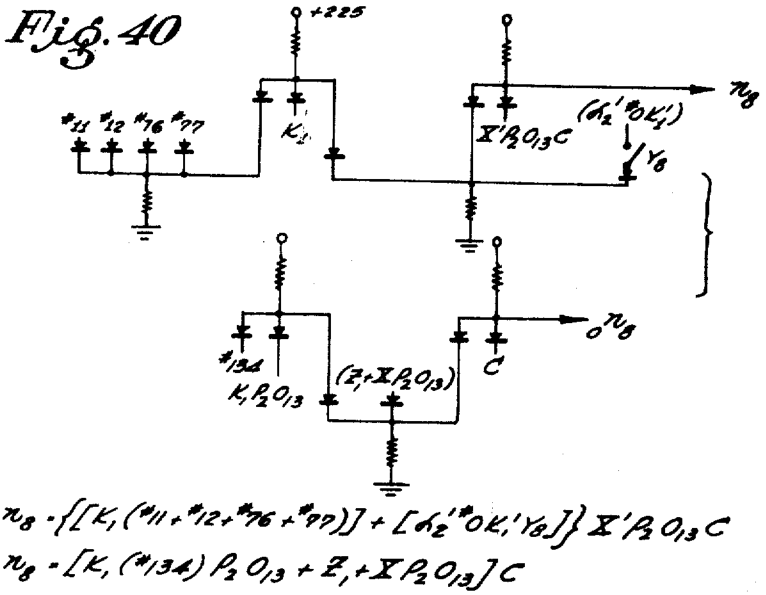

Fig. 40 is a composite diode network for the N8 flip-flop triggering equations.

Figure 41:
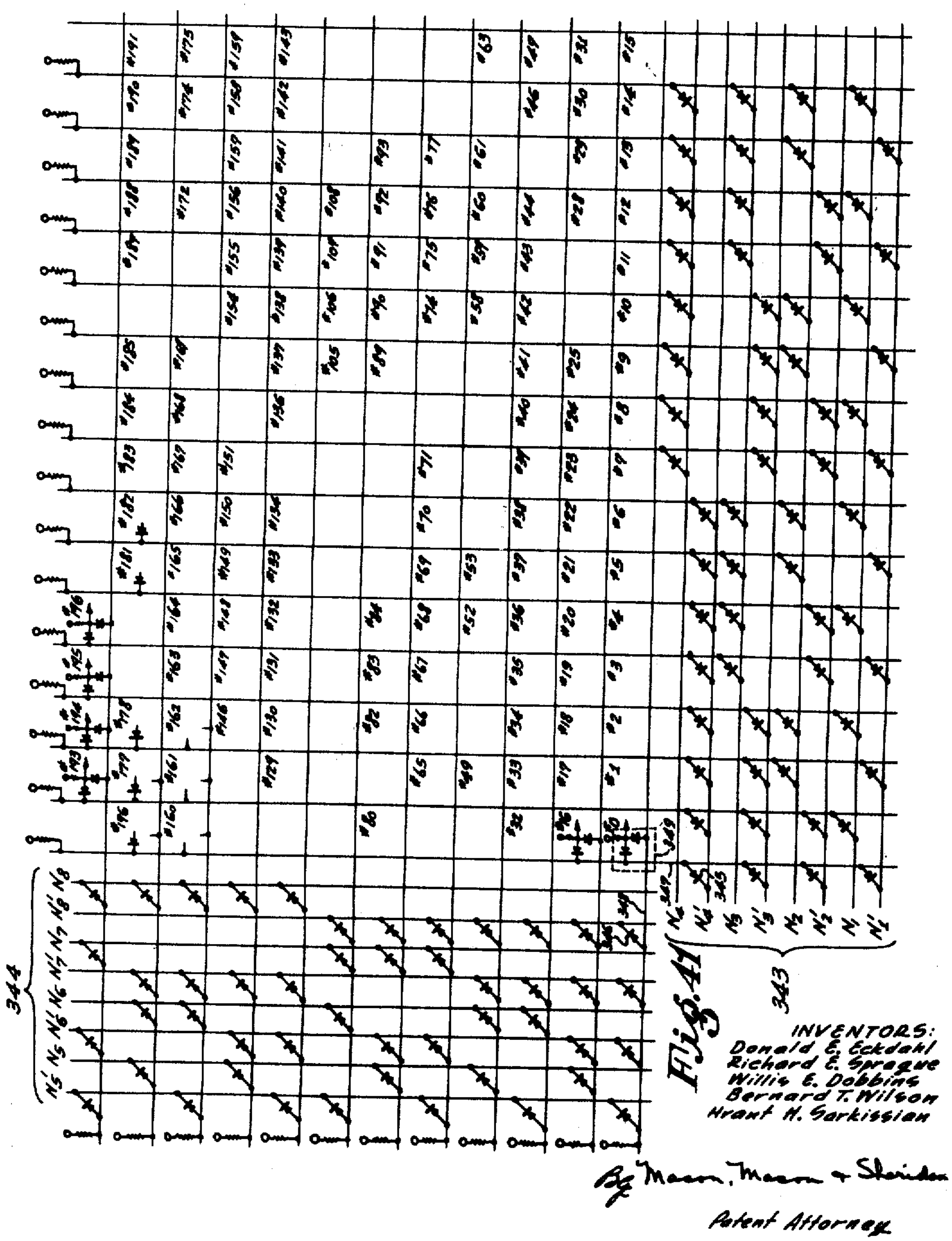

Fig. 41 is a diode matrix for generating the program counter number outputs.

Figure 42:
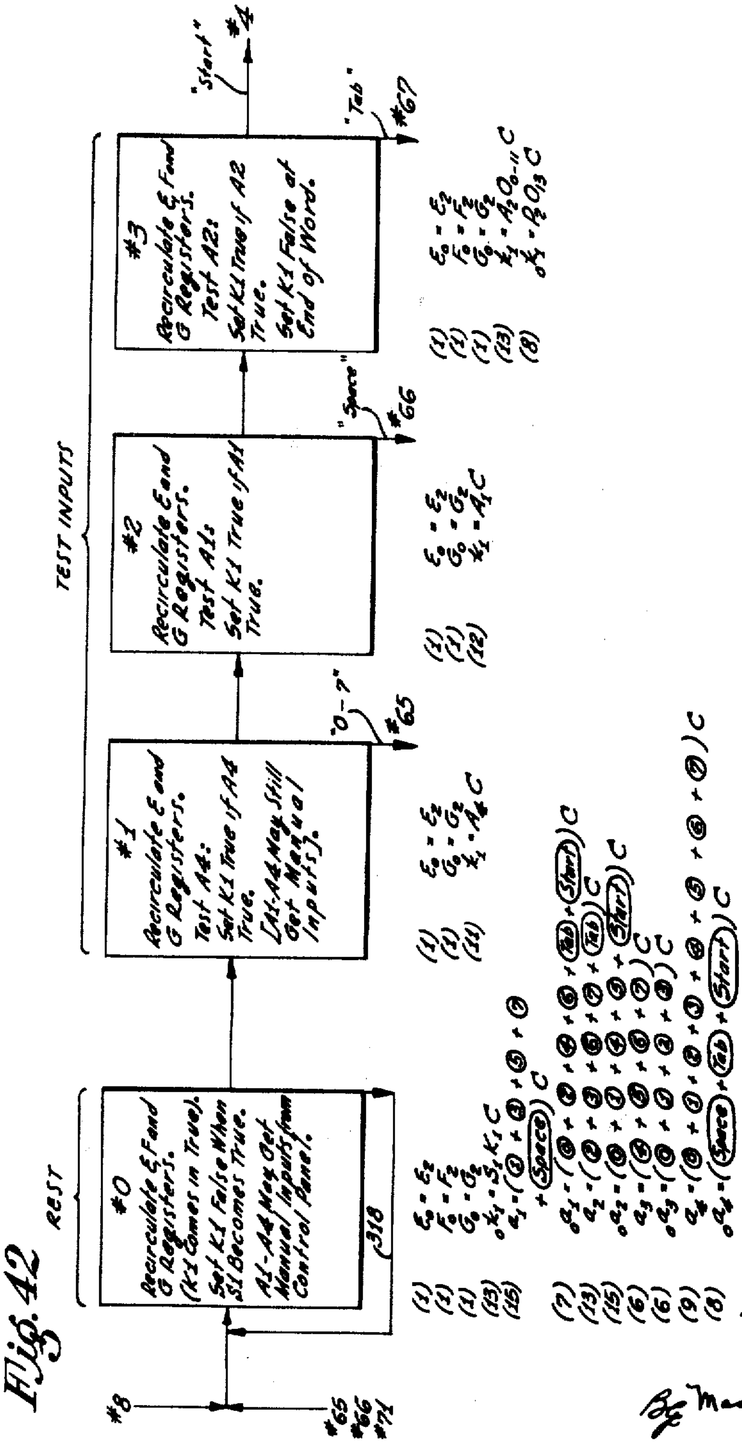

Fig. 42 shows the details of the step operations by which the computer decides which of the fill subroutines to carry out.

Figure 43:
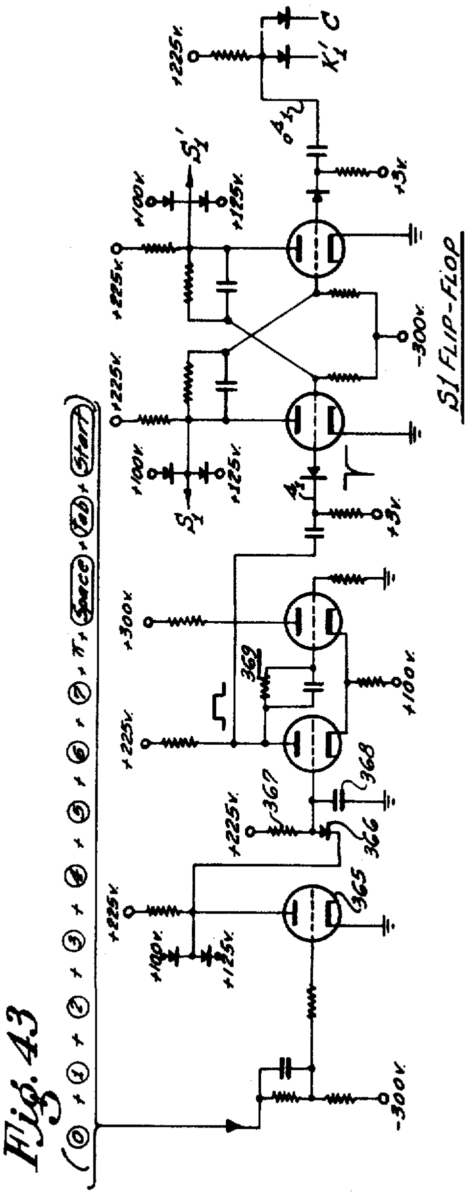

Fig. 43 shows an electrical diagram of the start flip-flop circuit.

Figure 44:
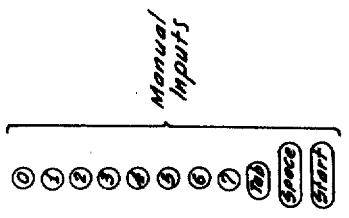

Fig. 44 shows a table of the states assumed by the A1–A4 flip-flops when initiated by each of the push buttons on the manual control panel.

Figure 45:
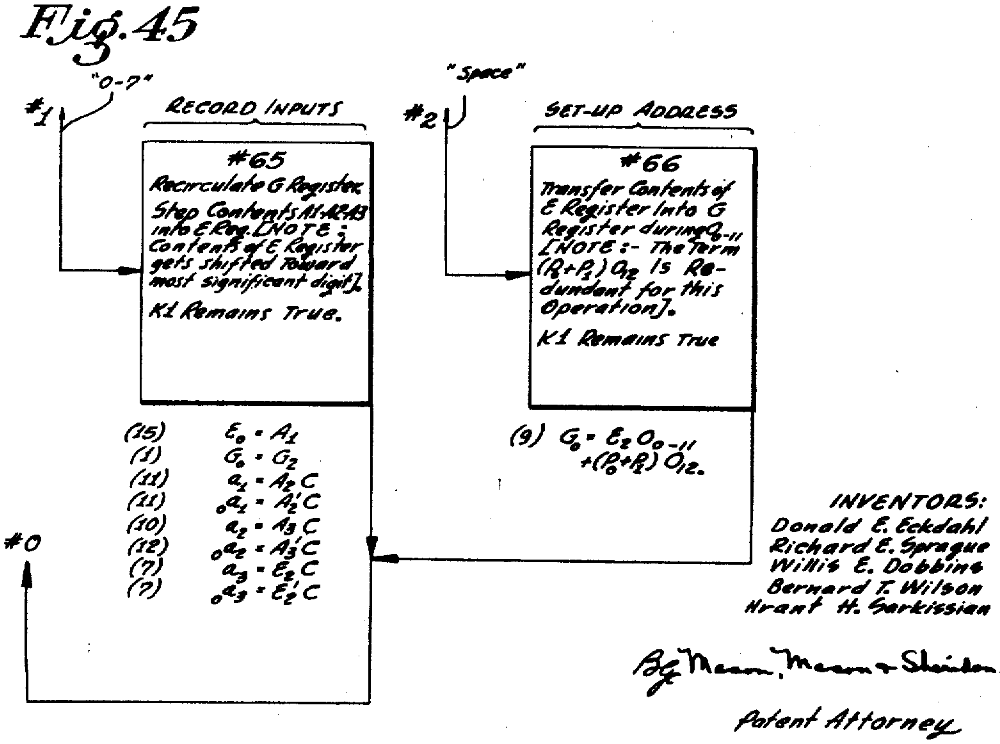

Fig. 45 shows details of the step operations by which the computer records digit inputs in the E register and sets up the address in the G register.

Figure 46:
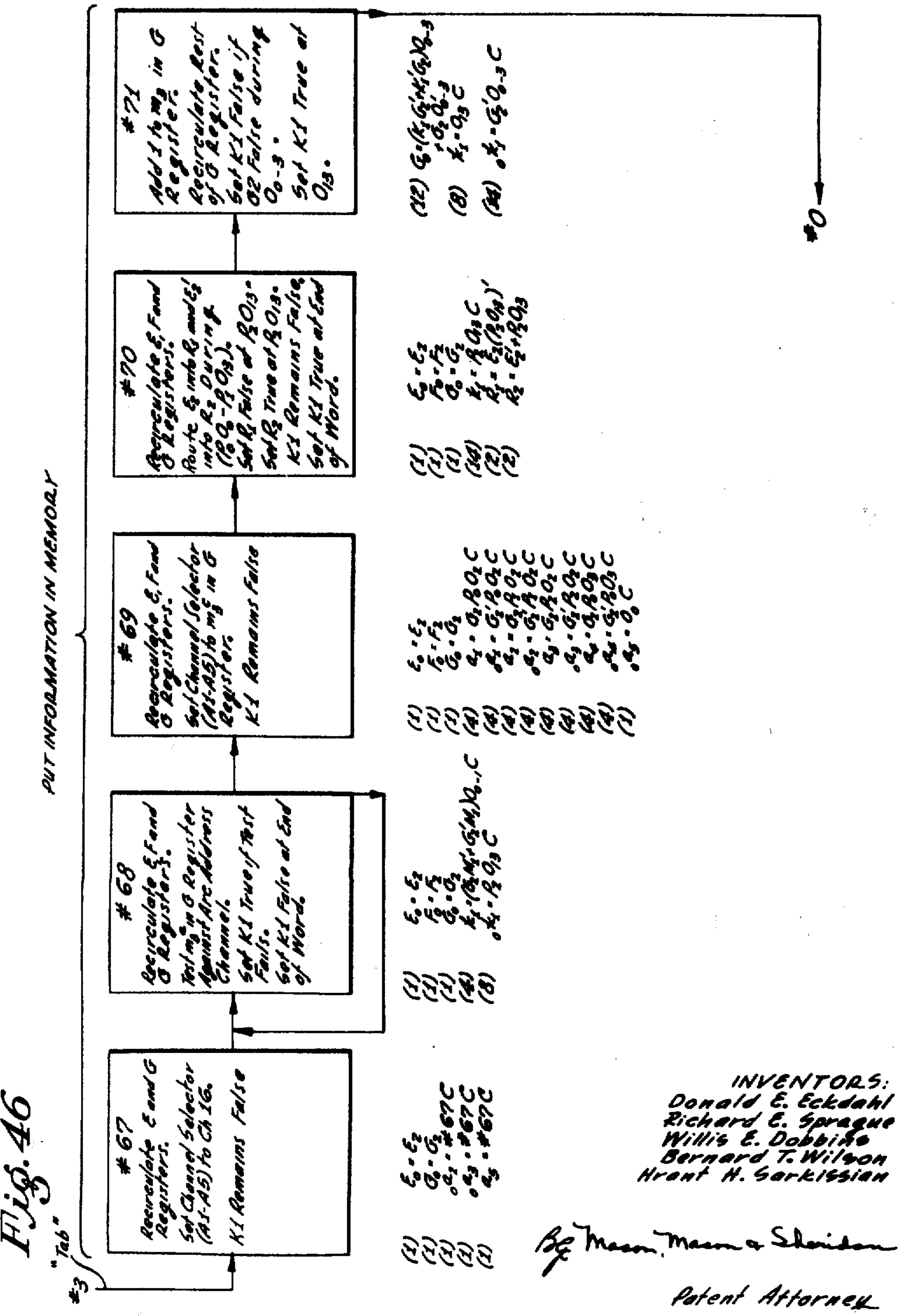

Fig. 46 shows the details of the step operations provided in the computer for recording information manually set up on the control panel into the main memory registers of the drum.

Figure 47:
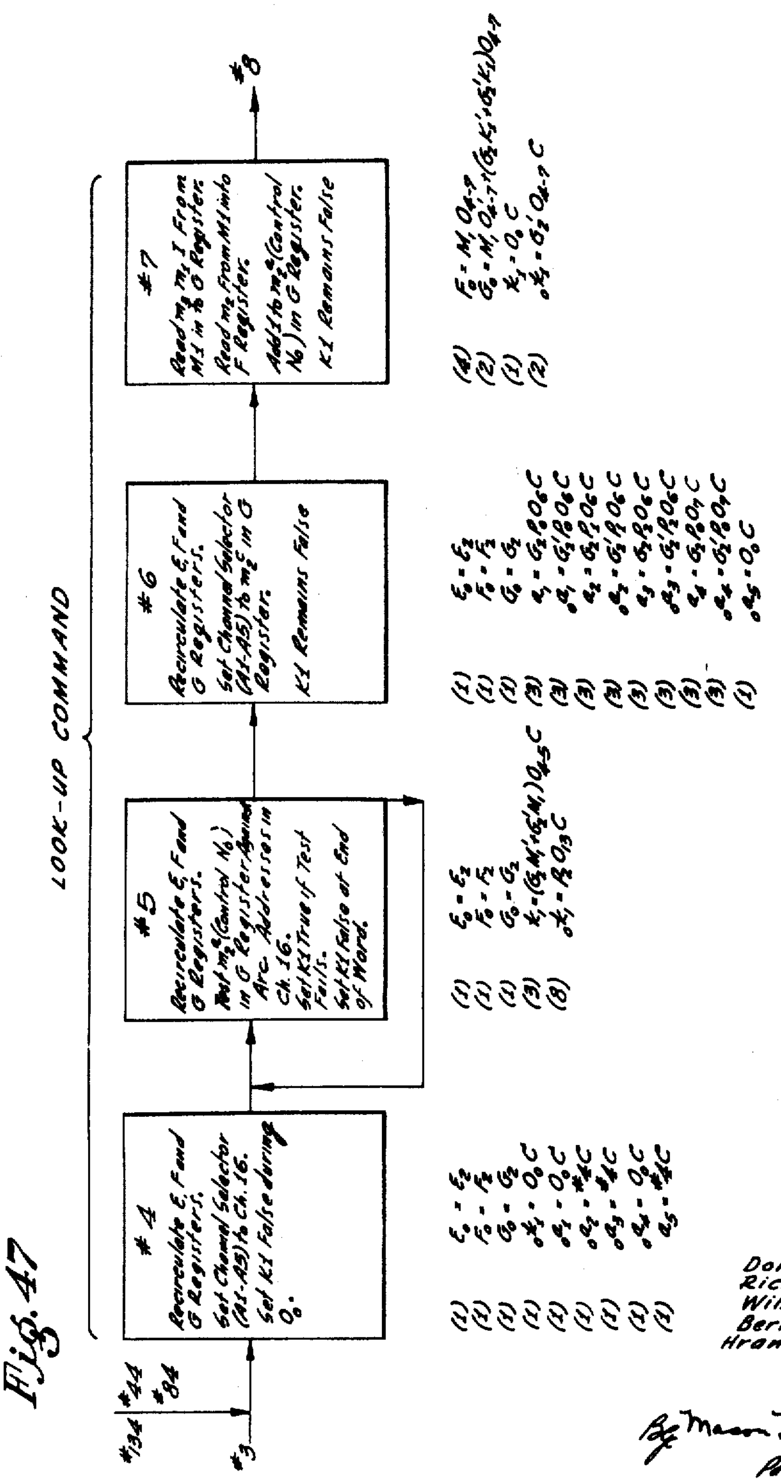

Fig. 47 shows the step operations which define how the computer looks up a command.

Figs. 4§*a* and 48*b* show a first series of step operations which define the mode by which the computer tests a command to determine which instruction is to be carried out.

Figure 49:
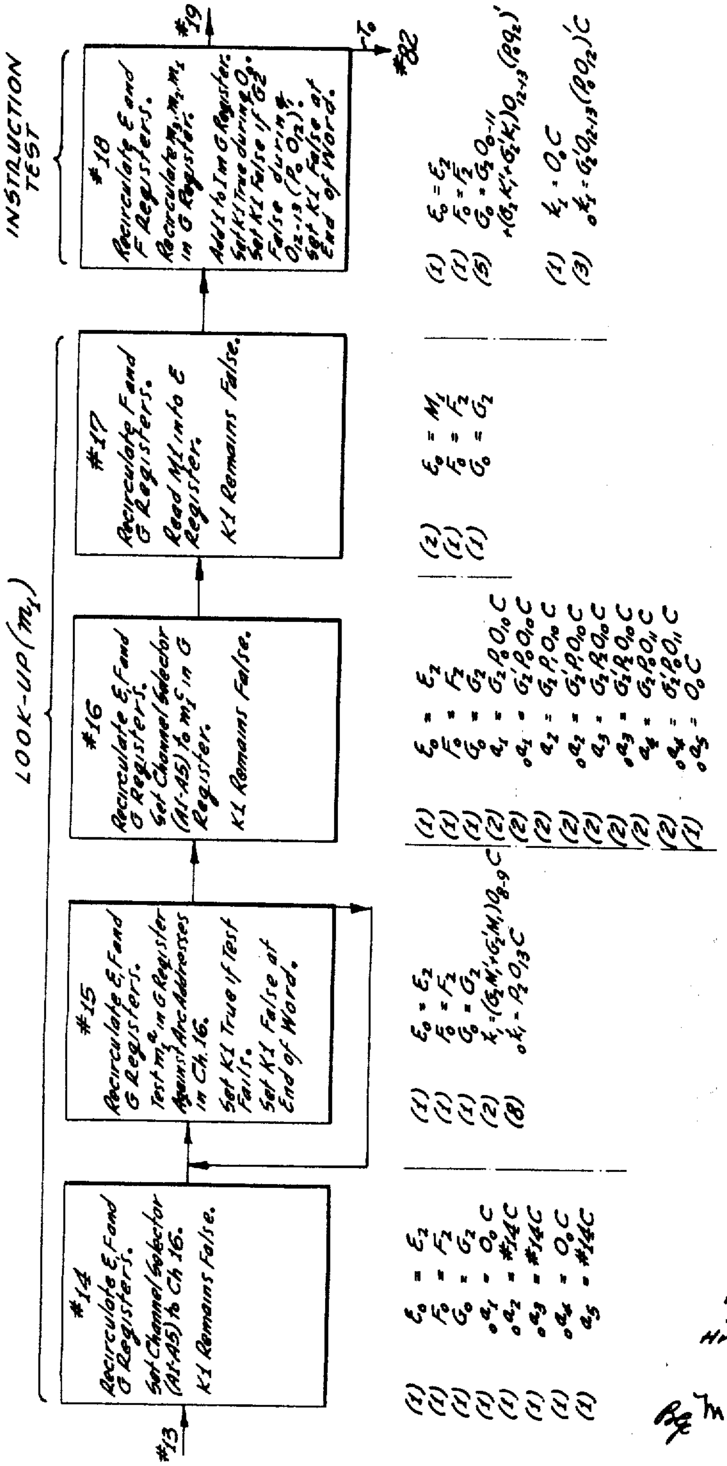

Fig. 49 shows the step operations defining the routine of looking up the contents of address $m_1$ and depositing same in the E register.

Figure 50:
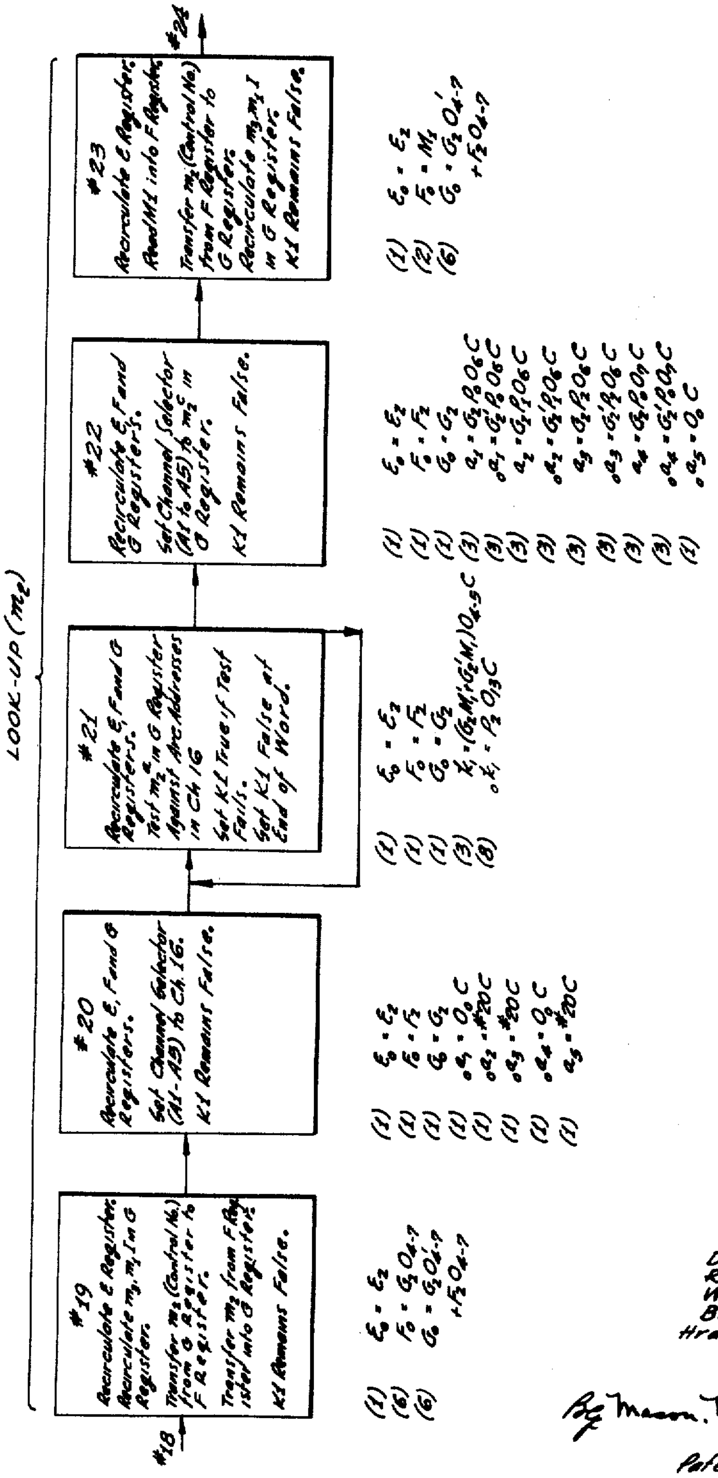

Fig. 50 shows the step operations defining the routine by which the computer operates to look up the contents of address $m_2$ and deposits this information in the F register.

Figure 51:
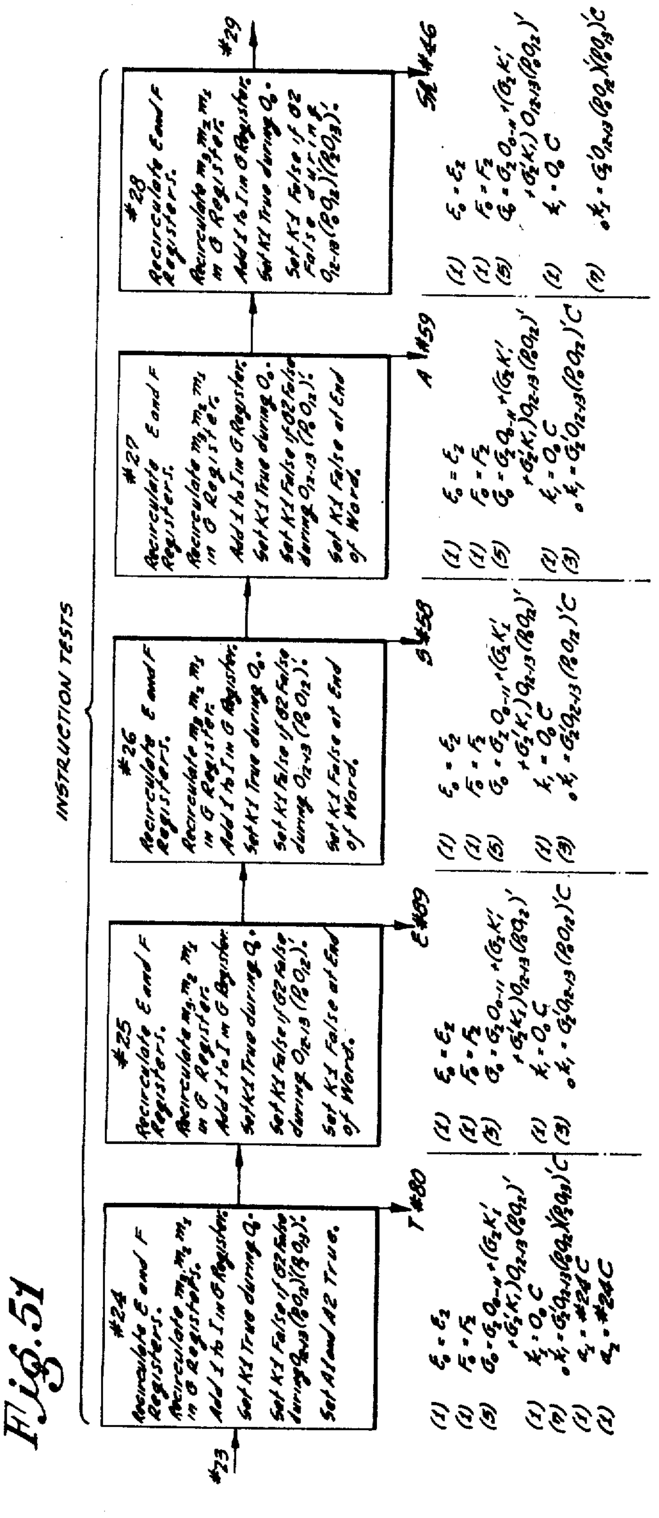

Fig. 51 shows a second series of step operations defining the manner by which the computer tests a command to determine which of the arithmetic instructions is to be carried out.

Figure 52:
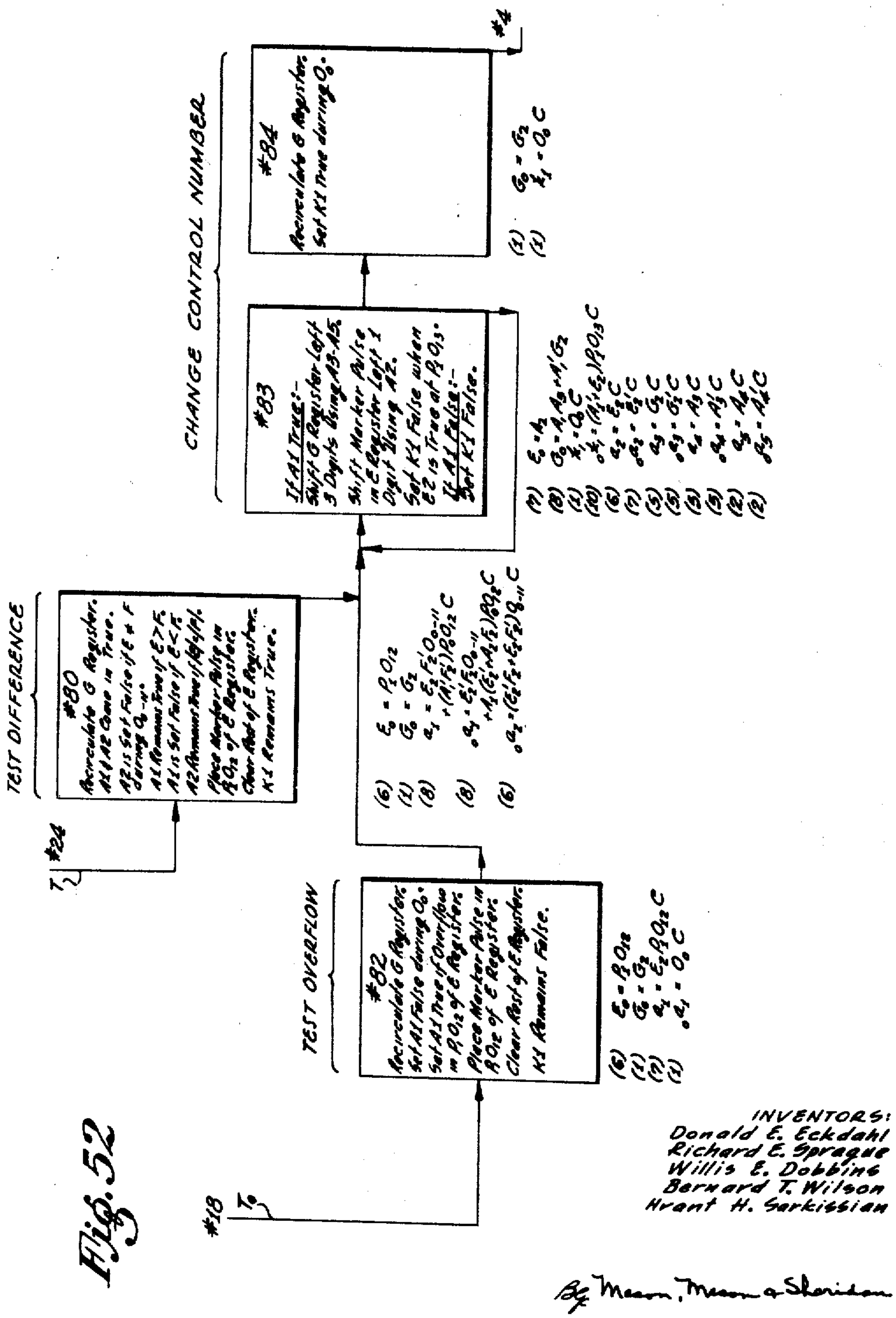

Fig. 52 shows the step operations which describe how the test overflow, T*o*, and test difference, T, operations are performed.

Figure 53:
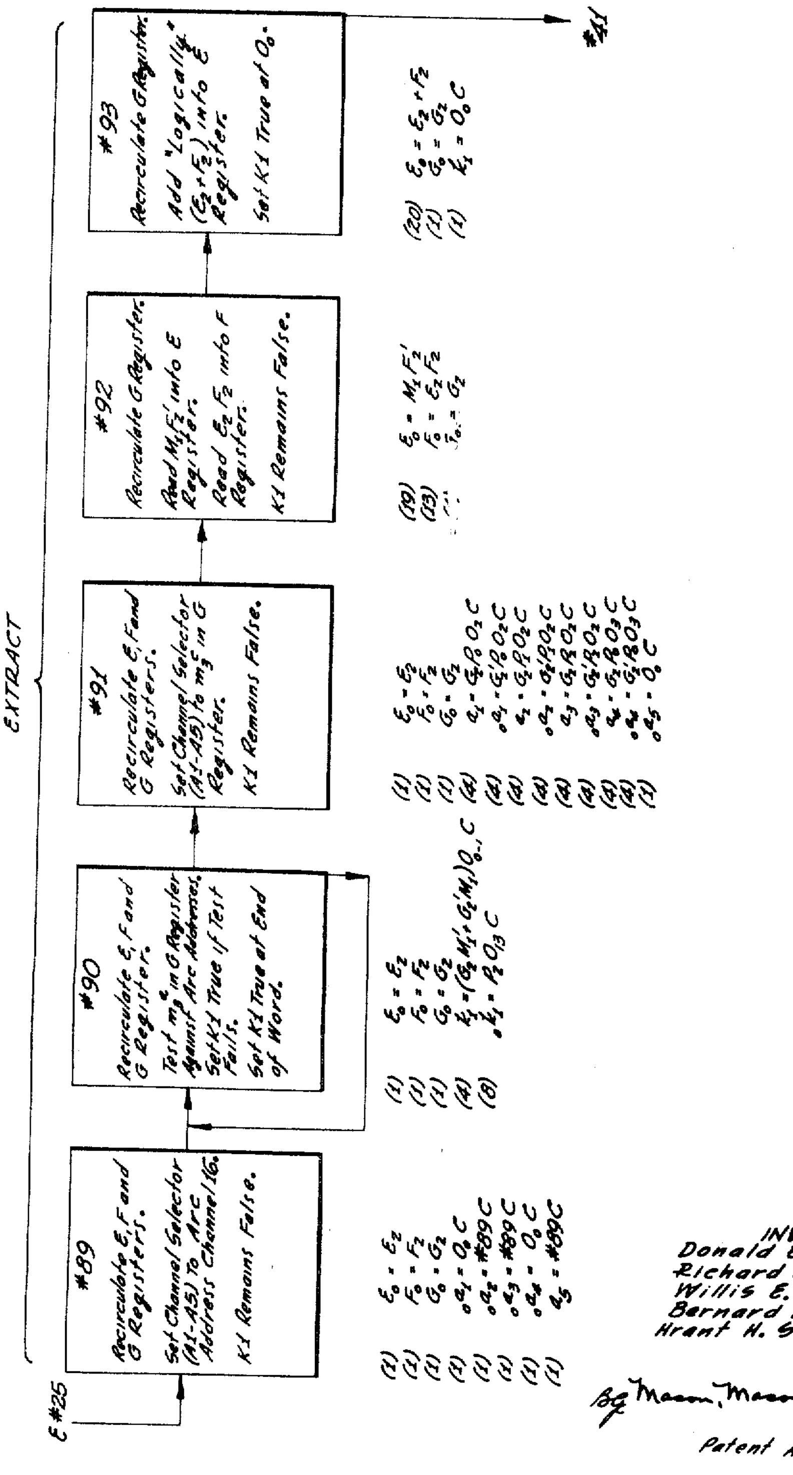

Fig. 53 shows the step operations which describe how the extract instruction is carried out by the computer.

Figure 54:
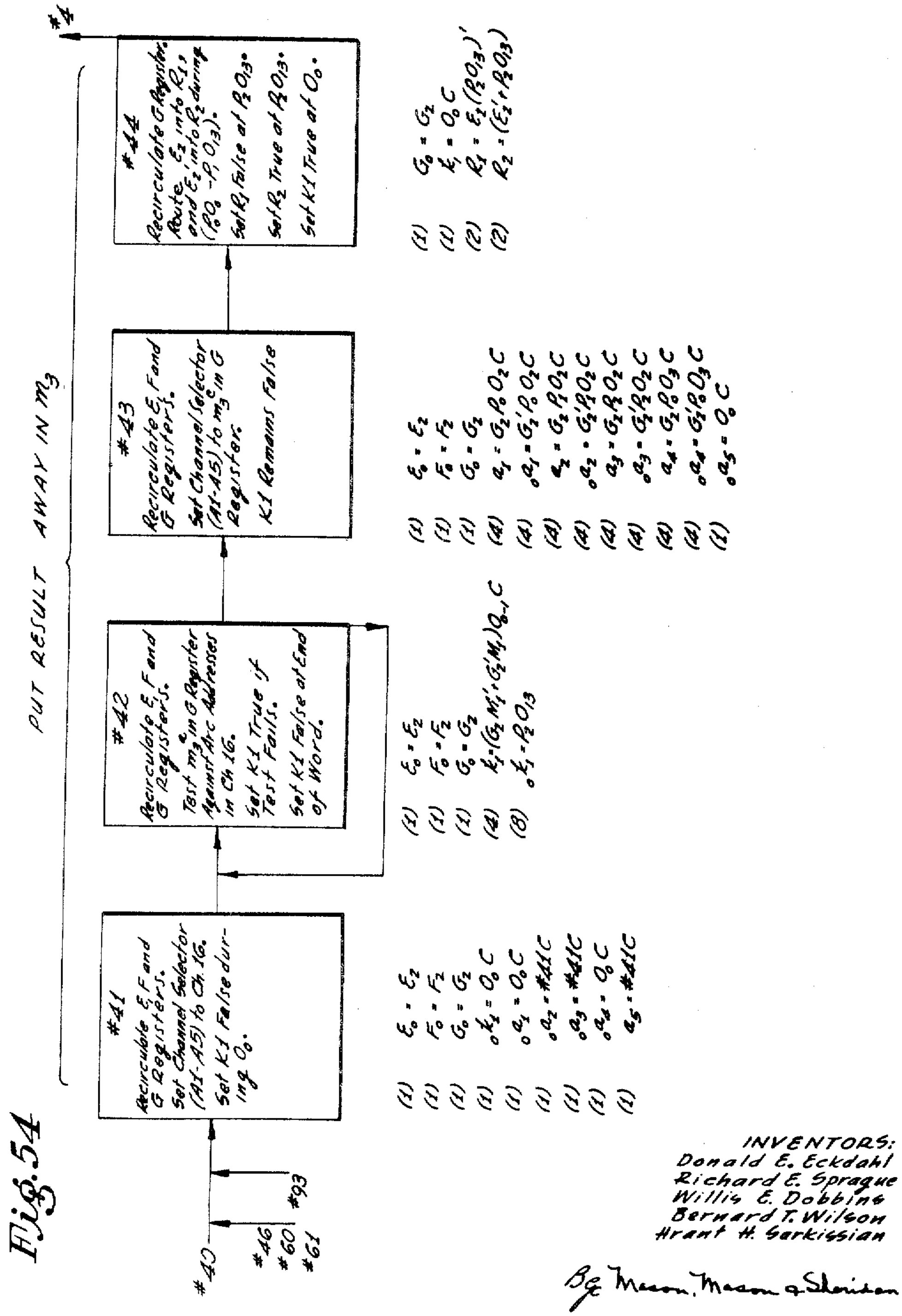

Fig. 54 shows the steps of the routine by which the computer operates to place the results of a computation into the $m_3$ address of the memory.

Figure 55:
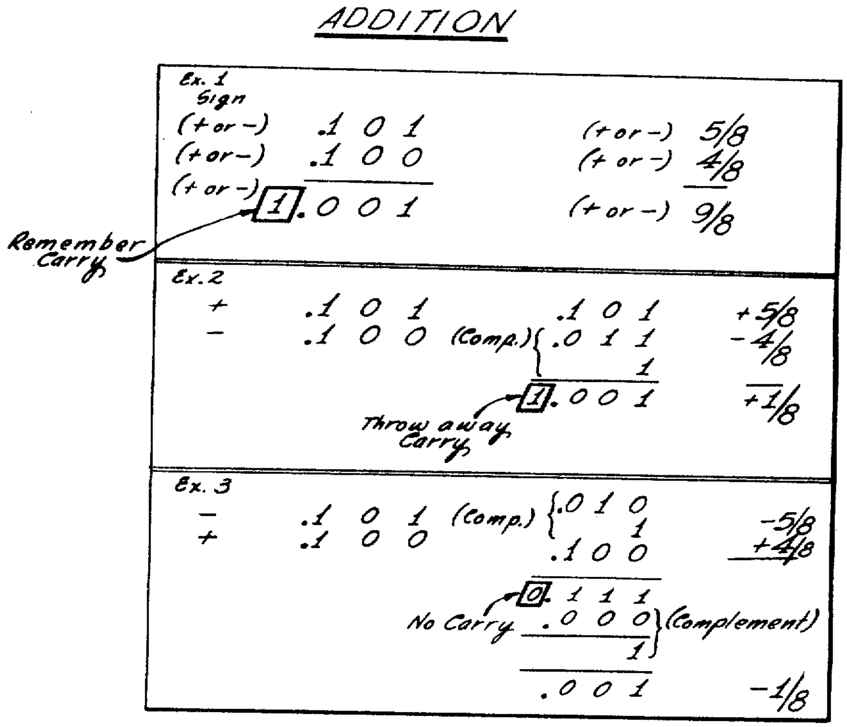

Fig. 55 is an example showing how addition is carried out by the arithmetic unit.

Figures 56, 57:
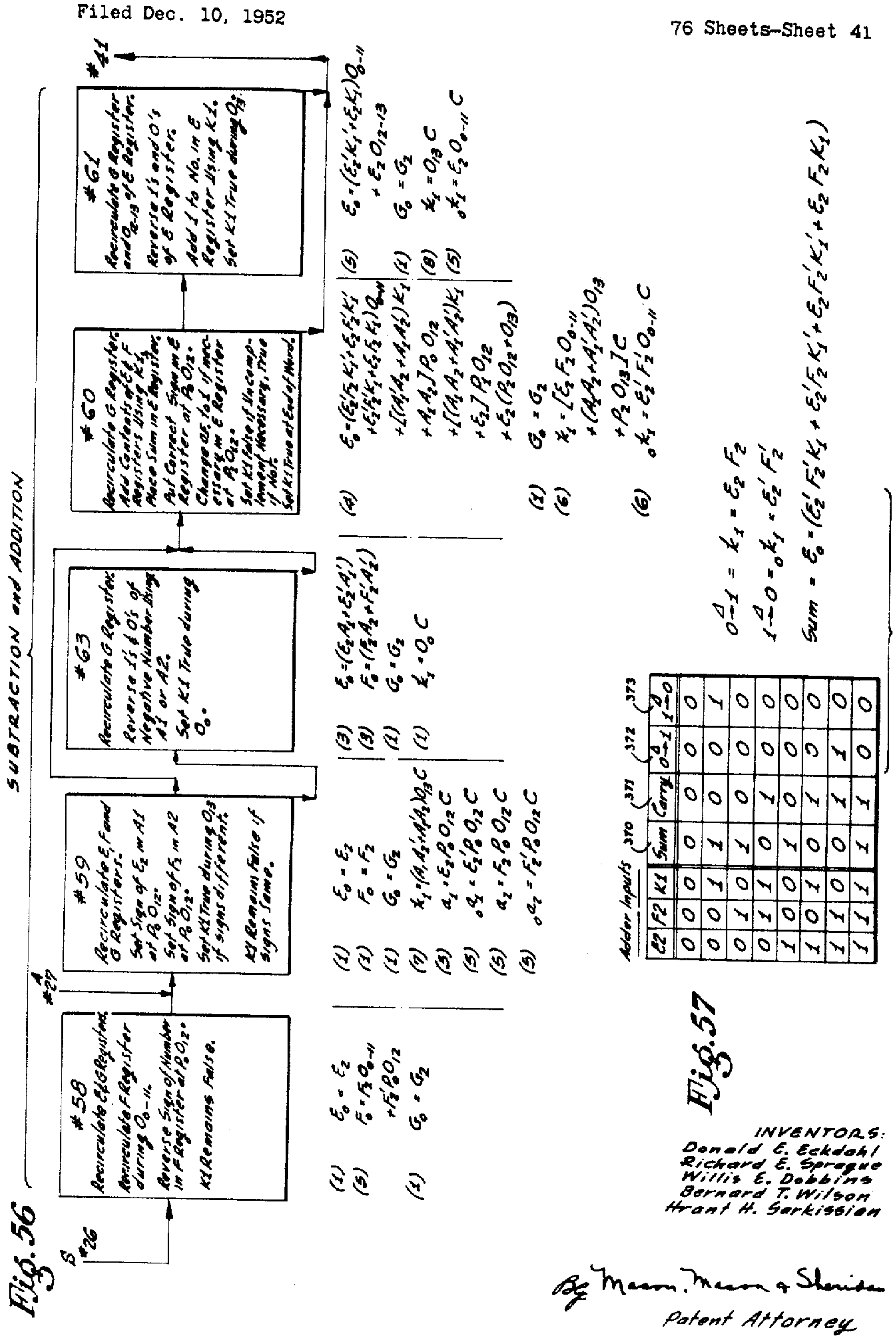

Fig. 56 shows a flow diagram of the step operations which define the mode by which addition and subtraction are carried out by the computer.

Fig. 57 is a table showing how the logical equations are derived for the adding circuit.

Figure 58:
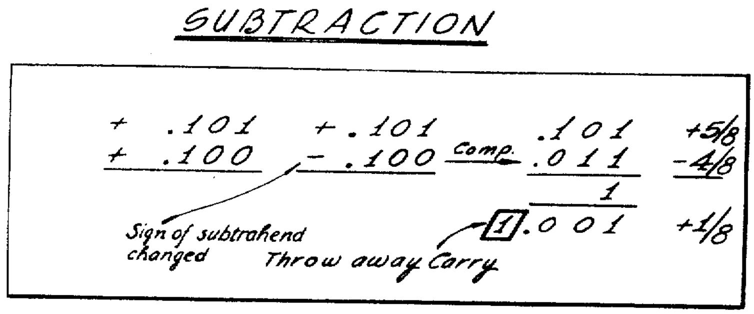

Fig. 58 is an example showing how subtraction is carried out by the arithmetic unit.

Figure 59:
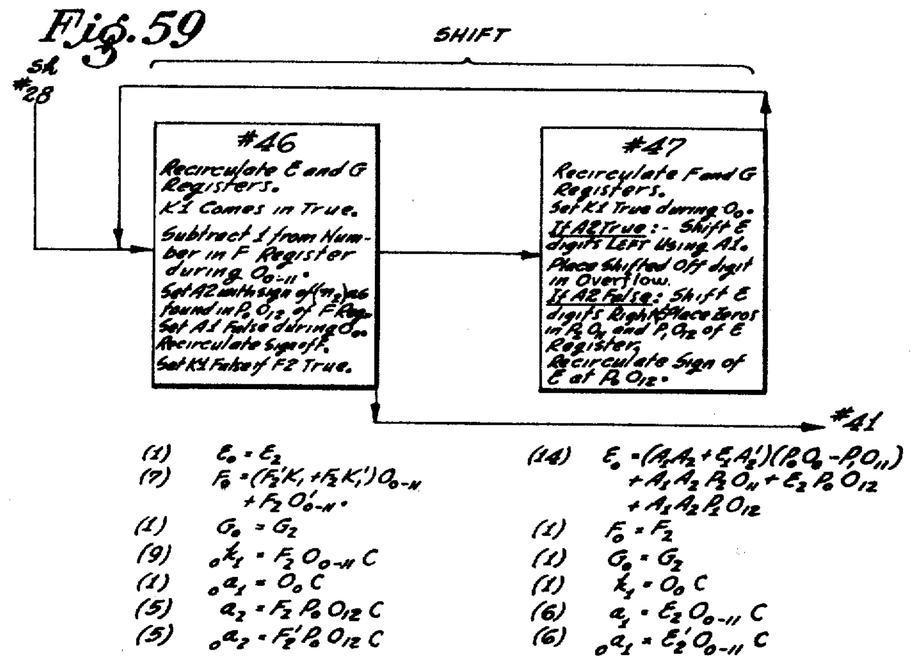

Fig. 59 shows the step operations by which the shift instruction is carried out.

Figure 60:
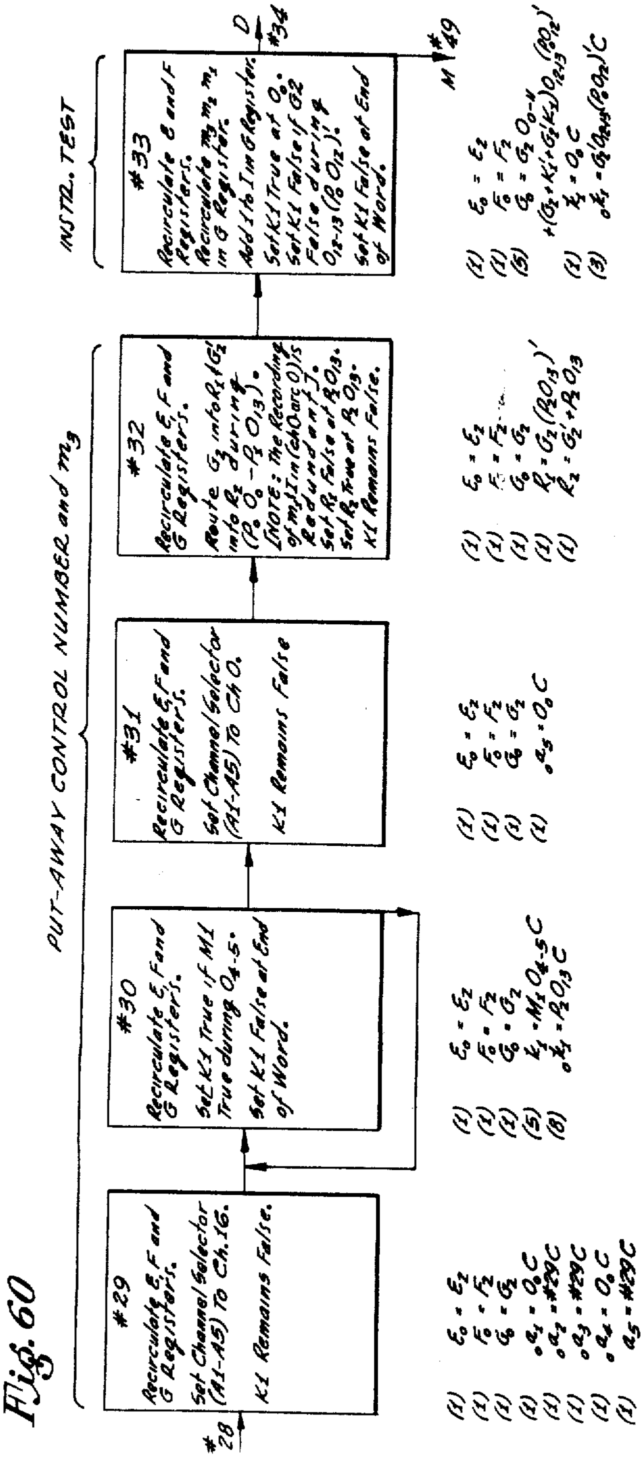

Fig. 60 shows the step operations by which the computer places the control number and the $m_3$ address in the auxiliary register of the memory.

Figure 61:
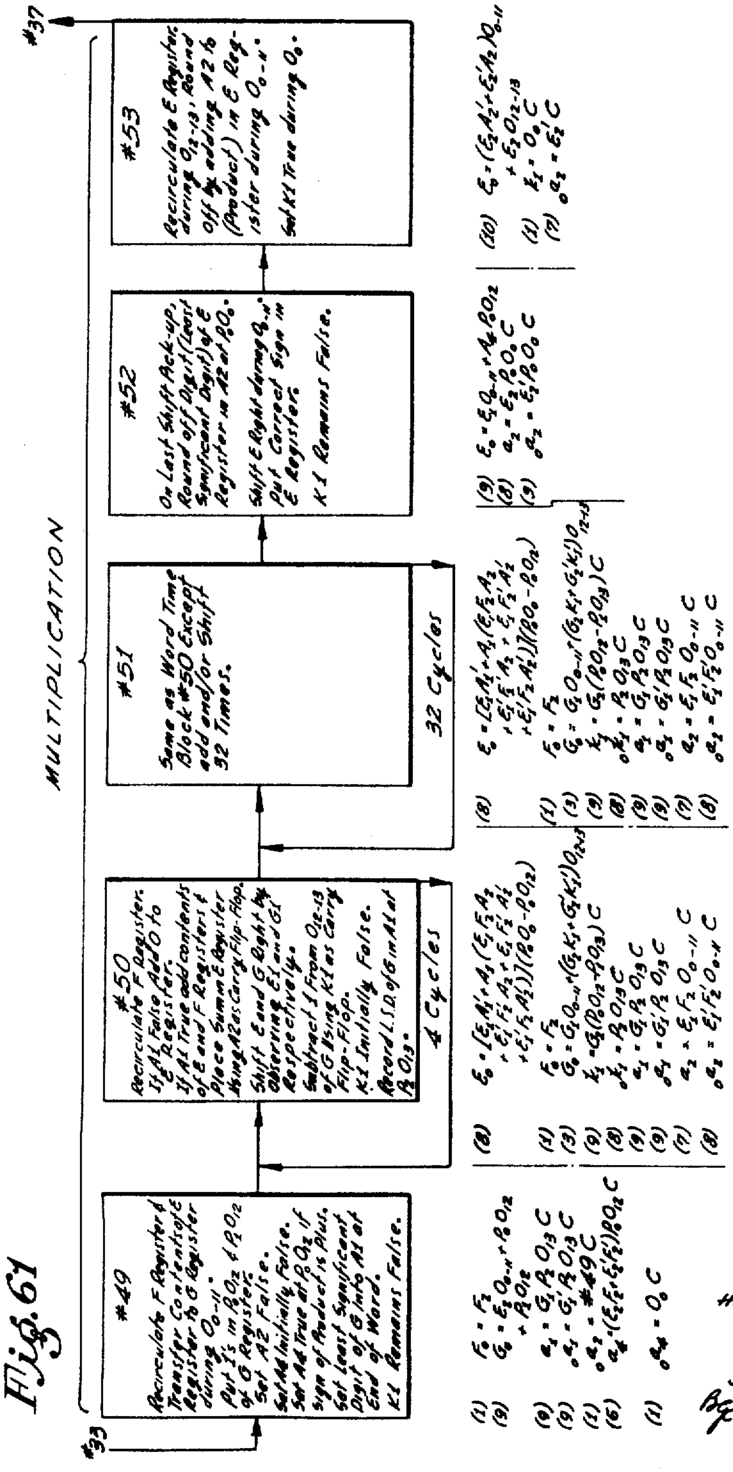

Fig. 61 shows the step operations by which the multiplication instruction is carried out.

Figure 62:
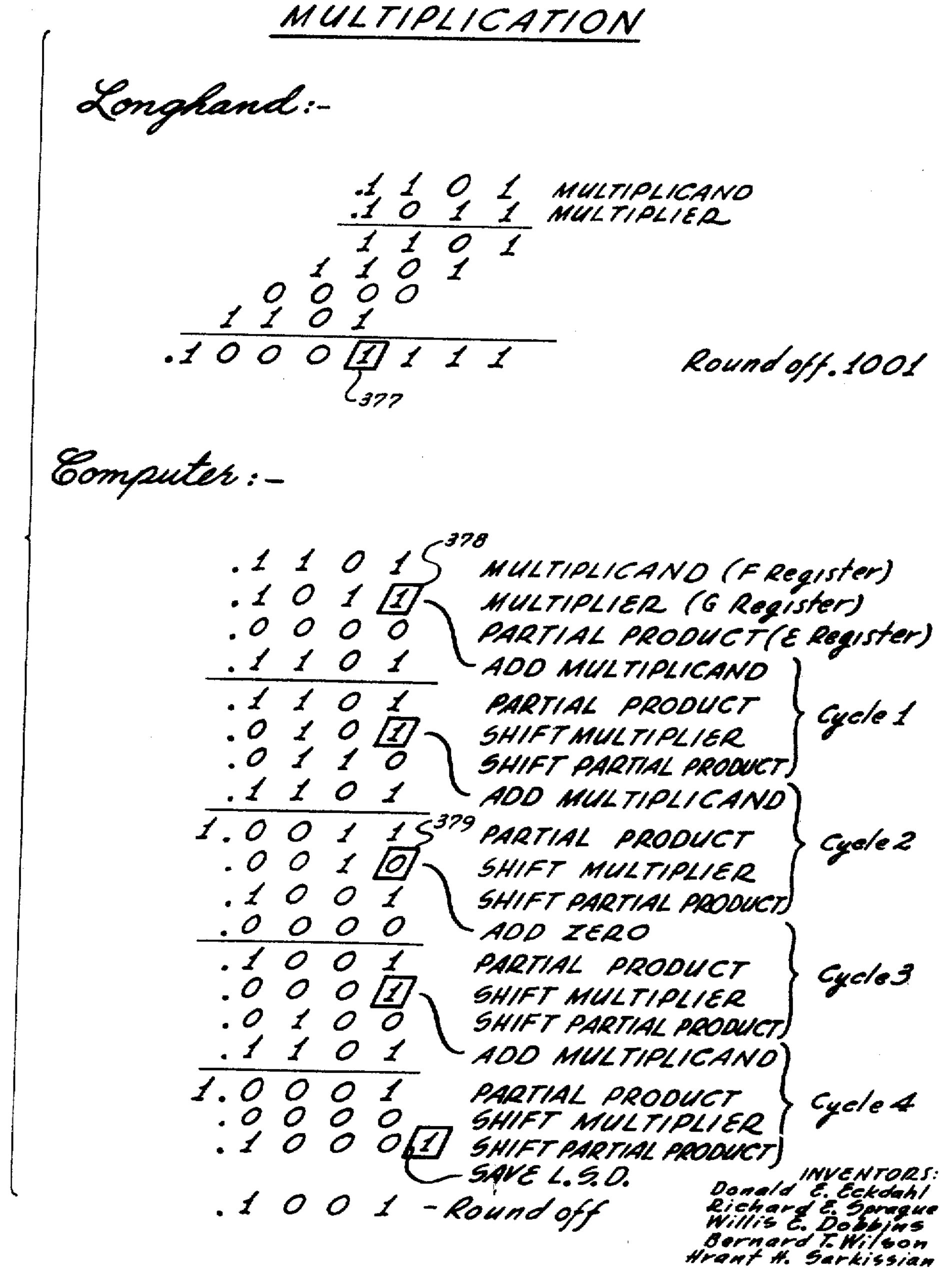

Fig. 62 shows an example of how multiplication is carried out in the arithmetic unit.

Figure 63:
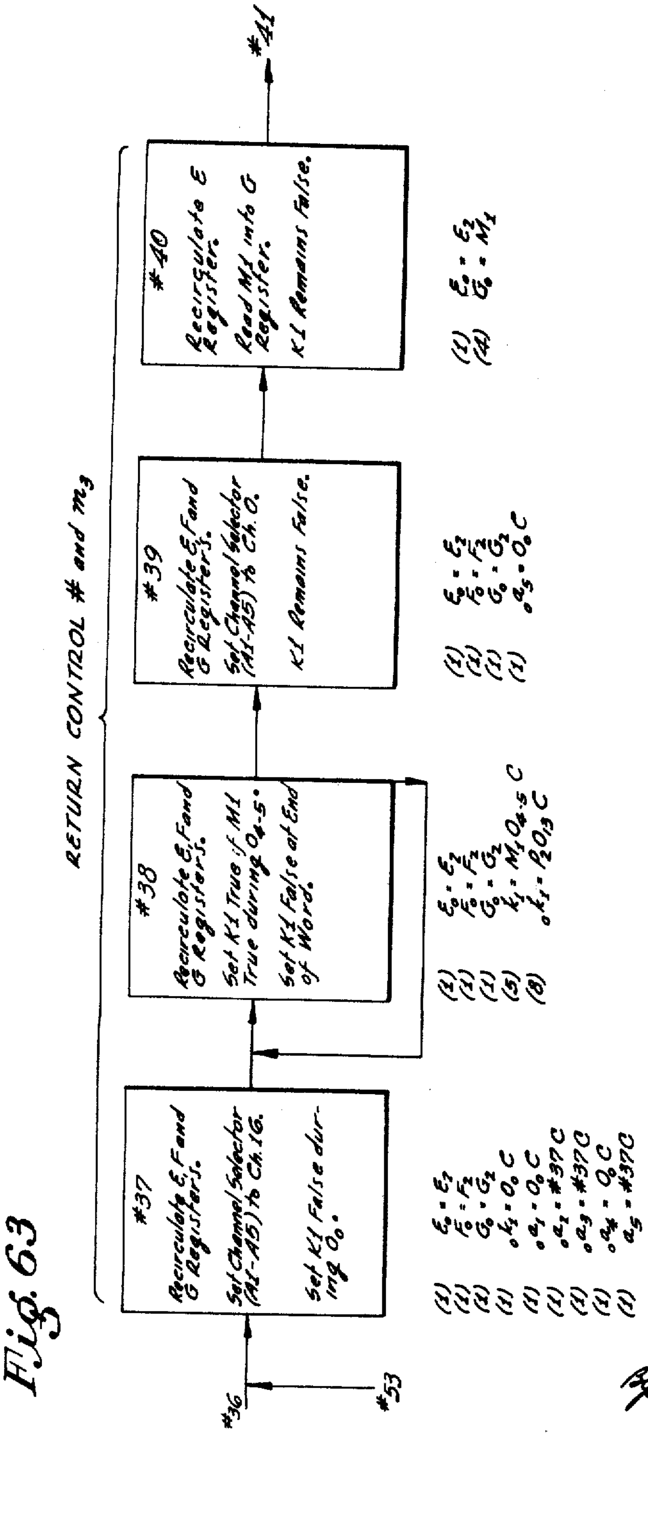

Fig. 63 shows the step operations by which the computer returns the control number and the $m_3$ address back to the G register.

Fig. 64 shows the step operations by which the division instruction is carried out.

Figure 65:
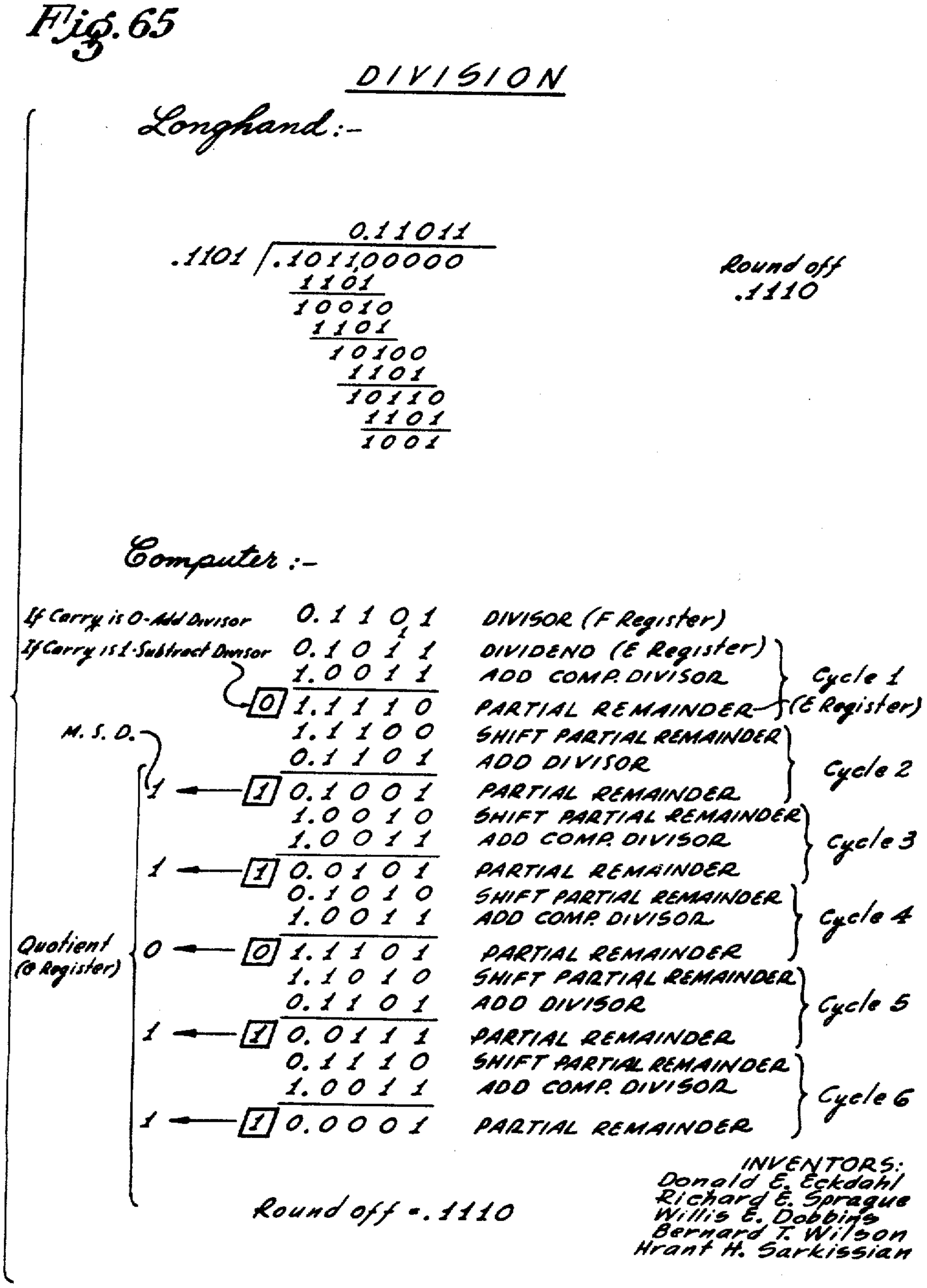

Fig. 65 shows an example of how division is carried out in the arithmetic unit.

Figures 66, 67:
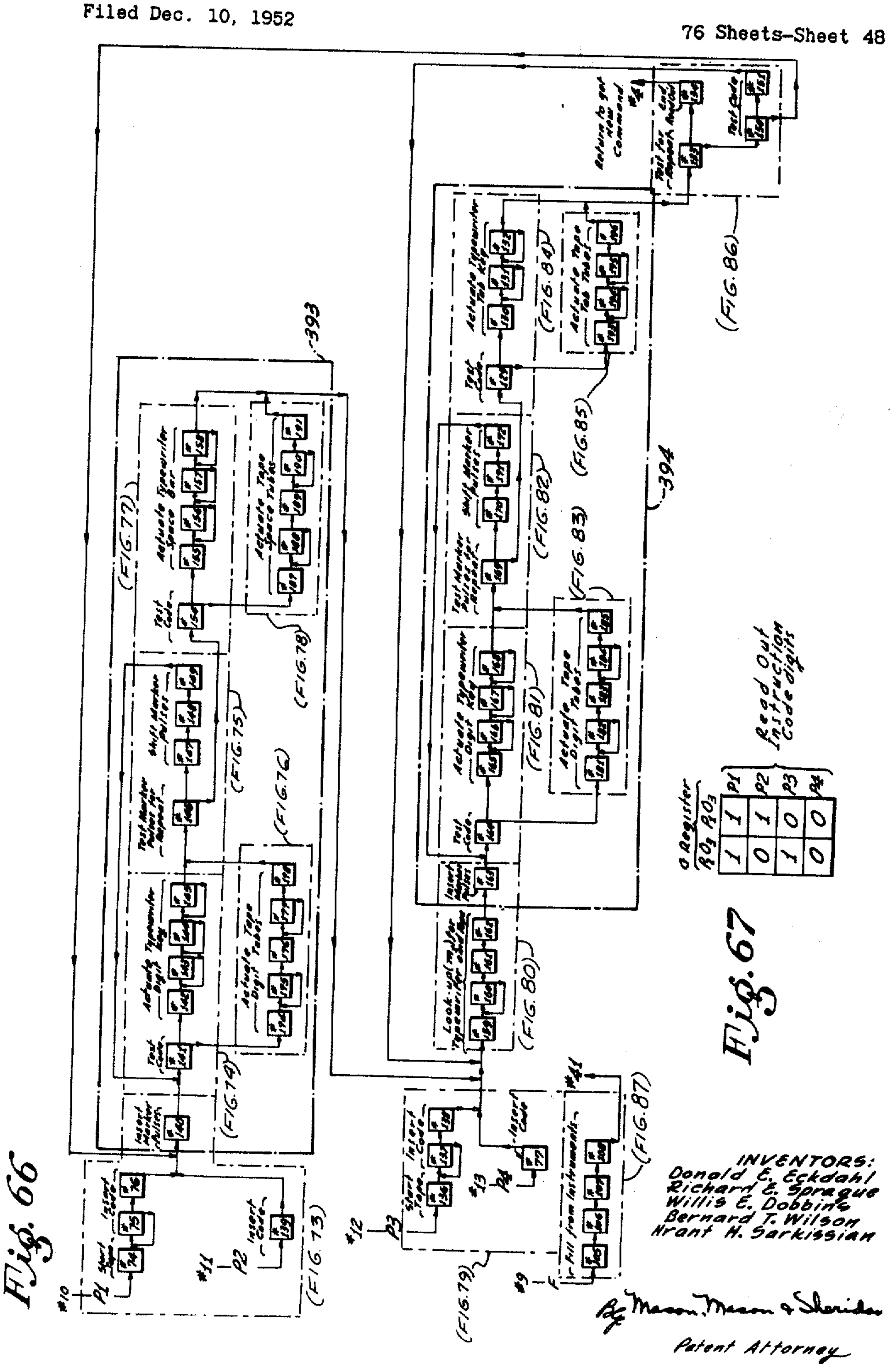

Fig. 66 is a functional flow diagram of the read-out operations performed by the computer.

Fig. 67 shows a table of the code digits characterizing the instructions during the read-out process.

Figures 68, 69, 70:
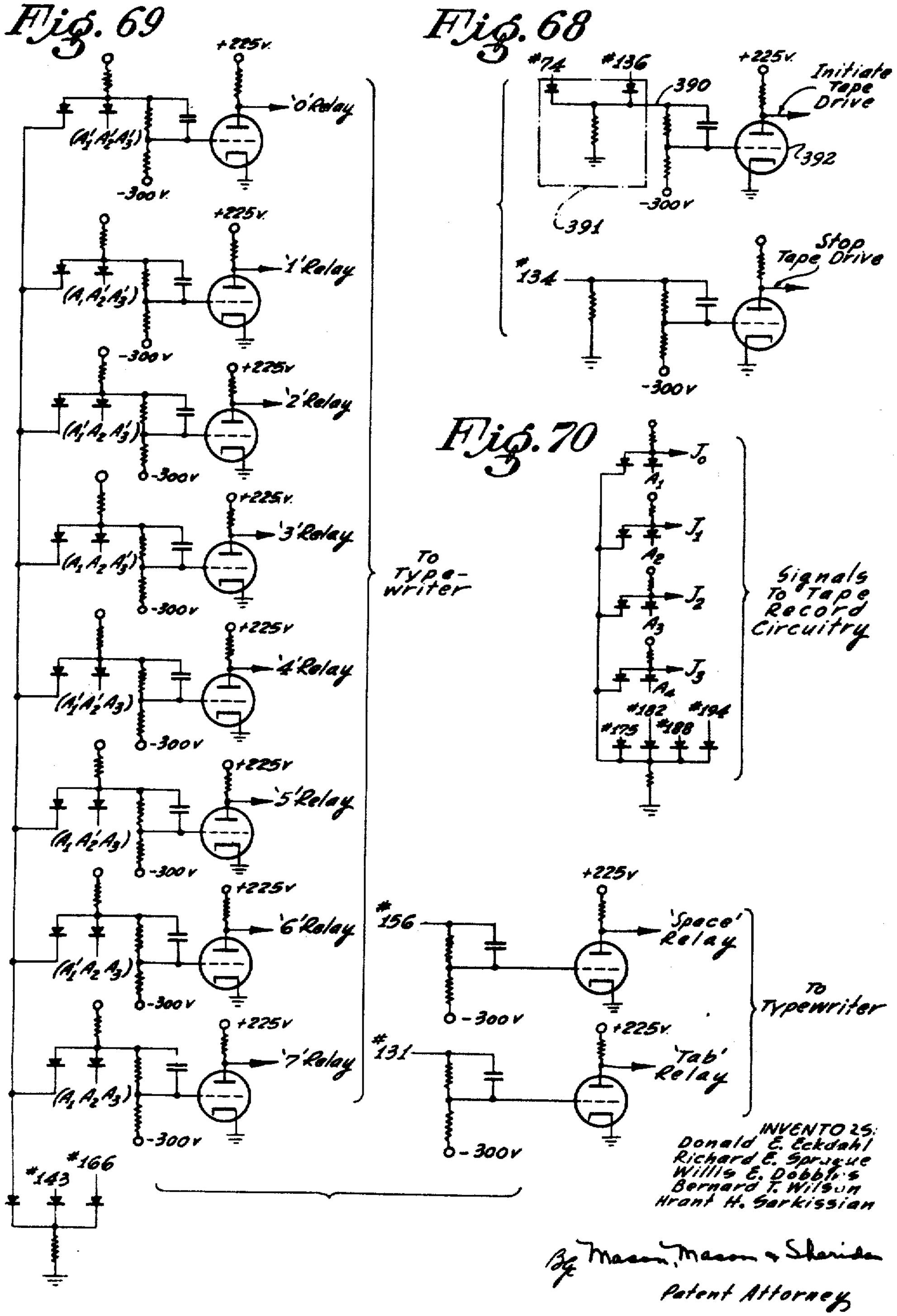

Fig. 68 shows the circuitry provided for controlling the tape drive mechanism.

Fig. 69 shows the circuitry provided for actuating the typewriter digit relays.

Fig. 70 shows the circuitry provided for generating coded signals to be recorded onto the tape.

Figure 71:
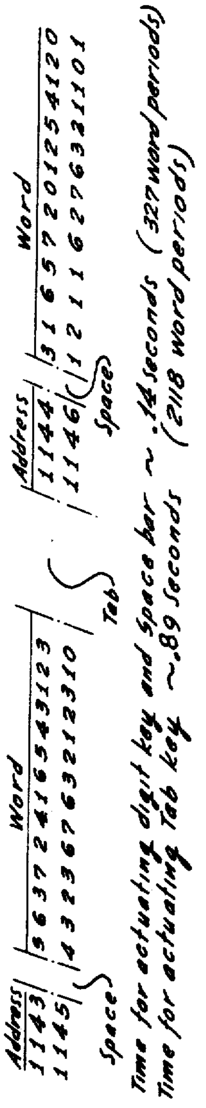

Fig. 71 shows an example of how information is printed out on the electric typewriter.

Figure 72:
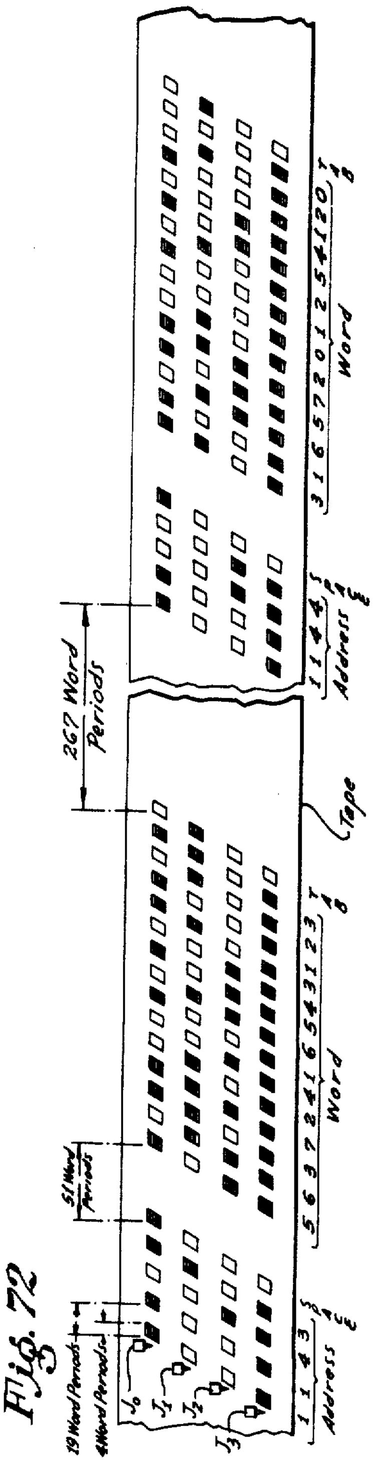

Fig. 72 illustrates how information is recorded onto the magnetic tape.

Figure 73:
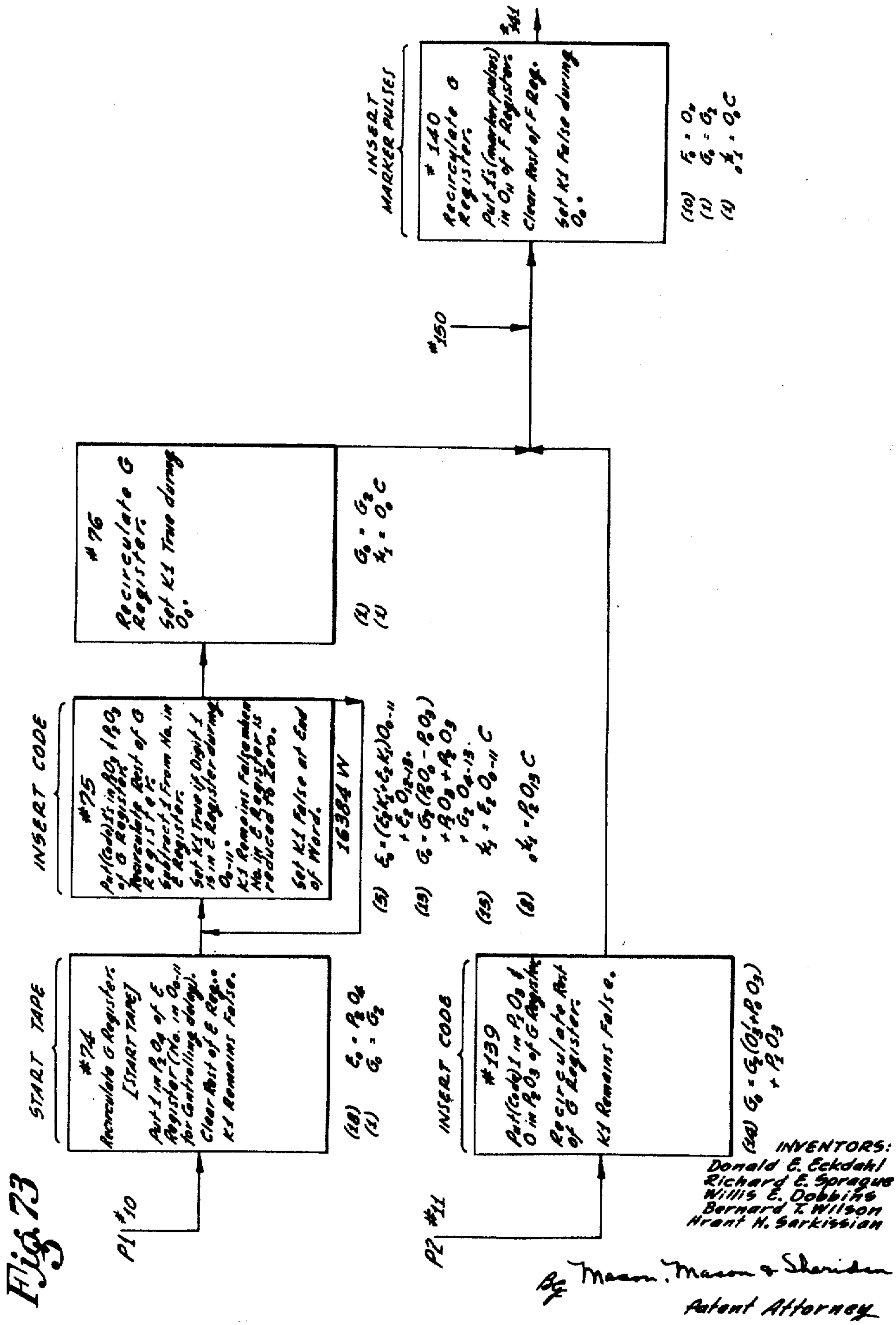

Fig. 73 shows the preliminary step operations provided in performing the instructions which operate to read out an address and a word.

Figure 74:
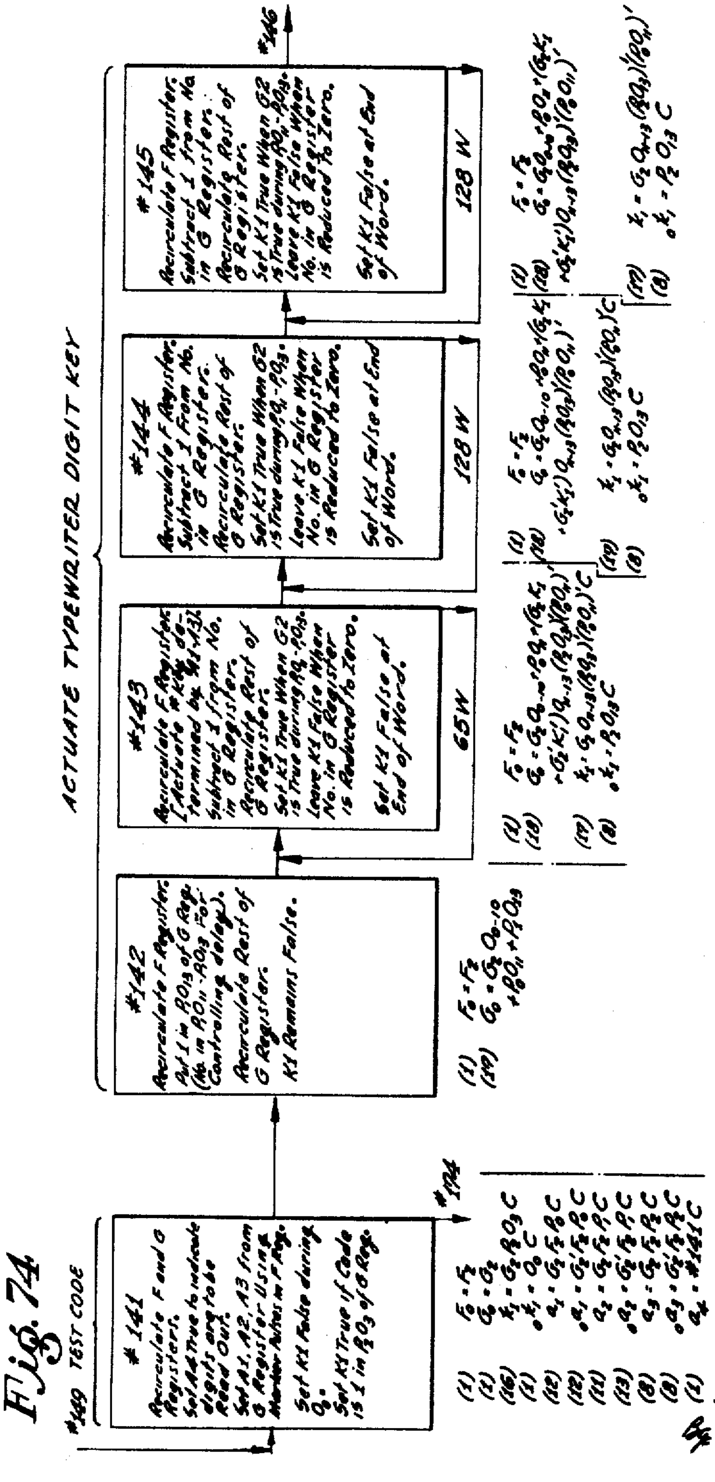

Fig. 74 shows the step operations whereby the instruction code is tested and a digit key of the typewriter is actuated to print out an octal digit of the address.

Figure 75:
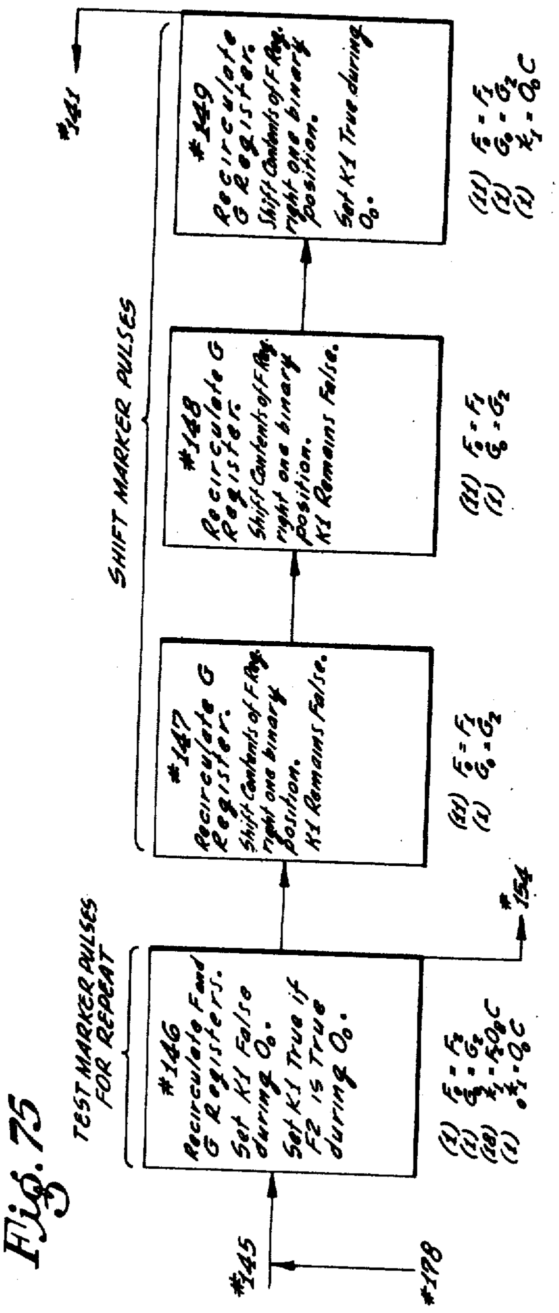

Fig. 75 shows the step operations whereby the marker pulses which define the octal digit to be read out are tested and shifted.

Figure 76:
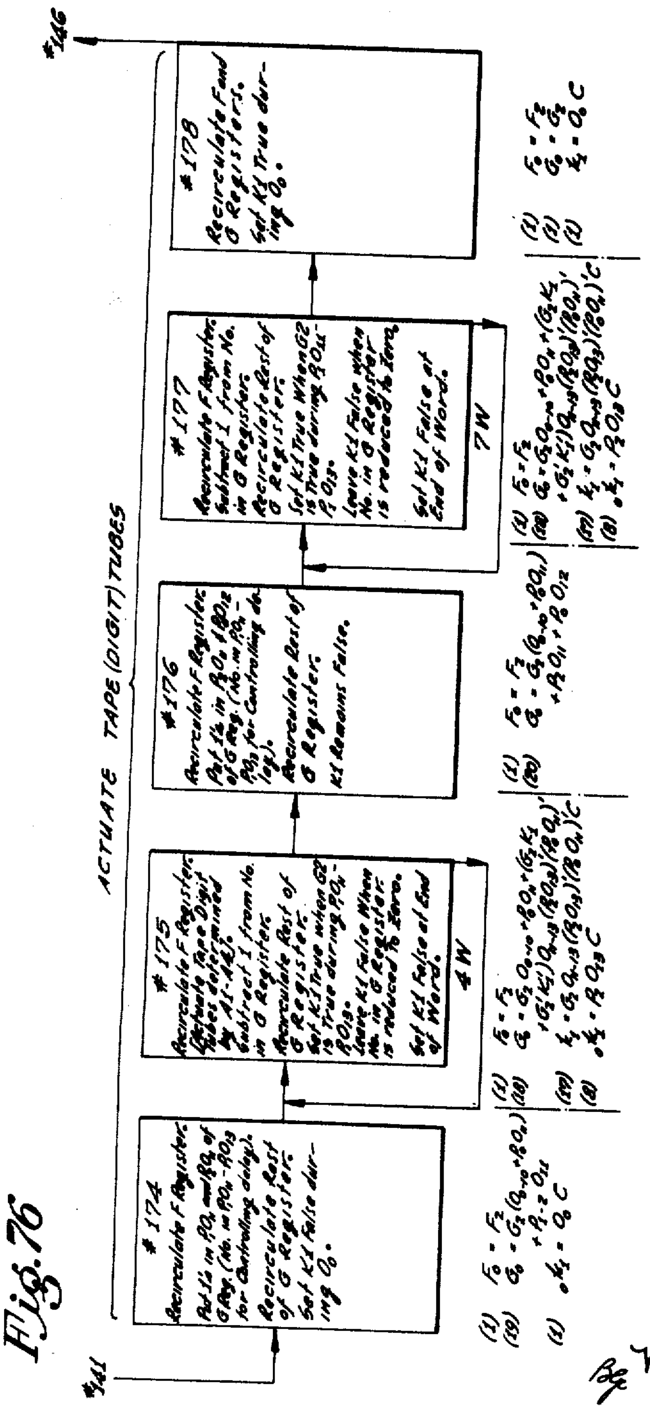

Fig. 76 shows the step operations whereby the record circuitry sets up signals representing an octal digit of an address on the magnetic tape.

Figure 77:
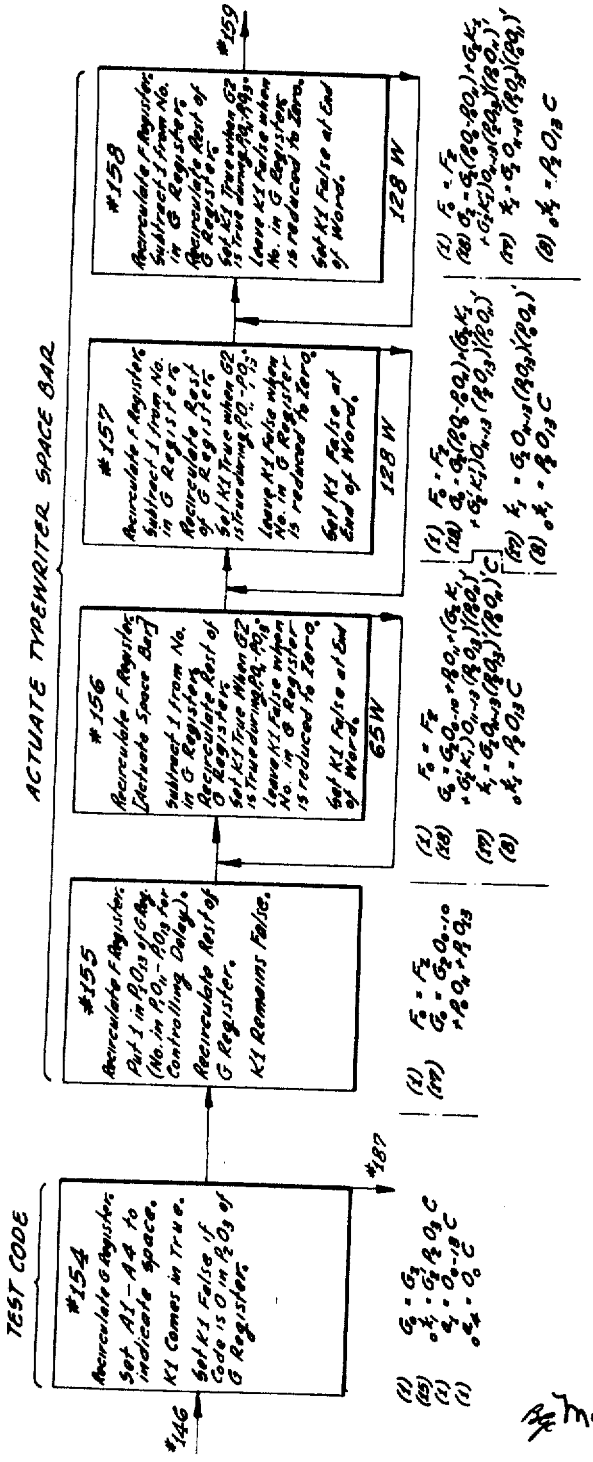

Fig. 77 shows the step operations whereby the instruction code is tested and the space bar of the typewriter is actuated.

Figure 78:
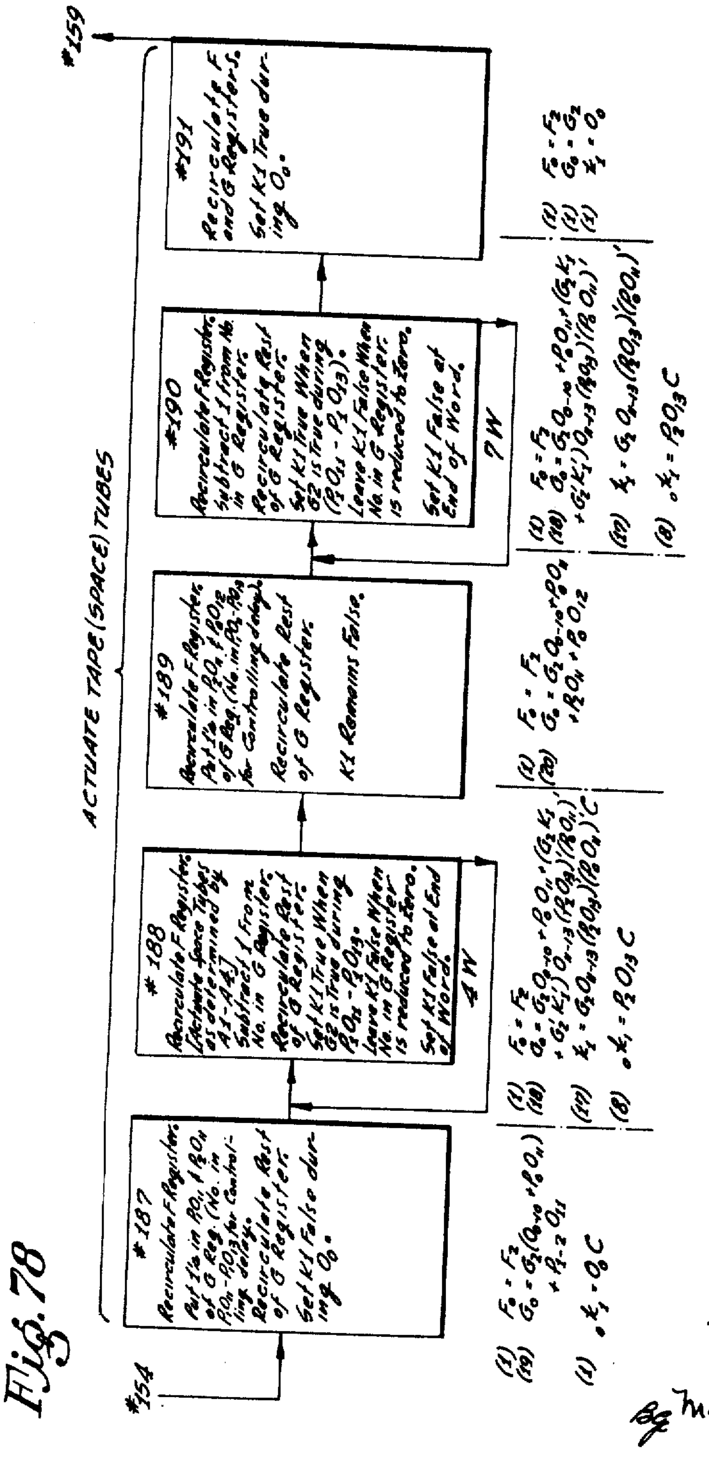

Fig. 78 shows the step operations whereby the record circuitry sets up a space signal on the magnetic tape.

Figure 79:
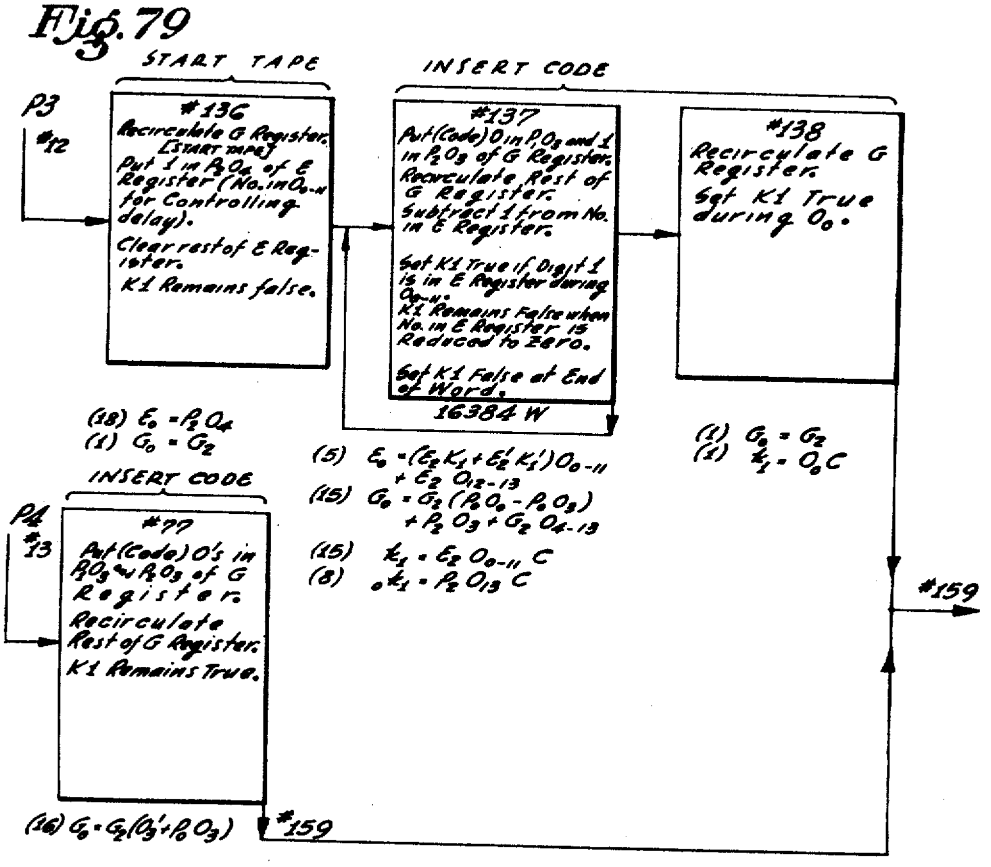

Fig. 79 shows the preliminary step operations provided in performing the instructions which operate to read out a word only.

Figure 80:
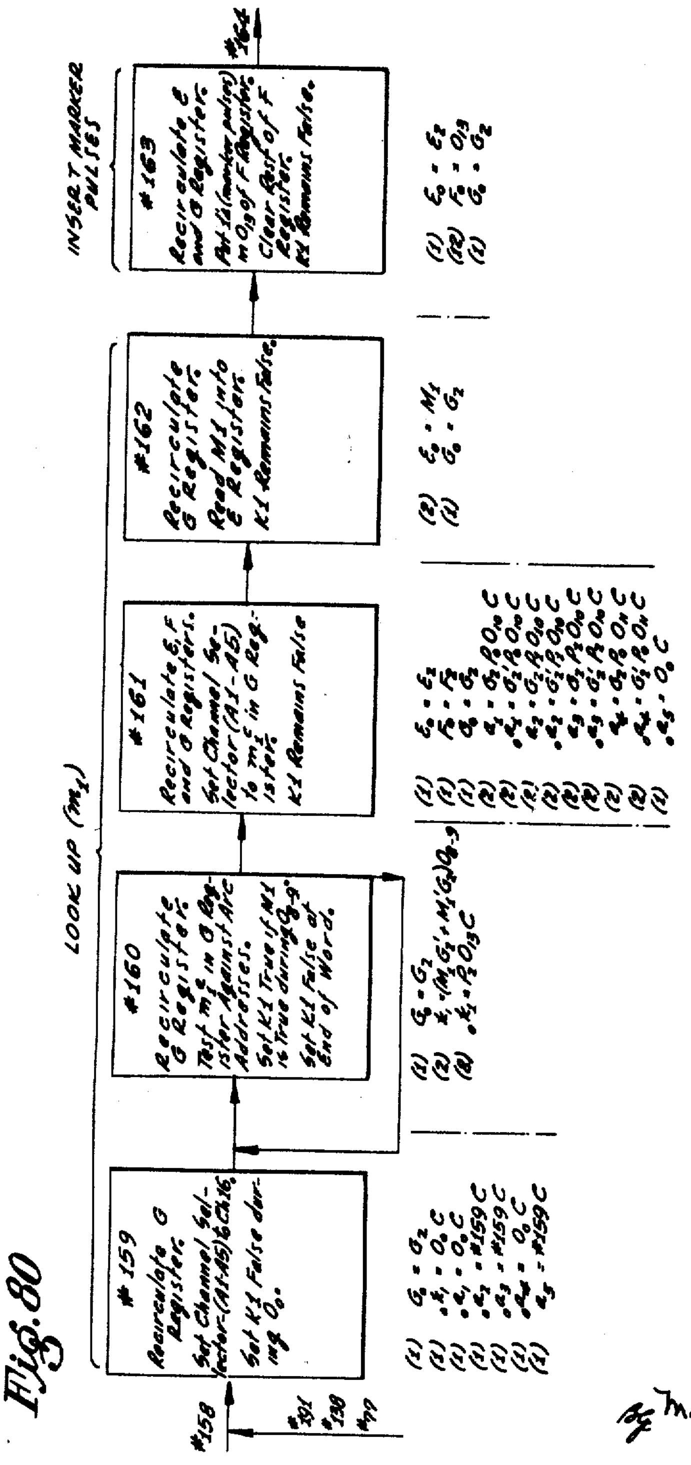

Fig. 80 shows the step operations whereby the word in address $m_1$ is looked up for the read-out routines.

Figure 81:
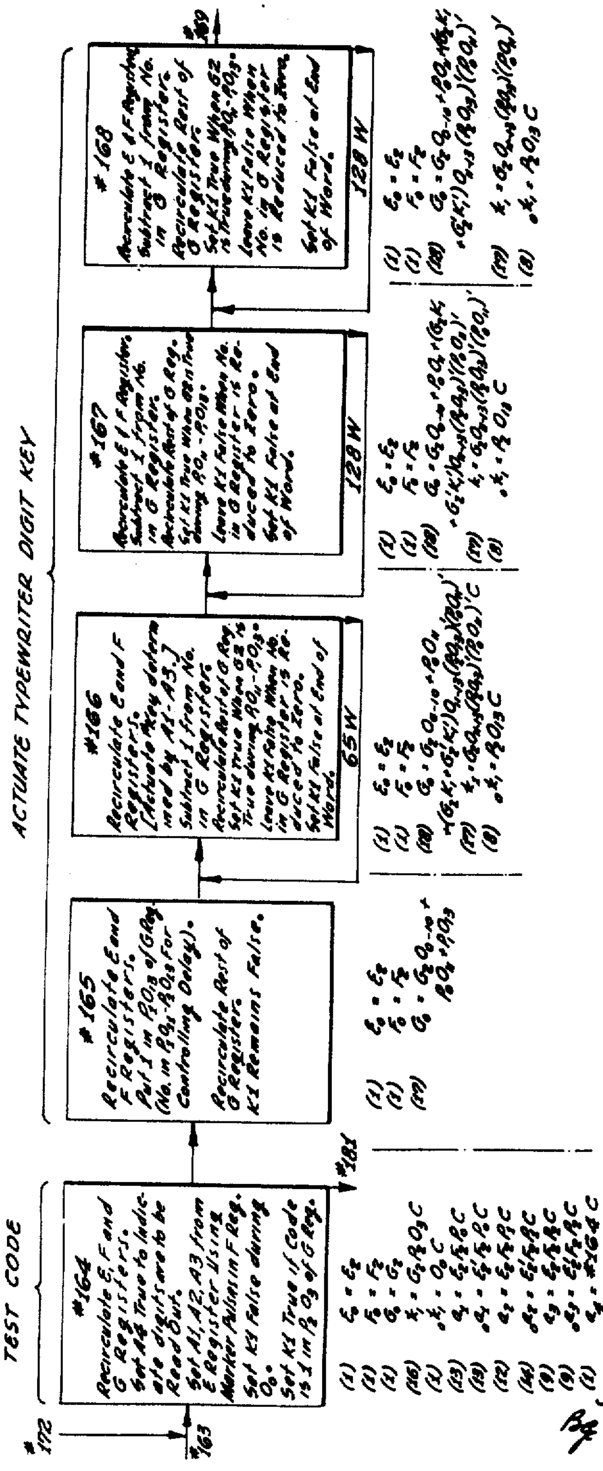

Fig. 81 shows the step operations whereby the code is tested and a digit key is actuated to print out one digit of a word.

Figure 82:
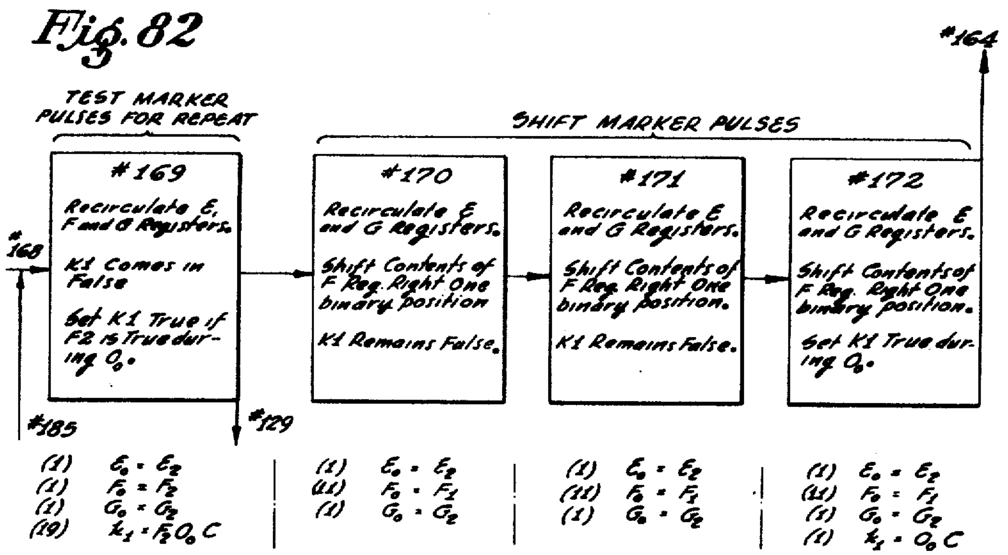

Fig. 82 shows the step operations whereby the marker pulses are tested and shifted.

Figure 83:
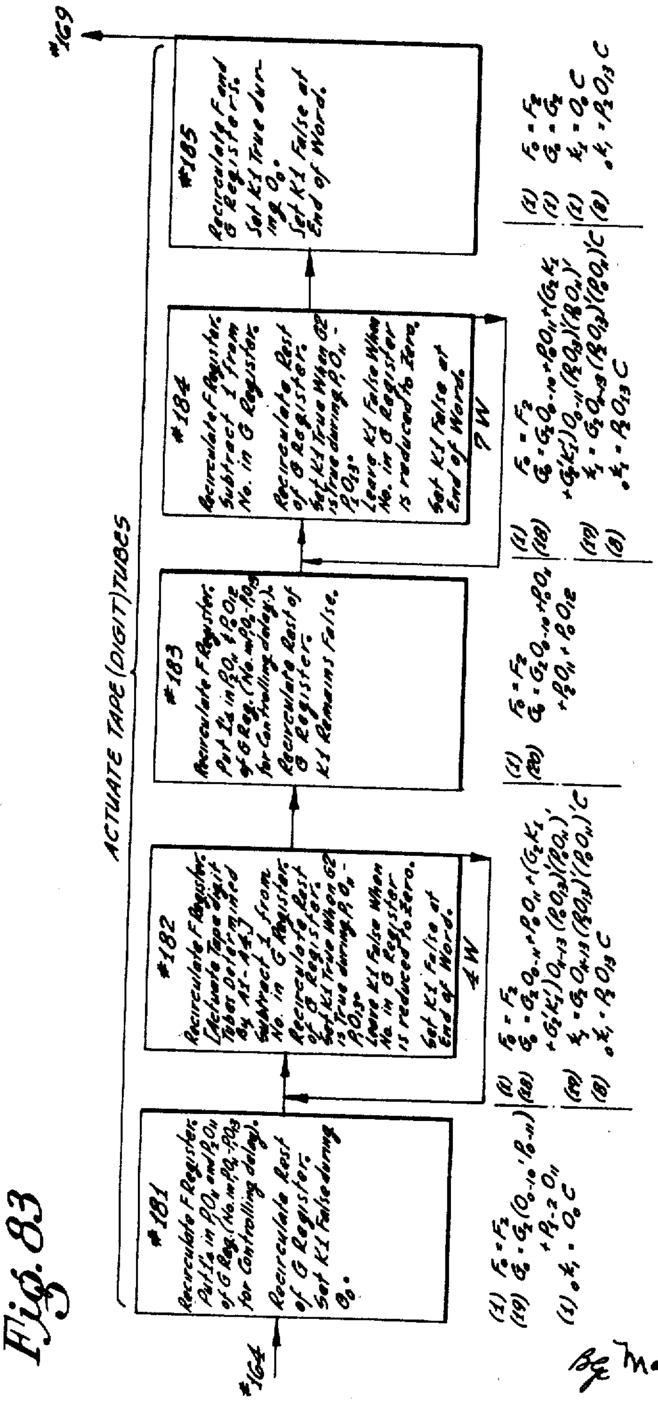

Fig. 83 shows the step operations whereby the record circuitry sets up signals representing an octal digit of a word on the magnetic tape.

Figure 84:
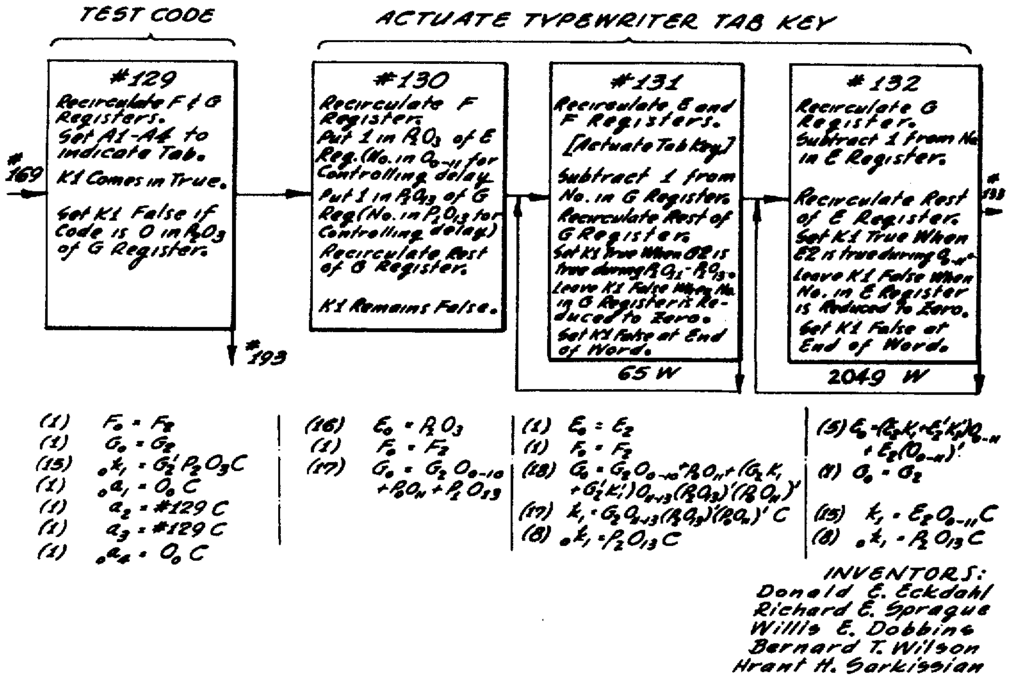

Fig. 84 shows the step operations whereby the instruction code is tested and the tab key of the typewriter is actuated.

Figure 85:
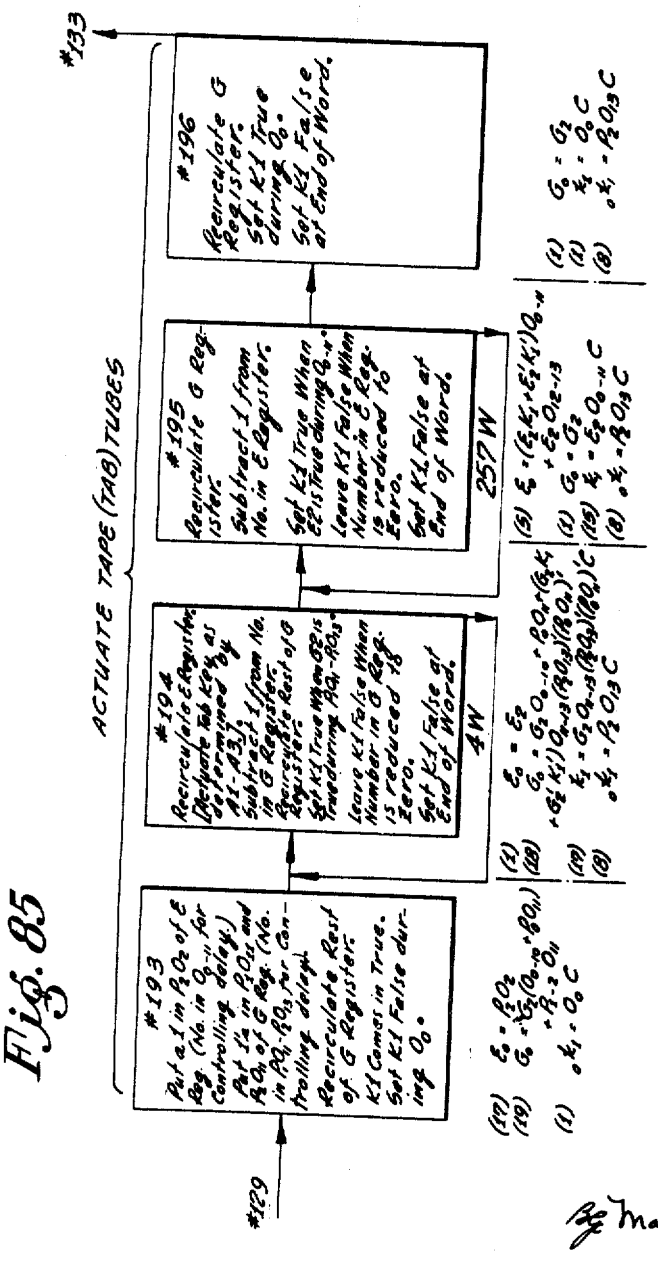

Fig. 85 shows the step operations whereby the record circuitry sets up a tab signal on the magnetic tape.

Figure 86:
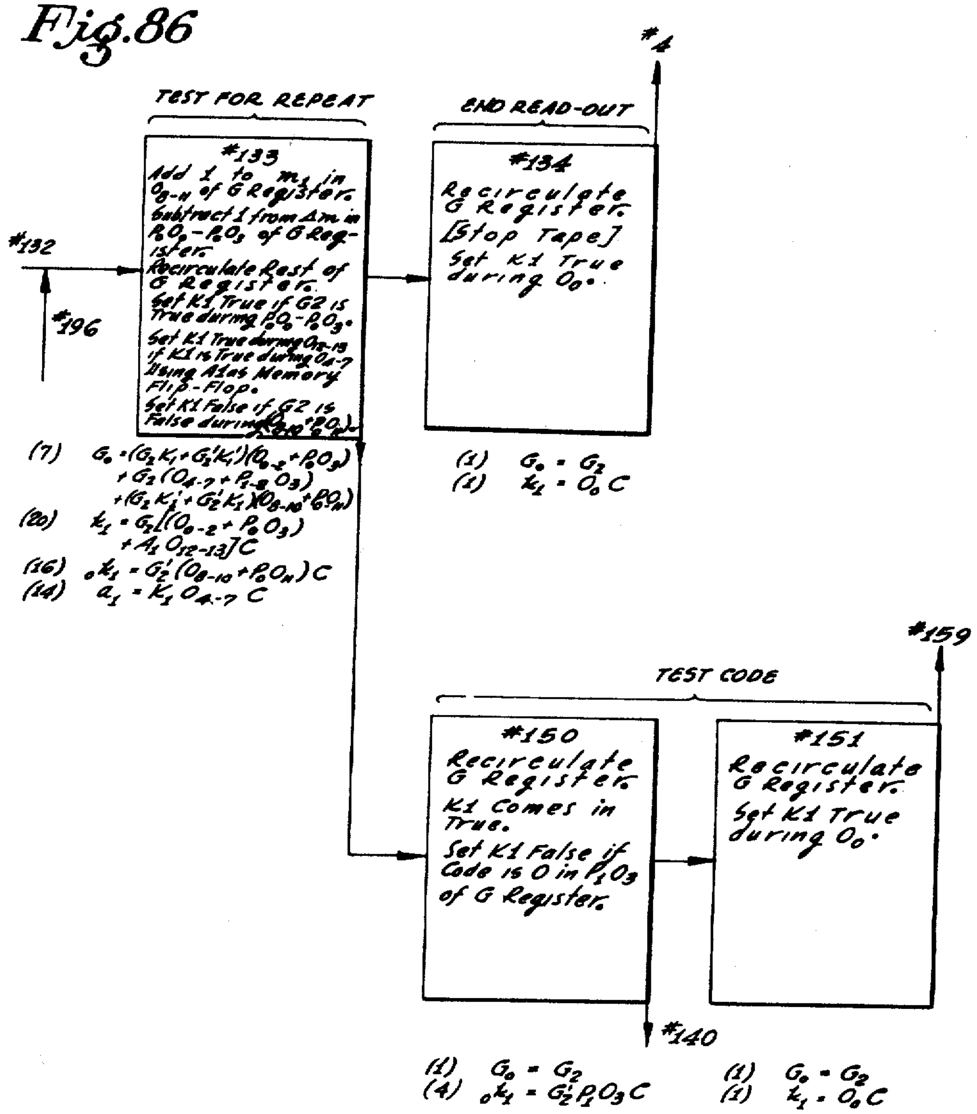

Fig. 86 shows the step operations whereby the readout code is tested for repeat and the routine is caused to proceed to read out the next address or word, or look up a new command.

Figure 87:
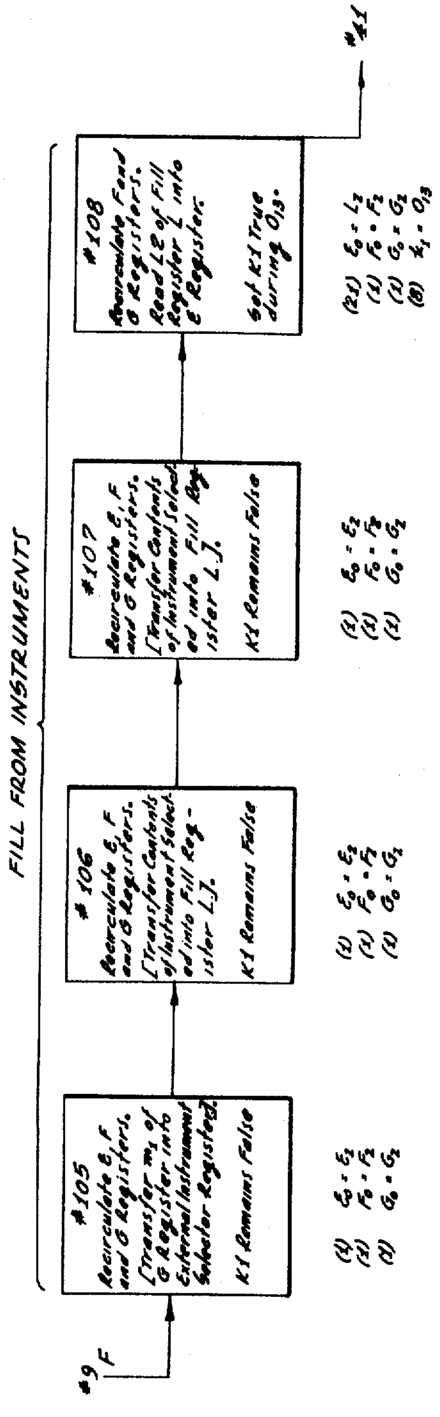

Fig. 87 shows the step operations of the arithmetic unit during which time the memory of the computer is filled with information received from external instruments.

Figure 88:
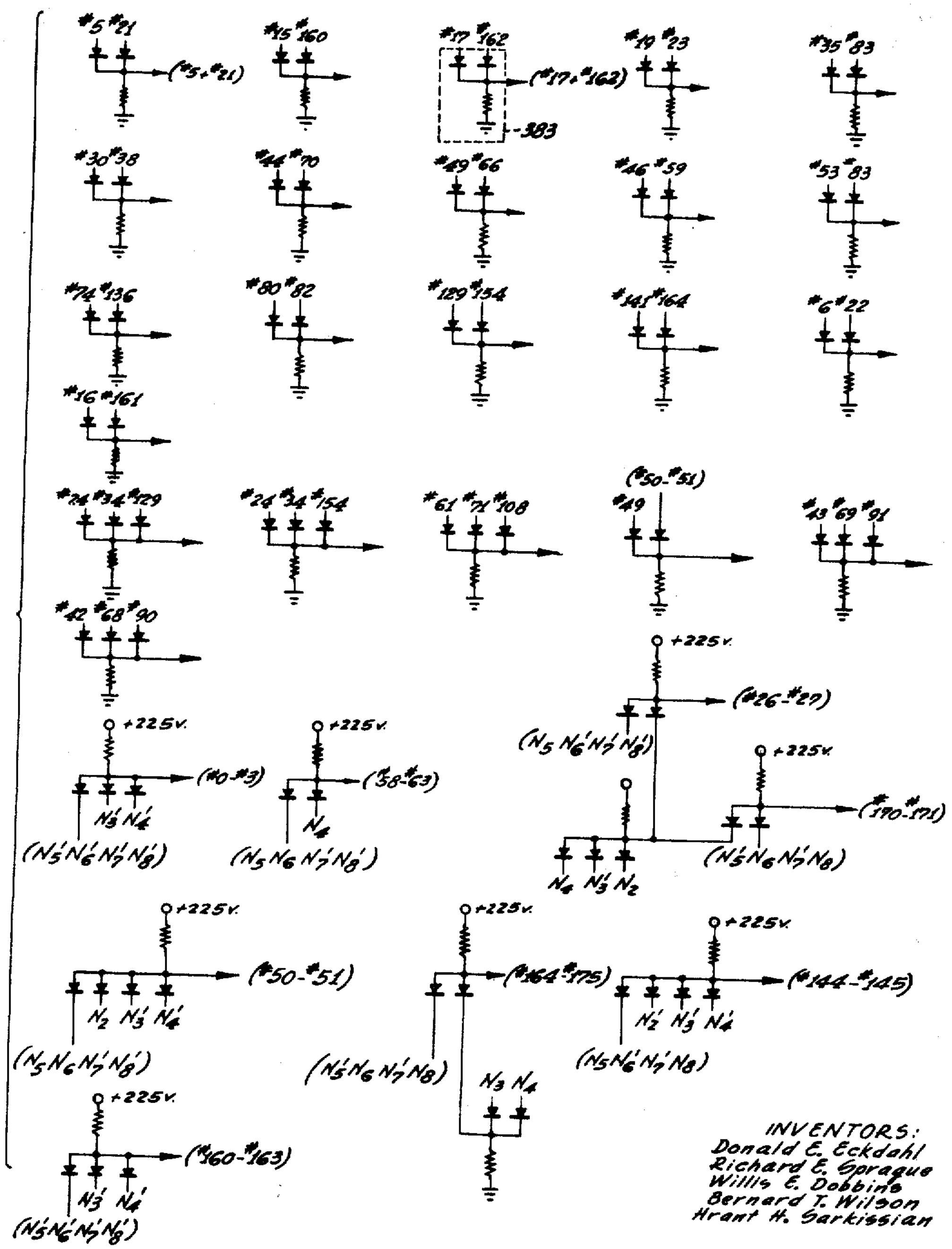

Fig. 88 shows the diode networks provided for generating the smaller program counter sums needed in the final networks for the logical propositions.

Figure 89:
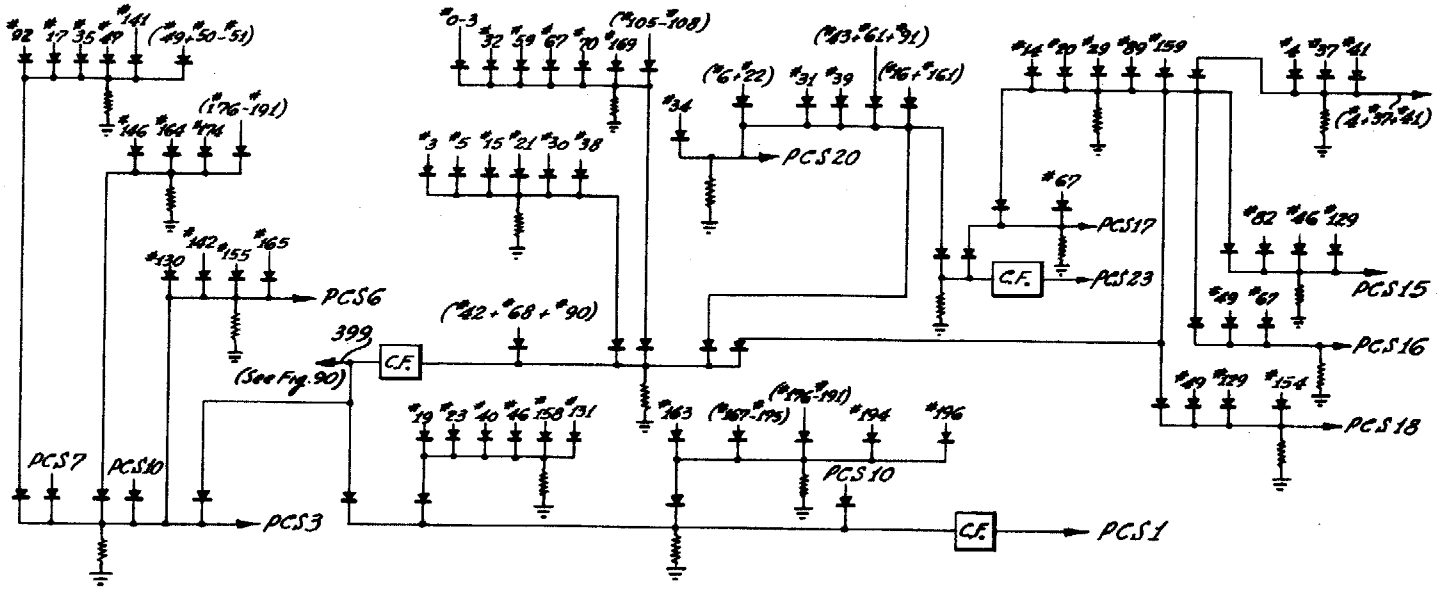
Figure 90:
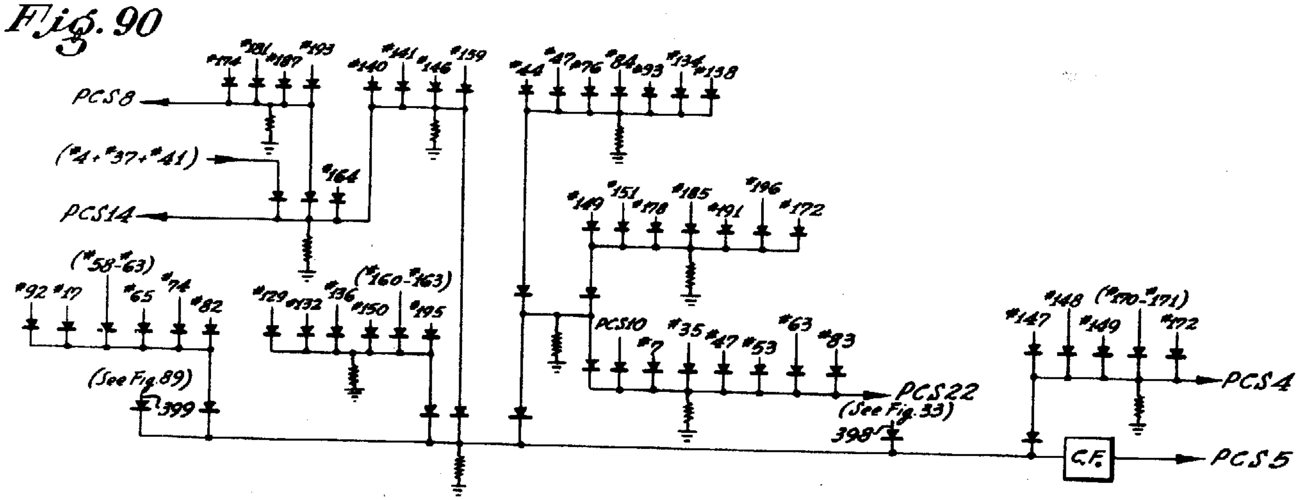
Figure 91:
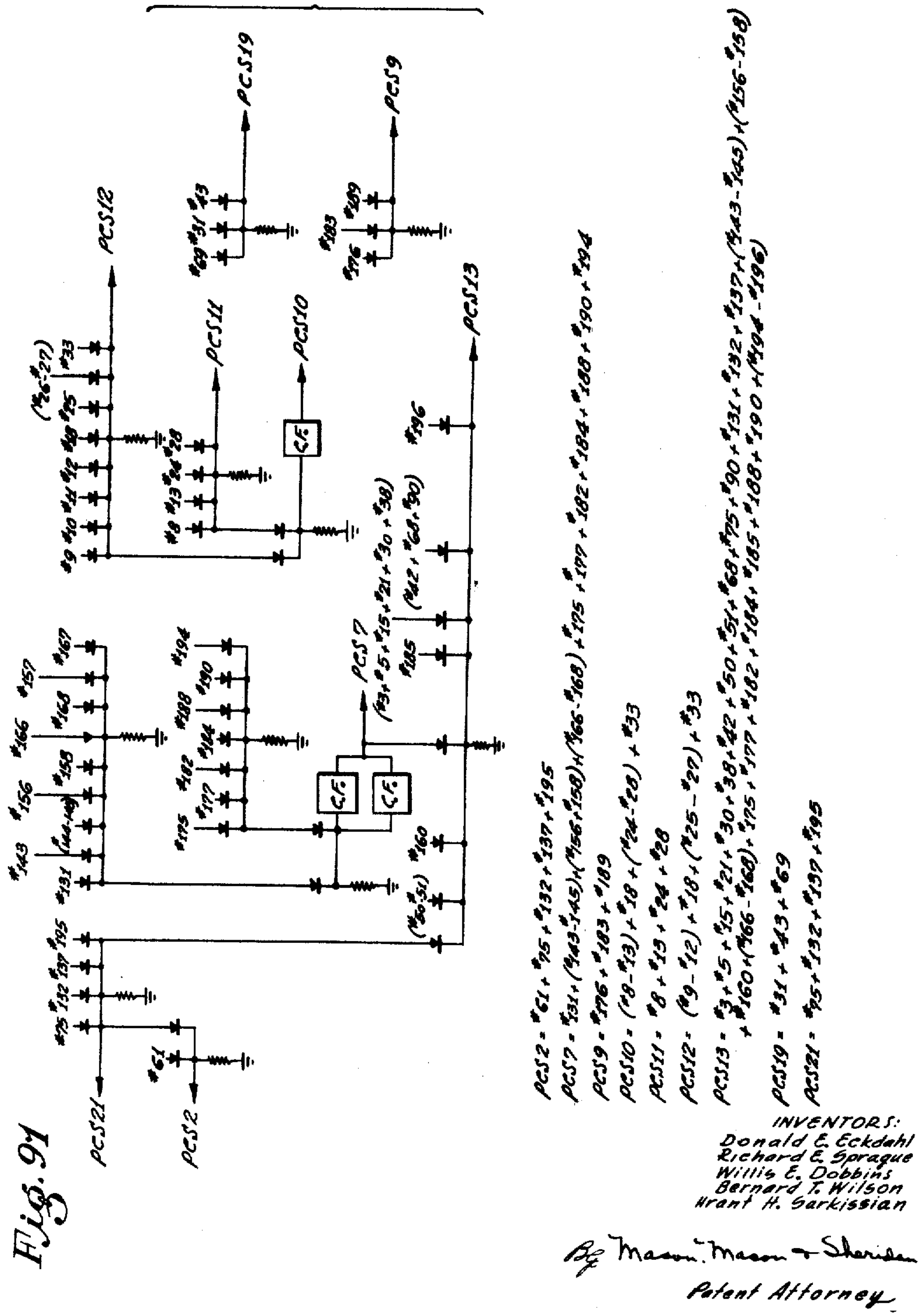

Figs. 89, 90, and 91 show the diode networks provided for generating the larger program counter sums needed in the final networks for the logical propositions.

Fig. 92 shows the overall diode network for generating the $E_0$ proposition equations.

Figure 93:
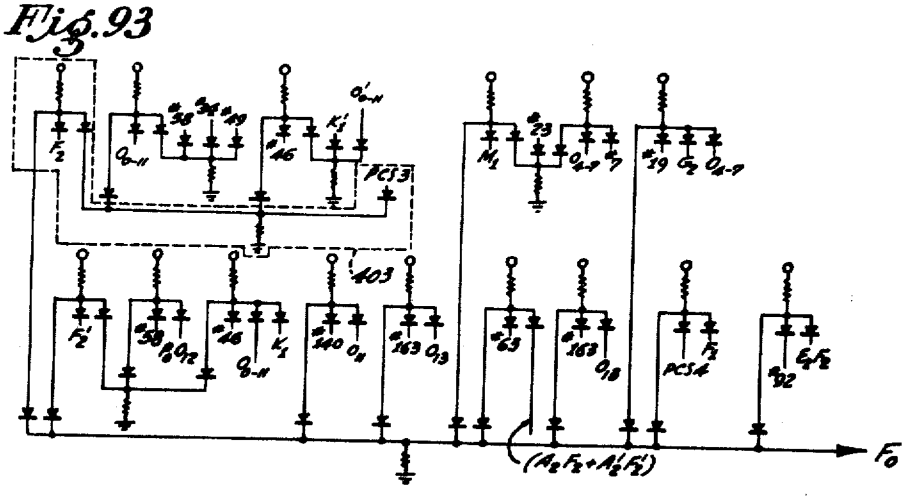

Fig. 93 shows the overall diode network for generating the $F_0$ proposition equations.

Fig. 94 shows the overall diode network for generating the $G_0$ proposition equations.

Figure 95:
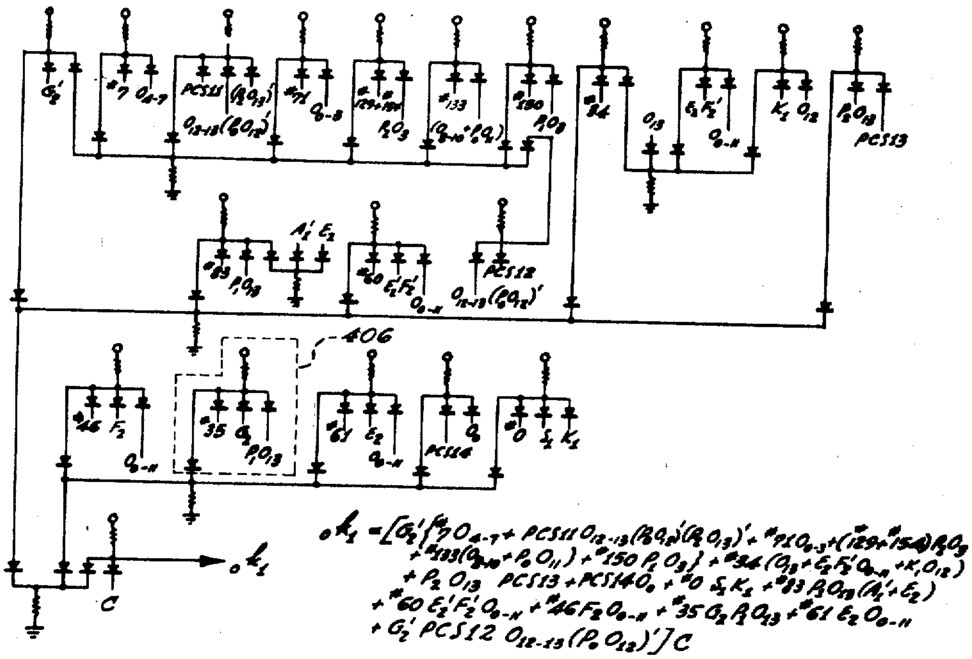
Figure 96:
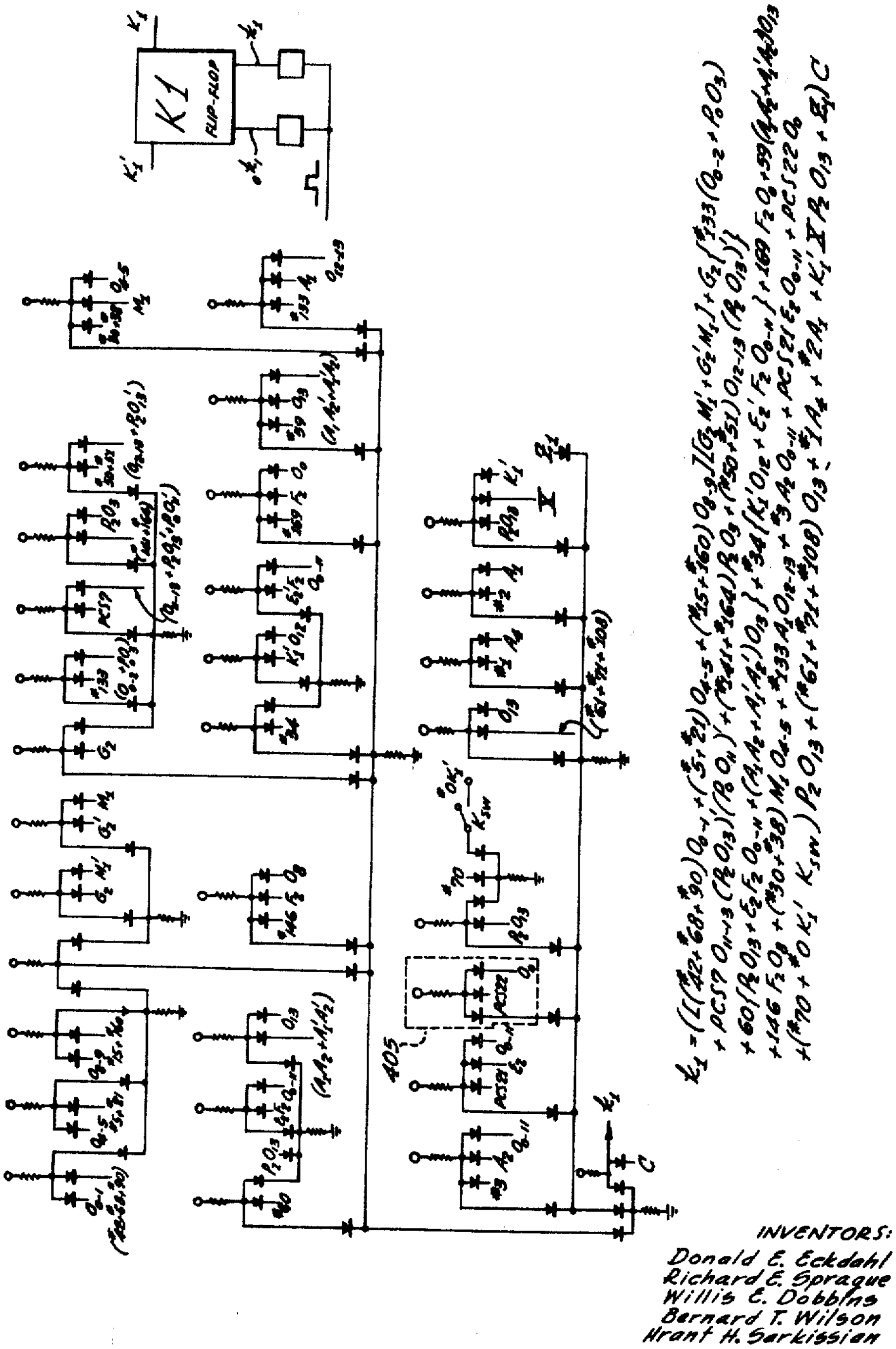

Figs. 95 and 96 show the diode networks for generating the ${}_0k_1$ and $k_1$ triggering equations for the K1 flip-flop.

Figure 97:
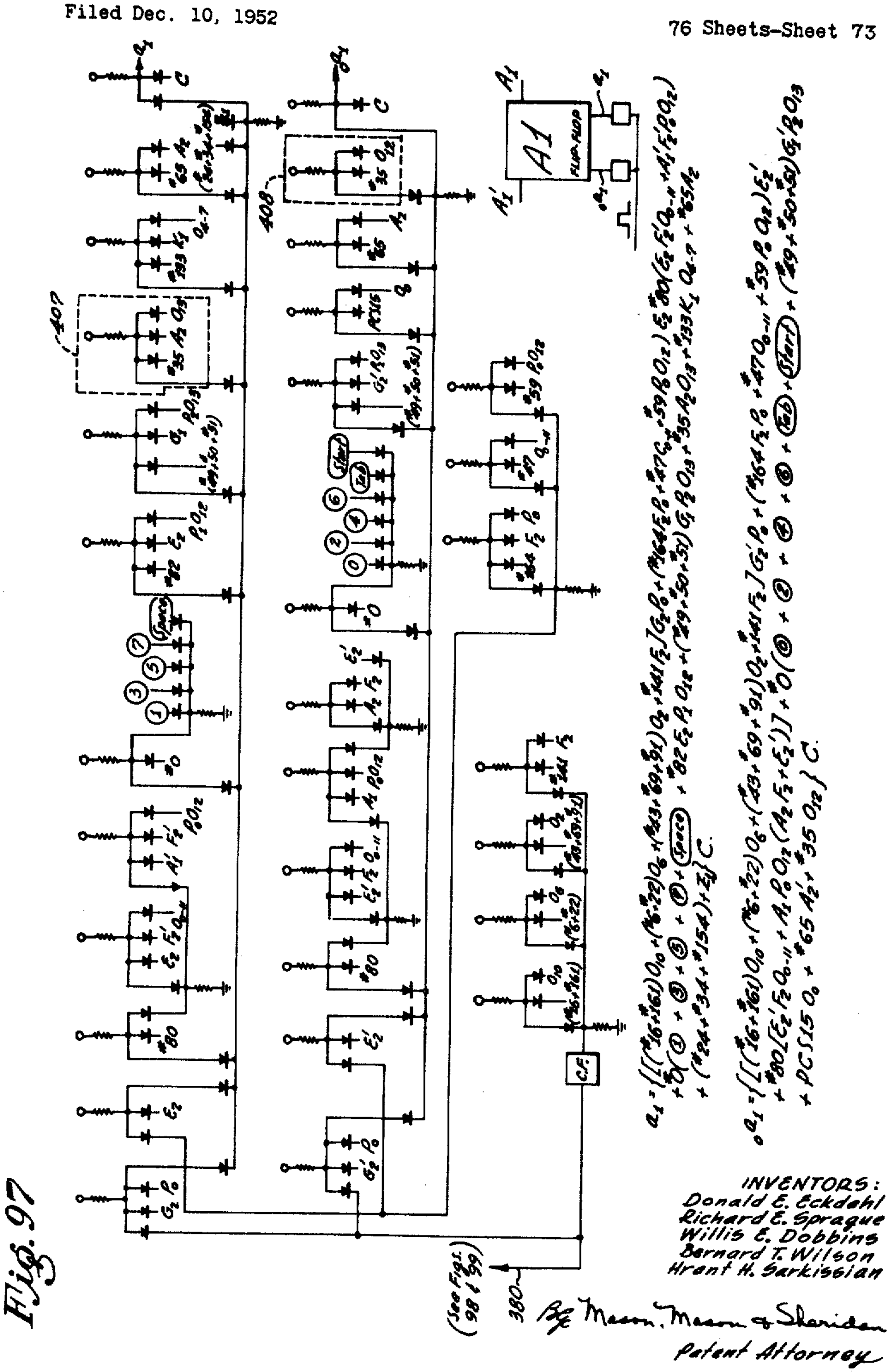

Fig. 97 shows the diode network for generating the $a_1$ and ${}_0a_1$ triggering equations for the A1 flip-flop.

Figure 98:
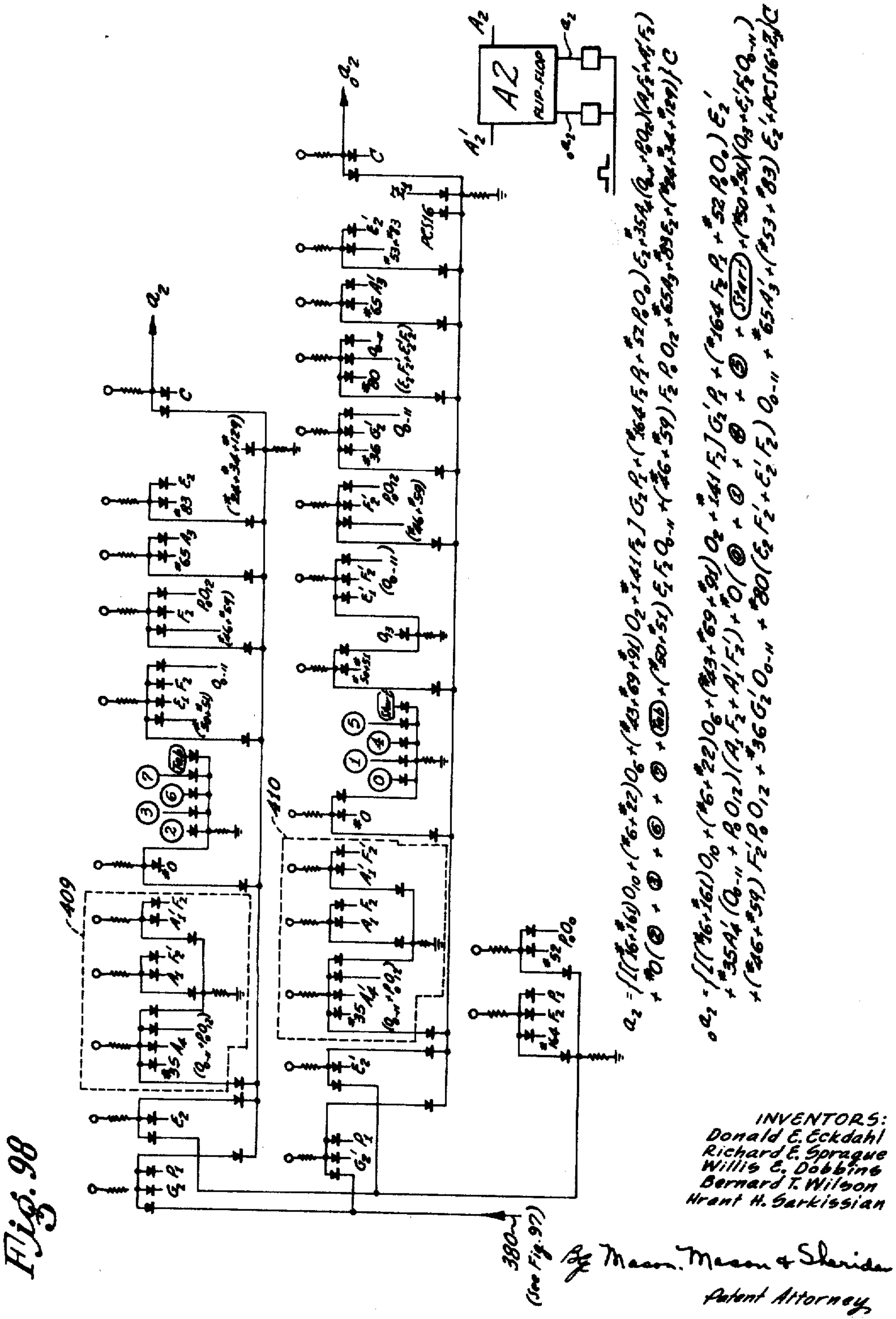

Fig. 98 shows the diode network for generating the $a_2$ and ${}_0a_2$ triggering equations for the A2 flip-flop.

Figure 99:
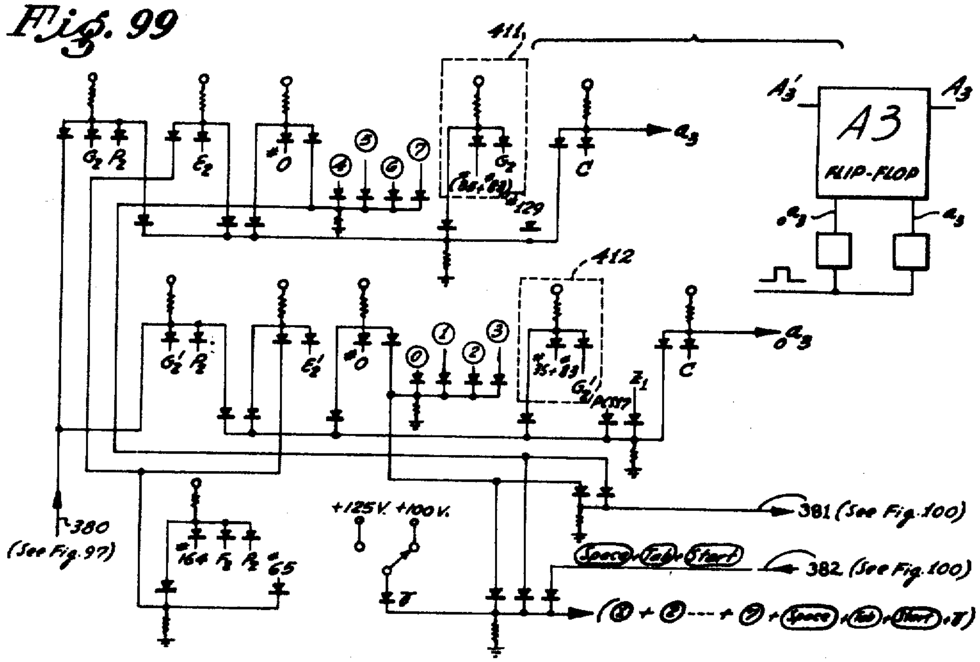

Fig. 99 shows the diode network for generating the $a_3$ and ${}_0a_3$ triggering equations for the A3 flip-flop.

Fig. 100 shows the diode network for generating the $a_4$ and ${}_0a_4$ triggering equations for the A4 flip-flop.

Fig. 101 shows the diode network for generating the $a_5$ and ${}_0a_5$ triggering equations for the A5 flip-flop.

*General description*

Figure 1:
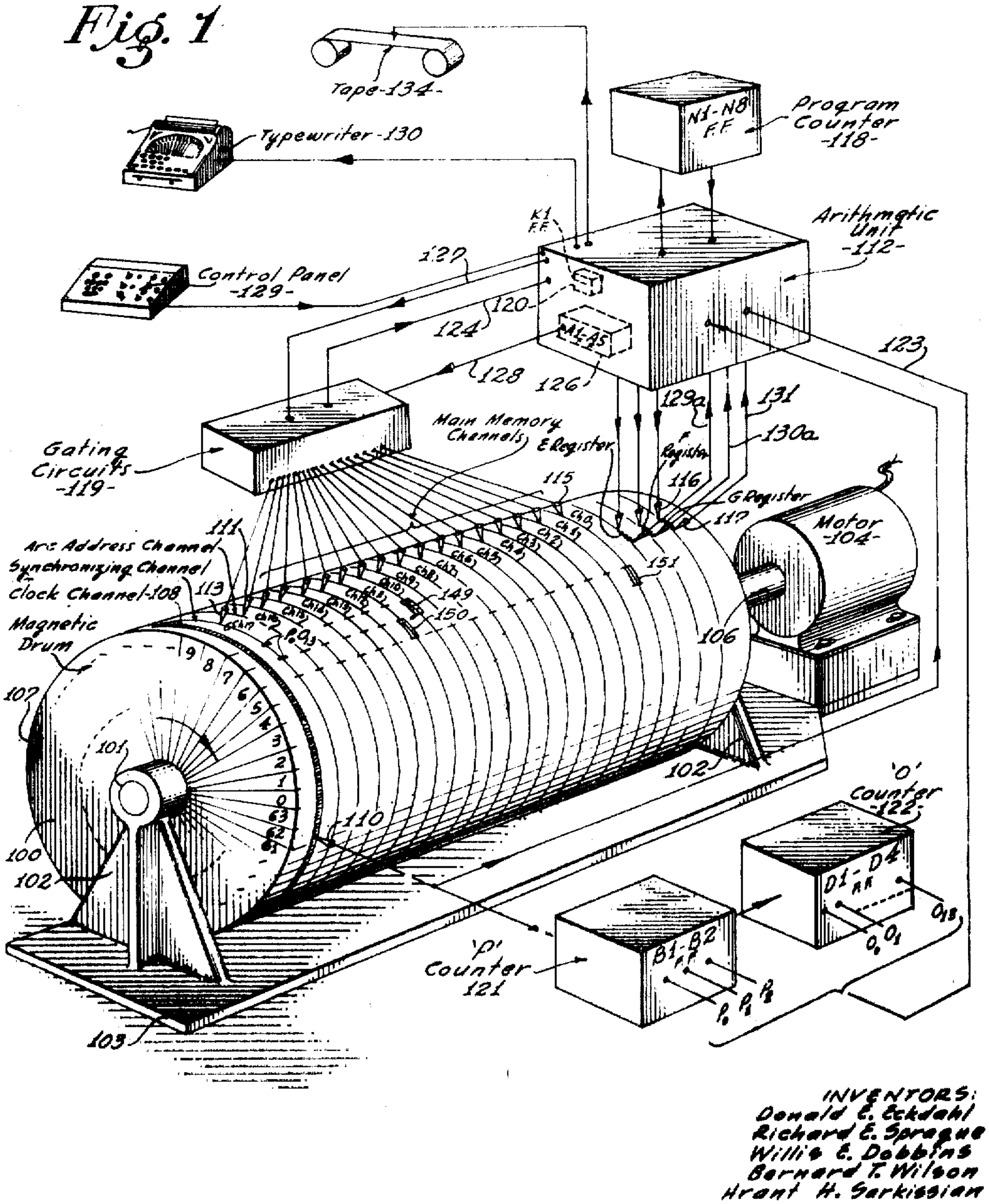
Fig. 1 is a diagrammatic view in perspective used for explaining the cooperative relation of the various components of the computer system of the present invention.

Referring first to Fig. 1, a general overall pictorial view of the preferred embodiment of the present invention is presented. Here a drum 100 is shown rotatably supported on suitable journal bearings 101 mounted on bearing supports 102 positioned at the sides of a base 103. A motor 104 rotates drum 100 by means of drive shaft 106 in a clockwise direction as indicated by the arrow on the left end of the drum 100. A coating 107 of magnetic material, such as ferric oxide, is deposited on the periphery of the drum 100. This coating enables information to be stored as magnetic flux patterns in nineteen circumferential channels shown spaced along the axis of the drum. Commencing from the left end of the drum 100, the first channel is designated as a clock channel 108, the second channel as a synchronizing channel *Ch*17, and the third channel as an arc address channel *Ch*16. These first three channels contain permanently recorded information. The remaining sixteen circumferential channels designated *Ch*0 to *Ch*15, inclusive, are referred to as main memory channels. The information in these latter channels is comprised of numbers and commands on which and by which the computer operates. These channels also store the results of the computation. Toward the right end of the drum 100, as shown in Fig. 1, three more channels are provided. These latter three channels are different from the others in that only a small arc on each of them is storing useful information at any given time. Furthermore, this information is stored in a dynamic sense in that the moving arc serves as a medium for temporarily delaying information recorded thereon so that it can be picked up a fixed period later. As will be noted later, the combination of the delay obtained by this means, together with a delay obtained by a series of flip-flop circuits in arithmetic unit 112, constitutes each of the loops referred to as the E, F, and G recirculating registers. Each of these registers provides means for serially recirculating information through arithmetic unit 112 so that it can be operated upon, i.e., altered, in accordance with the commands provided.

Although the three recirculating registers are shown in the present embodiment of the invention to be arranged on separate channels, it should be understood that since only an arcuate portion of each channel is useful it is possible for all the recirculating registers to be aligned along the same channel.

Describing the circumferential channels in greater detail, the magnetic flux pattern on the clock channel 108 is obtained by permanently recording an electrical sine wave so as to form a closed loop about the circumference of the drum 100. Each cycle of this sine wave defines a unit area or memory cell on the periphery of the drum. Thus the signals on the clock channel 108 divide the circumference of the drum into a fixed number of such memory areas. In the present embodiment, the periphery of the drum is divided in this manner by the sine wave recording into 2688 unit areas. A clock head 110 stationarily held near the periphery of drum 100 senses the magnetic flux pattern on the moving clock channel 108, thereby generating an electrical signal indicative of each sine wave cycle. It is by utilizing the signals so induced by the clock channel 108 as a reference during reading and recording that the other circumferential channels of the drum 100 are effectively divided into a similar number of unit areas.

Each of these unit areas on the periphery of drum 100 is capable of containing a bit of binary information, i.e., a saturated flux pattern either in one direction or the other. When the flux is in one direction in a given pulse position, it represents a binary digit "one"; and when it is in the other direction, it represents a binary digit "zero." Since the non-return-to-zero method of storing information on the drum is employed, the recorded flux pattern only changes on successive pulse positions when the binary digits of a sequence change from a 0 to a 1, or vice versa.

As will be made apparent in the ensuing description, the clock signals induced by the clock channel 108 not only define the unit areas on the drum but also synchronize the operation of all the circuits in the computer so that they function in accordance with the basic timing logic to be hereinafter described.

The memory drum 100 and arithmetic unit 112 of the present invention are designed to serially handle information or data in blocks consisting of a fixed number of binary digits. These assemblages of digits may represent either numbers (see Fig. 2) or commands (see Fig. 3) and are commonly referred to herein as "words." In the present invention a word is comprised of a sequence of 42 consecutive binary digits. Consequently, 42 consecutive units of area on a channel are required to store a word; or, stated another way, a series of 42 clock pulse signals defines the period of a word. In the ensuing discussion, the arc of a circumferential channel in which information representing a word may be recorded will be referred to as a register. Since the clock channel 108 contains 2688 clock signals (42×64), storage space or registers for 64 words are provided on each of the main memory channels. Thus the circumference of the drum 100 is divided into 64 arcs. As shown on the left end of the drum 100 in Fig. 1, each of these arcs is designated by one of the reference numerals 0 through 63. The arcs are numbered consecutively in a counterclockwise direction, and it should be noted that arc 63 is followed directly by arc 0 such that the defined registers extend over the entire circumference of the drum.

In order to enable the arithmetic unit 112 to properly respond to each of the digits in a register being sensed at any given time, counting circuits comprised of the P counter 121 and the O counter 122 are provided for counting the clock pulses generated by the clock head 110. These counters, together, respond to a cycle of 42 clock pulses. Thus the overall counting cycle defines the period allotted to a register on the drum. The P counter 121 responds directly to the signals induced in the clock head 110 and has a capacity of three clock pulse counts; namely, $P_0$, $P_1$, and $P_2$. A carry pulse generated once each cycle of the P counter 121 causes the O counter 122 to manifest a new count. Since the unit to which the O counter 122 responds is represented by a period of three clock pulses, it can be thought of as counting or defining octal digits. It is well known in the computer art that a group of three binary digits together can be readily converted into their octal equivalent. This arrangement of counters divides each register into 14 octal digits; namely, $O_0$, $O_1$ . . . $O_{13}$, as manifested by signal outputs from the O counter 122. Accordingly, by noting the counts in the P and O counters together, the pulse position in a register presently being scanned by the heads on the drum can be indicated and the indication fed into the arithmetic unit 112, as schematically illustrated in Fig. 1, by connection 123.

The second channel from the left on the drum periphery, designated the synchronizing channel *Ch*17, provides a single permanently recorded signal in each of the arcs 0 to 63, inclusive. This signal is recorded on each of the arcs on channel *Ch*17 in the position of a word period identified by the P and O counters as position $P_0O_{13}$. This signal is used to set the P and O counting circuits in synchronism with all of the registers simultaneously being sensed across the drum 100 by the heads of the channels *Ch*0 to *Ch*16, inclusive. It should be noted that each of the channels *Ch*0 through *Ch*17 operatively communicates with the arithmetic unit 112 by only one head, such as head 113 shown positioned opposite channel *Ch*17. As will be explained hereinafter, this head is utilized for both reading information from and recording information onto the channel. Gating circuits 119 control the connections of the channel heads, permitting only one channel head to communicate with the arithmetic unit 112 at a time. Assuming the computer is in its idling condition, in preparation to starting the computer operating, a clear (Z) switch 355 on the control panel 129 (see Fig. 14) is manually closed. As will be more thoroughly described in the ensuing description, the actuation of switch 355 causes gating circuits 119 to pass the synchronizing pulses picked up by head 113 at $P_0O_{13}$ time of each word period from the synchronizing channel *Ch*17. As later to be described in connection with Fig. 16, this signal is then used to set the P and O counters to indicate count $P_1O_{13}$ (note that there is one clock pulse period lag) from which the counters proceed to count on successive clock pulses. Thus the P and O counters are placed in synchronism with the pulse positions of the registers on the drum and remain in step as long as the drum 100 is revolving.

The third channel from the left, the arc address channel, is designated *Ch*16. The arc address channel *Ch*16 defines the location of each of the 64 arcs or registers on the drum. Each of the arcs of *Ch*16 contains a magnetic pattern, representing a coded binary number equivalent of the decimal number which has been assigned it as indicated on the left end of the drum in Fig. 1. Accordingly, as the arc address channel *Ch*16 moves past its associated head 111, a train of signals is induced therein indicative of the address of each of the arcs on the drum 100.

The remaining sixteen channels on the drum 100 are designated as main memory channels *Ch*0 through *Ch*15. These channels store the numbers and commands, i.e., the "words" upon which and by which the arithmetic unit 112 is made to operate. As previously stated, each of these channels has a single stationary head, such as head 115 shown for channel *Ch*0. The same head is used for both recording and reading information from a channel. Since information is always recorded into a channel by reference to the P and O count signals, the information recorded in a main memory channel register is always temporally aligned with the periods of the arcs already shown to be defined on the drum. Thus each of the heads associated with the main memory channels is always scanning data in the same arc address and same pulse position of an arc address. However, it should be understood that all the heads do not have to be physically located in the same radial plane in the drum memory in order to accomplish this. The only requirement is that corresponding positions in the respective arcs of the several channels have the same timewise reference.

Since there are 16 main memory channels and 64 one-word length registers available on each of them, a total of 1024 word registers are provided on the memory drum 100. As will be explained in the ensuing description, the word location or register defined by channel *Ch*0 and arc 0 is generally reserved for use as a special storage register to which information is temporarily routed from the arithmetic unit 112 during the multiplication and division routines. Accordingly, the remaining 1023 registers on the drum 100 are the ones available at all times to a coder for setting up a problem on the computer. These registers are filled with patterns of binary information which, as previously stated, represent either numbers or commands.

The last three channels on the drum 100 operate as part of the E, F, and G short recirculating registers. These channels differ from the others in that they each have a record and a read head associated therewith, such as record head 116 and read head 117 of the G register. The heads associated with each of these latter channels are so positioned that a point on the periphery of rotating drum 100 first passes the record head and then passes the read head a little less than one word period (approximately 39½ clock periods) later. Thus assuming the circuits are set for recirculation, a particular unit signal on being recorded on the revolving drum 100 by the record head 116 of the G register will be carried by the drum 100 to the read head 117 of the G register, stepped through flip-flop circuits in the arithmetic unit 112, and rerecorded again by the record head 116. The heads are spaced relative to each other to create a delay such that, together with the delay through the arithmetic unit 112, the total time required for a given digit to make one cycle about the loop during normal recirculation is equal to 42 clock pulse periods.

Still referring to Fig. 1, it should next be noted that all of the heads associated with the main memory channels *Ch*0 through *Ch*15, the arc address channel *Ch*16, and the synchronizing channel *Ch*17 feed their signals in parallel into gating circuits 119. As will be described fully in the ensuing discussion, a set of flip-flops (A1 to A5) in the arithmetic unit 112 is referred to as the channel selector register 126 during the time the arithmetic unit 112 is searching the memory. Channel selector register 126 is used for setting up a selective signal on line 128. This signal causes the gating circuits 119 to pass information from only one of the channels *Ch*0 to *Ch*17 on the drum onto line 124 and thence to the arithmetic unit 112. Referring momentarily to Fig. 7, a table shows the contents of the A1 to A5 flip-flops which characterizes the signals for each of the channels on the drum. By making the main memory channel selection at a particular time, with reference to the rotation of drum 100, i.e., by first selecting the arc address channel to obtain the proper arc, and then, after a fixed period, selecting the desired main memory channel, any of the registers in the channel may be read.

In a similar manner, when it is desired to record information by way of line 127 from the arithmetic unit 112 into one of the main memory channels, the same channel selector register 126 is employed for controlling the gating circuits 119 to thus select the particular main memory channel head to which signals are to be conveyed from the arithmetic unit 112. As before noted, by controlling the time of this main memory channel selection, the recording of information can be limited to a particular register of the channel.

It should be understood that the operation of the E, F, and G recirculating registers is such that the information (binary signals) in all three of these registers may be continually recirculating in parallel through the arithmetic unit 112. As a result, information from any of these reigsters, or information in any portion of these registers, may be electrically switched and routed into the main memory channel registers.

Figure 2:
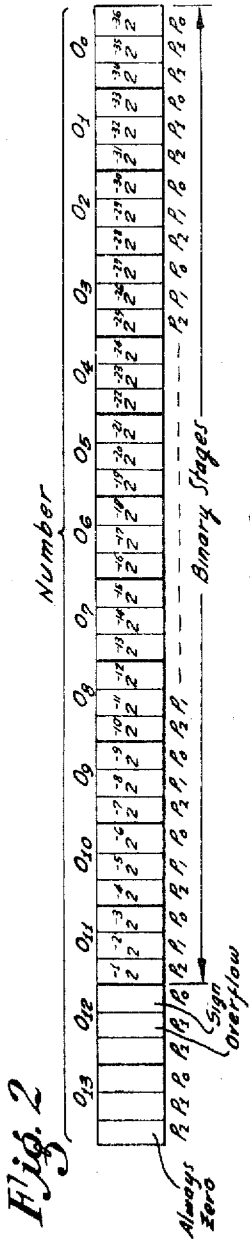
Fig. 2 shows a detail of the code pattern employed during a word period to represent a number.

Referring next to Fig. 2, a diagram showing the serial arrangement in a word period of information representing a number will next be described. The word period of 42 clock pulses is shown to be divided into 14 equal octal periods. Starting from the right, these periods are marked $O_0$ through $O_{13}$, respectively. Each of these octal periods is further divided into three binary periods marked $P_0$, $P_1$, and $P_2$. The present computer provides for operating on binary numbers 36 digits in length. The binary point is fixed and considered to be at the left of the number; that is, all numbers are assumed to lie within +1 and −1. Thus in the diagram the first binary position, defined by $P_0O_0$, represents the least significant digit of the number, or stage $2^{-36}$; and the $P_2O_{11}$ position represents the most significant digit, or stage $2^{-1}$. The $O_{12}$ period of this word contains coded information indicating the sign of the number and whether or not a carry digit beyond the most significant digit of the number has been obtained as a result of the previous computation. As revealed more clearly in the table of Fig. 6*a*, there are four possible combinations of this number information. The first row of the table indicates the information in $O_{12}$ and $O_{13}$ when the sign of the preceding binary number is minus and there is no overflow digit associated with the number. The second row is descriptive of when the sign of the number is plus and there is no overflow. The third row describes the condition when the sign of the number is minus and there is an overflow. The final row is descriptive of a number having a positive sign and an overflow.

In summary, it may be noted that a flux indication of a binary one in the $P_0O_{12}$ position of a word indicates that the preceding number is positive, while a flux indication of a binary zero in this position indicates that the preceding number is negative in value. Similarly, a one in pulse position $P_1O_{12}$ of a word indicates an overflow has been generated as a result of the previous calculations, while a zero in $P_1O_{12}$ indicates no overflow is present. As will be made apparent in the ensuing discussion, the control panel 129 shown connected to the arithmetic unit 112 in Fig. 1 provides for manually placing only octal digit information into the computer. Similarly, the typewriter 130 and tape mechanism 134 reproduce information in octal digit form. Thus it should be noted that the operator operates octal push buttons on the control panel 129 and reads octal digits as printed by the typewriter 130. The computer, however, actually receives and operates on binary numbers. Thus an operator thinks of one of the octal digits 0 through 3 in the $O_{12}$ period of a number in order to distinguish its characteristics. As noted, the binary digits, or octal digits, appearing in position $O_{13}$ of a number are always zero.

In Fig. 3, the arrangement is shown for information in a word period representing a command. It should be noted that the word diagram here shown is divided into periods defined by the P and O counts, similarly to that in Fig. 2. The information in a command is generally defined by the notation (I, $m_1$, $m_2$, $m_3$), where $m_1$, $m_2$, and $m_3$ represent addresses (arc and channel) on the memory drum, and I corresponds to an instruction to be carried out by the arithmetic unit 112. Thus in the diagram a command is shown to be divided into four sections. Starting from the right the $m_3$ information is positioned in the periods defined by the octal counts $O_0$, $O_1$, $O_2$, and $O_3$; the $m_2$ information is positioned in the next four octal periods $O_4$ through $O_7$; and the $m_1$ information in the following four octal periods $O_8$ through $O_{11}$. The last two octal periods $O_{12}$ and $O_{13}$ are reserved for information corresponding to the instruction I. The code information assigned to each of the 14 instructions I provided in the present computer is shown in Fig. 6*b*. These instructions, such as halt, fill (from instruments), read-out, etc., are listed in the table and will be more thoroughly explained later. Note that information in the $P_0O_{12}$ position of the I period is always represented by a binary digit 1 while the $P_2O_{13}$ position is always represented by a binary digit 0. Making the $P_0O_{12}$ position of the I period equal to a binary digit 1 enables a coder to treat the information in $O_{0\text{-}11}$ of the word period as a positive number, when he codes the machine to alter an address, for example.

The reason for requiring a binary digit 0 to be placed in the $P_2O_{13}$ position (the final binary position) of a word is because of the non-return-to-zero method of recording. When using this method, it is necessary to provide for the memory flip-flops, such as M1, to always enter into the succeeding word period in a zero state. If this were not done, it is possible that the M1 flip-flop might not be in the proper state when it is made effective at the beginning of some word period. This condition is present, for example, when the M1 flip-flop is switched from reading the arc address channel to reading one of the other channels during searching operations. The state of the M1 flip-flop when switching from one to the other of these channels may not be the same, in which event, the reading would be erroneous if the M1 flip-flop were not always first set false at the beginning of a word period.

Thus it is actually only the intermediate positions of I, defined by periods $P_1O_{12}$ to $P_1O_{13}$, inclusive, which contain the 4 place binary digits which define each of the instructions, as shown.

Referring back to Fig. 3, it should be noted that each of the sections $m_1$, $m_2$, and $m_3$ of the command is in turn divided into two periods, such as periods $m_3^a$ and $m_3^c$ for the $m_3$ address. The superscripts "*a*" and "*c*" characterize that information in these periods are descriptive of the arc and channel addresses, respectively, on the drum 100. Hence $m_3^a$, located in octal positions $O_0$ and $O_1$, may contain binary numbers representative of any of the arcs 0 through 63; and $m_3^c$, located in octal positions $O_2$ and $O_3$, may contain a binary number representative of any of the channels *Ch*0 through *Ch*15.

As a specific example of how information representing binary digits of the addresses is placed, Fig. 3*a* shows the portion of a command reserved for the $m_3$ address. Here a binary number representative of arc 2 is provided in the periods $O_0$ and $O_1$ by placing a digit 1 (pulse) in position $P_1O_0$ and a digit 0 (blank) in the remaining pulse positions of these periods. In a similar manner, a binary number representative of channel *Ch*10 is provided in $O_{2-3}$ (simplified notation for octal periods $O_2$ to $O_3$, inclusive) by placing a digit 1 in positions $P_1O_2$ and $P_0O_3$, and a digit 0 in each of the remaining positions of these periods.

Referring next to Fig. 4, a diagram of a portion of the arc address channel *Ch*16 (Fig. 1), defining in particular arc 2, is shown. In each of the arcs in channel *Ch*16 corresponding to the $m_1^a$, $m_2^a$, and $m_3^a$ periods of a command (as noted in Fig. 3), signals corresponding to the binary number indication of the arc address are permanently recorded. The binary code for arc address 2 is repeated in each of the periods $O_{0-1}$, $O_{4-5}$, and $O_{8-9}$ of this arc. It is necessary to arrange the arc address in this manner because of the serial comparison routine used by the arithmetic unit 112 in locating a particular arc address. This routine consists of matching information appearing in any one of the $m_1^a$, $m_2^a$, or $m_3^a$ periods of a command, as found in the G register, with information appearing in the corresponding periods of successive arcs in arc address channel *Ch*16. Repeating the arc address in this manner in each arc or word period of the arc address channel enables any of the three addresses of a command to refer to any of the arcs, thus providing complete generality in coding the computer.

Referring next to Fig. 5, a plan view showing in greater detail the arrangement of information on the periphery of magnetic drum memory of Fig. 1 will be presented.

The clock channel 108 is shown to divide the path of travel (note arrow) of the drum periphery into unit areas defined by the clock periods. Along the left side of the plan view, each arc is noted to consist of 42 clock periods.

The arc address channel *Ch*16 shows the location, in each arc, of the signals $m_1^a$, $m_2^a$, and $m_3^a$ representing the binary number equivalent of the numbers assigned to the arcs. As previously described in detail in Fig. 4, these binary numbers are repeated in the three periods $O_{0-1}$, $O_{4-5}$, and $O_{8-9}$ of each of the arcs. The portion of the arc address channel carrying the address arc 2, as shown in detail in Fig. 4, is indicated by block 131 in Fig. 5.

The coded information in the main memory channels *Ch*0 to *Ch*15, inclusive, may represent either a command or a number, as already described. For example, a command bearing reference numeral 149 is shown recorded in arc 7 of channel *Ch*10, and a number bearing reference numeral 150 is shown recorded in arc 6 of channel *Ch*11. The information in these words is positioned on the drum so that the least significant position of a word, $P_0O_0$, is the first to move past the channel heads. It should be noted that although the command 149 shown is positioned in arc 7 of channel *Ch*10, the address of this command is actually defined as arc 2. The reason for this anomaly is because of a four word period delay between the operation in which the arc address is located and the operation wherein the selected register is actually read into the arithmetic unit 112. As a result, the information defined by arc address 2, for example, will be in reality located in arc 7. It should be noted further, however, that since the delay in reading a register of a particular channel (after having located the desired arc address) is the same as the delay in recording information into the register, the actual physical shift of the information in the channels of the main memory with respect to the arc addresses as defined by the arc address channel is cancelled. Thus for all practical purposes, the operator of the computer can forget that this condition exists.

The block 151 in Fig. 5 represents the register on the memory located at address (*Ch*0, arc 0 which is reserved as a special storage register during the multiplication and division arithmetic routines and is thus not available as a main memory storage for numbers and commands when performing these arithmetic routines.

Having described the arrangement of information in each of the word periods constituting a command, a number, and the arc address channel *Ch*16, it should be noted again that each of the recirculating short registers E, F, and G, as schematically shown in Fig. 1, normally operate so as to recycle information serially contained within a single word period. Stated in another way, each of these short registers normally defines a closed loop of information 42 clock periods in length. When the short registers are each recirculating their information, the digits in corresponding positions of each of these registers travel in parallel around their respective loops once during each word period. It should be understood that the recirculation of information in the short registers E, F, and G, and consequently the availability of this information to the arithmetic unit 112, is independent of the communication of the arithmetic unit 112 with the memory channels on the drum. Furthermore, the operation of the recirculating registers is synchronized with the arcs (word registers) on the drum 100. Thus it is pertinent to note that arithmetic unit 112 may be simultaneously observing corresponding digits of a maximum of four different words: the three words contained in the E, F, and G recirculating registers and a word being read from a selected channel on the drum.

Referring back to the pictorial view of the computer system in Fig. 1, it is now apparent that the arithmetic unit 112 may be simultaneously receiving corresponding digits of words from each of the E, F, and G registers by means of lines 129*a*, 130*a*, and 131, respectively, and from any one of the registers of the main memory channels by means of line 124.

The present computer does not provide for simultaneously reading information out of and recording information into the main memory channels. Thus, since information being picked up from the memory channels on the drum is not being recorded back onto any of the main memory channels of the drum, it is apparent that this information is either being routed directly into one of the E, F, and G recirculating registers, or utilized in the arithmetic unit 112 to operate on the information simultaneously being picked from the recirculating registers.

Next it should be broadly noted that when the arithmetic unit 112 is not set for reading information from the main memory channels, it may either be blocked off from communication with the main memory or it may be switched to record information into the main memory by way of output line 127 from the arithmetic unit 112. In this later operation, the information being recorded into a particular arc address of a selected channel may be derived either directly from one of the recirculating registers E, F, or G, or may be a result of logically combining information being received in the arithmetic unit 112 from these recirculating registers.

It is when the E, F, and G recirculating registers are not communicating with the main memory channels that the computational processes of the computer are taking place. During these times the numbers in the E and G registers, for example, are serially recirculated once each word period. During each word period the information is processed so as to advance the particular computation being carried out. The circuits which are used for processing the information during any word period are made effective by a program counter 118, while the P and O counters 121 and 122, respectively, operate to let the arithmetic unit 112 know which digit position of a word is being sensed during a given clock period.

Still referring to Fig. 1, a broad description of the sequence of operation of the computer will next be presented. Assume first that an initial control number has been recorded in the $m_2$ period of the G recirculating register by the operator initiating the proper keys on the control panel 129. (Note the location of the control number in area 140 of the G register in Fig. 5.) This control number represents the address of a register in the main memory wherein the first command to be executed was previously recorded. Thus the control number consists of a serial arrangement of the two binary numbers representing the channel address $m_2^c$ and the arc address $m_2^a$.

Initially the A1–A5 flip-flops of the arithmetic unit 112 function as the channel selector register 126. The first operation needed is to locate the proper arc on the drum; thus the program counter 118 selects proper circuits in the arithmetic unit 112 so as to set up the binary number representing arc address channel *Ch*16, in channel selector register 126. At the end of the word period allocated to this operation, a signal is sent from the K1 decision flip-flop 120 in the arithmetic unit 112 to the program counter 118 which causes the gating circuits 119 to pass the information picked up by head 111 on the address channel *Ch*16 into the arithmetic unit 112. There the information in the $m_2^a$ period of successive words of the arc address channel *Ch*16 is compared with the control number in the G register which is simultaneously being serially passed through the arithmetic unit 112. In Fig. 5 this operation may readily be observed to consist of comparing the $m_2^a$ portion of the control number 140 shown in the G register with the successive $m_2^a$ portions of the arcs or word periods on the arc address channel *Ch*16. At the end of the word period that the information is matched, a signal is again conveyed from the K1 flip-flop 120 of the arithmetic unit 112 to the program counter 118, which causes the next operation to occur. This next operation consists of setting up the channel selector register 126 in the arithmetic unit 112 in accordance with the $m_2^c$ portion (channel address) of the control number 140 recorded in the G register. Under ordinary conditions the gating circuits 119 could now function to permit the head associated with the desired information channel *Ch*0 to *Ch*15, inclusive, to pass the information from the drum register being scanned into the arithmetic unit 112. However, because of transients occurring in the pickup circuit to be hereinafter described, it is necessary to delay the sensing of this information on the drum for three additional word periods until the transients have settled out. This delay is accomplished by means of an auxiliary counting circuit comprised of flip-flops A6 and A8 (see Fig. 30*a*) which operates to count through three word periods before the program counter can change to the next operation which permits the gating circuit 119 to pass information from the selected register.

The information found in the register so located in the main memory is now serially passed through the gating circuits 119 and transferred into the G recirculating register by means of the arithmetic unit 112. This information represents a command which, as stated in connection with Fig. 3, is generally notated as (I, $m_1$, $m_2$, $m_3$).

This series of four groups of coded binary numbers is termed a three address coded command in computer terminology. Thus it can be interpreted as meaning: Search the memory for the register defined by address $m_1$ and place the information (usually a number) found there into recirculating register E. Next, search the memory for the register defined by address $m_2$ and place the information (usually a number) found therein into the recirculating register F. Now then, operate on these two numbers in the arithmetic unit 112 in accordance with the instruction indicated by I, as found in the G register. And finally, search the memory for the register defined by address $m_3$ and place therein the result of the computation as found in the E recirculating register.

It should be broadly noted at this point that the procedure by which the computer operates to search the memory for the $m_1$, $m_2$, and $m_3$ addresses is similar to that already described for obtaining the first command.

Assuming the operations directed by the first command have been completed, the computer then automatically operates to search the memory for the second command and the cycle above described for carrying out a three address coded command repeats.

The second command, as well as all the others, is located in the same manner as the first by means of the control number in the G register which is altered during each cycle by having a unit added to it. Thus the control number causes the commands to be picked up from the registers on the drum in consecutive order until a halt command has been observed, at which time the computer stops.

As will be made clear in the ensuing discussion, the computer may be coded with commands which cause the answers of the computation obtained in the above manner to be printed out on the typewriter 130, or to be recorded onto the tape mechanism 134.

*Pickup and record circuitry*

A detailed description of the circuitry employed for routing information between the magnetic drum 100 and the arithmetic unit 112 will now be given. Reference will first be made to Fig. 8 showing the clock pickup circuitry.

This clock pickup head 110 (see Fig. 1), which is stationarily positioned to have a working relation with the clock channel 108, is here shown to be comprised of a coil 132 wound on a split core 133. As the magnetic flux on the clock channel 108 moves past pickup head 110, an electrical waveform 137 is induced in coil 132. This waveform 137, which resembles a sine wave, is applied on the grid of a first amplifier tube 135 through a grid resistor 136. Resistor 136 functions to limit current flow in the grid circuit which, if present, would tend to erase the clock channel recording. The plate output of first amplifier tube 135 is coupled to the grid of a second amplifier tube 138. The waveform 137*a* thus resulting on the plate of second amplifier tube 138 is in phase with the original waveform 137 sensed by the pickup head 110.

Because of the relatively small size of the drum used for the memory in the present invention, it is generally necessary that the clock pickup head 110 be physically located close to a head on one of the other memory channels of the drum 100. As a result, a magnetic coupling effect may be induced therein by the abrupt change in current flow set up in the adjacent head during recording, for example. This effect may cause the clock pickup head 110 to ring at its natural frequency. The normal frequency operation of the head 110 is, of course, designed to be generally well below this natural frequency.

The introduction of a conventional parallel tuned circuit 139 in the cathode circuit of the first amplifier tube 135 prevents the spurious natural frequency waves created by ringing from passing through tube 135. At the same time, the tuning circuit does not prevent the true waveform of the clock signals from passing through tube 135.

The output of the second amplifier tube 138 is coupled by capacitor 146 to the grid of a tube 141 which, together with a second tube 142, constitutes a Schmitt triggering circuit. The plate of tube 141 is coupled to the grid of the second tube 142 by means of a resistor 143 and a capacitor 144 connected in parallel. The plates of the tubes 141 and 142 are connected through individual resistors, such as resistor 145, to a D.C. source +225 v. and the cathodes of these tubes are connected to ground through a common resistor 147. The grid of tube 141 is maintained by voltage divider 148 at such a potential that tube 141 is normally in a conducting state. Under these conditions, the resulting low plate voltage of tube 141 impressed on the grid of second tube 142 prevents this latter tube from normally conducting.

The positive portion of the waveform 137*a* from the plate of second amplifier tube 138, when applied onto the grid of tube 141, has no effect on the Schmitt circuit since tube 141 is already conducting; however, at some point of the negative portion of this applied wave, tube 141 is cut off. The resulting increased plate voltage of tube 141 is impressed on the grid of second tube 142. Simultaneously the decreased current flow through common cathode resistor 147 decreases the cathode potential of second tube 142. These two effects cause second tube 142 to have a sudden increase in current flow, resulting in a steep drop in its plate output voltage.

In a similar manner, the conduction of second tube 142 is sharply cut off at a point of the positive portion of the input waveform 137*a* which triggers tube 141 into a conducting state.

A diode 155 is connected across the portion of the voltage divider 148 which connects the grid of tube 141 to ground. Diode 155 prevents a negative charge from accumulating on the grid side of the coupling condenser 146 which, if present, would prevent tube 141 from properly responding to the amplified waveform 137*a* as induced by the clock pickup head 110.

The periodic square wave thus obtained from the Schmitt trigger circuit is coupled to both of the grids of a pair of triodes 152 and 153 whose plates are joined to form a common output line 154. The grids of triodes 152 and 153 are prevented from accumulating a negative charge by diode 156. The output line 154 is clamped between +100 v. and +125 v. by upper and lower parallel clamping diodes 156*a* and 156*b*, respectively. The triodes 152 and 153, connected in parallel, function as drivers enabling a large current source to be provided for driving the clock proposition C used for synchronizing logical networks of the arithmetic unit 112. It should be understood that all the logical propositions in the machine operate at the same two voltage levels as the clock signals, i.e., 100 v. and 125 v. These voltages are referred to as low and high operating potentials in the ensuing description.

Reference to Fig. 9 will next be made showing the detailed circuitry employed for routing information between the main memory channels and the arithmetic unit 112. As previously noted in Fig. 1, channels *Ch*0 through *Ch*17 each have a single head, such as head 115 on channel *Ch*0. In Fig. 9 this head 115 is shown to be comprised of a split core 157 wound with two coils 158 and 159 connected in series with their common terminal 160 connected to a 300 v. positive source. The other terminal of coil 158 is connected to a pickup lead 189. The single 158 functions as a pickup coil for reading information from the drum 100. As the *Ch*0 channel on drum 100 moves past the core 157, the substantially square magnetic saturation pattern M on this channel induces electrical pulses in the coil 158. Head 115 serves to differentiate this pattern so that positive pulses $e^+$ are generated on the leading edges, and negative pulses $e^-$ are generated on the trailing edges of the magnetic pattern M. These positive and negative pulses are conveyed by way of lead 189 to a control grid 161 of a tube 162 whose cathode has a common point 164*a*, to which other tubes are similarly connected, so as to maintain it at 125 v. This tube 162 functions not only as a preamplifier but also as a gate inasmuch as its suppressor grid 163 is connected to the output of the channel selector register 126 in the arithmetic unit 112.

Referring momentarily to Figs. 7 and 10, the circuits for the channel selector register 126 will be further explained in order to clarify the gating action of tube 162. The binary table in Fig. 7 defines the operational states of the A1–A5 flip-flops when functioning as the channel selector registor 126. Each row of the table shows the states of the flip-flops which in combination define the channels of the drum. In Fig. 10, a diode matrix is shown for generating signals representing each of the channels *Ch*0, *Ch*1, etc. As will be made clear by later reference to detailed descriptions of similar diode matrices appearing in the computer, as in Fig. 24, output lines from each of the flip-flops A1 through A5 impressed with electrical signals of two voltage levels are combined so as to generate output signals of two voltage levels representative of each of the channels. By reference to the table in Fig. 7, it will now be understood that, depending on the combined states assumed by the A1–A5 flip-flops, on of the output lines from the diode matrix shown in Fig. 10, such as *Ch*0, will be at the high operating potential of 125 v., while all the other output lines will be at the low operating potential of 100 v. As noted in particular for the circuit generating *Ch*0, each of the output lines representing a channel signal is further combined with a signal $A_7'$ by means of a diode gating circuit to generate the combined signal $A_7'$ *Ch*0. A reference to Fig. 30*d* in the ensuing description reveals that the $A_7'$ signal, which is obtained as an output from the A7 flip-flop, must be at the high potential of 125 v. in order to render the gating circuits operative for reading information from the main memory. On the other hand, the $A_7$ signal, representing the opposite output of the A7 flip-flop, must be at this high potential in order to make the gating circuits operative for recording information into the main memory.

Returning to Fig. 9, it is now evident that it is only when the channel selector register 126 has the binary equivalent of the decimal 0 set-up therein simultaneously with term $A_7'$ at a high potential that suppressor grid 163 is of a high potential (125 v.), thus permitting the signals on the control grid 161 to cause tube 162 to conduct and impress a signal on output line 164 leading to a common junction 165 of the circuit.

Each of the other channels *Ch*1 to *Ch*16, inclusive, on the drum has a similar pickup circuit (not shown) connected to common junction 165 by one of the connections 166 shown. Each of these other pickup circuits has the suppressor grid of its preamplifier tube controlled by one of the binary signal outputs, $A_7'$ *Ch*1, $A_7'$ *Ch*2, etc., shown in Fig. 10.

It is now evident that although all eighteen pickup heads associated with the *Ch*0 to *Ch*17 channels are simultaneously sensing signals on their respective channel on the revolving drum, the present circuit permits signals to be impressed on common junction 165 from only one of these channels at a time, depending on the binary number set up in the channel selector registor 126.

The remaining circuitry provided for transferring information from the channels on the drum 100 to the arithmetic unit 112 is used in common by all the channel pickup circuits feeding into common junction 165 and will now be described.

The signals on junction 165 are fed into the grid of a first triode **167*a* which, in conjunction with second triode 167*b*, forms a two-stage degenerative amplifier 167. A positive pulse applied to the grid of first triode 167*a* causes the grid of the second triode 167*b* to go more negative. As a result, the plate voltage output of the second triode 167*b* rises. This rise in voltage is transmitted through a feed-back resistor 169, connecting the plate of second triode 167*b* to the cathode of first triode 167*a*, thus causing the potential of this cathode to rise. By this feed-back connection, distortion of the signals passing through amplifier 167** is reduced.

To further reduce distortion of the signals, a tuned circuit is provided in the cathode circuit of first triode **167*a*. This circuit consists of an inductor 171 in parallel with a capacitor 172**. The function of this circuit is to reject signals in the cathode circuits which are resonating at the natural frequency of the pickup heads. These spurious signals are induced by current pulses flowing through adjacent heads during recording.

The output of the degenerative amplifier circuit 167 is impressed upon a lumped constant delay line 173 which operates to delay the channel signals for a period substantially equal to half a clock period. As will be made clearer in the subsequent discussion, these signals are delayed so that the flip-flop information set up by these signals can be combined in the diode networks of the arithmetic unit 112 with other signals that are aligned with the clock periods and not produce faulty results.

The delayed signals are next fed through a coupling capacitor 186 into the grid of a tube 175 which, together with a tube 177, operates as a phase splitting circuit 174. As will be noted, tube 175 has its plate resistor 176 connected to the 225 volts positive supply, and its cathode resistor **174*a*** connected to a 225 volts negative return.

It is essential for the operation of phase inverter tube 175 that its grid be maintained at a point half way between the supply (+225 v.) and return voltage (−225 v.). Tube 177 serves the function of a regulating device. The plate resistor 176 of tube 175 is connected to +225 v. and the cathode circuit of this tube is connected to a carefully regulated reference point 170 in the power supply system (not shown). A series circuit comprised of plate resistor **176*a* of tube 177, and resistors 178 and 179 connected to the 225 volt negative return, functions as a series voltage divider to which the grid of phase inverter tube 175 is connected at the common point of resistors 178 and 179**.

Any time a positive pulse is impressed on the grid of phase inverter tube 175, tube 175 is caused to conduct heavily. The resulting momentary drop on the plate of the tube 175 causes a pulse of negative polarity to be emitted on its plate output line 180. Simultaneously with this increase in current flow through tube 175, the potential drop across its cathode resistor **174*a* is increased. This momentarily raises the cathode potential and causes a positive pulse to be emitted on the cathode output line 181**.

A negative input pulse to the phase inverter tube 175 generates a pulse of opposite polarity on the output lines 180 and 181. That is, it generates a negative pulse on the cathode output line 181 and a positive pulse on the plate output line 180. It should be noted that it is the positive pulses on the output lines 180 and 181 which correspond to the desired signals.

The pulses on these latter two output lines 180 and 181 are next fed into a clipper circuit 183 comprised of left and right triodes 184 and 185, respectively. The grids of these triodes are both biased such that the negative pulses fed therein are clipped, but the positive pulses effectively cause the triodes to conduct. The voltage divider for controlling the grid of left triode 184 is traced through a series circuit comprised of resistors 187, 188, and **174*a* connected between +225 v. and −225 v. Similarly the voltage divider for controlling the grid of the right triode 185 is traced through a series circuit comprised of resistors 176, 190, and 191**.

The desired signals thus appear as substantially square negative pulses on upper output line 192, connected to the plate of the left triode 184, and lower output line 193, connected to the plate of the right triode 185. Thus the signals $e^+$, representing leading edges of the flux pattern M on the drum, appear on the lower output line 193; and the trailing edge signals $e^-$ of this flux pattern appear on the upper output line 192. In order to further square these signals, the voltages on these output lines are each clamped by a pair of diodes, such as diodes 194 and 195, which connect upper output line 192 to the already available 100 v. and 125 v. sources, respectively.

The clipper output lines 192 and 193 are connected to a memory flip-flop circuit, designated M1. This flip-flop circuit is similar to the well-known Eccles-Jordan circuit having two stable states. The circuit is comprised of a pair of triode tubes 197 and 198, the grid and cathode electrodes of which are connected in conventional fashion for this type of circuit, the grid of tube 197 being connected to the anode of tube 198 through a charging condenser 199 shunted by a voltage dividing resistor 200, and the grid of tube 198 being similarly connected to the anode of tube 197 through a similar charging condenser 201 shunted by a voltage dividing resistor 202. The circuit is arranged to be triggered into its opposite state by applying negative pulses to the grid of the conducting tube.

The clamped upper output line 192 of the clipper circuit 183 is coupled through a differentiating circuit 204 and a diode 205 which is orientated so that only the negative pulse is impressed on the grid of tube 197 of the M1 flip-flop. The lower output line 193 is coupled through a similar differentiating circuit and diode to the grid of the right tube 198 of the M1 flip-flop.

The output lines 206 and 207 from the M1 flip-flop are taken from the right and left plates, respectively. These output lines are applied onto driver tubes 208 and 209, respectively.

It is now apparent that the differentiated leading edges of the squared input signals $e^-$ and $e^+$ are used for triggering flip-flop M1. The appearance of an input signal $e^-$ on the left input ${}_0m_1$ causes tube 197 to become non-conducting, thus resulting in the left output 207 having a high output potential and the right output 206 having a low output potential. Similarly, an input signal $e^+$ on right input $m_1$ of the M1 flip-flop results in the right output 206 having the high and the left output 207 the low output potential.

Note that the output lines from the M1 flip-flop are not clamped. Furthermore, the connecting elements of the flip-flop circuits are so chosen that the flip-flop tubes can be easily triggered to opposite states by negative pulses applied on their grids.

The output lines designated $M_1$ and $M_1'$ connected to the plates of driver tubes 209 and 208, respectively, are clamped by diodes, such as diodes 210 and 211 on the output line $M_1'$, which hold the swing of this output between the operating potentials +100 v. and +125 v.

This particular arrangement of the flip-flop circuit is advantageous for two reasons. It permits the flip-flop to be designed so as to be easily triggered by the input pulses, and the driver tubes provide a large source of current for operating the diode networks in the arithmetic unit 112.

Assume that the M1 flip-flop circuit is originally in a state such that the $M_1'$ output line connected to driver tube 208 is at the high level operating potential and the $M_1$ output, being connected to the opposite driver tube 209 of the flip-flop, is at the low level operating potential.

As the portion of the channel of drum 100 containing the magnetic pattern M moves past head 115, the leading edge pulse $e^+$ is generated and, after substantially a one-half clock period delay provided by delay unit 173, it is impressed on the right input $m_1$ of the M1 flip-flop, resulting in the $M_1$ output line abruptly swinging to the high level operating potential, and the $M_1'$ output line to the low level operating potential. A given number of clock periods later, depending on the number of consecutive binary "ones" represented by the magnetic pattern M, the trailing edge pulse $e^-$ is impressed on the ${}_0m_1$ input to the M1 flip-flop, causing the output lines $M_1$ and $M_1'$ to return to their initial voltage levels.

It should now be understood that the $M_1$ output of the M1 flip-flop recreates the signal which had been originally recorded on the magnetic drum 100, while the $M_1'$ output generates the binary complement (or logical inverse) of this information. In other words, the M1 flip-flop follows the magnetic pattern sensed on the drum 100, delayed, of course, by the one-half clock pulse period.

It should be noted that since the M1 flip-flop responds only to changes in polarity of the memory pattern, the M1 flip-flop is forced to always be zero at the beginning of the $P_2O_{13}$ pulse time of each word period by means of gating circuit 226 which responds to signals C and $P_1O_{13}$. This ensures that the M1 flip-flop always adjusts itself anew at the beginning of each word period that it is operating.

The two voltage level information thus provided on output lines $M_1$ and $M_1'$, i.e., the information picked up from the drum together with its logical inverse, is connected to the diode networks 168 in the arithmetic unit 112. Here this information is logically combined during each clock period with other two voltage level information either being simultaneously received from the E, F, and G registers or previously registered in storage flip-flops in the arithmetic unit 112 as a result of the previous clock period actuations. This mode of logical operation will be explained in the ensuing discussion.

As previously noted, depending on the circuits activated in the arithmetic unit 112 by the program counter 118, information in the recirculating registers E, F, and G may be recorded onto any of the registers in the main memory channels *Ch*0 to *Ch*15, inclusive, of the drum 100. Thus the circuitry provided for recording information onto the channel *Ch*0 of the drum 100 will next be described. The same head 115, previously referred to as being used for reading, is also used for this recording; however, in this operation both coils 158 and 159 of the head 115 are used. The outputs from the arithmetic unit 112 to the channel heads are derived from logical diode networks and are designated as record propositions $R_1$ and $R_2$.

As shown in Fig. 9, record propositions $R_1$ and $R_2$ are impressed on common junctions 196a and 196b from which they are connected by means of individual diode gating circuits to the record circuitry of the respective channels. For the channel *Ch*0 shown, diode gating circuit 203a connects output $R_2$ to the left tube 214 of a record amplifier 212 while diode gating circuit 203b connects output $R_1$ to the right tube 213 of amplifier 212. The outputs of gating circuits 203a and 203b are denoted $r_0'$ and $r_0$, respectively.

Referring to Fig. 11, a detail of the overall diode network for generating the record outputs $R_1$ and $R_2$ is shown, together with the gating diode networks by which these record propositions may be selectively connected to one of the heads of the channels *Ch*0 to *Ch*15, inclusive. Here it is shown that a pair of outputs $r_0$, $r_0'$, etc. to $r_{15}$, $r_{15}'$, inclusively, is similarly provided for connecting the $R_1$ and $R_2$ record propositions to the record amplifiers of the channels *Ch*0 to *Ch*15, respectively.

It should be understood that the arc address channel *Ch*16 and the synchronizing channel *Ch*17 are permanently recorded channels. Thus their record circuitry is only used for initial recording of information on these channels, after which time the circuitry is disconnected.

The selection of the pair of gates for routing the $R_1$ and $R_2$ outputs to a particular memory channel on the drum is made by the same channel selector register 126 (flip-flops A1–A5) which controls the read gating circuits. The output signal from channel selector registor 126 corresponding to each of the memory channels controls the pair of gates provided for each channel in combination with the term $A_7$. As previously mentioned, in order to render any of the memory pickup gating circuits effective, the A7 flip-flop shown in Fig. 30*d* must be in a false state; that is, term $A_7'$ must be of a high potential. This explains the presence of the $A_7$ term which in combination with the channel term determines the signal for controlling each of the output gates, such as gate 203b.

It is now evident that the A7 flip-flop is used for controlling the operation of the read and record gating circuits connecting the channel heads of drum 100 to the arithmetic unit 112. When flip-flop A7 is in a false state, as represented by output $A_7'$ being of a high potential, the read gating circuits are made operative; and when flip-flop A7 is in a true state, as represented by output $A_7$ being of a high potential, the record gating circuits are made operative.

As noted in Fig. 30*d*, the A7 flip-flop is triggered into a true state at $P_2O_{13}$ pulse time of the word period prior to any of the step operations during which information is recorded onto the drum. As will be noted later, these word periods are defined by program counter numbers #31, #43, and #69 whose logical sum is represented by the single term designated as PCS19.

Assume for purposes of discussion that the program counter 118 selects the portion of the diode network in the arithmetic unit 112 such that channel selector register 126 is set to *Ch*0 and therefore the pair of outputs $r_0$, $r_0'$ associated with channel *Ch*0 is operative. As shown in Fig. 9, output $r_0$ is fed into the grid of a "one" amplifying record tube 213 by way of a divider network 216, while output $r_0'$ is fed into the grid of a "zero" amplifying record tube 214 by way of a similar divider network 217. The plates of tubes 213 and 214, respectively, are each connected through respective plate resistors, such as resistor 218, to the end terminal of coils 159 and 158. Coil 158 is used for recording the $r_0'$ network output proposition representing binary zeros, while coil 159 is used for recording the $r_0$ network output proposition representing binary ones. The flux setup in the core 157 of head 115 by current in one of these coils is sufficient to produce a magnetic pattern in one direction or the other on the unit area of the periphery passing the head during the period the current is flowing. Of course, if netither of the coils around core 157 is energized, then nothing is recorded, i.e., the medium is left unchanged.

In operation of the record amplifier, assume that $r_0'$ is originally at a high potential while $r_0$, which is its logical inverse, is necessarily at a low potential. At this time, since tube 214 is conducting heavily through coil 158 while tube 213 is held at cut-off, zeros are being recorded on the drum 100. When $r_0$ becomes high in potential and $r_0'$ is made low, tube 213 is now conducting heavily through coil 159, while tube 214 is held at cut-off. Thus ones are being recorded on the drum 100.

Shown on the left of Fig. 9 is a circuit, not described as yet, comprised of a tube 220 having its plate connected through resistor 221 to the same 225 v. positive supply feeding each of the channel preamplifier tubes, such as tube 162. The plate output of tube 220 is connected to the common junction 165 to which all of the plates of the 18 preamplifier tubes are connected.

As previously discussed, when flip-flop A7 is in a state such that output $A_7'$ is of a high potential, any of the channel preamplifier tubes, such as tube 162, may be operated. However, the supressor grid of tube 220 is connected to the output line $A_7$ of the A7 flip-flop. The tube 220 is thus cut-off whenever the channel preamplifier tubes are rendered operative. Whenever output $A_7$ is high in potential, however, the reverse condition is true. The preamplifier tubes, such as tube 162, are now inhibited from passing current while tube 220 is placed in conducting condition. The function of tube 220 is to damp out signals which might inadvertently pass through the preamplifier tubes, such as tube 162, during periods when the computer is not reading the memory. These signals, if not damped in this way, would tend to build up a charge on coupling capacitor 165*a* which would raise the potential level of common junction 165 and prevent the pickup circuitry from operating properly when the computer again reads the memory.

Referring next to Fig. 12, the circuitry for transferring information from the E, F, and G register channels on the drum 100 to the arithmetic unit 112 and back again so as to provide the arithmetic recirculating loops will next be described.

Whereas in the circuitry for transferring information from the main memory channels *Ch*0, *Ch*1, etc. each channel had a single head comprised of a single core and two coils which functioned both as a read and a record head, the recirculating register channels E, F, and G each have a pair of heads, such as read head 117 and record head 116 shown in particular for the G recirculating register.

The split core 223 of read head 117 has a coil 224 which has an electrical signal induced therein as the drum rotates which represents the differentiated leading and trailing edges $g^+$ and $g^-$, respectively, of a magnetic pattern M appearing on the G channel of the drum 100.

These positive and negative pulses are conveyed on lead 225 to the control grid of first tube 227 which in conjunction with second tube 229 forms a two state degenerative amplifier 230 similar to circuit 167 described in connection with Fig. 9. The output of this amplifier 230 feeds directly into a phase splitter 231 and thence to a clipper 232, which circuits are similar to the circuits 174 and 183, respectively, previously described in Fig. 9.

As a result of the operation of the clipper circuit 232, negative polarity square pulses corresponding to $g^+$ and $g^-$ are impressed on respective ones of upper and lower output lines 233 and 234. The potential swing on these lines is limited between +100 v. and +125 v. by clamping diodes, such as diodes 235 on upper output line 233. These $g^+$ and $g^-$ negative square pulses are applied onto the right and left grid input circuits, respectively, of the G*m* flip-flop.

The G*m* flip-flop is similar to the M1 flip-flop already described in that each of its grid input circuits is comprised of a differentiating circuit and a clipping diode. The G*m* flip-flop, however, does not have driver tubes connected to its outputs. Thus its left plate output is designated $G_m'$, and its right plate output is designated $G_m$.

These $G_m$ and $G_m'$ outputs are then conveyed to the gating circuits 238 and 239 connected to the right and left grid input circuits, respectively, of a G1 flip-flop. Each of these gating circuits, such as circuit 238, has two input diodes 240 and 241. Each output line from the G*m* flip-flop is connected to the cathode-end of a respective diode in a respective one of these gating circuits, and a line impressed with the clock pulses C is connected to the cathode-end of the other diode in each gating circuit. The introduction of the clock pulses into the pickup circuitry at this point provides for synchronizing the information picked up from the drum with the clock periods, as to be later described in detail.

The outputs from the G1 flip-flop, designated $G_1$ and $G_1'$, are then connected to similar gating circuits 243 and 244 in the G2 flip-flop.

The outputs from the G2 flip-flop, similar to the M1 flip-flop in Fig. 9, are each connected to a driving circuit whose clamped outputs, designated $G_2$ and $G_2'$, are then fed into the arithmetic diode network 168.

The output of arithmetic diode network 168, representing a proposition $G_0$, is fed into a cathode follower circuit 246 whose cathode 247 is connected by a line, also notated as $G_0$, directly to one input of gating circuit 248 in the right grid input of a G3 flip-flop, which is arranged identically to the other flip-flop circuits already described. Cathode 247 is also connected to a driver circuit 249 whose plate output designated $G_0'$ is connected to one input of the gating circuit 250 in the left grid input of the G3 flip-flop. The outputs $G_3$ and $G_3'$ connect the right and left plates of the G3 flip-flop to the control grids of a pair of tubes 251 and 252, respectively, of a record amplifier 253.

Tube 251 has its plate connected through a resistor 254 to one of the coils 255 provided on the core 256 of the record head 116 while the plate of tube 252 is connected through a similar resistor 257 to a second coil 258 on core 256. The other ends of these coils are connected to the +225 v. source. Resistors 254 and 257 function to reduce the time constant of the response of head 116.

Whenever output $G_3$ from the G3 flip-flop is high in potential, tube 251 is caused to conduct. The resulting flow of current in coil 255 sets up a flux in core 256 which magnetizes the G channel on the drum in the direction corresponding to a binary 1. Similarly, whenever output $G_3'$ is high in potential, a flux is set up in the opposite direction in core 256, thus magnetizing the G channel on the drum in the direction corresponding to binary 0.

It is now evident that as these areas of the drum 100 rotate past read head 117 the recorded magnetic patterns are again picked up, in a differentiated form, and routed through the electronic circuitry described, thus providing the recirculating loop.

It should be noted that during normal recirculation the G recirculating register circuitry is connected as shown in Fig. 12. However, when performing logical operations to be subsequently described, the G1 flip-flop outputs $G_1$ and $G_1'$ are also made available to the arithmetic diode network 168.

Next to be presented is the detailed description of the circuit operation by which the information in the G*m* flip-flop of the G recirculating register is synchronized or placed in step with the clock pulses.

Because information in the G recirculating register is being transferred from an electronic medium to a mechanical medium and then, after a given time delay, back onto the electronic medium, this information is likely to get out of step with the electronic circuits which are all designed to operate in synchronism with the clock pulses. This nonconformity is due to the fact that any error in spacing between read head 116 and record head 117, no matter how small, will accumulate each cycle of the recirculating register. As a result, the signals will eventually shift with relation to the clock signal periods giving rise to erroneous readings.

Thus referring to Fig. 12, as previously noted, the G*m* flip-flop is operated so that its $G_m$ output follows the magnetic pattern M being sensed on the drum.

The input gating circuitry associated with the G1 flip-flop provides the means by which the information in the G*m* flip-flop is placed in step with the clock pulse periods.

As described, each of the grid inputs to the G1 flip-flop has a circuit associated therewith, such as right gate 238, which is coupled to right grid of G1 by differentiating circuit 236 and a series diode 237.

Referring specifically to the right gate 238, the anode-ends of each of the input diodes 240 and 241 are joined to a common junction 242 which is connected through a load resistor 245 to the 225 v. potential source. The operation of right gate 238 is such that any time the inputs to the cathode-ends of either diode 240 or 241, or both of them, is at the low potential swing of 100 v., the common junction 242 is at this same low potential. However, when inputs to diodes 240 and 241 are both at the high potential swing of 125 v., the output of gate 238 is at this same high potential.

In Fig. 12 it should be again noted that the right output $G_m$ of the G*m* flip-flop is connected to input diode 240 of the right gate 238, and clock pulse source C is connected to the other input diode 241.

Referring to the graph of the train of clock pulses C, generated by the clock pickup circuitry in Fig. 8, the read head 117 of the G recirculating register is so positioned with respect to the record head 116 that the waveform shown in Fig. 12 of the unit pulse 259 impressed on the right output $G_m$ of the G*m* flip-flop has a phase lead of approximately two-thirds of a clock period with respect to the waveform of the clock pulse. More specifically, the clock pulse C is substantially centered within the span of the unit pulse 259. Corresponding to the time when both inputs to the right gate 238 are at the high potential of 125 v., which represents the duration of clock pulse C, the output of gate 238 is at 125 v. Thus a gate output pulse similar to the clock pulse C is applied onto differentiating circuit 236. Diode 237 is orientated so as to permit only the negative differentiated pulse corresponding to the trailing edge of the clock pulse to pass to the right grid of the G1 flip-flop, thus causing the right output $G_1$ to swing to the high potential of 125 v.

When the G*m* flip-flop changes state such that the $G_m$ output potential drops and the $G_m'$ output rises, this latter rise when applied onto the left gate 239, along with the next clock pulse, results in the $G_1$ output abruptly swinging to the low potential of 100 v. at the end of the clock pulse.

It is thus seen that the unit pulse signal on the $G_m$ flip-flop output, which has been picked up from the drum a little early, is now delayed, in effect, in order to place it in synchronism with the clock pulse periods. Except for this delay, it may be said that the G1 flip-flop directly follows the G*m* flip-flop in its operation.

The time-wise stepping of information in the G recirculating register will now be further explained by the waveforms in Fig. 13. The graphs show how a unit pulse representing a binary 1, for example, is cycled through the G recirculating register loop once each word period consisting of 42 clock periods.

Line I represents a graph of the clock pulses generated at the clock pickup head 110. As shown, a clock period is measured from the trailing edge of one square wave (clock pulse) to the trailing edge of the succeeding square wave.

Assume the flux pattern of a binary 1 is recorded on the G channel of the drum as shown by the graph in line II. Note that the non-return-to-zero method of recording is employed in that the saturation flux pattern representing the binary 1 is in the same direction for the entire period equivalent in length to a clock period.

It is to be particularly noted that the location, and consequently the timing, of the unit magnetic pulse as sensed on the drum is not in synchronism with the periods of the clock pulses being generated, inasmuch as the graph of the unit magnetic pulse on line II leads the clock period 261 in line I by approximately two-thirds of a clock period.

The graph in line III represents the signals induced in the G read head 117 when energized by the unit pulse in line II. It is noted that the G read head 117 differentiates the leading and trailing edges of the unit magnetic pulse to form the $g^+$ and $g^-$ pulses.

The G*m* flip-flop is triggered so that the potential on its right output $G_m$, as shown by the graph in line IV, follows the unit magnetic pulse shown in line II. It is thus seen by comparing lines I and IV that a clock pulse 260 occurs at approximately the middle of the square wave 259 representing the graph of the $G_m$ output. As previously described in connection with Fig. 12, the high potential on the $G_m$ output is used for gating this clock pulse 260 through gating circuit 238 of the G1 flip-flop onto its right grid. This pulse is then differentiated and the positive portion thereof clipped by the input circuitry, such as diode 237, shown for example in Fig. 12. It is now evident that the G1 flip-flop is triggered into a true state at the trailing edge of clock pulse 260. Thus the binary 1 information, which is now considered as being stored in the G1 flip-flop, has been brought into synchronization with the clock period designated 261 in Fig. 13. The information in the G1 flip-flop is then stepped into the G2 flip-flop at the end of clock period 261. The $G_2$ output is sensed by the arithmetic diode network 168 and immediately regenerated without change when the unit pulse is being circulated in the G register; that is, the $G_0$ output of the arithmetic diode network 168 is caused to directly change with the $G_2$ output, as shown in line VII. The $G_0$ output is then impressed upon the input gating circuit of the G3 flip-flop which is controlled by the clock pulses. Thus, as shown in line VIII, the unit information is set up in the G3 flip-flop at the end of the clock period 262. The outputs of the G3 flip-flop are directly impressed upon the tubes of record amplifier 253 previously described in Fig. 12. The flux in the core of record head 116 directly follows the changes in the G3 flip-flop outputs. As noted, the unit information is delayed 2 clock periods in the electronic circuitry of the arithmetic unit 112. Thus the read head 117 must be located with respect to the record head 116 so that the signal on line IX is recorded back onto the drum 100 at a point 40 clock periods (less the ⅔ of a clock period required to enable the signals to be picked up early) ahead of the read head 117. When this point of the drum again passes under read head 117, the G*m* flip-flop is actuated to indicate the unit information which is again routed through the electronic circuits of the arithmetic unit 112, as indicated by the waveforms in Fig. 13.

The operation of the G recirculating register should be noted in particular during the clock period designated 262 in the set of graphs. Note that the output proposition $G_0$ from the arithmetic diode network 168 is generated during the same period the G2 flip-flop is sensing its information. This is what is meant by saying that the arithmetic diode network 168 operates to alter the information without delay. It should be understood, of course, that when information is not being merely recirculated, but rather altered, the $G_0$ proposition is generated during clock period 262 as a result of logically combining the G2 flip-flop potentials with a plurality of signals indicative of other binary information existing during this clock period in the flip-flops. This other input information may, for example, be obtained from the flip-flops in the E or F recirculating registers, from the M1 flip-flop, or from storage flip-flops in the arithmetic unit 112, such as flip-flops A1 to A5, inclusive, or the K1 flip-flop.

*Counting circuits*

Having described the circuits by which information is picked up from the drum and redeposited thereon, the counting circuitry will next be described.

As previously described in Fig. 1, the P counter 121 responds to the successive clock pulses generated by the clock pickup circuitry described in detail in Fig. 8. The P counter counts repeatedly through a cycle of 3 pulses corresponding to pulse positions $P_0$, $P_1$, $P_2$.

Each time the P counter 121 counts through its cycle, the O counter 122 is set up to be advanced one unit. The O counter steps through a cycle of 14 steps corresponding to the octal digits $O_0$ through $O_{13}$ provided in a word period.

The P and O counts together may be used to define any pulse position within a word, or any combination of pulse positions. This enables the circuits of the arithmetic unit 112 to operate on the information in the different binary positions of a word, depending on their coded significance.

Before going into a description of the details of the counting circuitry, the convention of the logical methods employed for presenting the remaining circuitry of the computer will next be broadly described.

Logical propositions may be considered to be represented in the circuits by conditions of flip-flop circuits. When the flip-flop is in one condition, the proposition is considered to be "true" (or the flip-flop is said to be storing a binary "1"). When the flip-flop is in the other condition, the proposition is considered to be "false" (or the flip-flop is said to be storing a binary "0").

The true and false conditions of a proposition are preferably referred to as terms which are represented each by a respective D.C. voltage on a separate output line. When a voltage on an output line is high (125 v.), the term it represents is effective; and when the voltage on an output line is low (100 v.), the term represented is ineffective.

The two terms descriptive of a logical proposition are defined by output lines connected to each of the plates of the tubes of the flip-flop circuit. One of these terms represents the proposition itself, and the other represents its logical inverse.

In accordance with the present scheme, in order to trigger a proposition flip-flop to either its true or false state by signals applied thereto on separate inputs, input lines are coupled, each to the grid of a respective one of the tubes of the flip-flop.

The nomenclature employed for the present invention uses combinations of capital letters and numbers, or lower case letters, for designating the proposition flip-flops themselves. The outputs of the flip-flops are characterized by corresponding capital letters with the number, or lower case letter, as a subscript, for examples $G_1$, $G_m$. In order to differentiate the true state of a proposition flip-flop from its logical inverse, the latter is distinguished from the former by an affixed prime, for examples $G_1'$, $G_m'$.

As for the inputs to a flip-flop these are designated by corresponding lower case letters with the associated number or letter as a subscript. The input, which when energized renders a flip-flop into a false state, is further characterized by a subscript zero prefixing the lower case letter.

This standardized notation, which is to be used throughout the rest of the present specification, will be made clear by referring next to Figs. 15 through 20, together with the following description as to how the outputs of the B flip-flops are connected to the inputs to cause the P counter to count through a cycle of three consecutive counts; namely, $P_1$, $P_2$, and $P_3$.

The counter arrangement is a parallel one in that the C pulse generated by the clock pickup circuitry in Fig. 8 is simultaneously applied on all the gates associated with the B flip-flop inputs. The interconnections of the flip-flop outputs, however, only allow the flip-flops to be triggered by the successive C pulses, so as to change their states in an orderly fashion to indicate the P cyclical counts.

In Fig. 15 the combinations of the states of the flip-flops which indicate the digital content of the counter are shown by a table. This table is a binary representation of the pulse counts $P_0$ through $P_2$.

Each row of the table indicates the states assumed by the flip-flops during each pulse count or clock period as defined at the right of the table. It should be noted that the B1 and B2 flip-flops together define a different combination of states for each pulse count.

On examining the states of the B flip-flops, in order to render the B1 flip-flop into a true state, i.e., have a 1 therein during the next clock period, as in advancing from count $P_0$ to $P_1$, it is noted that the B1 and B2 flip-flops must both have a 0 therein, i.e., they must be in a false state during the $P_0$ count. Similarly the B1 flip-flop must be in a true state in order to be switched into a false state during the next clock period, as in advancing from count $P_1$ to $P_2$.

Referring next to Fig. 19, a detailed schematic circuit diagram is shown of how the B1 flip-flop is connected so as to operate as the first stage of the P counter.

The flip-flop circuit which has already been introduced in Fig. 9 will here be further described. As shown, triodes 264*a* and 264*b* have their plates and grids intercoupled, as for example, by a resistor 265 in parallel with a capacitor 215. The plate of each of the triodes is connected through a separate load resistor, like resistor 267, to the positive D.C. source +225 v. and the cathode of each triode is grounded. Each of the grids of the tubes is joined through a separate grid resistor, such as 268, to a negative bias −300 v. The flip-flop circuit is provided with output circuits connected to each of its plates and triggering circuits associated with each of its grids in accordance with the arrangement previously noted.

Whenever the flip-flop is considered to be in a "one" state, neon light 270, connected in series with a limiting resistor 269 across the left load resistor 267, lights up; and when the flip-flop is in a "zero" state, neon light 270 is extinguished.

The output lines $B_1$ and $B_1'$ from the B1 flip-flop are taken from the right and left plates respectively. In order to maintain the swing of the plate voltage between voltage levels +125 v. and +100 v., clamping diodes, such as diodes 271 and 272 associated with the right output $B_1$, are provided on each of the output lines.

The inputs to the flip-flop are controlled by left and right gate circuits 274 and 273 associated with the grids of tubes 264*a* and 264*b*, respectively. Each of the gates is coupled to a grid through a differentiating circuit 275 and blocking diode 276 as shown in particular for the circuitry connected to the grid of tube 264*b*.

For this particular counting stage, the right plate output $B_1$ is connected to one input of the left gate 274 and the left plate output $B_1'$ is connected to one input of the right gate circuit 273. The clock pulse C is applied simultaneously to the second input of each of the left and right gate circuits 274 and 273.

These gate circuits 273 and 274 are typical logical product diode networks. In such a circuit, as noted in particular for right gate 273, the inputs therein are applied on the cathode-ends of crystal diodes 278, 279, and 280 whose anode-ends are joined to a common line 281 which is connected to the positive source 225 v. through a load resistor 282.

Each of the inputs to a gate circuit can be either of the high potential of +125 volts or the low potential of +100 volts, depending on the state of the flip-flop or other source from which it is derived. Any time the plate input to a gate circuit is high in potential, the clock pulse C applied to the gate input of that gate is, in effect, passed to the output of the gate. This pulse is differentiated in differentiating circuit 275 and the positive portion thereof is blocked by diode 276 while the negative portion is passed therethrough and thus triggers tube 264*b* into a non-conductive state.

It should be noted that the diode 276 is returned through the resistor of the differentiating circuit 275 to a positive voltage of 3 volts. This serves to place a bias voltage of 3 volts across diode 276, thus preventing the passage of the initial 3 volts of a signal fed into it. This bias arrangement functions to clip spurious signals resulting from slight variations of the gate output voltage level caused by the cutting off of current flow through one of the input diodes of gate 273. Anytime this is done the increased current flow through the other diodes results in the gate output level being slightly lower. This results from the small forward resistance inherent in each diode. The differentiation of these negative drops in voltage level creates the spurious signals which the aforementioned bias circuit arrangement effectively prevents from passing to the grid.

In Fig. 20 the graphs of the waveforms appearing at different points of the B1 counting stage circuit during the P counter counting cycle are shown. In line I the regularly recurring clock pulses C are shown. In line II the waveform of the $B_2'$ term, representing the left output of the B2 flip-flop, is presented. In line III the $B_1$ plate output is shown to be of a low voltage (100 v.) during clock period $P_0$, while in line IV the $B_1'$ plate output is shown to be of a high voltage (125 v.) during $P_0$. As shown in line V, since both the waveforms $B_1'$ and $B_2'$ are high in potential, the clock pulse C causes the gating circuit 273 to generate a pulse $b_1$ which is substantially similar in waveform to the clock pulse C. Note that it was previously mentioned in connection with the table in Fig. 15 that a zero in the B1 and B2 flip-flops present the conditions which define when the B1 flip-flop should change into a true state on receipt of the next clock pulse, which is the action presently being described. It is pertinent to note at this point that the clock pulse source is of very low impedance so as to ensure that the trailing edge of the wave in line V is not rounded but relatively square. On line VI the pulse form impressed on the input to the right grid during $P_0$ is shown to be essentially the differentiated trailing edge of the rectangular pulse $b_1$. It is thus noted that the B1 flip-flop changes state on the trailing edge of the $b_1$ pulse generated during $P_0$. It is also noted that as a result of triggering the right tube off at this instant, the right plate output $B_1$ rises in potential according to the time constant of the flip-flop circuit. The output $B_1$ is thus high in potential during clock period $P_1$. As a result, during this period the conditions at the left gate 274 are proper to effectively pass the pulse ${}_0b_1$ shown in line VII. The differentiated trailing edge of this latter pulse, as shown in line VIII, then operates to trigger the B1 flip-flop so as to bring it back to its original state during $P_2$. As noted, the B2 flip-flop is triggered into a true state at the end of the $P_1$ period. Consequently, the $B_1'$ term is ineffective and neither of the conditions required to pass clock pulses through the gates of the $B_1$ flip-flop are satisfied by the waveforms during period $P_2$. However, at the end of the $P_2$ period, the B2 flip-flop is again set false and thus the waveforms noted during period $P_0$ are again present.

It should be noted that the circuit arrangements shown enable the flip-flop circuits in the present embodiment of the invention to be reliably operated without the use of any delay circuits. Referring to the circuit shown in Fig. 19, the abrupt swing in the output voltage level of flip-flop B1 at the end of period $P_0$, induced by the particular clock pulse passing through gate 273 during period $P_0$, controls the opposite gate 274 so as to permit it to pass the next clock pulse during the next clock period $P_1$. Thus it is very important to control the point at which each of the clock signals triggers a flip-flop so as to eliminate a faulty response of the flip-flop circuit.

For example, if the change in the B1 flip-flop induced by a particular clock pulse were to be sensed by the opposite gate before the clock pulse which causes this change is dissipated, it would be possible for the flip-flop to end up in an undesired state. The present arrangement of circuit elements overcomes the possibility of this. First it should be pointed out that each squared clock pulse appears simultaneously at all the gates. Now then, by effectively differentiating the trailing edge of a clock pulse, and using this signal for triggering the circuits, assurance is given that the clock pulse which causes the triggering is no longer present on any of the other gating circuits. This results from the fact that the flip-flop voltage level changes are communicated to the input gates after the clock pulse disappears.

It is now evident that the clock pulse period may be considered to divide the timing of the circuit operations into two distinct phases of operation. During the first half of a clock pulse period when the voltage from the clock source is low, the transients of the circuitry are occurring. For reliability, these should be completed before the leading edge of the clock pulse arrives. During the last half of the clock pulse period when the clock pulse is present, gating circuits can be thought of as observing the flip-flop outputs so as to determine if a pulse should pass onto the grid of the flip-flop circuit. The clock pulse must be broad enough so that, taking into account its rise time, it reaches its maximum voltage level before the end of the clock period. The clock pulse must also come from a low impedance source so that a square edge can be created on the trailing end of the pulse passing through the grid gates. These conditions make it possible to create by differentiation a negative pulse coincident with the end of the clock period which can be used for triggering the flip-flops.

Referring back to Figs. 16 and 17, the simplified manner in which the remaining circuitry of the present invention is to be presented will now be described.

Instead of showing the wiring diagrams of the flip-flops together with the logical circuits, as in Fig. 19, the remaining circuits are presented by simplified block diagrams of the flip-flops. As shown in Fig. 16, only the input and output lines for the flip-flop are indicated and these are marked in accordance with the convention previously described. Furthermore, the grid input differentiating and blocking circuits are omitted in the block diagrams for simplicity. Only the gates indicating the logical product of the control input and clock input are shown at each of the inputs so as to emphasize the fact that the clock pulses are applied simultaneously to all the flip-flop inputs.

In accordance with the scheme of presenting the present invention, after the system of thought to be accomplished is explained by means of binary tables or similar schemes for systematizing the thought, the terms of the system are represented by the conditions of flip-flop circuits, or other sources of potentials, having the two possible operating levels.

Logical equations are then written which define when and how the flip-flop circuits ar to change in accordance with the effective terms of the system. The logical equations, so devised, are then presented below the block diagram of the flip-flops.

The logical equations for the grid triggering of a flip-flop circuit may be interpreted as a statement of the terms which have to be simultaneously of a high potential in order that the particular flip-flop should trigger into the particular state. Two distinct notations are used for the equations. The first, "logical multiplication," means that all the terms in the particular product have to be of high potential in order to make that product effective in a particular equation. The second, "logical addition," means that at least one term of the sum has to be of high potential in order to make that sum effective in a particular equation.

Refer, for example, to the ${}_0b_1$ counting equation for the B1 flip-flop with the reset terms included as shown below the B1 flip-flop in Fig. 16. This equation, ${}_0b_1=B_1(Z_1'+M_1')C$, states that the B1 flip-flop will change to a "false" state at the end of the clock period during which the following three terms are at a high potential: $B_1$, $(Z_1'+M_1')$, and C. It should be understood that the term $(Z_1'+M_1')$, itself, will be of high potential if either $Z_1'$ or/and $M_1'$ is of high potential.

The particular mode disclosed of representing these logical equations has been chosen because these equations can be operated upon according to certain well-known rules of logic in a manner similar to those by which algebraic equations are operated upon.

Having once described the means for physically generating a typical logical product and logical sum, the present techniques enable the logical circuitry for solving the entire logical equations to be set up directly by reference to the equations alone. The logical circuitry generally ends up as one large interconnected network comprised of a plurality of the two fundamental circuits. In reducing the equations to physical circuitry, recognition is made of the fact that certain common complex terms and partial products can be generated separately and used repeatedly where needed. This results in a reduction of the number of components required but often at the expense of complicating the recognition of the original equations. The present techniques, however, make it possible to retain in the equations the original system of thought, even though the equations go through several revisions, as long as the revisions are according to the well-known rules of symbolic logic.

It should be noted that circuits to solve "logical multiplication" are commonly called "gates" and circuits to solve "logical addition" are commonly called "mixers" in the prior art. Still further, it should be understood that the circuits referred to herein as logical "sum" and logical "product" circuits are also known in the digital computer art as logical "or" and logical "and" circuits, respectively.

Returning back to Fig. 16, the conditions required during a clock pulse period for flipping the B1 flip-flop, as previously described in connection with Figs. 15 and 19, are represented by symbolic logic equations.

$$b_1=B_1'B_2'C \text{ and } {}_0b_1=B_1C.$$

Note that these equations are merely a shorthand way of stating that the terms of the equations representing the inputs to the left and right gates 274 and 273, respectively, must be simultaneously at the high operating potential (+125 v.) in order to pass the pulses $b_1$ and ${}_0b_1$ previously described and indicated in Fig. 20.

By examining the states of the B flip-flops, as presented in the table of Fig. 15, the symbolic logic equations for the B2 flip-flop can now be similarly determined. As noted in the table, the conditions necessary to enable flip-flop B2 to be triggered to a true state, i.e., change from a 0 to a 1 state, are that flip-flop B1 be in a true state. This represents the advancing of the P counter from count $P_1$ to $P_2$ and is symbolically noted by $b_2=B_1C$. In a similar manner, the conditions required to make the flip-flop B2 false, as when changing from count $P_2$ back to $P_0$, are that flip-flop B2 is true, i.e., ${}_0b_2=B_2C$.

In Fig. 16 the counting equations, as above described, are shown directly below the B1 and B2 flip-flops. A second set of equations is then presented which represents the counting equations with terms included enabling the flip-flops to be reset under certain conditions so as to indicate a count which will synchronize the counters with the registers on the drum.

In order to understand the nature of these reset terms, it is necessary to refer back to the synchronizing channel *Ch*17 on the drum 100. This channel is used for placing the P and O counters in step with the register on the drum.

Whenever the Z clear button 355 on the control panel shown in Fig. 14 is operated, the term $Z_1$ is made effective. This term operates to set up the binary number equivalent of *Ch*17 in the channel selector register 126 comprised of the A1 through A5 flip-flops. As a result, the M1 flip-flop is caused to follow the information on the synchronizing channel. As previously described, a binary 1 is placed in the $P_0O_{13}$ position of each of the arcs of the synchronizing channel *Ch*17. The product $Z_1M_1$, when true, causes the trailing edge of the clock pulse sensed during period $P_0O_{13}$ to trigger the B1 flip-flop into a true state and the B2 flip-flop into a false state. As will be seen in the table of Fig. 15, these states of the flip-flop define the $P_1$ count.

Thus in the second set of equations for the B1 and B2 flip-flops, the $b_1$ and ${}_0b_2$ trigger equations have the product $Z_1M_1$ logically added to the counting terms. The combined equations define both the counting operations and the resetting operations.

As will be also noted later in describing Fig. 22, the O counter 122 is likewise reset by these conditions to indicate the $O_{13}$ count.

The logical diode networks used for physically solving the triggering equations for the B1 flip-flops will next be introduced in Fig. 17.

The networks for the equations ${}_0b_1=B_1(Z_1'+M_1')C$ and $b_1=(B_1'B_2'+Z_1M_1)C$ for the B1 flip-flop are simply shown by designating the inputs to the gate **274*a* by terms of the ${}_0b_1$ equation and the inputs to gate 273*a*** by terms of the $b_1$ equation. The outputs of these gates are marked respectively ${}_0b_1$ and $b_1$. Each of these gates or product circuits operates in the manner previously described in that whenever any of the inputs are simultaneously at the low potential of 100 v., the output is also at this low potential; however, when the inputs are both at the high potential of 125 v., the output is also at this high potential. In other words, the output potential equals the lowest input potential.

It should be noted that the logical sum $(B_1'B_2'+Z_1M_1)$ needed for the $b_1$ equation is generated in a typical sum circuit 283. This sum circuit has two input diodes 284 and 285. The product $B_1'B_2'$, which is shown to be incidentally equal to $P_0$, is impressed on input diode 285; and the separately generated product $Z_1M_1$ is impressed on the other input diode 284. The cathode ends of these diodes are connected to a common junction 286 which is returned to ground through a resistor 287. The operation of the sum circuit is such that whenever either of the inputs is at the high potential of 125 v., the output is at the high potential. In other words, the output potential of the sum circuit equals the highest input potential.

The $b_2$ equation for the B2 flip-flop is seen in Fig. 16 to be identical to the ${}_0b_1$ equation. Thus the output from the gate **274*a*, which bears the designation ${}_0b_1$, is also designated $b_2$. The sum $(Z_1'+M_1')$ is generated on the input 288 to gate circuit 274*a***. This logical sum is included to ensure that the B flip-flops will operate with a counting action when either $Z_1'$ or $M_1'$ is effective. However, this counting action is prevented when these two terms are simultaneously low in potential, as when the counters are reset, so as to realign them with the positions of the registers on the drum.

The equation ${}_0b_2$ includes the reset product $Z_1M_1$. Thus this product, having once been generated for the $b_1$ network, is added to the $B_2$ term in logical sum circuit 290 and multiplied by term C in product circuit 291 to generate the ${}_0b_2$ term.

The above circuits illustrate clearly how the equations for the input to the proposition flip-flops operate as a key, revealing the manner in which the outputs of the flip-flops are logically interconnected to the inputs; i.e., they define how and when the flip-flops should change with respect to the conditions of other propositions in the circuits.

The equation representing the timing pulses, or count signals, $P_0$, $P_1$, and $P_2$ are seen in Fig. 15 to be composed of terms represented by the outputs from the B flip-flops. Timing pulse $P_0$ is represented by product $B_1'B_2'$ which is physically generated by the product network 292 shown in Fig. 18. Timing pulses $P_1$ and $P_2$ are respectively defined by the single terms $B_1$ and $B_2$. Thus these timing pulses are obtained directly by the signals on these flip-flop outputs.

The nature of the counting circuits will now be further revealed by describing the O counter. As shown in Figs. 21 and 22, the D1 to D4 flip-flops, inclusive, are used for defining the O counts. These flip-flops operate essentially as the stages of a binary counter, where flip-flop D1 is the least significant stage and flip-flop D4 is the most significant stage.

Here also the counter arrangement is a parallel one in that a clock pulse C generated by the revolving drum is applied to all flip-flop inputs so as to cause all changes to occur simultaneously and in synchronism with the clock periods. The interconnections of the flip-flop outputs, however, only allow certain flip-flops to be triggered by the successive pulses.

In Fig. 21 the combination of the states of the flip-flops characteristic of each octal digit count of the counter is shown by a table. This table is a binary representation of the digit counts $O_0$ through $O_{13}$.

On examining the changes in states of the D flip-flops, moving down the table in Fig. 21, it is noted that when desiring to make the D1 flip-flop true, i.e., have a 1 therein, on receipt of the next $P_2$ count signal from the P counter 121, the D1 flip-flop must have a 0 therein, i.e., be in a false state. Similarly the D1 flip-flop must be in a true state in order to be switched to a false state on the next $P_2$ count.

It is thus noted in general that the D1 flip-flop changes state every time a $P_2$ count output signal is generated by P counter 121.

The counting equations for the D1 flip-flop are thus noted to be represented by the logical equations: $d_1=D_1'P_2C$ and ${}_0d_1=D_1P_2C$. As before, these equations are simply a shorthand way of stating the mode of operation of the D1 flip-flop.

By examining the states of the D flip-flops as presented in the table of Fig. 21, the symbolic logic equations for the D2 flip-flop can be similarly determined. On moving down the table it is noted that the conditions necessary to make flip-flop D2 trigger to a true state, i.e., change from a 0 to a 1 state, are that flip-flop D1 be in a true state and flip-flop D2, itself, be in a false state. This can be symbolically noted by $d_2=D_1D_2'P_2C$. In a similar manner, the conditions required to make the flip-flop D2 false are that flip-flop D2 be true and flip-flop D1 be true, i.e., ${}_0d_2=D_1D_2P_2C$.

In general it is noted by the binary table in Fig. 21 that all of the D flip-flops change from a "zero" to a "one" state on the next $P_1$ count when, and only when, it is in a "zero" state and all the respective lower order flip-flops are in a "one" state.

In a similar manner, the condition required, in general, for enabling a flip-flop to change from a "one" to a "zero" state on the next P count is for it and all the previous flip-flops to be in a "one" state.

It should be noted that there is one exception to the general mode of operation of the D flip-flops which results from the resetting of the O counter after it reaches the count $O_{13}$. Note that when returning from $O_{13}$ to $O_0$, the D2 flip-flop is maintained in a zero state instead of being triggered to a "one" state as its general binary triggering pattern would dictate. As noted, the $O_{13}$ count is distinguished from all but $O_{12}$ by having both the D3 and the D4 flip-flops in a true state. All the other counts excepting $O_{13}$ and $O_{12}$ have either D3 or D4 flip-flops in a false state. Thus by multiplying the sum $(D_3'+D_4')$ into the $d_2$ triggering equation noted above, the D2 flip-flop will follow the states on successive $P_2$ counts as shown in the table of Fig. 21.

The D3 flip-flop must also have special terms for handling the triggering of the D3 flip-flop from $O_{13}$ to $O_0$. Ordinarily, the D3 flip-flop is triggered into a false state under the condition described by ${}_0d_3=D_1D_2D_3P_2C$. However, it is necessary to add the conditions of the flip-flops defining count $O_{13}$, namely, $D_1D_2'D_3D_4$, to the equation in order to have the D3 flip-flop properly reset during counting from $O_{13}$ to $O_0$.

The only time the D4 flip-flop triggers to a false state is when going from count $O_{13}$ to count $O_0$. Thus the condition of the D flip-flops during $O_{13}$ defines the equation for input ${}_0d_4$. Thus ${}_0d_4=D_1D_2'D_3D_4P_2C$.

As referred to in connection with the P counter, it is necessary to reset the O counter to align its action with the word registers on the drum. This resetting is brought about by inserting the term $Z_1M_1$ in the counting equations already described for the O counter.

Since it is desired to reset the O counter to count $O_{13}$, the D1, D3, and D4 flip-flops each have the term $Z_1M_1$ logically added to the triggering equations $d_1$, $d_3$, and $d_4$, respectively. The D2 flip-flop has this term logically added to its ${}_0d_2$ equation since it is in a false state during count $O_{13}$.

As before, the other equation of the D1 to D4 flip-flops have the sum term $(Z_1'+M_1')$ multiplied therein so as to prevent the counting action from being effective when the counter is being realigned with the registers.

The logical network for physically realizing the triggering equations for the O counter will next be presented by reference to Fig. 23.

It follows from the previous discussion that the circuit for generating $d_1$ can be obtained directly by reference to the $d_1$ equation.

The equations ${}_0d_1$, $d_2$, ${}_0d_3$, and ${}_0d_4$ all have in common the product $(Z_1'+M_1')P_2C$ as generated on line 293 by product network 294. Thus line 293 is connected to one input of the product circuits 295, 296, 297, and 298 whose outputs correspond to the ${}_0d_1$, $d_2$, ${}_0d_3$, and ${}_0d_4$ equations, respectively. This circuitry illustrates how common terms in a plurality of equations only need be generated once in order to provide a useful network.

The equations ${}_0d_2$, $d_3$, and $d_4$ all have the common product $D_1D_2P_2$ generated on line 299 by product network 300. Thus line 299 is connected as an input to the networks generating each of these equations.

Having provided logical circuitry for interconnecting the O counter flip-flops to count through the octal digit cycle, the circuitry required for manifesting the octal counts as signals on separate outputs will next be considered.

An octal digit count is characterized by a unique combination of states of the D1 through D4 flip-flops. Referring to the binary table in Fig. 21, the binary digits in each row correspond to the states of the D flip-flops associated with each O count.

As previously explained, when a flip-flop contains the digit "one," its right output is at the high potential of 125 v.; and when a flip-flop circuit contains the digit "zero," its left output is high. Thus in order to obtain a logical product whose solution represents a count, the states of the D1 through D4 flip-flops, which when simultaneously high in potential define a count, are symbolically multiplied together. Thus $O_0=D_1'D_2'D_3'D_4'$, $$O_1=D_1D_2'D_3'D_4'$$

and the equations for the other O counts are similarly indicated by the table in Fig. 21.

In Fig. 24 the logical network for physically generating the O count equations, as well as other word count indications, will next be introduced.

Here the matrix type of diode network is employed. This form of circuitry is useful when the equations generated are made up of combinations of different sets of terms. The outputs of flip-flops D1 and D2 are fed in on one set of matrix inputs 302, and the outputs of flip-flops D3 and D4 are fed in on another set of matrix inputs 303. Interconnecting diodes, such as diodes 304 and 305, connect the appropriate outputs to vertical and horizontal partial product lines, respectively, such as 306 and 307. These partial product lines are then combined in product circuits, such as circuit 308, whose output generates the $O_0$ count. The other octal digit counts $O_1$, $O_2$, $O_3$, etc. are generated in a similar manner.

On the right of Fig. 24, certain octal count periods, as needed for selecting certain groups of positions of a word, are generated. For example, period $O_{12-13}$ is uniquely characterized in the table of Fig. 21 by flip-flops D3 and D4 being in a true state. Thus the product $D_3D_4$ on line 313 defines this period. Similarly, the product $O_{12-13}(P_2O_{13})'$ is defined by feeding the product $D_3D_4$ on line 313 into a product circuit 308 along with the term $(P_2O_{13})'$.

In order to obtain a term representing a logical negative of one of the count periods, an inverter circuit, such as inverter circuit 310 shown in the lower part of Fig. 24, is employed. Thus period $O_{12-13}$ is fed into the grid of tube 311 on whose output the term $O'_{12-13}$ (or $O_{0-11}$) is generated. Logically adding the term $O_{12}$ to the $O_{0-11}$ term in logical sum circuit 312 generates the term $O_{0-12}$.

In Fig. 25 a simple matrix is shown for generating combinations of P counts and O counts. Each of the three P counts, $P_0$, $P_1$, and $P_2$ is impressed on a respective one of the three horizontal lines of the matrix and each of the octal counts $O_0$ to $O_{13}$, inclusive, is impressed on a respective one of the 11 vertical lines of the matrix. A product circuit, such as product circuit 309, is then provided for connecting the desired combination of P and O counts to generate the term for a desired particular position in a word.

*Arithmetic unit*

Referring next to Fig. 26, a schematic diagram is shown of the relation of the arithmetic unit 112 to other components in the computer. This unit is comprised in the main of a large diode network 168 which operates to interconnect the flip-flop circuits of the computer so as to route information from one register of the drum to another and to perform digital processes on the information in accordance with the commands provided. Some of these flip-flop circuits interconnected by the network 168 are considered an integral part of the arithmetic unit, such as the A1 to A5 flip-flops and the K1 flip-flop, while others, such as E2, F2, G2, and M1, are considered an integral part of the E, F, and G recirculating registers and the main memory pickup circuitry, respectively.

As an aid to understanding the logical equations which define how these flip-flop circuits are interconnected in diode network 168, a summary will be presented at this point of all the flip-flop circuits of the present computer, together with the functions they perform. As previously discussed, the flip-flop circuits are the source of the binary terms which make up the logical equations.

The E*m*, F*m*, and G*m* flip-flops are integral parts of the E, F, and G recirculating registers, respectively, and operate such that their outputs directly follow the information read from the E, F, and G channels of the drum as previously described in detail for the G recirculating register in Figs. 12 and 13.

The E1, E2; F1, F2; and G1, G2 flip-flops are likewise considered an integral part of their respective recirculating registers. The outputs of these flip-flops are fed into the arithmetic diode network 168 and serve to give the recirculating registers a degree of flexibilty such as is needed for shifting information in a register, for example.

The E3, F3, and G3 flip-flops are also integral parts of their respective recirculating registers. These flip-flops respond to the $E_0$, $F_0$, and $G_0$ outputs of the diode network 168 and serve to reconstruct and synchronize the signals derived from the arithmetic network 168 before recording them back onto the drum 100.

The M1 flip-flop is an integral part of the main memory pickup circuitry as described in Fig. 9 and operates in a manner similar to the G*m* flip-flop mentioned above, with the exception that it feeds information directly into network 168 while the G*m* flip-flop feeds information into the G1 flip-flop where the information is synchronized with the clock periods before it is then made available to the network 168. It should be distinctly pointed out that the M1 flip-flop is the only flip-flop by which information can be fed from the memory channels *Ch*0 to *Ch*17, inclusive, into the network 168.

The K1 flip-flop has many functions, such as its use as the carry flip-flop for binary addition, but its most important function which will be subsequently described is that its condition at the end of a word period determines whether the program counter 118 will "count" to its next higher number, "skip" to a new number, or "stick" in the same number.

The A1, A2, A3, A4, and A5 flip-flops serve four different functions which is made possible because of the serial operation of the computer. The first of these is that they provide a means for setting up manual inputs onto the memory channels of the drum during filling routines. Secondly, they serve as the channel selector register 126 during the time the memory is being searched for a particular register. Thirdly, they are used for logically manipulating information in the E, F, and G recirculating registers during the time the instructions associated with the commands are being carried out. And lastly, they are used for reading digits out of the computer during the print routines. In this latter capacity, the signals derived from the A1 to A5 flip-flops are used for either energizing the relays of typewriter 130, or controlling the amplifiers of tape unit 134.

The B1 and B2 flip-flops, as already noted and described in Fig. 16, function as binary stages for the P counter 121.

The D1, D2, D3, and D4 flip-flops, as already shown and described in Fig. 22, function as binary stages for the O counter 122.

The N1 to N8 flip-flops, inclusive, function as the binary stages for the program counter 118 and will be described in connection with Figs. 29 and 30.

The S1 flip-flop (Fig 43) is used in connection with manually initiated routines for activating the computing circuits and for synchronizing the manually initiated input data with the clock periods.

The A6 and A8 flip-flops together operate as an auxiliary delay counter (Fig. 30*a*) which is introduced into the pickup and record circuitry whenever the memory channels are being searched.

The A7 flip-flop (Fig. 30*d*) operates as a switch for enabling either the input gating circuit **119*a* or the output gating circuit 119*b*** to be effective, depending on whether the computer is operating to read or record information in the drum memory.

It will next be broadly described, by reference to the schematic diagram in Fig. 26, how the arithmetic diode network 168 serves to effectively interconnect the registers of the computer so as to perform the operations carried out by the computer.

In Fig. 26, it should now be clearly understood that the information picked up from, for example, the G channel of the drum 100 by flip-flop G*m* is synchronized with the clock periods in the G1 flip-flop. This information is then stepped into the G2 flip-flop. The arithmetic diode network 168, in response to outputs from either the G1 or G2 flip-flops and/or other sources of two level potentials shown feeding into network 168, generates an output $G_0$ which is stepped into the G3 flip-flop and thence back onto the drum 100. After a delay, depending on the spacing of the record and read heads on the G channel of the drum, this information again appears in the G*m* flip-flop. The loop thus defined represents a delay of one word period.

The circuitry for the E and F recirculating registers is similarly indicated in the drawing and operated accordingly.

In addition to the routing of the binary information through each of the E, F, and G register loops so as to make it available to the arithmetic diode network 168, it should be noted that binary information may also be received into network 168 from any of the registers of the memory channels $Ch0$ to $Ch17$, inclusive, by way of the M1 flip-flop.

As stated previously, information representing "words" from four different sources may thus be received simultaneously in the network 168.

As previously shown and described in Figs. 9 and 10, depending on the content of the channel selector register 126, one of the gating tubes of the input gating circuitry, designated 119*a* in Fig. 26, is operated by a signal on line 128*a* so as to connect the M1 flip-flop to one of the memory channels $Ch0$ through $Ch17$. The binary information thus serially received in the M1 flip-flop during a word period may be connected by way of the diode network 168 directly to the $E_0$ output proposition lines, for example. In this manner, information in any of the main memory registers may be routed into any of the recirculating registers.

Next to be noted is that information generated in the arithmetic diode network 168 may be routed into any of the registers of the main memory channels $Ch0$ through $Ch15$ by means of output proposition lines $R_1$ and $R_2$ shown feeding out of the right of network 168. Two lines are provided because both the proposition and its logical inverse are required for recording. Therefore, $R_1$ carries the true or digit 1 signals, while $R_2$ carries the false or digit 0 signals. For example, the output proposition lines $R_1$ and $R_2$ may be connected to directly follow the two outputs $G_2$ and $G_2'$, respectively, of the G2 flip-flop. Then, depending again on the content of the channel selector register 126, one of the diode gates of the output gating circuit, designated 119*b* in Fig. 26, is opened by a signal on line 128*b*. The gating circuit in this way operates to connect the $R_1$ and $R_2$ proposition lines to the record amplifier of the selected channel. Of course, it is necessary to first select the arc of the drum, as before described, before selecting the channel of the drum to which the information is to be routed.

In addition to the arithmetic diode network 168 responding to the input flip-flops of the E, F, and G recirculating registers and the memory channels by way of flip-flop M1, it is to be noted that network 168 may also respond to signals from the set of flip-flops indicated at the left of network 168 by reference numeral 314 in Fig. 26. These flip-flops are considered an integral part of the arithmetic unit 112. The operation of these flip-flops may be controlled either manually by means of initiating keys on the control panel 129 or by output propositions derived from the arithmetic diode network 168. As shown in the diagram, the outputs $k_1$, ${}_0k_1$; $a_1$, ${}_0a_1$; $a_2$, ${}_0a_2$; etc., feeding out from the lower right of the rectangle representing network 168, are routed back via lead 316 to the inputs of the K1, A1, A2 flip-flops, etc., respectively.

As previously explained, the channel selector register 126 is comprised of the flip-flops A1 to A5. It is now clear how these flip-flops can be used. During certain word periods, portions of the diode network 168 are made effective to energize certain of the outputs $a_1$, ${}_0a_1$; $a_2$, ${}_0a_2$; etc. These outputs represent triggering inputs for their corresponding flip-flops A1, A2, etc. Thus, during searching operations, these flip-flops can be set up by the outputs from network 168. In turn these flip-flops feed their outputs into network 168 to generate signals on gate selector lines 128*a* or 128*b* which control the input and output gating circuits 119*a* and 119*b*, respectively. In the present computer the processes performed are all divided into sequential steps or time periods of one word length. This is the time required for information in the E, F, and G registers to recirculate once through the arithmetic unit 112. Thus, each step operation defines a fixed serial operation performed by the diode network 168 in the arithmetic unit 112 during a word period.

During any word period it is the function of the program counter 118 to render the required networks operable so as to accomplish each of these step operations. Accordingly, each output count signal #0, #1, etc. of the program counter 118 selects, i.e., renders operable, certain respective circuits of network 168 which respond to the desired inputs during respective ones of the 42 clock periods of a word to generate the desired output propositions. Since some of the output propositions, such as $a_1$, ${}_0a_1$, etc., operate to alter the inputs to the network 168, the flip-flops in the arithmetic unit 112 and the voltage levels in diode network 168 may be thought of as being stepped through a cycle 42 clock periods in length.

Referring to the diagram in Fig. 26, the cycle of 42 clock periods is determined by the timing circuits feeding into the left of the diode network 168. These circuits include the clock puses C, the signals from the P counter 121, and the signals from the O counter 122. The counter outputs operate to break up the period of a word so as to render certain circuits effective only during portions of the word. In this way the coded information in various positions of a word can be operated upon according to its significance.

The content of the program counter 118 is changed precisely at the end of each word period dependent on the state of the K1 flip-flop at $P_2O_{13}$ so as to cause other circuits to become operable during the next word period. Thus it is seen that the program counter 118 feeds its outputs into the arithmetic network 168 and is in turn controlled by the output 315 derived from this network.

As an example of how the program counter 118 functions to render certain networks operable during each word period so as to accomplish the operations desired, the procedure for transferring information from a register in the main memory into the E recirculating register will now be described in greater detail.

First it is necessary that the address, of the register in the main memory to be read, be placed in the G register. Assume that this address is located, as shown in Fig. 3, in the $m_2$ portion of the word period. The first step operation to be performed is to connect the M1 flip-flop to follow the arc address channel $Ch16$. This channel is characterized by the binary equivalent of decimal 16, as shown in the table of Fig. 7. Thus, during the first word period, the ${}_0a_1$, ${}_0a_2$, ${}_0a_3$, ${}_0a_4$, $a_5$ outputs respectively of the network 168 are energized to a high potential of 125 v. thereby causing the A1, A2, A3, and the A4 flip-flops to be triggered into a false state and the A5 flip-flop to be triggered into a true state. As a result, a signal is conveyed on line 128*a* into gating circuit 119*a* causing signals from $Ch16$ to be impressed on the M1 flip-flop. One word period is allotted for setting up the input gating circuits. Prior to completion of this step operation the auxiliary delay counter A6–A8 (Fig. 30*a*) is activated to inhibit the program counter 118 from operating for three word periods. The program counter 118 content then changes at the end of the three word period to select circuits in network 168 that cause the M1 flip-flop output to be compared with the G2 flip-flop output during octal counts $O_{4-5}$ (containing $m_2{}^a$) of generally several word periods until the information received from the two sources is identical. It should be evident that the average time required for this step operation to be completed is 32 word periods, or half a revolution of the drum. The program counter content then changes at the end of this operation and a new set of circuits is made effective which operate to energize the outputs $a_1$, ${}_0a_1$, etc. in accordance with the contents of the G2 flip-flop during octal counts $O_{6-7}$ (containing $m_2{}^c$). As a result, the A1 to A5 flip-flops now contain the channel address of the register being sought. Prior to the completion of this step operation, as before, the auxiliary delay counter A6–A8 is activated to inhibit the program counter 118 from operating for three more word periods, after which time its contents change so as to activate circuits which connect the M1 flip-flop to the $E_0$ output of the diode network 168. Thus the $E_0$ output follows the M1 flip-flop for a single word period, resulting in transferring the desired information from the register of the main memory channel to the E recirculating register.

In a similar manner, when information is to be recorded onto a particular channel register on the drum from one of the recirculating registers, the A1 to A5 flip-flops, inclusive, are set-up to indicate the arc address channel *Ch*16 during one word period so as to pass information from this channel into the M1 flip-flop. After the three word period introduced by the auxiliary delay counter A6–A8, the information in the M1 flip-flop is then compared with the arc address information in the G register during each of the following word periods until the information matches. The A1 to A5 flip-flops are then set up in accordance with the channel address found in the G register thereby causing the output gates to pass signals generated on the $R_1$ and $R_2$ outputs into the record amplifier of the selected channel. Here again, however, the $R_1$ and $R_2$ outputs are not connected to follow one of the recirculating registers until after the three word period delay caused by the auxiliary delay counter.

In order to further understand the function of the program counter 118 which is to be subsequently described, reference will next be made to the flow diagram in Fig. 27. This flow diagram shows how the step operations are arranged in sequence so as to perform the coded commands placed in the computer by the operator. Each of the step operations is represented in the flow diagram by a block identified by a number of the program counter 118. As will be described later, each block diagramatically represents a set of logical operations to be serially performed by the arithmetic diode network 168 on information passing through the arithmetic unit 112 during a single word period. The flow diagram shows how the program counter 118 content changes so as to automatically determine the order in which the step operations are performed by the computer. The program counter operates to automatically sequence the computer through the series of one-word operations depending on several parameters. The one-word or step operations which are carried out in this manner may repeat for several word times, depending on a binary decision; or one or another sequence may be carried out after a certain operation in a previous sequence causes a binary choice to be made.

Generally, as noted, the program counter tends to increase its content or "count" in an orderly fashion as the one-word operations are sequenced from left to right on the flow diagram. However, as noted, the program counter 118 may have a certain number content for several word periods, i.e., the program counter may "stick" in a given number as shown by the recirculation line 318 associated with block #0. Furthermore, the program counter 118 may "skip" from one number to another as shown, for example, when it "skips" from #1 to #65.

As indicated in the flow diagram, such as for example block #2, whenever, a horizontal output from a block is followed, the program counter "counts" to the next successive count. On the other hand, whenever, a vertical output from a word block is followed, the program counter 118 may be controlled so as to "stick" in the same number or "skip" to a new number. From the above it should be understood that the program counter is herein defined as a device capable of changing from one to another of a plurality of distinguishable states upon each receipt of a discrete input signal. The states which characterize the program counter content are controlled to be ordered in variable sequence.

Referring to the diagram in Fig. 28, the convention above described for the blocks in the flow diagram and the significance attached to the outputs from the block are shown. This diagram clearly points out that it is the state fo the K1 flip-flop at the end of a word period that determines which of the two courses the program counter will follow.

It can be seen from the above description that the flow diagram in Fig. 27 closely resembles the diagrams used by coders in coding a problem for a general purpose computer. The counting feature of the program counter 118 is similar, for example, to the carrying out of commands, by a computer, which are located in numerically adjacent addresses of a memory. Furthermore, the skip or stick feature closely resembles the transfer of control operation; and the possible binary choice, depending on the state of the K1 flip-flop, is similar to the test command whose criterion is based, for example, on the relative magnitudes of a pair of numbers. Also, as shown in the flow diagram, there are loops within loops as there frequently are in coding flow diagrams.

It should be noted that of the 256 total states available by the use of program counter 118, which has 8 binary stages, 140 of these states, i.e., program counter numbers, are developed and used in the present computer. Different program numbers are assigned to the respective step operations appearing in the flow diagram, even though the operations under a particular number may be the same as those performed under some prior step operation in the flow diagram. Thus it is evident that $2^n$ different one-word operations may be sequenced in this manner by a program counter having N flip-flops where $N=n+1$. In other words, the upper limit of complexity of operation of a small group of N bistable devices is reached when they are selecting from among $2^n$ different step operations. The program counter of the present invention illustrates the utility of this approach.

Referring to Fig. 28, which describes the significance of the arrangement of each word block, it will now be further shown how the K1 flip-flop functions as the key decision flip-flop for the sequencing of the step operations in the computer. The K1 flip-flop takes on its true or false condition at $P_2O_{13}$ as the result of a number of conditional processes.

As one example, the K1 flip-flop may be used as a carry flip-flop in an addition process during a word period. If there is a final carry resulting from the addition, the K1 flip-flop is left true at $P_2O_{13}$; if not, it is left false. Thus the program counter 118 "counts" with no carry, and "sticks" or "skips" with a carry. The situation obviously can be reversed.

As another example, the condition of the K1 flip-flop at $P_2O_{13}$ may be realized by examining a certain pulse position in one of the registers for a digit 1. For example, the K1 flip-flop may be initially in a true state, then, if the digit 1 appears in a certain pulse position of a word, the K1 flip-flop will be placed in a false state at $P_2O_{13}$, causing the program counter 118 to "count"; otherwise the counter will "stick" with the same content. The information in the register being examined may be shifted during the one-word operation so as to cause the pulse to appear in a certain pulse position of a register after a given number of shifts. This system is employed when it is desirable to have, for example, repeated use of the same one-word operation.

Another example is that the result of any binary test carried out by any of the flip-flops or registers can be transferred into the K1 flip-flop before $P_2O_{13}$ and thus used to cause the program counter 118 to count into the next sequence number.

In still other cases the K1 flip-flop may be merely set true or false or left alone entirely to produce the next program counter action.

*Program counter*

Referring next to Figs. 29 and 30, the flip-flops N1 through N8 used for the program counter 118 are schematically presented along with the trigger logical equations for each of their grids. The logical equations for respective ones of the grids are divided according to the various functions they perform. The present discussion will be concerned with the counting equations.

The N1 to N8 flip-flops are interconnected by a logical counting network causing them to operate as a binary counter whose outputs indicate the decimal equivalent digits #0 through #196. The table in Fig. 31 shows the states of the flip-flops which, in combination, uniquely define each of exemplary ones of these decimal equivalents.

Note that these flip-flops operate in a fashion similar to that of the stages of a binary counter with flip-flop N1 representing the first stage, $2^0$; flip-flop N2 representing the second stage, $2^1$; etc.

As was described for the P and O counter flip-flops, the counting logical grid equations for the flip-flops are determined by noting the states the other flip-flops in the counter have when the flip-flop in question is to reside in a different state during the next clock period.

A logical equation is then symbolically written defining this change such that it holds for all changes of the flip-flop in question during the counting operation.

As previously stated in connection with the P and O counters, the condition required to control the triggering of a flip-flop generally represents a fixed pattern as obtained by inspecting its own state and all the lower order flip-flop states.

Thus it is noted by moving down the table in Fig. 31 that the first flip-flop N1 changes state each time an input is received. This input is generated each time the product $K_1'P_2O_{13}$ is effective since, as previously noted in Fig. 28, the program counter 118 can only count in an orderly manner if the K1 flip-flop is false at the end of a word period; that is, at $P_2O_{13}$ pulse time.

The counting input equation for rendering the N1 flip-flop true is thus shown in Fig. 29 to include, among other terms, the product $N_1'K_1'P_2O_{13}C$; and the equation for rendering the N1 flip-flop false is shown to include, among other terms, the product $N_1K_1'P_2O_{13}C$.

The logical equations for the triggering of the remaining flip-flops N2, N3, etc. of the program counter so it will perform its counting function are obtained by inspecting the binary table shown in part in Fig. 31. The products so obtained are included in the triggering equations shown below the respective flip-flops. Note that in the exemplary apparatus using 197 program counts or step operations the counting action never proceeds beyond the point where the N6 flip-flop, representing binary stage $2^5$, is triggered into a true state. Thus $_0n_6$ and the triggering inputs to the N7 and N8 flip-flops $n_7$, $_0n_7$ and $n_8$, $_0n_8$ are in the example always 0.

Next to be explained is the presence of the terms $A_6'A_8'$ in all of the counting equations provided for the program counter flip-flops.

As noted in the previous discussion, any time information is read from or into the memory channel registers, a three word period lag is introduced into the pickup and record circuitry. The reasons for this may be recalled by referring to Fig. 9. Whenever one of the gating tubes, such as gate tube 162, has its suppressor grid impressed with a high voltage from the channel selector register 126, in this case $A_7'$ *Ch*0, the conductance of gate tube 162 creates a transient at common junction 165 of the pickup circuits. It takes approximately three word periods for this transient to be dissipated. This three word period delay is obtained by the auxiliary counter comprised of two flip-flops A6 and A8, which counter operates to inhibit the program counter 118 from selecting the next step operation when the gating circuits are first energized.

As will be made clear in the ensuing description, information is read into or from the computer during the step operations following the word periods defined by the program counter sum proposition designated PCS23 (see Fig. 89). Thus during the word period whenever one of these program counter numbers is effective, the auxiliary delay counter comprised of the A6 and A8 flip-flops is activated out of its quiescent state which is characterized by its output $A_6'A_8'$ being at the high potential of 125 v.

The $A_6'A_8'$ output of the auxiliary delay counter is included in all of the products of the counting equations for program counter 118. Normally the auxiliary delay counter resides in such a state that this output is effective. However, whenever it is desirable to inhibit the program counter 118 from counting as above described, the auxiliary delay counter is stepped out of its quiescent state and caused to count through a cycle of three word periods before returning to its quiescent state.

The table of Fig. 30*b* shows the stepping or counting action of the A6 and A8 flip-flops when operating as a delay. The quiescent state of the auxiliary delay counter, characterized by $A_6'A_8'$ being effective, is shown in the first row of the table. It is only under these conditions that the program counter 118 can operate. At $P_0O_{12}$ pulse time of certain step operations, defined by PCS23, the auxiliary delay counter is reset so that output product $A_6A_8'$ is true. The flip-flops are then caused to be triggered at $P_0O_{12}$ pulse time of successive word periods so that output products $A_6'A_8$, $A_6A_8$, and $A_6'A_8'$ are respectively true. When the product $A_6'A_8'$ of the auxiliary delay counter is again true, the program counter counting equations are again effective and the auxiliary delay counter remains in its quiescent state until the program counter 118 content again assumes one of the numbers included in proposition PCS23.

The terms of the counting equations have now been described except for the inclusion of the term X′ in all of the true grid equations $n_1$, $n_2$, $n_3$, etc., and the $\alpha_1'$ term in the $n_1$ equation. These terms represent "not testing" propositions. As will be seen in the following description, the logical negative of these terms; namely, X and $\alpha_1$, are indicative of an X switch test and Y switch test, respectively. Thus when terms X and $\alpha_1$ are true, the counting equations are inhibited from functioning since X′ and $\alpha_1'$ are false.

A reference to Fig. 32 at this point will illustrate how a family tree network is provided in the present computer for generating the products required in the counting grid equations of the program counter 118.

Referring to the counting logical equations below the flip-flops in Figs. 29 and 30, it is noted that certain products included in the solutions to the grid input equation for the lower order stages represent partial products in the solutions generated for the higher order states. Thus in Fig. 32, the partial product $K_1'A_6'A_8'$ appearing in all the equations is generated once by the network enclosed in block 319 and then impressed on line 320. The $N_1$ term is then logically multiplied with the signal on line 320 to generate product $N_1K_1'A_6'A_8'$ as needed for equation $_0n_1$. This latter product is then further multiplied once by the term $N_2'$ to generate $N_1N_2'K_1'A_6'A_8'$ as needed for equation $n_2$, and then multiplied by term $N_2$ to generate $N_1N_2K_1'A_6'A_8'$ as needed for equation $_0n_2$. Similarly, the $N_3'$ and $N_3$ terms are shown by the family tree to be multiplied separately into products $N_1N_2K_1'A_6'A_8'$ to generate the products needed for equations $n_3$ and $_0n_3$.

It should be understood that all the logical product circuits in the family tree, such as block 319, have their load resistor 321 connected to the 225 volt positive voltage source. This is true for the product circuits throughout the logical network of the computer. Similarly, as will be subsequently described in connection with Fig. 33, all of the sum circuits of the logical network, such as the one shown by block 322, are returned to ground potential.

The equations for causing the program counter 118 to "skip" from one number content to another not following it in numerical order will next be described.

It should be noted that these equations are effective when the K1 flip-flop is in a true state at $P_2O_{13}$ time of a word.

In order to determine which flip-flops must change in order to cause the program counter content to skip, or jump, in this manner, it is necessary to examine both the number jumped to and the number jumped from. In this way the changes necessary will indicate which grids must be triggered. As an example of how this is done, assume that the computer is in step operation #46 and that as a result of the computation carried on during that word period the K1 flip-flop is true at $P_2O_{13}$ time so that the program counter should skip to count #41, as revealed in the flow diagram of Fig. 27. The binary number representing step operation #46 as set up in the N1 to N8 flip-flops is 01110100, assuming the least significant digit is on the left. The binary number representing step operation #41 is 10010100. It is thus noted on comparing corresponding digits of these binary numbers that the first three binary digits are reversed. Thus flip-flop N1 must be triggered from a 0 to a 1, and flip-flops N2 and N3 must be triggered from a 1 to a 0 in order to change from the former binary number to the latter. Thus the term #46 is included as a logical sum term in the $n_1$, ${}_0n_2$, and ${}_0n_3$ "skip" triggering equations, as noted in Fig. 29, to accomplish this change. None of the other flip-flops in the program counter have term #46 included in their equations since they are already in the necessary state to indicate the count #41.

By noting in the flow diagram the numbers to which the program counter content skips when the K1 flip-flop is true, the remaining change terms of the equations for the skip-operation may be determined.

Since only 140 of the 256 possible states of the program counter 118 are used in the present invention, most of the jumps could be chosen so that only a minimum number of flip-flops would have to be changed, thus simplifying the program counter skip equations.

It should be noted that if the program counter is to "stick" in a particular number the K1 flip-flop must be true at $P_2O_{13}$ time. However, there is no need to change the states of the flip-flops, and hence no terms need be added to the equations to handle this action. It is obviously accomplished by a mere omission of any change.

In addition to multiplying the change terms by $K_1P_2O_{13}$, all of the true grid skip equations are multiplied by the X' term so as to inhibit the program counter content from skipping when it is desired to reset the counter during a test operation.

Next to be noted is the equations used for clearing the program counter 118. Fig. 14 shows the Z clear switch 355 on the control panel 129. Whenever this switch is closed, all the program counter flip-flops N1 through N8 have a clock pulse impressed on their false grids so as to set up the binary number equivalent to #0 in the program counter. The equations for these false grids, as shown, are all the same, namely, $Z_1C$.

The test equations provided in the program counter for controlling its action such that any of the step operations in the flow diagram can be individually studied will now be described. Two such test operations are provided for this purpose in the computer. One of these utilizes the set of manual switches $X_1$, $X_2$, etc. The other utilizes the set of manual switches $Y_1$, $Y_2$, etc. The test operation involving the X switches will first be described.

In Fig. 30*c*, the X proposition is shown, together with the circuitry for generating it. The terms $X_1$, $X_2$, etc. correspond to two position switches. The two positions of each switch connect to the two outputs of the program counter flip-flop which bears the same numerical subscript as the switches. Thus switch $X_1$ may be connected to either the $N_1$ or the $N_1'$ output of the N1 flip-flop.

The X proposition is generated as the output of a product circuit whose inputs are connected to the switches $X_1$, $X_2$, etc.

It is thus obvious that proposition X is only rendered true during the word period when the switches $X_1$, $X_2$, etc. are all simultaneously connected to outputs of the N1 through N8 flip-flops which are at a high potential (125 v.).

The X proposition enables the operator to test the nature of the information in the E, F, and G recirculating registers after this information has been processed by any of the step operations defined by the program counter. While the computer is in step operation #0, in which it is idling the $X_1$, $X_2$, etc. switches are set in accordance with the states of the N1 to N8 flip-flops which define a given step operation which it is desired to individually test. The start button 354 shown on the control panel 129 in Fig. 14 is then operated and the computer is sequenced through the flow diagram shown in Fig. 27 in an orderly fashion. The computer will continue to operate after once initiated until the designated program counter number has been reached.

The network shown in Fig. 30*c* causes the X proposition to be true, that is, high in potential, whenever the number content of the program counter flip-flops matches the setting of the X switches. As soon as proposition X is rendered true, the program counter 118 is inhibited from counting. Instead, the false grids of each of the flip-flops N1 to N8 have a clock pulse impressed thereon causing the program counter to reset to count #0 in which the computer idles. Thus note how each of the false grid equations of the N1 to N8 flip-flops for the X switch test are the same, as defined by product $XP_2O_{13}C$. It is now clear that the reason for including the X' term in the counting equations is to render them inoperative whenever the X term is true. The test equations can thus operate without interference to set the program counter 118 back to #0.

The test operation involving the Y switches $Y_1$, $Y_2$, etc., as shown in Figs. 33 through 40, will next be described. These switches make it possible to skip the program counter from content #0, by passing all intermediate operations, directly to a program counter number set up by the Y set of switches. As noted in the Y test equations associated with each of the flip-flops, one of the $Y_1$, $Y_2$, etc. terms (indicative of the corresponding switch being closed) is included in each of the true grid test equations $n_1$, $n_2$, etc., respectively. Likewise, the switches $Y_1$, $Y_2$, $Y_3$, etc. are shown connected in the diode networks provided for physically solving these equations in each of the Figs. 33 through 40.

Referring to the Y test equations which enable the program counter to jump from #0 to any number set up by the Y switches, it is to be noted that since #0 count is characterized by 0's in all of the N1 to N8 flip-flops it is only necessary to consider triggering these flip-flops into their true state. All of the equations for the Y switch test, except $n_1$, have the product $\alpha_2'\#0K_1'$. Thus, as noted in Fig. 33, whenever the $\alpha_2$ switch is closed, i.e., true, the Y switch test operation is inoperative since the product $\alpha_2'\#0K_1'$ is ineffective.

It is now evident that the operator must open the $\alpha_2$ switch in order to carry out the test operation utilizing the Y switches.

The N1 flip-flop equation for the Y switch test operation requires special consideration. The problem that arises is when it is desired to jump the program counter from count #0 to an even number count. Under these conditions, the N1 flip-flop is likely to be set into a true state instead of remaining in a false state as characterized by even counts of the program counter.

This difficulty is overcome by the addition of a second switch $\alpha_1$ into the circuitry of the $n_1$ equation shown in Fig. 33. Switches $\alpha_1$ and $\alpha_2$ are mechanically interconnected such that when switch $\alpha_2$ is closed switch $\alpha_1$ is opened, and vice versa.

Accordingly, when switch $\alpha_2$ is open, as required to make the test equations for flip-flops N2 to N8 effective, the $\alpha_1$ switch is closed, thus introducing the expression ($\#0'+Y_1$) into the $n$ equation for N1 flip-flop. Note that the term $\#0'$ is equivalent to $$(N_1+N_2+N_3+N_4+N_5+N_6+N_7+N_8)$$

since whenever the count is "not #0" at least one of the flip-flops will be in a true state. The purpose of this latter term is to re-establish the counting equations after the program counter has skipped from #0 to the new number set up by the Y switches.

Referring to Fig. 33, the network for generating the ${}_0n_1$ and $n_1$ equations is shown and will now be described. The logical sum circuit 322 has two inputs 323 and 324. Input 323 represents the independent solution of the "skip" equation and input 324 represents the solution of the "count" equation when switch $\alpha_1$ is open, and represents the solution of the Y switch test equation when the $\alpha_1$ switch is closed. The common product $X'P_2O_{13}C$, appearing in all of the equations, is generated once, on line 325, and multiplied along with the output of the sum circuit 322 in an output product circuit 326 to obtain the solution $n_1$.

The network for the ${}_0n_1$ equation is also shown in Fig. 33. The count and skip equations are generated at the inputs 328 and 329, respectively, of the logical sum circuit 330, while the clear and X switch test equations are generated on the inputs 331 and 332, respectively, of the logical sum circuit 333. The output of the logical sum circuit 330 is then multiplied by $P_2O_{13}$ before being logically added to the output of sum circuit 333, and then further multiplied by C in a product circuit 334 so as to finally generate ${}_0n_1$.

The equations for the N2 through N8 flip-flops are generated in a similar manner by the diode networks in Figs. 34 to 40, inclusive. The explanation of the diode networks follows directly from the equations and will not be further described.

The diode network circuitry provided for solving the logical equations of the present computer is known as a multilevel network. Such a network is defined as one that involves logical products driving logical sums which in turn drive logical products, etc. In order to provide a D.C. coupled multilevel network such as this to solve complex logical propositions, it is necessary that forward current be always flowing in the product diodes when a product circuit drives a sum circuit and forward current be always flowing in the sum diodes when a sum circuit drives a product circuit. As will be explained herein, in a network having this characteristic, each change from one type of logical circuit to another is represented by a different voltage level of operation of the diode network.

The arrangement and operation of a multilevel logical circuit will be described by noting the circuitry for generating the ${}_0n_2$ equation. As shown in Fig. 34, this circuitry represents a six level network. Each succeeding logical circuit for generating this equation, starting from the final clock product circuit 336, for example, and working backward, has a smaller resistor value. Thus note how final clock product circuit 336 has a product resistor of 1M ohms; sum circuit 337 has a sum resistor of 500 kohms; product circuit 338 has a product resistor 300 kohms, etc.

In these circuits, the resistor, equal to 1M ohm, in the clock product circuit 336 is first determined by noting the input capacity to the tube in the N2 flip-flop which is driven by this resistor so that the time constant of the rise or fall of the ${}_0n_2$ proposition is consistent with the operating frequencies of the circuit. Having the value of this resistor, it is possible to calculate the current flow from the product circuit 336 when the sum circuit output is at 100 volts. In order to properly operate the sum circuit 337 which drives the product circuit 336, it is necessary that the sum resistor of circuit 337 be small enough so that the current flowing through it from the product circuit 336 will not raise the voltage at the output of sum circuit 337 higher than 100 volts. If the current through the sum resistor for this condition raises the output voltage to some level below 100 volts, forward current through the other diodes of the sum circuit will always flow; and this current will maintain the output voltage at the 100 volts level. Thus note that the current flow through the product resistor of circuit 336 and the sum resistor of circuit 337 is the same (disregarding back currents); but the voltage drop to be developed across the sum resistor of circuit 337 is less than $100-0=100$ volts, while the voltage drop across the product resistor of circuit 336 is $225-100=125$ volts. As a result, the value of the sum resistor of circuit 337 must be less than the value of the product resistor of circuit 336 by a ratio of at least 100/125. Taking resistor tolerances into account as well as certain safety factors and availability of standard resistors, this ratio becomes even smaller and circuit 337 is provided with a sum resistor of 500 kohms.

The ratio of the resistors when a sum circuit is driven by a product circuit will next be described.

The condition of interest here is when the product circuit 338 output is high (125 volts) which means current is flowing from circuit 338 into the resistor of sum circuit 337. The current drawn by the resistor of sum circuit 337 is determined by the voltage $125-0=125$ volts. In order to have proper operation of the product circuit 338, its resistor must be small enough so that current flowing through it will not drop the voltage at its output lower than 125 volts. In this case it is the current drawn in the sum circuit 337 by a voltage differential of 125 volts which must not drop the voltage at the output of the product circuit 338 to a point lower than 125 volts. That is, the voltage drop to be created by the resistor of the product circuit 338 must be less than $225-125=100$ volts. Holding this voltage at some level above 125 volts ensures that forward current will always be flowing in the other input diodes of product circuit 338, thus maintaining the output voltage at 125 volts. Here again the value of the product resistor must be less than the value of the sum resistor by the ratio of at least 100/125. By taking into account tolerances, safety factors, and available resistors, as noted before, this ratio becomes even smaller, resulting in product circuit 338 being provided with a resistor having a value of 180 kohms.

In a similar manner the resistor values of each of the other logical circuits 339, 340, and 341 is determined.

It is now evident that the resistor values of succeeding circuit levels must be reduced in value for proper operation of the circuits. As a result, the current flow in the circuits tend to increase in a multilevel network and the power requirements rise. It can be shown that the power requirements can be kept down by making the swing voltage of the propositions small and by having the positive and negative return voltages of the diode networks relatively far apart. In other words, the swing of the propositions in this case between 125 volts and 100 volts should be no greater than necessary; and the voltage return of 225 volts for the product resistors should be as high above 125 volts as possible, while the voltage return of 0 volt, or ground, for the sum resistors should be as low below 100 volts as possible, consistent, of course, with other operating considerations.

It should be noted that making the values of the positive and negative potential returns of the diode network equally away from the high and low potential swings of the propositions, respectively, results in a simplified design because of their symmetry.

One other consideration is given in support of having the positive and negative returns of the diode networks as far apart as possible. Because of the clamping of each of the input voltage sources applied to the diodes, the rise time or fall time of the output of a logical circuit becomes only a part of the rise time inferred by the time constant of the load resistor and shunt capacity. For example, in an unloaded product circuit, the charge of the equivalent condenser is toward 225 volts; but its rise is halted at 125 volts because of the clamping effect which limits this rise. This effect, likewise, makes it possible to use higher resistor values, thus reducing the power requirements of the circuits.

Having provided the logical circuitry for interconnecting the program counter flip-flops to count, skip, etc., the circuitry required for manifesting these counts as high potentials on separate outputs will next be considered.

A program counter count is characterized by a respective unique combination of states of the N1 through N8 flip-flops. Referring to the binary table in Fig. 31, the binary digits in each row indicate the true or false state of the N1 through N8 flip-flops for the respective program count.

As previously explained, when a flip-flop contains the digit "one," its right output is high in potential; and when a flip-flop contains the digit "zero," its left output is high. Thus, in order to obtain a logical product whose solution represents a given count, the states of the N1 through N8 flip-flops, which when high define a count, are symbolically multiplied together. Thus:

$$\#0 = N_1'N_2'N_3'N_4'N_5'N_6'N_7'N_8'$$
$$\#1 = N_1N_2'N_3'N_4'N_5'N_6'N_7'N_8'$$

and the equations for the other program counter #'s are similarly obtained.

In Fig. 41, the logical network for physically generating the program counter 118 output equations will be introduced.

Here the matrix type of diode network is employed. This form of circuitry is useful when the equations generated are made up of different combinations of a plurality of terms. The outputs of flip-flops N1, N2, N3, and N4 are fed in on one set of matrix inputs 343; and the outputs of flip-flops N5, N6, N7, and N8 are fed in another set of matrix inputs 344. Interconnecting diodes, such as diodes 345 and 346, connect the appropriate outputs of each flip-flop to vertical and horizontal partial product lines, respectively, such as 347 and 348. These partial product lines are then combined in product circuits, such as circuit 349, which generates the #0 count. Only 140 of the program counter numbers out of the possible 256 are generated since the present computer embodiment does not use the entire capacity of the program counter for sequencing the step operations shown in the flow diagram of Fig. 27.

*Flow diagram*

Returning to Fig. 27, the flow diagram there shown will now be described broadly with reference to the operations performed during the step operations defined by certain groups of the word blocks.

As noted on the left of the flow diagram, there is one block defined by the #0 output of program counter 118 which is labelled "rest." This block corresponds to an idle operating condition. Whenever the computer operation resides in this block it is necessary to tap one of the push buttons on the control panel 129 shown in Fig. 14 to cause the computer to advance out of its idle operating condition.

The straight counting sequence, starting with program counter #0 and proceeding through #33, and also #41 through #44, inclusive, may be broadly considered to be the main sequence of the computer flow diagram. The branch sequences are then defined, generally, as the vertical paths deviating from the main sequence. As will be seen, the main sequence includes operations which are common to many commands as well as those test operations which determine where the branch sequences, individual to the instructions, take off from the main sequence.

In order to understand the circuitry for the branch sequences which consist of manually filling, i.e., setting up information in the registers of the memory drum 100, reference will be made to the control panel 129 shown in Fig. 14.

First to be noted are the switches on the right of the control panel 129 which control the power supplied to the computer. Two-position switch 356 is used for connecting the A.C. power supply to energize the memory motor 104 and power unit (not shown) associated with the computer, while two-position switch 357 starts the memory drum 100 rotating. "On" and "off" push buttons 358 and 359, respectively, are used for controlling the D.C. power used for energizing the computer circuits.

Conveniently arranged on the left of the control panel 129 is a set of push buttons 350 identifying the octal digits 0 to 7, inclusive. Any time one of these octal digit push buttons is tapped, circuitry defined by path "0–7" in the flow diagram of Fig. 27 is made effective enabling a set of three binary signals, corresponding to the octal digit, to be set up in the E register. Above the push buttons 350 are two more push buttons bearing reference numerals 351 and 352. The first of these is identified as the space button, and the other as the tab button. As will be described more thoroughly later, the space button 351 when tapped initiates circuitry designated "space" in the flow diagram. This circuitry provides for transferring information representing an address of a memory register from the E recirculating register into the G register. The tab button 352 when tapped initiates circuitry designated "tab" in the diagram which provides for placing information set up in the E recirculating register into the register of the main memory channels identified by the address in the G registry.

Aligned on the control panel 129 to the right of the set of octal digit push buttons 350 is a main two-position switch 353, a start push button 354, and a clear push button 355.

The main switch 353, as noted, may be set to either a "fill" or a "compute" position. This switch operates as a safeguard for cutting off the electrical connections of the push buttons 350, 351, and 352 on the control panel 129, which are used for filling, for example, when the computer is automatically carrying out a computing process.

The start push button 354 when tapped causes the computer to proceed through word time blocks #1, #2, and #3 into word time block #4 which represents the route followed by the automatic computing routine.

The clear button 355 is used for initiating several actions which are needed when the operator first starts the computer. It sets the register 126 to synchronizing channel *Ch* 17, it aligns the contents of the P and O counters with the positions of the registers, it sets the K1 flip-flop into a true state, and it clears the program counter 118 to indicate step operation #0, thus placing the computer into its idling operating condition.

Neon lights are associated with several of the switches, such as light 360 marked "idle" associated with clear switch 355. The neon bulb 361 associated with the "start" push button 354 is of special import. When lit, this bulb indicates that the Y test switches (previously introduced in connection with Figs. 33 to 40) have been manually set to a number #255 which is outside the active range of the program counter 118. This insures that the computer will automatically proceed through the computation routine set up by the coder without being inadvertently routed back to the idling or rest condition by the accidental setting of the Y switches.

Referring next to Fig. 14*a*, a partial wiring diagram of the control panel is shown. It will be seen that when switch 353 is in the "fill" position, any of the terms ⓪, ①, ②, ③, ④, ⑤, ⑥, or ⑦ can be generated as a high voltage (+125 v.) and routed to the computer by tapping the appropriate one of the digit push buttons 350; and the term (space) or (tab) can be generated and routed to the computer by tapping push button 351 or 325, respectively. Also evident is that the (start) term can be generated as a high voltage only if switch 353 is in the "compute" position when the start push button 354 is tapped. Finally, the terms $Z_1$ and $Z_1'$ are derived from the clear switch 355. As shown, that is, when switch 355 is in the normal position, term $Z_1'$ is generated as a high voltage, but when switch 355 is tapped, term $Z_1$ is generated as a high voltage.

The first set of branch sequences in the flow diagram which provide for placing information manually set up on the control panel 129 into the main memory channels of drum 100 will now be further described. The tests which determine whether any of these fill branches are taken are made during step operations #1, #2, and #3 by reference to the four flip-flops, A1–A4, which are set up during step operation #0, by the pressing of the buttons on the control panel 129, according to the code shown in the table of Fig. 44. All three of the fill branch sequences "0–7," "space," and "tab" in Fig. 27, which take off vertically from step operations #1, #2, and #3, respectively, return to step operation #0 or "rest" when completed.

When the start button 354 is pressed on the control panel 129, the A1–A4 flip-flops are set up so that the fill sequences are all bypassed and the operation proceeds instead into the "start" path sequence which corresponds to the horizontal output from step operation #3.

Once in the "start" sequence, the computer automatically proceeds to carry out the computing operations by looking up the command during step operations #4 through #7 by use of a control number previously set up in the G recirculating register. Having done this, the computer then decides whether the instruction I associated with the command to be carried out corresponds to any of the branches vertically taking off from step operations #9 through #13. This is done by successively testing the content of the I section of the command (see Fig. 6*b*) during each of these step operations and adding a one to it each time it is tested. Anytime the I section of the command is filled in this way to capacity (that is, contains all 1's), the test during the next step operation results in the computer operation being diverted, as shown in the flow diagram, from the main sequence into the associated branch sequence. It is thus obvious that by starting with a different code content in the I section of the command in the G register, the number of step operation tests which must be performed depends on the units which must be added to this code to cause the I content to exceed its capacity as evidenced by a carry-out.

It should be noted at this point that ordinarily an instruction register is provided in a general purpose computer so as to remember the instruction while it is being carried out on the information in the E, F, and G recirculating registers. The present invention, however, does not use an instruction register as such. Reference to the branch sequences off the main routine of the flow diagram of Fig. 27 indicates that having once deviated from the main routine the desired instruction will be carried out without the necessity of remembering the instruction statically. This static control has been essentially absorbed in the sequencing pattern of the computer.

Returning to the instruction test process more specifically, selection of the proper branch sequence from the main sequence is obtained in the following way. It should be noted from the previous discussion that the instruction I, along with the rest of the command, $m_3$, $m_2$, and $m_1$, is read into the G register during the routine comprised of step operations #4 through #7. Following this, and preceding each breakoff point where a particular instruction sequence begins, is a series of test operations. These test operations consist of adding a 1 to the 4-place binary number representing the instruction I of the command. If a carry results as a consequence of this addition, flip-flop K1 is left true during $P_2O_{13}$ and as a result the program counter is changed so that the vertical branch sequence is followed. Thus H, which is 1111 in the binary instruction code shown by the table in Fig. 6*b*, initially fills the I section to capacity. As a result, a carry is generated immediately after the addition in the first test step operation #8 and the computer is sequenced back to step operation #0 in which it idles until initiated again by a push button on the control panel 129.

The remaining instructions necessarily have to have a particular numerical order as shown by the chart in Fig. 6*b*.

As noted in the flow diagram, the H instruction test is followed by the F instruction test which provides for filling the main memory register with information from external instruments. Referring momentarily to Fig. 66, it can be seen that this branch sequence, comprised of step operations #105 through #108, is routed to a put away section of the main sequence, step operations #41–#44, because it involves filling a register in the main memory from an external storage register. The F instruction test is followed by four print instruction tests: P1, P2, P3, and P4. The flow diagrams for the P instructions will be described in the ensuing description in connection with Fig. 66. It should be understood that after each of these instructions has been carried out the computer is sequenced back to the "look up command" routine comprised of step operations #4 through #7.

Continuing on with the main sequence in Fig. 27, after the initial test instructions #8 through #13, the routine for looking up the contents of the $m_1$ address of the command is executed in step operations #14 through #17. Following this, the test for overflow instruction, T*o*, is provided for, inasmuch as this instruction does not depend on getting any further information from the memory. After executing the test overflow instruction, T*o*, by proceeding through step operations #82, #83, and #84, the computer process is returned directly to the look up command routine #4 through #8 so that the next command can be obtained from the memory.

Assuming the test for overflow, T*o*, instruction fails, the main sequence next provides for looking up the content defined by the $m_2$ address of the command during step operations #19 through #23. Having now obtained the contents of both the $m_1$ and $m_2$ addresses of the command, another group of instruction tests are performed. These instructions, indicated in the table of Fig. 6*b* as test difference, T; extract, E; subtract, S; add, A; and shift, S*h*, are carried out in order by means of step operations #24 through #28, respectively.

The test, T, instruction, similarly to the T*o* instruction already described, does not involve the placing of information back onto a register of the memory; and so after proceeding through step operations #80, #83, and #84 the computer is also routed back to the look up command routine (Fig. 47) of the flow diagram.

The extract instruction, E, which is next tested for in #25, proceeds through step operations #89 through #93. The route for the subtract instruction, S, which is tested for in #26, proceeds through step operations #58, #59, #63, #60, and #61 in order, while the add instruction, A, tested for in #27, proceeds through step operations #59, #63, #60, and #61 in order. It should be noted that the add A and subtract S instruction routines share most of their step operations in common. Finally, the route for the shift, S*h*, instruction, tested for in #28, proceeds through step operations #46 and #47.

As shown in the flow diagram, the paths for all of the instructions, E, S, A, and S*h*, return to the put away portion of the main sequence, performed by step operations #41 through #44, before being routed back to step operation #4 in the look up command routine.

After the S*h* instruction test #28, a routine for placing the control number and the $m_3$ address into the first register of the main memory defined by address arc 0, channel $Ch0$ is provided for by step operations #29 through #32. This is necessary because there is not sufficient capacity in the E, F, and G recirculating registers of the present computer to simultaneously store this information while carrying out the processes for the remaining instructions provided for in the computer, i.e., multiplication M and division D.

As a result of the final test instruction, step operation #33, if the K1 flip-flop is true during $P_2O_{13}$ time, the program counter 118 is activated so that the M branch (vertical output) of the flow diagram, comprised of step operations #49 through #53, is followed. On the other hand, if the K1 flip-flop is false during $P_2O_{13}$ time of step operation #33, the program counter 118 is activated so that the D branch (horizontal output) of the flow diagram, comprised of step operations #34, #35, and #36, is followed. After either the division D or multiplication M routines are carried out, the computer is sequenced through step operations #37 through #40 which causes the control number and the $m_3$ address to be again returned to the G recirculating register. The results of the computations are then placed into the $m_3$ address of the main memory during the following step operations #41 through #44, previously mentioned, after which the computer operation is again routed back to the look up command routine.

The content of the program counter 118 defining each step operation of the flow diagram in Fig. 27 operates to select during each word period, while it is effective, certain portions of the diode networks, Figs. 92 through 101, thereby making them operative during the word period.

These diode networks are a physical realization of the logical equations subsequently to be shown below the respective blocks defining the step operations in detail.

It should now be clear that the flow diagram which indicates how the program counter 118 changes is also the flow diagram of the computer operations. Hence the ensuing detail descriptions of the word blocks in Fig. 27 will be specifically referred to as flow diagrams of the computer operations.

*Fill routine*

The first set of step operations whose logical equations are to be described are those provided for placing initial information into the memory registers.

As noted in the diagram of Fig. 27, the computer is in its idling or rest condition when in the step operation defined by word time block #0. The recirculation line 318, which connects the vertical output of the block back to its input, indicates that the computer will remain in this condition until one of the information push buttons, previously discussed in connection with Fig. 14, is depressed on the control panel 129. As a result of depressing any of the buttons, the program counter 118 is activated so as to advance the computer into word block #1 of the series of test word blocks #1, #2, and #3. The functions of the word blocks #1, #2, and #3 are to test the nature of the buttons depressed by the operator so as to cause the proper subroutine to be followed.

As previously noted, there are only two general patterns in which information appears in the computer: numbers, as shown in Fig. 2, and commands, as shown in Fig. 3. The unit of information in both of these arrangements is one word in length and the 42 binary positions in a word are divided into groups of three by means of the O counter 122 so that the operator may consider them as 14 octal periods, $O_0$ through $O_{13}$. In order to enter information representing a word into the computer, the operator depresses the desired octal digit push button 0 through 7, one at a time, on control panel 129. As a result of depressing one of the octal digit push buttons 350, the subroutine branching from word time block #1 operates to set up binary digits, equivalent to the octal digit, in an octal period of the E register. The octal digits are automatically entered in order, starting with the most significant digit. By entering zeros or blanks in certain portions of the E register, a part of a command, such as a particular address, may be manually recorded.

Assuming the information entered into the E register corresponds to the address of a register on the memory drum in which it is desired to record a word, this address must be transferred from the E register to the G register since the computer operations are so set up that addresses when referred to, are always located in the G register. To initiate this transfer operation, the space push button on the control panel 129 is manually depressed by the operator. The word time block #2 operates to test the signals set up by the push buttons on control panel 129 causing the computer to follow the vertical branch when the space push button 351 is initiated.

Having set up the address in the G register, the operator again successively depresses the desired octal digit push buttons 0 to 7 on the control panel 129 to again fill up the E register. The information now contained in the E register is that which is to be placed in the main memory in the location defined by the address in the G register.

The computer operation which results in placing the E register information into the address defined by the G register information is initiated by depressing the tab push button 352 on the control panel 129. As will be shown by a detailed description of the steps illustrated in Fig. 42, as a result of this latter routine, a unit is added to the address in the G register each time the "tab" sequence is followed. Thus it is not necessary to record the address of each of the registers in the main memory if they are to be manually filled in numerical order.

In order to describe the details of the operation carried out during each word time block in Fig. 42, reference will be made momentarily to Fig. 26 showing the inputs to and the outputs from the arithmetic diode network 168. As noted, there are 17 logical propositions feeding out from the right of the arithmetic diode network 168. These propositions are designated $E_0$, $F_0$, $G_0$, $R_1$, $R_2$, $k_1$, ${}_0k_1$, $a_1$, ${}_0a_1$, $a_2$, ${}_0a_2$, $a_3$, ${}_0a_3$, $a_4$, ${}_0a_4$, $a_5$, ${}_0a_5$.

The $E_0$, $F_0$, and $G_0$ propositions define the inputs to the E, F, and G recirculating registers, and the $R_1$ and $R_2$ propositions define inputs to be recorded in the main memory.

The rest of the logical propositions generated by the arithmetic diode network 168 represent triggering input propositions for the K1 and A1 to A5 flip-flops. These propositions are schematically indicated to be routed by means of connection 316 from the right of the arithmetic diode network 168 around to the inputs of their respective flip-flops, K1 and A1 to A5, which are shown on the left of the arithmetic diode network 168. These flip-flops feed their binary signals into network 168.

It should be understood from the previous description that the outputs of the flip-flops K1 and A1 to A5 may be fed into the arithmetic diode network 168 to represent, for example, terms of the logical equations defining any of the output propositions. However, the A1–A5 flip-flops are repeatedly used during the searching operations for generating signals on channel selector lines 128a and 128b; and the K1 flip-flop functions repeatedly at the end of each step operation to send signals by way of output line 315 connecting network 168 to the program counter 118.

It may be pertinent to restate here that the A1 to A5 flip-flops have three broad functions. First, during filling and printing operations these flip-flops are set up by the control panel to generate signals indicative of, for example, the octal digits 0 to 7. Secondly, during the times the computer is searching the memory for a particular address, these flip-flops function as the channel selector register 126. Finally, during logical manipulations on the information in the E, F, and G recirculating registers, these flip-flops function in various ways, such as lengthening the recirculating registers, testing various codes, etc.

Referring to Fig. 42, it will be noted that within the rectangle representing each word time block concise statements appear defining what the output propositions represent or what they must be connected to in order to accomplish the step operation desired. Below each of the word blocks, logical equations are presented which define how the statements made in the rectangle are precisely stated in terms of the computer language.

It should be pointed out that not all of the 17 propositions previously noted as being generated by the arithmetic diode network 168 are needed in order to accomplish the operation performed during a particular word period. Thus only those proposition equations are listed below a particular word block which are effective during that word period. In the subsequent description, it may be considered that if one of the 17 propositions shown feeding out of the right of network 168 is not generated during a word period it is equal to zero for that word period.

It will now be shown, by referring to word time block #0, that it is the developing of these equations, one at a time, which shows precisely what is occurring during a word time block.

In word time block #0 the first statement made is that information in the E, F, and G registers is recirculated. Referring to Fig. 26, this is accomplished in the arithmetic diode network 168 for the G register by connecting the line representing term $G_2$ of the G2 flip-flop directly to the output $G_0$ of the arithmetic diode network. This may be stated in another way by saying proposition $G_0$ directly follows the $G_2$ term. The logical equation for this is $G_0=G_2$. As previously shown by the circuitry in Fig. 12 and by the waveforms in Fig. 13, this results in a recirculation of the information in the G register as desired. This equation is to be operative during the entire word period as defined by period $O_{0-13}$. However, it is not necessary to include the timing term in any of the equations which are operative during the entire word period, since the program counter # which controls the equation is effective for the interval equal to the word period.

The recirculation of the information in the E and F registers is accomplished in the same way as is indicated by equations $E_0=E_2$ and $F_0=F_2$.

The next statement in word block #0 is that flip-flop K1 comes in true. This is merely a reference as to the state of the K1 flip-flop whenever the computer operates to enter word time block #0. As previously noted, the function of the K1 flip-flop, among others, is to signal the program counter 118 whether it should count in an orderly fashion or deviate from this count. It should be understood that the choice as to how the program counter 118 should change is derived as a result of information either received or generated during the word period and set up in the K1 flip-flop. In the present instance, whenever a halt command is called, or the clear switch 355 on the control panel 129 is depressed, the K1 flip-flop is in a true state at the commencement of the #0 word time block.

Thus the state of the K1 flip-flop is of paramount interest in all the word blocks and continual reference to its status is made throughout the word block descriptions.

The next statement made in word block #0 is that the A1 to A4 flip-flops may get manual inputs from the control panel 129. What this amounts to is that the A1 to A4 flip-flops may be set up as a result of operating the information push buttons on the control panel 129.

In order to note in greater detail what happens when any of the manual push buttons on the control panel, shown in Fig. 14, are depressed, refer to the table of Fig. 44 which shows the states into which the A1 to A4 flip-flops are triggered as a result of depressing the respective information push button on the control panel 129. Depression of any one of the octal digit push buttons 0 to 7 sets up a 1 in the A4 flip-flop while the A1 to A3 flip-flops carry the binary digits equivalent of the depressed octal digit push button. Depression of any one of the space, tab, and start push buttons is charactered by a digit 0 in the A4 flip-flop. Further, the space push button 351 sets up a 1 in the A2 flip-flop, the tab push button 352 sets up a one in the A1 flip-flop, and the start push button 354 sets up zeros in the A1 and A2 flip-flops. Consequently, each of the push buttons is represented by certain signals distinguishing it from the others.

Where an X is noted in a row of the table of Fig. 44 representing a state of one of the A1 to A3 flip-flops, it is immaterial whether the flip-flop referred to is true or false.

It is now evident that the equation $a_1$, as shown below time block #0, is determined by noting the state of the A flip-flops characterizing each of the push buttons on the control panel. Thus note that equation $a_1$ which triggers flip-flop A1 into a true state may be activated by any one of the push buttons 1, 3, 5, 7, or space. This is symbolically noted by the equation:

$$a_1=(\textcircled{1}+\textcircled{3}+\textcircled{5}+\textcircled{7}+\text{(space)})C$$

On the other hand, the A1 flip-flop must be in a false state to characterize any one of the push buttons 0, 2, 4, 6, tab, and start. This is symbolically expressed as:

$$_0a_1=(\textcircled{0}+\textcircled{2}+\textcircled{4}+\textcircled{6}+\text{(tab)}+\text{(start)})C$$

The triggering equation for the A2, A3, and A4 flip-flops are similarly obtained and noted below word time block #0.

The next statement in the word time block #0 is that the K1 flip-flop is set false whenever the S1 flip-flop is true. This is symbolically expressed by equation:

$$_0k_1=S_1K_1C$$

Referring momentarily to Fig. 43, the S1 flip-flop is shown to be set true as a result of manually depressing any of the information or start push buttons on the control panel. The positive signal set up whenever any of these push buttons is depressed is inverted in tube 365 whose plate is clamped between 100 v. and 125 v. The clamped negative going signal draws current by way of a diode 366 from a load resistor 367 connected to +225 v. This results in placing a charge on capacitor 368 whose output sends a signal to a Schmitt triggering circuit 369. The negative drop of the square wave signal created by circuit 369 is differentiated and fed into the $s_1$ input of the S1 flip-flop, causing its $S_1$ output to be swung to the high clamped potential of 125 v.

It is now obvious that if any one of the push buttons of the control panel 129 is depressed, the K1 flip-flop is set false such that at the end of the word period the program counter 118 is caused to advance to count #1. Note that in Fig. 43 the false triggering input of the S1 flip-flop, $_0s_1$, is energized whenever the K1 flip-flop is false. Thus the S1 flip-flop, having once set the K1 flip-flop false in word time block #0, is reset back to a false state until a push button on the control panel is again operated.

The next three word time blocks #1, #2, and #3 shown in Fig. 42 function to test the manual inputs. During each of these word blocks, the computer operates to recirculate information in the E and G registers, as already described. It should be noted that word time block #3 also provides for recirculating information in the F register, although no useful information may be recorded therein.

As previously noted in the table of Fig. 44, the initiation of any one of the octal digit push buttons on the control panel is uniquely characterized by the A4 flip-flop being in a true state. Thus word time block #1 functions to test the A4 flip-flop. If the A4 flip-flop is true, the K1 flip-flop (which comes into block #1 in a false state) is triggered into a true state as expressed by equation $k_1=A_4C$. As a result, the program counter is caused to "skip" to word time #65. On the other hand, if the A4 flip-flop is false, the K1 flip-flop remains in a false state and, as a result of this, the program counter has a unit added to it, i.e., "counts" to #2.

In word time block #2, the A1 flip-flop is tested since a true state of the A1 flip-flop indicates the space push button has been depressed by the operator. If the A1 flip-flop is true, the K1 flip-flop is triggered into a true state as shown by equation $k_1=A_1C$. As a result, the program counter is caused to "skip" to word time block #66. If the A1 flip-flop is false, however, then the K1 flip-flop remains false and the program counter counts to #3.

In word time block #3, the A2 flip-flop is tested to determine whether the operator has initiated the tab push button. If the A2 flip-flop is true, the K1 flip-flop is triggered into a true state as indicated by equation $$k_1=A_2O_{0-11}C.$$

As a result, the program counter "skips" to word time block #67. It should be understood that the term $O_{0-11}$ in the $k_1$ equation limits the effectiveness of the equation to the octal digit periods $O_0$ to $O_{11}$, inclusive. This is not important during the present test operation but, as will be shown later, this equation is used in other word time blocks where this limitation is needed.

Next to be noted is that the K1 flip-flop is always rendered false at the end of the #3 word time block operation as indicated by equation ${}_0k_1=P_2O_{13}C$. The state of the K1 flip-flop is observed by the program counter counting network during the $P_2O_{13}$ pulse period of a word. Thus any change made in the K1 flip-flop at the end of the $P_2O_{13}$ pulse period does not affect the program counter counting network. There are occasions when the K1 flip-flop must be true during a $P_2O_{13}$ pulse period in order to cause the program counter to follow the vertical path from a word block. At the same time, it may be desired to have the K1 flip-flop enter the next word period in a false state, in which event the equation ${}_0k_1=P_2O_{13}C$ is made operative to trigger the K1 flip-flop into a false state at the end of $P_2O_{13}$ pulse period or the end of the word period.

Assuming that one of the octal digit push buttons has been depressed on the control panel, the vertical path "0–7" from word time block #1 will be followed. That is to say, the K1 flip-flop will be true at the end of the #1 word period and #65 will be set up in the program counter. The word time block #65 will next be described by reference to Fig. 45.

The function of this word time is to transfer the octal digit set up in the A1, A2, and A3 flip-flops into the least significant octal digit period, $O_0$, of the E register. This is accomplished by having the $E_0$ proposition directly follow the $A_1$ term, i.e., $E_0=A_1$; stepping the contents of the A2 flip-flop into the A1 flip-flop; and finally stepping the contents of the A3 flip-flop into the A2 flip-flop. For example, the stepping of information from the A2 flip-flop to the A1 flip-flop is noted by equations $a_1=A_2C$ and ${}_0a_1=A_2'C$. At the same time, the contents previously in the E register, as evidenced by the state of the E2 flip-flop, is stepped into the A3 flip-flop, i.e., $a_3=E_2C$ and ${}_0a_3=E_2'C$. What this amounts to is adding a 3 clock period delay comprised of flip-flops A1, A2, and A3 into the E register. Finally, the K1 flip-flop remains true during the operation of word time block #65, which results in the program counter skipping back to count #0.

As a result of introducing the octal digits into the E register in this manner, the octal digits may be considered to be stepped into the register from the right in much the same way as an adding machine is filled.

It should be understood that after each octal digit is recorded in the E register, the computer operation returns to "rest" in word block #0. Furthermore, the three clock period delay introduced in the E register by the A1, A2, and A3 flip-flops causes the octal digit signals set up therein to follow the previously recorded signals.

Assume next that the space button has been depressed on the control panel. As previously noted, as a result of the test made during word block #2, the program counter 118 is caused to skip to #66 which represents the vertical path out of block #2.

The function of word block #66, which is also shown in Fig. 45, is to transfer the contents of the E register into the G register so that the computer may recognize it as an address. This transfer is symbolically defined by equation $G_0=E_2O_{0-11}$. It is to be noted that the term $(P_0+P_1)O_{12}$, although shown in the equation below the block, is redundant at this point. The only reason it is included is because the logical equations for the arithmetic diode network 168 have been standardized as much as possible. Thus, since the term is needed in later word periods, it is included here.

Referring to Fig. 46, assume next that the tab button has been depressed on the control panel. The test made during word time block #3 causes the program counter to sequence the computer into the series of word time blocks #67 to #71. Broadly these word blocks function to record the information present in the E register into one of the registers of the main memory. The address of this register will be the one just previously placed in the G register; or, if another word was recorded in the memory just prior to this, the address is the next larger address number.

Since information representing the word to be recorded and its address in the memory is contained in the E and G registers, these registers are recirculated during word time blocks #67 through #70 by equations $E_0=E_2$ and $G_0=G_2$.

During word block #67 the channel selector register 126 comprised of flip-flops A1 to A5 is set to indicate *Ch*16 which represents the arc address channel. To accomplish this, it should be noted that the A1 and A4 flip-flops are already in a false state as a result of initiating the tab push button. Therefore it is only necessary to provide for setting the A2 and A3 flip-flops false by equations ${}_0a_2=\#67C$ and ${}_0a_3=\#67C$, and the A5 flip-flop true by equation $a_5=\#67C$, in order to register the binary equivalent of decimal 16 in the A1 to A5 flip-flops. As previously described in Fig. 26, the setting of the A1 to A5 flip-flops in this way causes a signal on output 128a of the network 168 to actuate the input gating circuits 119a so as to operatively connect the M1 flip-flop to follow the read head of channel 16.

The K1 flip-flop remains false during word block #67, thus the program counter content counts to #68 at the end of this period.

During operation of block #68, the $m_3{}^a$ portion of the G register (as appearing in flip-flop G2) is tested against the arc address channel 16, and the K1 flip-flop is set true each time the test fails. It should be noted that it may take from 1 to 64 word periods to make this test, depending on the location of the desired address at the time the word block #68 is made effective. This test operation is logically noted by equation $$k_1=(G_2M_1'+G_2'M_1)O_{0-1}C$$

Thus by comparing the output of the G2 flip-flop with the output of the M1 flip-flop during the period $O_{0-1}$ which defines the location of an $m_3{}^a$ address in a word period, the state of the K1 flip-flop during $P_2O_{13}$ of each word period will indicate the result of the test. Note that the above equation states that the K1 flip-flop is set true whenever the comparison fails, resulting in the computer repeating the operation in word time block #68. Here again equation ${}_0k_1=P_2O_{13}C$ is provided to cause the K1 flip-flop to always re-enter the word time block #68 in a false state.

At the end of the word period during which the proper rc is read, as indicated by equation $$k_1=(G_2M_1'+G_2'M_1)O_{0-1}C$$

ot being satisfied, the K1 flip-flop remains false; there-ore, the program counter 118 counts 1 and advances the outine to word time block #69. During this word eriod, the channel selector register flip-flops A1 to A5 are et to indicate the channel address $m_3^c$ as found in the $O_2$—$O_3$ periods of the G register. Ths is accomplished, or example, by equation $a_1=G_2P_0O_2C$, ${}_0a_1=G_2'P_0O_2C$, $a_2=G_2P_1O_2C$, ${}_0a_2=G_2'P_1O_2C$, etc. Note that the A1 flip-op is thus caused to follow the G2 flip-flop during $P_0O_2$, he A2 flip-flop is caused to follow the G2 flip-flop during $P_1O_2$, etc. Since the A5 flip-flop is not used to define the hannels *Ch*0 to *Ch*15, it is necessarily set false during his word period as indicated by equation ${}_0a_5=O_0C$.

Since the K1 flip-flop remains false during #69, the rogram counter changes to #70 at the end of this word eriod. Word period #70 operates to record the infor-nation from the E register (as appearing in flip-flop E2) nto the main memory register previously located by word locks #67 through #69.

The effect of setting up address $m_3^c$ in the channel elector register 126 during word period #69 causes he output gating circuits **119*b* (Fig. 26) to connect the $R_1$ and $R_2$ output propositions from the diode network 68** to the desired channel record lines, $r_0, r_0'$, $r_1$, $r_1'$, etc. The $R_1$ output receives the proposition $E_2(P_2O_{13})'C$ and he $R_2$ output receives the proposition $E_2'+P_2O_{13}C$. These latter two equaitons show that the true state of the E2 flip-flop is connected to the $R_1$ (or "one" recording output line) for the entire word period except pulse eriod $P_2O_{13}$. This is to ensure that a zero is recorded nto this position of a register on the drum. Likewise the alse state of the E2 flip-flop is connected to the $R_2$ (or "zero" recording output line) for the entire word period except $P_2O_{13}$ when a zero is arbitrarily recorded in the nain memory register.

The word period #71 is provided in order to add a 1 o the address $m_3$ in the G register. This addition is accomplished by the equations $G_0=(K_1G_2'+K_1'G_2)O_{0-3}$ and ${}_0k_1=G_2'O_{0-3}$. This is interpreted as meaning that the $G_0$ output proposition from the arithmetic diode net-work 168 simultaneously observes the contents of the G2 and K1 flip-flops. When they are different, as when add-ing (1+0), the equation is satisfied and a 1 is recorded in the G register during $O_{0-3}$. When they are the same, as when adding (0+0) or (1+1), the equation is not sat-isfied and a 0 is recorded in the G register. The K1 flip-flop goes false at the end of the first clock period during which the G2 flip-flop is observed to be false, and remains false for the remainder of the counting period. The re-sult of this operation is that a one is added to the binary number representative of the address.

Since it is desired to return to operation #0 after plac-ing the information in the main memory register, the K1 flip-flop is set true in operation #71 as shown by equa-tion $k_1=O_{13}C$.

The above completes the description of how information manually set up on control panel 129 is recorded into the registers of the main memory channels of drum 100.

Referring to the flow diagram in Fig. 27, the circuitry and operations of the computer will now be described in detail when the start push button is depressed on the control panel 129.

*Look up command*

The next set of step operations to be described are those defined by word blocks #4 through #7 in Fig. 47 which operate to "look up the command" to be carried out by the computer. Stated more specifically, these step opera-tions provide a means for searching the memory for a register identified by the control number in the G register and transferring the contents of this register into the recirculating registers.

It should be noted that after filling up the main memory register with initial information, i.e., commands and numbers, the operator then places in the $m_2$ section of the G register a control number representing the address of the first command to be executed by the computer. After being filled in this manner, the computer returns to the #0 word time block in which it idles.

In order to initiate the computer so that it will proceed through the automatic computation routine, whereby the commands are executed on the information according to the program set up by the coder, the operator taps the start button 354 on the control panel 129. This causes the computer operation to proceed through the test oper-ations #1, #2, and #3 in order. Since none of the tests work, the "fill" branch routines are all bypassed and the computer proceeds into step operation #4, which is the first of the word blocks in the series known as "look up command." This operation is similar to the procedure followed during the "tab" subroutine just described in connection with Fig. 46. During step operation #4, the channel selector flip-flops A1 to A5 are set to *Ch*16, as previously described for step operation #67. Here logical equations are provided for triggering each of the flip-flops A1–A5 to indicate the binary equivalent of decimal 16. This is necessary because the A flip-flops do not enter the #4 word time block in a uniform pattern, as was true with word time block #67. During step operation #5 the arc address (control number) located in the $m_2^a$ section of the G register is compared with the arc ad-dresses picked up from *Ch*16, as previously described for step operation #68. Note that the only difference in the $k_1$ equation for the two word blocks is that in #68 the timing term $O_{0-1}$ is used, whereas in #5 the timing term $O_{4-5}$ is used. During step operation #6 the channel address located in the $m_2^c$ section of the G register is set up in the channel selector A1 to A5 flip-flops similar to the process by which the address in the $m_3^c$ section of the G register was set up in #69. The operation of the last word time block #7 of this routine is different from that of word time blocks #70 and #71 in Fig. 46 in that the latter case provides for recording information into a register of the main memory while the present word operation provides for reading information out of a register into the memory.

Thus, during word time block #7, information repre-senting the instruction I and the $m_1$ and $m_3$ addresses of the command (but not the $m_2$ address) is picked up by the M1 flip-flop and read into the G register by the equation $G_0=M_1O'_{4-7}$, which is interpreted to mean that the G register observes the information in the main memory register selected for the entire word period with the exception of period $O_{4-7}$. This $O_{4-7}$ section of the memory register, which contains the $m_2$ contents of the command, is read into the F register according to the equation $F_0=M_1O_{4-7}$. This procedure is necessary be-cause the $m_2$ section of the G register is already occupied by the control number which must be retained.

It is apparent that after a command has once been read from the memory its address, as indicated by the control number, is no longer needed. However, the commands are generally located on successive registers of the main memory. Thus, by adding a 1 to the old control number, the address of the next command to be executed is obtained.

Accordingly, word time block #7, in addition to the above operations, provides for adding a unit to the con-trol number in the $m_2$ section of the G register by the equations $G_0=(G_2K_1'+G_2'K_1)O_{4-7}$ and ${}_0k_1=G_2'O_{4-7}C$. Note that with the exception of the timing period this addition is carried out in the same manner that a unit was added to the address in the $m_3$ section of the G register during step operation #71 of the "tab" sequence previously described. Just as in word block #71, the K1 flip-flop, originally true, is rendered false whenever the G2 flip-flop is false during the period $O_{4-7}$ to enable the addition to be carried out. Since flip-flop G2 is always necessarily false toward the end of period $O_{4-7}$, K1 is false at $P_2O_{13}$ time, thus resulting in the program counter counting and advancing the operation to word time block #8.

*Instruction tests (Series 1)*

The next set of word operations to be described is comprised of the six word time blocks #8 to #13, inclusive. These time blocks, as noted in Figs. 48*a* and 48*b*, comprise the first of two series of test step operations provided for determining whether any of the six instructions, whose branch sequences take off from the word time blocks, is associated with the command just obtained from the main memory. The respective word blocks #8 to #13, inclusive, are used to test for the following instructions: halt, H; fill from external instrument, F; record address and word on tape, P1; print address and word on typewriter, P2; record word alone on tape, P3; and print word alone on typewriter, P4.

Before presenting the propositions within the word blocks for performing the test operations, the manner by which the proper branch sequence corresponding to an instruction is selected will be described. It will be noted from the previous discussion that the instruction I section of the command was read into the G register during program counter step operation #7. Following this is the series of six word time blocks from which extend vertical paths representing respective ones of the instructions. Each of these word blocks has an operation statement "add 1 to I in G register" written therein. This operation consists of adding a unit to the 4-place binary number representing the instruction I located in the $P_1O_{12}$ through $P_1O_{13}$ positions of the G register. The test is such that if a carry occurs as a result of this addition (whenever a 1 is added to a binary equivalent of decimal 15), the K1 flip-flop is left true at $P_2O_{13}$ of the word period and the program counter is operated so as to follow the vertical path taking off from the word block. Otherwise, the K1 flip-flop is triggered false and the program counter "counts" a unit resulting in the horizontal path being followed from the word block. Thus H, which is 1111 in the binary instruction code, causes a carry after the addition in program counter operation, #8, and the program counter is caused to skip directly to #0, the idling operating condition. The rest of the instructions necessarily have a particular numerical order, as listed in the chart shown in Fig. 6*b*.

Figure 48A:
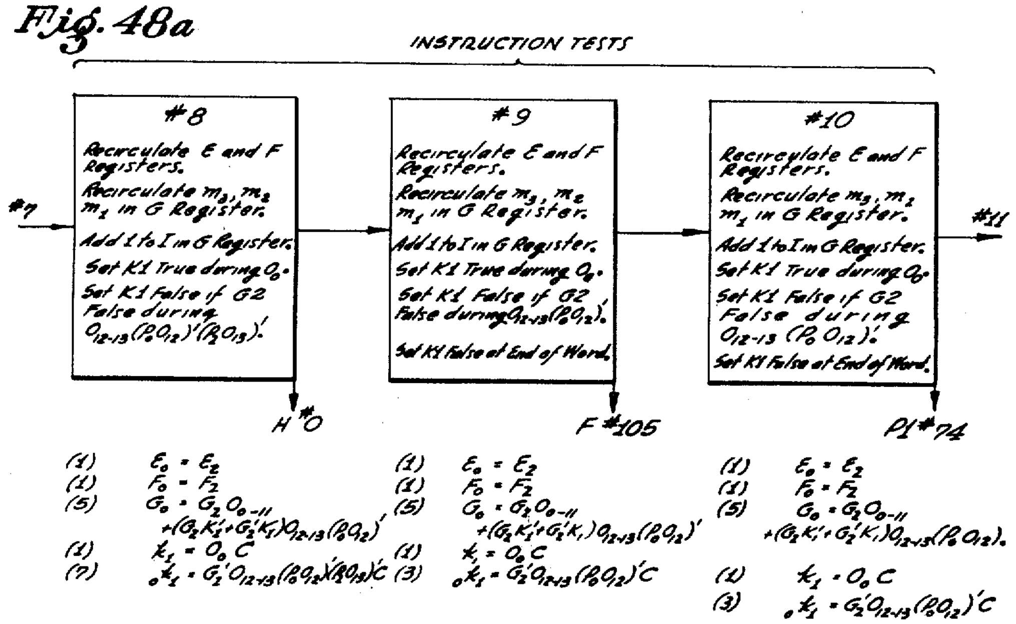
Figure 48B:
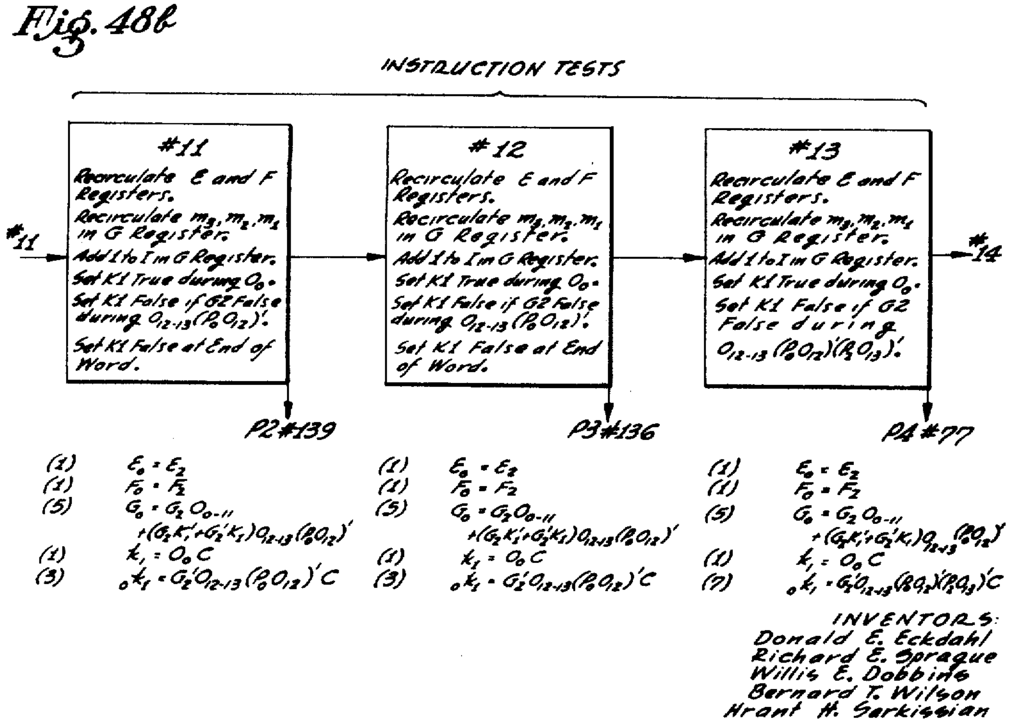

This operation will now be described more specifically with reference to the logical equations within the word blocks. It should be pointed out, as shown in Figs. 48*a* and 48*b*, that the equations for each word block are identical except for minor variations in the ${}_0k_1$ equations of blocks #8 and #13.

First it should be noted that the E and F registers are recirculated during each of the word block periods as provided for by equations $E_0=E_2$ and $F_0=F_2$ previously described.

As for the G register, the first portion of the $G_0$ equation, $G_2O_{0-11}$, indicates that the address in the $m_1$, $m_2$, and $m_3$ sections of the G register are recirculated.

The second portion of the $G_0$ equation, $$(G_2K_1'+G_2'K_1)O_{12-13}(P_0O_{12})'$$

together with the equation $${}_0k_1=G_2'O_{12-13}(P_0O_{12})'$$

functions to add 1 to the instruction I in the G register. (Disregard the term $(P_2O_{13})'$ in the ${}_0k_1$ equations of #8 and #13 for the moment.) The action of these equations is similar to the addition of a unit to the $m_3$ address in the G register as previously described in word time block #71 in Fig. 46.

The K1 flip-flop is set true during $O_0$ by the equation $K_1=O_0C$ so as to provide the unit to be added to the instruction I. According to the scheme of adding employed, the first time that the G2 flip-flop has a 0 digit content during the timing period $O_{12-13}(P_0O_{12})'$ the K1 flip-flop is set false.

Note that the timing term $O_{12-13}(P_0O_{12})'$ is interpreted as meaning the time period $P_1O_{12}$ through $P_2O_{13}$. Thus whenever the contents of the G2 and K1 flip-flops are different during a clock period included in this timing period, the $G_0$ proposition are true or indicative of a 1 digit. When the contents of the G2 and K1 flip-flops are the same during this period, the $G_0$ proposition is false or indicative of a 0 digit.

From the above, it is now evident that if the G register has the binary equivalent of decimal 15 in its I section, the K1 flip-flop will remain true during $P_2O_{13}$ and the program counter will follow the vertical path out of the word time block and the computer will subsequently operate to carry out the instruction I indicated.

As an example of how the word time blocks #8 through #13 operate, assume that the binary instruction code for P4 is present in the I section of the command in the G register. As seen in Fig. 6*b*, this instruction code is 1010 which is equivalent to a decimal 10. As a result of this information in the G register being operated upon during word time block #8, a 1 is added to the 4-place binary number causing it to be equivalent to 1011 or a decimal 11. Since one of the digits is a 0, the K1 flip-flop is rendered false and the program counter is caused to count to #9 rather than to skip to the #0 count which would be the case if no zeros were in the 4-place binary number in the I section of the G register. During each of the following 4 word time blocks #9, #10, #11, and #12, a 1 is added to the I section so that the 4-place binary numbers leaving these blocks have the value 1100, 1101, 1110, and 1111, respectively.

The K1 flip-flop is observing the binary digits of these numbers and is set false whenever a 0 is present. Thus it is evident that the K1 flip-flop will be rendered false during each of the #9, #10, #11, and #12 word time blocks.

It is now evident, however, that upon entering word time block #13, the binary number in the I section of G is 1111. As a consequence, the K1 flip-flop will now observe all 1's and remain true. As a result of the K1 flip-flop being true at $P_2O_{13}$ pulse time of the #13 word block, the program counter skips to count #77 thus entering into the P4 subroutine of the read-out flow diagram (see Fig. 66).

During word time blocks #8 and #13, the K1 flip-flop, although it may be true during pulse time $P_2O_{13}$, would always be set false at the end of this time, i.e., the end of the word period, if the inhibiting term $(P_2O_{13})'$ were not included in the ${}_0k_1$ equations of these word time blocks. The reason for this will be evident from observing the arrangement of the instruction I code numbers in octal periods $O_{12}$ and $O_{13}$ of the table of Fig. 6*b*. The digit in the $P_2O_{13}$ period of the I section of the G register is always 0. Hence, if the ${}_0k_1$ equation were operative during this period, it would invariably cause the K1 flip-flop to go false at the end of the word period. There are times, however, when it is necessary to have the K1 flip-flop rendered true at the end of a word period so that it will fit into the logical scheme of operation of the following word time block. As will be noted later, word time blocks #8 and #13 are of this type. Consequently, the presence of the term $(P_2O_{13})'$ in the ${}_0k_1$ equation of the word time blocks #8 and #13 makes the equation inoperative during this pulse time so as to maintain the true state of the K1 flip-flop when the branch sequences taking off from these word time blocks are followed.

The remaining word time blocks #9, #10, #11, and #12 do not include the term $(P_2O_{13})'$ in the ${}_0k_1$ equation.

Thus in those blocks the K1 flip-flop invariably gets set false at the end of the $P_2O_{13}$ pulse period or the end of the word; and, as a result, the K1 flip-flop always enters the instruction sequences taking off from these word time blocks in a false state.

The word blocks which describe the step operations for performing the instructions tested for by the above series of word blocks, #8 through #13, with the exception of the halt instruction, H, which is self-evident, will be described in an ensuing portion of the description after their overall flow diagram, as shown in Fig. 66, has been presented.

*Look up* ($m_1$)

Assuming that none of the instructions tested for by the previous word time blocks #8 through #13 were satisfied, the program counter advances along the main sequence, as shown in Fig. 27, into word time block #14 which, together with blocks #15, #16, and #17, performs the process of searching the memory for the register defined by the address in the $m_1$ section of the command in the G register and reading the contents found there into the E register. In this way the first of (usually) two numbers is placed in position in the recirculating registers so that they can be operated upon by the arithmetic unit 112.

The logical equations describing the step operations performed during word time blocks #14, #15, and #16 as shown in Fig. 49, are almost identical to those already described for the #4, #5, and #6 word time blocks (Fig. 47) used for looking up the command. The exceptions again are the timing terms since the address $m_1$ is located in a different portion of the G register. In addition to providing for recirculating the E, F, and G registers during each of these word block operations, word time block #14 provides for setting up the binary equivalent of C*h*16 in the A1 to A5 flip-flops. Entering word time block #15, the information in the $m_1{}^a$ section of the G register is then compared with information in corresponding sections of successive words on the arc address channel 16. This operation is recycled a number of word periods until the comparison agreement exists. Word time block #16 then provides for setting up the A1 to A5 flip-flops in accordance with the information in the $m_1{}^c$ section, i.e., positions $P_0O_{10}$ through $P_2O_{11}$, respectively, of the G register. This operates to gate information from the desired channel of the main memory into the M1 flop-flop.

Thus during the final word time block #17 of the look up ($m_1$) routine, the $E_0$ proposition is connected directly to the M1 flip-flop as expressed by equation $E_0=M_1$, thus routing information from the desired register of the memory into the E register.

After looking up the contents of the register having address $m_1$ and placing it in the E register, it is possible to carry out the test overflow instruction, T*o*. Thus word time block #18 is next made operative to determine whether the command being stored in the G register contains this instruction. Time block #18 operates identically to the time block #8 through #13 already described.

If the T*o* instruction is not indicated by the I content of the command, the program counter counts into the #19 word time block which is the first of a series of time blocks used for looking up the contents of the $m_2$ address of the command.

*Look up* ($m_2$)

The next series of step operations to be described are those shown in Fig. 50 which, along with their logical equations, result in searching the memory for the $m_2$ address of the command in the G register and reading the contents found there into the F register. In this way, the second of the two numbers is placed in position in the recirculating registers so that it can be operated upon by the arithmetic unit 112.

These step operations are similar to those previously described for searching the memory. In the present instance, however, it is necessary to precede the searching operation by step operation #19. Here the $m_2$ section of the G register, which contains the control number, is transferred into the F register as indicated by the equation $F_0=G_2O_{4-7}$. Simultaneously, the $m_2$ address of the command which is to be used for locating the second number to be operated upon in the memory is transferred from the F register to the G register as indicated by the portion of the $G_0$ equation $F_2O_{4-7}$. It shoud be remembered that during the look up command routine shown in Fig. 47, the $m_2$ address of the command was routed into the F register since the control number already occupied the $m_2$ section of the G register.

The remaining sections of the G register are recirculated during word time #19 as indicated by the portion of the $G_0$ equation, $G_2O'_{4-7}$.

Step operations #20, #21, #22, and #23 are identical in their operation to step operations #14, #15, #16, and #17 of the look up ($m_1$) routine, except for the difference in the timing terms.

Thus during step operation #20, the channel selector comprised of flip-flops A1 to A5 is set to C*h*16, the arc address channel. Step operation #21 then proceeds to test the arc addresses sensed by the M1 flip-flop with the arc address in section $m_2{}^a$ of the G register as sensed by the G2 flip-flop. This operation is repeated until the proper arc is reached, as represented by the K1 flip-flop remaining in a false state.

Following this comparing operation, during step operation #22 the channel selector flip-flops A1 to A5 are set to indicate the channel in accordance with the information in the $m_2{}^c$ section of the G register. The register of the main memory is then read into the F register during the following step operation #23.

As previously noted in step operation #19 of this routine, the control number in the $m_2$ section of the G register was read into the F register; and the $m_2$ section of the command, which was in the F register, was read into the G register. The reason for this operation is that when comparing an address with the address in the short registers, it simplifies the operation and, therefore, reduces the size of the diode networks if the $m_2$ address is always located in the same register, namely the G register.

Thus in step operation #23, simultaneously with placing the contents of the register defined by address $m_2$ into the F register, the control number is again returned to the $m_2$ section of the G register as indicated by the $F_2O_{4-7}$ portion of the $G_0$ equation. The $m_2$ address of the command is thus discarded since it is no longer needed.

As a result of having looked up the contents of the registers in the $m_1$ and $m_2$ addresses of the main memory, there are now two words in the short registers. The $m_1$ contents are in the E register and the $m_2$ contents are in the F register.

*Instruction tests* (*Series 2*)

The next part of the main routine through which the computer proceeds is a second series of step operations for testing the instruction I of the command similar to those described in step operations #8 through #13, inclusive. Since the contents of both of the addresses $m_1$ and $m_2$ of the command have been procured from the memory, it is now possible to automatically carry out the following instructions: test difference, T; extract, E; subtract, S; add, A; and shift, S*h*. The significance of these instructions will be made more clear in the ensuing description.

As previously explained, the binary code for each of exemplary ones of the instructions is shown in the table of Fig. 6*b*. As already stated in connection with Figs. 48*a* and 48*b*, each time an instruction test is performed, a one is added to the instruction I code number. When the instruction I code number has enough units added to it so that the four place code number represents all 1's, or the decimal equivalent of 15, the next test step operation results in causing the program counter to change content so as to follow the vertical path taking off from the word block into the instruction routine noted.

As previously noted for step operation #8 and #13 in Figs. 48*a* and 48*b*, the K1 flip-flop will be triggered into a false state at the end of the $P_2O_{13}$ pulse time if the term $(P_2O_{13})'$ is not included in the $_0k_1$ equation to inhibit it from operating during this time. This results from the fact that the $P_2O_{13}$ position of the I section of a command always contains a zero. Thus during step operations #24 and #28 of the present series of test operations, this term is included in the $_0k_1$ equation. However, it is necessary that the K1 flip-flop be in a false state at the end of the step operations #25, #26, and #27. Accordingly, the $(P_2O_{13})'$ term is omitted from the $_0k_1$ equations for these operations.

Next to be described will be the word time blocks for the branch sequence provided for performing the test instruction, T*o*, as shown in Fig. 52.

*Test overflow, To*

This instruction operates to replace the old control number being stored in the $m_2$ section of the G register with a new control number. This is accomplished by shifting the $m_3$ section of the command in the G register into the $m_2$ section and is effected during word time blocks #82, #83, and #84, as shown in detail in Fig. 52.

The reason for the inclusion of this instruction in a general purpose computer is that it is often desirable in solving a problem to deviate from utilizing an orderly sequence of commands. It is often practical to utilize commands found in a given numerical sequence of registers in the main memory for a while and then switch to commands found in another numerical sequence of registers in order to perform other types of computations. As an example, it is possible that the present computer has just executed the command obtained from arc 25 of channel 7 of the main memory and that it is next desirable to execute a command located in arc 30 of channel 2 of the memory. In ordinary operation the next command to be executed would be picked up from arc 26 of C*h*7 because of the provision for adding a unit to the control number each time a command is looked up, as shown in step operation #7 of Fig. 47. But by utilizing the present routine, a shift in the control number will enable the computer, through this change in the control number, to pick up the command from arc 30 C*h*2, for example as stated before.

One method of entering this subroutine of changing the control number is made available immediately after the contents of the $m_1$ address have been placed in the E register. If the instruction code is proper, the T*o* sequence is entered as previously described in step operation #18 of Fig. 49.

The decision as to whether the control number should be changed when utilizing instruction T*o* depends on whether an overflow pulse is located in the $P_1O_{12}$ position of the number previously placed in the E register. The A1 flip-flop is utilized to store this information in the network 168 so as to indicate whether the change in control numbers should take place in the subsequent step operation of word time blocks #83 and #84.

Accordingly, if the A1 flip-flop is true upon entering word time block #83, this indicates that the new control number in the $m_3$ section of the G register is to be shifted left 12 binary digits so as to replace the old control number in the $m_2$ section.

This shifting is carried out by recycling through the step operation #83 four times. During each step operation #83 the digits in the G register are stepped 3 binary digit positions to the left.

Keeping account of the number of cycles of word time block #83 is accomplished by inserting a cycle counting pulse during step operation #82 in the $P_1O_{12}$ position of the E register. This cycle counting pulse is shifted one pulse position towards the $P_1O_{13}$ position each time the computer cycles through word time block #83.

Referring to the word time blocks #82, #83, and #84, the detailed description of how this operation is carried out will be presented by reference to the equations below the word blocks.

With reference first to word time #82, note that the G register is recirculated as indicated by equation $G_0=G_2$.

The A1 flip-flop is initially set false during $O_0$ by the equation $_0a_1=O_0C$ so that it can be set true if there is an overflow pulse in the $P_1O_{12}$ position of the E register. This is shown by equation $a_1=E_2P_1O_{12}C$.

The E register is cleared except for the cycle counting pulse in the $P_1O_{12}$ position which is inserted there by the equation $E_0=P_1O_{12}$.

The K1 flip-flop remains false during step operation #82, causing the program counter 118 to count 1 and advance the operation to word time block #83.

The operation of word time block #83 depends on the status of the A1 flip-flop. Initially, the K1 flip-flop is set true as indicated by $k_1=O_0C$. If the A1 flip-flop is false, which is the case if no overflow existed in the number in the E register, the K1 flip-flop is then set false at $P_1O_{13}$ as indicated by the product $A_1'P_1O_{13}C$ in the $_0k_1$ equation. Thus the program counter 118 counts 1 and advances the subroutine to word time block #84 without a change in the control number. Note that the product $A_1'G_2$ in the $G_0$ equation indicates that if the A1 flip-flop is false the G register is recirculated.

If the A1 flip-flop is true coming into word time block #83, the contents of the G register are shifted left three binary digital positions upon each recirculation of the step operation #83 using the A3, A4, and A5 flip-flops. These three flip-flops A3, A4, and A5 operate to insert a 3 pulse delay in the G recirculating line by having the A3 flip-flop follow the contents of the G2 flip-flop in the G register. This is logically represented by the equations $a_3=G_2C$ and $_0a_3=G_2'C$. The A4 flip-flop is then made to follow the A3 flip-flop and the A5 flip-flop is made to follow the A4 flip-flop, as indicated by the equations shown for their inputs. The $G_0$ proposition, which represents the information to be recorded back onto the G channel of the drum by way of the G3 flip-flop (Fig. 26), is then made to follow the A5 flip-flop as indicated by the product $A_1A_5$ in the $G_0$ equation.

Simultaneously with the above action, the cycle counting pulse in the E register is shifted one binary pulse position to the left in the E register during each cycling of step operation #83. This is accomplished by inserting the A2 flip-flop in the E recirculating line to produce an additional one clock pulse delay therein. Thus the A2 flip-flop is caused to follow the E2 flip-flop by equations $a_2=E_2C$ and $_0a_2=E_2'C$; and the $E_0$ proposition is caused to follow the A2 flip-flop as indicated by equation $E_0=A_2$.

After three cycles of the word time block #83, the contents of the G register has been shifted 9 binary digital positions to the left and the cycle counting pulse in the E register has been shifted 3 binary digital positions to the left. Thus during the fourth cycle of step operation #83, the contents of the G register is shifted a further 3 binary positions and the cycle counting pulse resides in pulse position $P_1O_{13}$ of the E register and the K1 flip-flop is rendered false by the product $E_2P_1O_{13}C$ in equation $_0k_1$.

Referring to Fig. 3, it will be noted that $m_3$ is indicated to be in the positions $O_{0-3}$ of the register indicated. Four shifts of 3 binary positions each will step the contents of $m_3$ from $O_{0-3}$ to the $m_2$ position, $O_{4-7}$. Thus the contents previously located in the $m_3$ section of the register become the new control number by being placed in the $m_2$ section.

After the word time block #83 operation has been completed, the #84 word time block is made operative. This block is merely a dummy in the sequence inasmuch as its only purpose is to set the K1 flip-flop true so that the program counter will change to a new count. Since the test overflow instruction has been completed, the command has been executed and the operation of the computer immediately skips back to the #4 word time block in the "look up command" routine. The computer then operates to look up the command indicated by the new control number.

*Test difference, T*

Another method employed by the computer for changing control numbers is available after the contents of the $m_2$ address of an instruction have been looked up. Thus the T instruction test is made in word block #24 which follows the look up $(m_2)$ sequence shown in Fig. 50. The decision as to whether the control number is to change will now be made by comparing the algebraic values of the numbers obtained from the $m_1$ and $m_2$ addresses of a command and deposited in the E and F registers, respectively. If the number found in the $m_1$ address is algebraically greater than the number found in the $m_2$ address, the control number is changed.

This comparison is carried out during step operation #80 which will next be described, as shown in Fig. 52.

It should be noted that since the algebraic values of the numbers in the E and F registers are to be compared, the first process involved is to test the magnitude of the two numbers as found in the $O_{0-11}$ period of the registers. Then during period $O_{12-13}$, or more specifically $P_0O_{12}$, the signs of the numbers are compared. As a result of information obtained from these comparisons, a conclusion is then generated as to whether E is algebraically greater than F. If E is algebraically greater than F, then the A1 flip-flop enters the next step operation #83 in a true state, thus causing the control number to change as previously described. If E is algebraically equal to or less than F, the A1 flip-flop enters the next step operation #83 in a false state; and the computer proceeds through step operation #83 without causing a change in the control number.

Returning to step operation #80, the detail circuitry for carrying out the comparison will now be introduced by statements within the block and the detail circuitry defined by the logical equations below the block.

First, it should be noted that the A1 and A2 flip-flops always come into step operation #80 in a true state. The comparison of the magnitudes of the numbers in the E and F registers is serially performed during $O_{0-11}$ by the product $E_2F_2'O_{0-11}$ in the $a_1$ triggering equation and the product $E_2'F_2O_{0-11}$ in the ${}_0a_1$ triggering equation. The first of these products logically states that if the number in the E register has a digit 1 in a stage in which the F register has a digit 0, then the A1 flip-flop will be triggered true. Likewise, the second product logically states that if the number in the F register has a digit 1 in a stage in which the E register has a digit 0, then the A1 flip-flop will be triggered false.

Thus the state of the A1 flip-flop at the end of $O_{0-11}$ determines whether E is greater or less than F. If $|E|\geqq|F|$, then term $A_1$ is true; and if $|E|<|F|$, then term $A_1$ is false.

In order to distinguish as to whether the magnitude of the number in the E register is equal to or greater than the number in the F register, the A2 flip-flop is set false only if the magnitudes are not equal as indicated by equation ${}_0a_2=(E_2'F_2+E_2F_2')O_{0-11}C$.

During $P_0O_{12}$, the signs of the numbers in the E and F registers are sensed by the E2 and F2 flip-flops, respectively. All the information is now set up in the arithmetic network 168 so that a final decision can be drawn as to the algebraic comparison of the two numbers.

Thus, for example, if the magnitude of the number in the E register is greater than the number in the F register ($A_1$ true) and the sign of E is negative, then the algebraic value of E is less than that of F and the A1 flip-flop is triggered into a false state by the product $A_1E_2'P_0O_{12}$. However, any time the A1 flip-flop is left true because the magnitudes are the same, it is necessary to test the signs in order to determine if E is less than or equal to F. First it should be noted that the A2 flip-flop is left in a true state if the magnitudes are the same. Thus if the sign of the number in the F register is positive, as indicated by the F2 flip-flop being true at $P_0O_{12}$ time, then it may be concluded that the E number is algebraically equal to or less than the F number and the A1 flip-flop is triggered into a false state as indicated by product $A_1A_2F_2P_0O_{12}$ in the ${}_0a_1$ equation.

One other possibility must be provided for. For example, the E number magnitude may be less than the F number magnitude so as to render the A1 flip-flop into a false state at the end of $O_{0-11}$. But it may be that the F number is negative in sign as indicated by the F2 flip-flop being false at $P_0O_{13}$ time. If this is the situation, then irrespective of whether E is positive or negative in sign, it may be concluded that the algebraic value of E is greater than that of F and the A1 flip-flop must be triggered from the false into the true state. The product $A_1'F_2'P_0O_{12}$ in the $a_1$ equation operates to trigger the A1 flip-flop into a true state when these conditions exist.

It is now evident that if the number found in the $m_1$ address is algebraically greater than the number found in the $m_2$ address the A1 flip-flop enters into word block #83 in a true state.

The description of step operations #83 and #84, which provides for changing the control number by shifting the $m_3$ section of the command in the G register into the $m_2$ section, has already been described in connection with the test overflow routine, T*o*, and will not be further discussed.

It should be noted by reference to the flow diagram in Fig. 27 that after either the test overflow, T*o*, or test difference, T, routines have been completed, the program counter is caused to skip to step operation #4. Thus the computer has executed the command previously obtained from the memory and now operates to obtain a new command which is located in the address of the memory defined by the new control number.

If the control number has not been changed as a result of previous test commands, then the control number defines the next consecutive memory address of the memory. If the control number has been changed as a result of the previous test commands, then obviously the command is obtained from that address represented by the new control number.

*Extract, S*

The next routine to be described is the extract instruction, E, tested for in word block #25. This instruction is used, for example, for replacing an address as found in a particular register in the memory with the address found in the corresponding location in the E register.

The first step operations in this routine, as shown in Fig. 53, function in the same manner as those previously described in Fig. 46 which search the memory for the register whose address is defined by the $m_3$ address in the G register. Thus the logical equations for step operations #89, #90, and #91 are identical to those for step operations #67, #68, and #69 previously described except for the fact that #89 provides for triggering the A1 and A4 flip-flops false, a situation not required in #67. In summary, the channel selector comprised of the A1 to A5 flip-flops is set to *Ch*16, the arc address channel, in step operation #89. The arc addresses from *Ch*16 are then sensed by flip-flop M1 and compared with the $m_3^a$ portion of the $m_3$ address in the G register during step operation #90. This step operation is recycled until the proper arc has been reached. During step operation #91, the channel selector flip-flops A1 to A5 are then set in accordance with the $m_3^c$ portion of the $m_3$ address in the G register, thus causing the M1 flip-flop to pick up information from the desired register on the drum.

In order to understand the remaining step operations of the extract instruction, reference will be made to the command notation ($Em_1m_2m_3$) which calls for this instruction. As will be made evident by referring to the flow diagram in Fig. 27, the contents of the $m_1$ address of the command has been placed in the E register and the contents of the $m_2$ address has been placed in the F register by the time the I section of the command, bearing the instruction E, has been successfully tested in step operation #25, resulting in the deviation of the programming into the extract routine. This routine provides for extracting the contents of the register defined by address $m_1$, as found in the E recirculating register, into the register of the memory having address $m_3$, using the contents of the register defined by address $m_2$, as found in the F register. Stated another way: when a digit in the F register equals 1, the corresponding digit in the E register is placed into the memory register having the address defined in the E register at section $m_3$; and when a digit in the F register equals 0, the corresponding digit in the memory register having the address defined in the E register at section $m_3$ is left unchanged. As will be now noted, this process is not carried out in a direct manner as stated. Instead, the process is divided into steps whereby the desired information is generated and recorded into the E and F registers, logically combined in the E register, and then transferred into the register of the memory having the address defined by the content of the $m_3$ section in the E register.

Thus, referring to word block #92, in order to determine the portion of the information ($m_1$), symbol for contents of $m_1$ address as found in the E register, which is to be extracted into the $m_3$ address in accordance with the information ($m_2$) as found in the F register, the equation $F_0=E_2F_2$ is used. That is to say, this information is generated by the product $E_2F_2$ and recorded in the F register.

The portion of the $m_3$ information which is to be left unchanged is then generated according to equation $E_0=M_1F_2'$. It should be remembered that the M1 flip-flop has been set up so as to follow the register having address $m_3$ in the memory. The product $M_1F_2'$ thus generates the unchanged information in $m_3$ which is recorded in the E register.

The step operation #93 is then made effective. During this word period, the information now existing in the E and F registers is logically added together and placed in the E register, as indicated by logical equation $E_0=E_2+F_2$. Thus the E register now contains the information which is to be recorded into the $m_3$ address.

As noted, the K1 flip-flop is set true during step operation #93, resulting in the program counter skipping to count #41 which is the first of a series of step operations employed for placing the result obtained from carrying out an instruction into the $m_3$ address of the memory.

It is now evident that what occurs during the extract instruction routine is that information is taken out of the $m_3$ address of the proper memory cell and processed in the arithmetic unit 112. This is then followed by the next series of step operations to be described in Fig. 54 which operates to return this information back to the same $m_3$ address of the memory.

*Put result away in $m_3$*

The placing of the result derived from carrying out an instruction back into the memory is accomplished by searching the memory for the register identified by the $m_3$ address. Thus the logical equations for step operations #41, #42, and #43, as shown in Fig. 54, are identical to the operations #67, #68, and #69 previously referred to in Fig. 46, except for the few minor deviations shown. Having found this desired register, that is to say, when the M1 flip-flop is connected to the desired channel head at the proper time, the circuits required for step operation #44 are made effective. The circuits effective during word period #44 operate to feed to the $R_1$ and $R_2$ output circuits propositions set up in the E register; they are the same as those described in step operation #70 of Fig. 46. The equation $R_1=E_2(P_2O_{13})'$ indicates that all the digit 1's in the E register are sensed by the $R_1$ output proposition. The term $(P_2O_{13})'$ of the product ensures that the $R_1$ output is cut off during $P_2O_{13}$ pulse time. This follows from the fact that the $P_2O_{13}$ pulse time of a word always has a zero recorded therein.

The equation $R_2=(E_2'+P_2O_{13})$ indicates that all the digit 0's in the E register are sensed by the $R_2$ output proposition. The inclusion of time $P_2O_{13}$ in the logical sum ensures that a digit 0 is recorded during this period for the reason above stated.

After this information is recorded onto the $m_3$ address of the memory, the extract instruction has been fully executed and the computer is automatically programmed back to the look up command routine, step operations #4 through #7, whereby it operates to obtain the next command to be executed.

*Addition, A*

The next routine to be described is the one which branches off from word time block #27 as a result of a successful test of the add instruction, A, in the command. As shown in the flow diagram of Fig. 27, a test for the subtract instruction, S, is made prior to the add instruction, A. However, it will be shown that having once described the add sequence, the understanding of the subtract sequence follows with but an initial step operation to be explained.

In order to describe and simplify the method and circuitry provided for carrying out the add instruction, an example will first be presented showing how the steps of the process are carried out in longhand. First to be noted is that the present computer operates with a fixed binary point which is assumed to be located at the left of the binary numbers. This amounts to thinking of the numbers as having values defined by the limits +1 and −1. The numbers in the $O_{0-11}$ positions of a word are thus fractional parts of a unit. Thus, in Fig. 55, several examples of binary addition show how the binary equivalent of decimal ⅝ is added to the binary equivalent of decimal ⅝ is added to the binary equivalent of decimal ⅛. Example 1 shows the procedure for carrying out the addition when the signs of the two numbers are the same. Example 2 shows the procedure for carrying out the addition when the signs of the two numbers are different, and a carry results from the binary addition. Finally, Example 3 shows the procedure for carrying out the addition when the signs of numbers are different and no carry is obtained as a result of the addition.

Noting Example 1, when the signs of the numbers as found in the E and F registers are the same, the magnitudes are added and recorded in the E register. Any resultant carry beyond the most significant digit is remembered and recorded in the $P_1O_{12}$ pulse position of the E register, while the sign is recorded in the $P_0O_{12}$ pulse position of the E register.

Examples 2 and 3 indicate that when the signs of the numbers are different, the magnitudes are added after complementing the negative number; and an examination is then made as to whether there is a carry generated beyond the most significant stage.

If a carry is generated, the resultant sum is the answer desired and the carry is discarded, as indicated by Example 2.

If a carry is not generated, the sum obtained from the previous addition must be complemented (reverse 0's and 1's and add a 1 into the least significant position) in order to give the proper answer.

Reference will next be made to the details of the word time blocks as shown in Fig. 56.

As noted, the addition routine, A, commences with word time block #59 of the series of step operations shown. It will be made clear in the ensuing description that the subtraction routine is no more than the addition routine preceded by the step operation defined by word block #58.

During word time block #59, the registers E, F, and G are recirculated, as indicated by the logical equations shown, since useful information is being stored in all of them. The part of the addition process accomplished during this work block is the examination of the signs of the numbers in the E and F registers so as to determine whether the addition process to be carried out is of the Example 1 type or the Examples 2 and 3 type, i.e., whether the signs of the numbers are the same or dissimilar.

As noted, the A1 flip-flop is set true if the sign of the number in the E register is positive, as indicated by equation $a_1=E_2P_0O_{12}C$, or set false if the number is negative, as indicated by equation ${}_0a_1=E_2'P_0O_{12}C$.

Similarly, the A2 flip-flop is set in accordance with the sign of the number in the F register, as indicated by the equations $a_2=F_2P_0O_{12}C$ and ${}_0a_2=F_2'P_0O_{12}C$.

It should be noted that the K1 flip-flop enters step operation #59 in a false state; this flip-flop is then set, i.e., triggered, into a true state if the signs of the numbers are different. This is accomplished by observing the states of the A1 and A2 flip-flops after they have been set in accordance with the signs of the numbers, as indicated by equation $k_1=(A_1A_2'+A_1'A_2)O_{13}C$.

Thus, if the K1 flip-flop is true at the end of the #59 word period, it is indicative that the signs of the numbers are different, i.e., one of them is negative. If such is the case, the program counter is actuated to sequence the computer into word time block #63 in which the negative number can be complemented before being added. If, however, the K1 flip-flop is not rendered true at the end of #59 word period, the signs of the number are the same and the program counter counts to #60, by-passing the step operation #63. Describing the logical equation associated with word time block #63, the complementation process amounts to reversing the 1's and 0's of the negative number defined by the false state of either the A1 or A2 flip-flop, and setting the K1 flip-flop so that it can cause the program counter to skip to #60 as well as provide the initial carry needed to complete the complementation.

The reversing of the 1's and 0's of the negative number is accomplished by the equations:

$$E_0=(E_2A_1+E_2'A_1')$$

$$F_0=(F_2A_2+F_2'A_2')$$

Note that if the A1 flip-flop is true, the number in the E register is positive and the digits are recirculated by the product $E_2A_1$. However, if the A1 flip-flop is false, the number in the E register is negative and the digits are replaced by their respective opposites by the product $E_2'A_1'$.

The equations for the F register may be similarly interpreted.

The next word time block in the sequence is step operation #60 which functions to add the information now residing in the E and F registers. Step operation #60, as already noted, may be entered either directly from step operation #59 or after the negative number has been complemented in step operation #63.

Step operation #60 operates to add the magnitudes of the numbers in the E and F registers, using the K1 flip-flop as the carry flip-flop. The K1 flip-flop enters step operation #60 from step operation #59 in a false state so as to indicate a zero carry, as required for ordinary binary addition, while it enters #60 from step operation #63 in a true state so as to provide the initial carry needed to obtain the complement of the negative number.

The logical equations, as shown below word block #60, for the circuitry required to effect the summation of the numbers in the E and F registers can be readily explained by reference to the table of Fig. 57. The first three columns of the table correspond to the inputs to the summing circuit. Each row of the table shows one of the combinations of digital inputs which can exist during a clock pulse period. The contents of columns 370 and 371 are obtained as a result of adding the three digital inputs. The binary digits representing the sum of the digital inputs is indicated in column 370 and a carry digit, if any, is recorded in column 371. The last two columns 372 and 373 of the table are derived by comparing the contents of the K1 flip-flop input column with the contents of the carry column 371. A change from a 0 to a 1 content in these columns is indicated in column 372 by a binary digit 1. Only one such change occurs as noted in the next to the last row of the table. Likewise, a change from a 1 to a 0 content in these columns is indicated by a 1 in column 373. The change in this latter case is present only in the second row of the table.

Shown to the right of the table in Fig. 57, the conditions of the input flip-flops in each row which result in a binary sum digit are notated as logical products. These products are combined by logical sum notations, as shown, to generate the overall sum equation:

$$E_0=(E_2'F_2'K_1+E_2'F_2K_1'+E_2F_2'K_1'+E_2F_2K_1)$$

This equation defines the proposition $E_0$ since the sum is fed into the E register.

The triggering actions of the K1 flip-flop, as indicated by columns 372 and 373, are also indicated by logical equations in Fig. 57. The condition of the input flip-flops E2 and F2, which results in the K1 carry flip-flop changing from a 0 to a 1 state, is identified as the equation $k_1=E_2F_2$ while the condition which results in the K1 carry flip-flop changing from a 1 to a 0 state is identified by the equation ${}_0k_1=E_2'F_2'$.

Returning now to word time block #60, the $E_0$ proposition is comprised of the sum equation already described during the time $O_{0-11}$.

During $P_0O_{12}$, the correct sign of the sum is generated and recorded. The signs of the numbers in the E and F registers were previously set up in the A1 and A2 flip-flops, respectively. If the signs of the numbers are both positive, the product $A_1A_2$ is effective during $P_0O_{12}$ causing a binary digit 1 to be recorded in the corresponding position of the E register. If the signs of the numbers are different, as when the products $A_1'A_2$ or $A_1A_2'$ are effective, then, if the K1 flip-flop is true, evidencing a final carry (Ex. 2 of Fig. 55), it may be concluded that the sum is positive and a binary one is deposited in the sign position of the E register. However, if the K1 flip-flop is false, i.e., no carry results from the addition (Ex. 3 of Fig. 55), the sum is negative and a zero is deposited in the sign position of the E register. The overall expression for generation of the sign is thus:

$$[(A_1'A_2+A_1A_2')K_1+A_1A_2]P_0O_{12}$$

An indication of an overflow, or final carry, if any, is next to be determined and recorded in the $P_1O_{12}$ position of the E register.

It should first be noted that if the signs are alike, a final carry, as indicated by the K1 flip-flop, is deposited in the $P_1O_{12}$ position of the E register.

If the signs are different, it is clear that no "true" carry will occur in the sum. However, it may be possible that a previous carry (an overflow) is associated with the number in the E register. Thus, if the E2 flip-flop is true during $P_1O_{12}$, indicative of such a previous carry, it is deposited into the E register. The overall equation for the carry is thus shown to be equal to:

$$[(A_1A_2+A_1'A_2')K_1+E_2]P_1O_{12}$$

It should be noted that the $E_0$ equation also provides for recirculating information existing in the $(P_2O_{12}+O_{13})$ timing periods of the E recirculating register. Obviously, as noted in the table of Fig. 6*a*, ordinary numbers do not have any useful information in these positions. However, it is often desirable to modify commands by use of the addition routine. This results in obtaining new memory addresses, for example. When this is the case, it is necessary to retain the instruction I section of the word being operated upon, and this is done by the portion of the $E_0$ equation indicated by $E_2(P_2O_{12}+O_{13})$.

Reference will next be made to the triggering equations for the K1 flip-flop. As previously noted to the right of the table of Fig. 57, the K1 flip-flop is triggered into a true state when the product $E_2F_2$ is effective. Accordingly, this product is used to define the true state of the K1 flip-flop during the $O_{0-11}$ time of the summing operation. Similarly, the K1 flip-flop is triggered into a false state during $O_{0-11}$ when the product $E_2'F_2'$ is effective. Thus the K1 flip-flop is controlled to operate as the carry flip-flop during addition.

In addition to acting as a carry flip-flop during $O_{0-11}$, the K1 flip-flop must be set up at the end of the word to determine how the program counter should change. Thus, during $O_{13}$, the K1 flip-flop must be triggered into a true state if the signs of the numbers are alike, as evidenced by products $A_1A_2$ or $A_1'A_2'$ being effective. As seen by Example 1 in Fig. 55, when the signs of the numbers are alike, the addition process has been completed by the carrying out of step operation #60; and setting up the K1 flip-flop in this manner causes the program counter to immediately skip the program count #41, which is the first step operation of the routine which operates to place the results accumulated in register E into the memory address defined by the contents of the $m_3$ section of the G register.

Next to be considered is the manner in which the state of the K1 flip-flop is controlled at the end of the word period when the signs of the numbers are different. As noted in Example 2 of Fig. 55, if a carry occurs as a result of the summation performed during step operation #60, the K1 flip-flop will be left in a true state during $P_2O_{13}$ time. Since the addition process is complete, the K1 flip-flop is thus properly set up to cause the program counter to skip to program count #41 to place the sum in the memory, as above described.

However, if the signs of the numbers are different and if no carry occurs as a result of the summation carried on during $O_{0-11}$ of step operation #60, the K1 flip-flop is left in a false state during $P_2O_{13}$, resulting in the program counter "counting" to step operation #61 which operates to complement the information in the E register before it is ready to be placed in the memory. This is the case typified by Example 3 of Fig. 55.

It should be noted that the K1 flip-flop is always triggered into a true state at the end of the $P_2O_{13}$ time of the word period operation #60 so as to always enter the succeeding step operation, whether it is step operation #61 or #41, in a true state.

If the next step operation performed turns out to be #61, the true state of flip-flop K1 provides the initial carry required to enable the complementation to take place.

Referring to step operation #61, the complementation of the number content of the E register; that is, both the reversing of 0's and 1's and the addition of a 1 is accomplished by equations $E_0=(E_2'K_1'+E_2K_1)O_{0-11}$ and ${}_0k_1=E_2O_{0-11}C$. The operation of these equations is similar to those described in detail in step operation #71 wherein a 1 was added to the control number on the G register. There it was noted that when the contents of the G2 and K1 flip-flops are dissimilar, a digit one is deposited in the G register. Here, when the E2 and K1 flip-flops are similar, a one is deposited in the E register. The difference in the operation is due to the reversing of 1's and 0's in the E register. In a like manner, whereas the K1 flip-flop was rendered false when the G2 flip-flop was false in step operation #71, here the K1 flip-flop is triggered false when the E2 flip-flop is true, as indicated by the equation for ${}_0k_1$.

The K1 flip-flop is always set true at the end of the word period of step operation #61, as shown by equation $k_1=O_{13}C$, so as to cause the program counter to skip to step operation #41 and further to enter therein in a true state.

Referring to the overall flow diagram in Fig. 27, after the addition routine has been completed, the results are placed in the register and section of the memory defined by address $m_3$ in the G register, by means of the routine defined by word time blocks #41 through #44, already described in connection with Fig. 54. The program counter then skips to step operation #4 where the next command to be executed is looked up in accordance with the control number in the G register.

*Subtraction, S*

The subtraction routine in Fig. 56, which will next be described, branches off from step operation #26. This routine is comprised of the step operations already described for the addition routine, but is preceded by the step operation #58.

Subtraction is no more than a reversing of the sign of the subtrahend followed by addition, as shown by the example in Fig. 58. Therefore, step operation #58 operates to accomplish the reversal of the sign of the subtrahend as found in the $P_0O_{12}$ position of the F register. Thus during the $O_{0-11}$ time period, the digits representing the magnitude of the subtrahend in the F register are recirculated by connecting the $F_2$ term of the F2 flip-flop to the $F_0$ output of network 168, but at $P_0O_{12}$ the $F_2'$ term is connected to $F_0$ so as to obtain the desired sign reversal. This is indicated by equation $F_0=F_2O_{0-11}+F_2'P_0O_{12}$.

The information in the E and G registers is merely recirculated during this step operation, as shown by the equations already described.

The subtraction routine then proceeds into the step operation #59 where the information is thus treated exactly as in the addition process. After the result has been obtained, the computer proceeds to place this information in the specified $m_3$ address in the memory, as described in Fig. 54. The computer is then again routed back to look up the next command to be executed, as described in Fig. 47.

*Shift, Sh*

The next operation to be described in connection with Fig. 59 is the shift routine, S*h*, which branches off from instruction test step operation #28.

The contents of the $m_1$ and $m_2$ addresses of the command have previously been placed in the E and F registers, respectively, when the shift routine is entered into. The operation called for is to shift the digital contents of the E register with respect to the initial positions therein, as defined by the P and O counters. The number of digital positions the contents of the E register is to be shifted is determined by the magnitude of the number in the F register. Furthermore, whether the E register contents are to be shifted left or right depends upon the sign of the number in the F register.

The method of operation is such that if the sign of the number in the F register is true, the digits in the E register are shifted left (toward most significant digit) one digital position each time the step operations #46 and #47 are cycled. As a result of each cyclical operation, a 1 is subtracted from the number in the F register. When the number in the F register is reduced to zero, the program counter is caused to skip to the routine commencing with program count #41 which operates to place the contents of the E register into the register of the memory defined by address defined at $m_3$ in the G register.

First to be noted in describing step operation #46 is that the E and G registers are recirculated. Next it should be recalled from observing step operation #28 that the K1 flip-flop enters into word time block #46 of Fig. 59 in a true state. In this way, the contents of the K1 flip-flop represents the one to be subtracted from the number in the F register.

The equations which describe how this one is subtracted are as follows:

$$F_0=(F_2'K_1+F_2K_1')O_{0-11} \text{ and}$$

$$_0k_1=F_2O_{0-11}$$

These equations are similar to those employed for adding a one to the control number, as explained in step operation #7 of Fig. 46, except that here the K1 flip-flop is rendered false following the clock period when a digit 1 is observed in the F register. As a result, a unit is subtracted from the number in the F register. This subtraction process takes place during $O_{0-11}$. The contents of the F register are then recirculated during $O_{12-13}$ which is indicated by the product $F_2O'_{0-11}$ in the $F_0$ equation.

The sign of the number in the F register, as found in position $P_0O_{12}$, which is needed to determine whether the contents of the E register are to be shifted right or left is set up in the A2 flip-flop by the equations: $a_2=F_2P_0O_{12}$ and $_0a_2=F_2'P_0O_{12}$.

The A1 flip-flop is set false during $O_0$. The reason for this is that the A1 flip-flop is inserted in the E recirculating register to provide the extra delay required to shift the digits left. Rendering the A1 flip-flop initially zero causes a digit 0 to be deposited in the $P_0O_0$ position of the E register each time the digits therein are shifted left during the step operation #47 to be next described.

Step operation #47 only alters information in the E register, the contents of the F and G registers being merely recirculated in accord with the equations shown.

Assuming, for example, first that the A2 flip-flop was previously set true in step operation #46, the operation will now be described of how the digits in the E register are shifted left one digital position, using flip-flop A1, during each cycle of #47.

First to be noted is that the A1 flip-flop is caused to follow the E2 flip-flop by equations: $a_1=E_2O_{0-11}$ and $_0a_1=E_2'O_{0-11}$.

Next, as indicated by the portions of the $E_0$ equations $A_1A_2(P_0O_0-P_1O_{11})$ and $A_1A_2(P_2O_{11})$, the $E_0$ output is equal to the A1 flip-flop output only if the A2 flip-flop is true during the time periods specified. The A1 flip-flop contains the digit that was in the $P_2O_{11}$ pulse position of the E register; that is, digit that was shifted off the end of the period $O_{0-11}$. This shifted off digit is recorded in the overflow position of the E register as indicated by the $A_1A_2P_1O_{12}$ of the $E_0$ equation.

Assuming next that the A2 flip-flop is false coming into step operation #46, the operation will now be described of how the digits in the E register are shifted right, i.e., toward the least significant digit, each time the shift operation #47 is cycled. This is accomplished by the portion of the $E_0$ equation notated as:

$$E_0=E_1A_2'(P_0O_0-P_1O_{11})$$

As a result of this shifting, the $P_2O_{11}$ position of the E register is filled with a digit 0, since the above equation is not satisfied.

The sign of the number is recirculated without change during the shifting operation by the portion of the $E_0$ equation indicated by $E_2P_0O_{12}$.

The K1 flip-flop is set true at $O_0$ each time word block #47 is operated so as to cause the program counter to return back to count #46 after each shifting operation.

Thus, after the shift operation has been recycled a sufficient number of times to reduce the number in the F register to 0, the K1 flip-flop is left true at the end of step operation #46 and the program counter skips to count #41 so as to enter the routine, as described in Fig. 54, for placing the contents of the E register into the register of the memory defined by the address defined in the $m_3$ section of the G register. Having done this, the computer then returns to the routine previously described in Fig. 47 which operates to locate a new command in accordance with the control number.

*Put away control number and $m_3$*

Referring back momentarily to the second series of instruction tests in Fig. 51, if the four place binary instruction code of a command has not as yet reached the value 1111 at the end of the step operation #28, it is clear from the table of instructions in Fig. 6*b* that the remaining instructions to be carried out are either multiplication, M, or division, D. In order to perform these latter two arithmetic instructions, it is necessary to carry out the following routine unique to these two instructions.

This routine, as shown in Fig. 60, operates to transfer the data contained in the $m_2$ and $m_3$ sections of the G register and which sections contain the control number and $m_3$ address of the command, respectively, into that address in the main memory designated by arc 0 and *Ch*0. (See reference numeral 151 in Fig. 5.) This is necessary because all three of the recirculating registers E, F, and G are needed to perform the multiplication and division operations to be described in the ensuing description.

In this routine the channel selector flip-flops A1 to A5 are set to define the arc address *Ch*16 during step operation #29, similarly to that previously described during other search routines, such as step operation #4 of Fig. 47, for example. However, for this routine the approach employed during step operation #30 for locating the desired arc on the main memory is a little different. Previously, the arc to be selected was always defined by one of the $m_1{}^a$, $m_2{}^a$, or $m_3{}^a$ sections of the G register, depending on the address effective. In the present instance, advantage is taken of the fact that the arc address of arc $O_0$ is nothing more than a series of zeros. Thus the test for the 0 arc is made by connecting the $k_1$ proposition to the M1 flip-flop during timing period $O_{4-5}$. The K1 flip-flop is initially false coming into the step operation #30. The K1 flip-flop is then set true whenever the M1 flip-flop senses a one in the arc address *Ch*16 during the $O_{4-5}$ of a word period. This causes the content of program counter 118 to remain unchanged and the cycle repeats until the K1 flip-flop remains false during the $P_2O_{13}$ pulse period of a word. A continual series of zeros in the M1 flip-flop during the period $O_{4-5}$ will bring this result about.

During the next step operation #31, the channel selector flip-flops A1 to A5 are then arbitrarily set to *Ch*0. Since these flip-flops were previously set to *Ch*16 which resulted in a one in the A5 flip-flop and zeros in the remaining flip-flops, it is only necessary to set the A5 flip-flop to a zero state, as indicated by equation $_0a_5=O_0C$, in order to establish communication with *Ch*0. The E, F, and G channels are obviously recirculated during this series of step operations since they each contain useful information.

During step operation #32, the contents of the G register is recorded into the main memory address so selected by the equations $R_1=G_2(P_2O_{13})'$ and $R_2=G_2'+P_2O_{13}$. The first of these record equations is interpreted as meaning that all the ones in the G register are recorded as they occur but that the $R_1$ output is cut off during $P_2O_{13}$ so as to ensure that a one is not recorded during this period. The second of these equations is interpreted to mean that all the zeros in the G register are recorded as they occur but that at $P_2O_{13}$ the $R_2$ output will necessarily be zero.

Included in Fig. 60 is a final test operation #33 which tests the instruction binary code to determine whether multiplication or division is to be carried out on the numbers located in the E and F registers. This word block is identical to the instruction tests as found in Fig. 51, for example. Thus, if the binary instruction code is all ones, then the multiplication sequence, M, branching vertically off of the step operation #33 will be followed. If the binary instruction code includes a zero digit, then the K1 flip-flop is triggered false and the division sequence, D, horizontally branching off of step operation #33 will be followed.

*Multiplication, M*

The next routine to be described is the multiplication process shown in Fig. 61.

Reference will first be made to Fig. 62 which shows an example of how the two binary numbers .1101 and .1011 are multiplied in longhand followed by an example of the process by which the computer performs the same multiplicaiton.

The longhand method of performing binary multiplication consists of examining the multiplier digits in succession, starting with the least significant and adding the multiplicand or zero into the partial product in the proper column position according to whether the corresponding multiplier digit is one or zero. This multiplication process requires $n$ addition cycles where $n$ is the number of binary places in the multiplier.

Multiplication gives a result having more significant figures than the original numbers entering into these processes. Since it is ordinarily desired in most computational processes to maintain the same number of significant digits in the product as in the original number, a round off procedure is followed in order to avoid the bias which would result if the remaining digits were simply dropped. The round off procedure followed in the present computer consists of adding the first of these remaining digits to the number representing this product. Thus note in the example of Fig. 62 how the digit 1 bearing the reference numeral 377 is added to the product .1000 to obtain the rounded off product .1001.

Reference will next be made broadly to the procedure by which the present computer multiplies the same two binary numbers. The multiplicand is already set up in the F register and the multiplier which was placed in the E register when first picked up from the memory is transferred to the G register.

The multiplication process is carried out by a cyclical process which generally consists of the following: The least significant digit of the multiplier is examined. If this multiplier digit is a 1, as indicated by reference numeral 378, the multiplicand is added into the contents of the E register and the sum placed in the E register which accumulates the partial products. If this multiplier digit is a 0, as indicated by reference numeral 379, a zero is added to the contents of the E register.

Simultaneously with the carrying out of the addition process, the multiplier in the G register and the partial product in the E register are shifted one binary digital position toward the right; that is, toward their least significant digital positions. By this means, the new multiplier digit can always be observed in the same position of the G register. Furthermore, the old multiplier digit, which is of no further interest, is automatically discarded.

The above cycle of events is repeated a number of times equal to the number of digits in the multiplier which in the present computer is equivalent to 36.

It should be noted that as a result of each shifting of the partial product in the E register to the right, the least significant digit of the partial product is also discarded. During the last shifting operation, however, instead of discarding this least significant digit of the partial product, it is temporarily stored and added to the product in the E register, thus accomplishing the round-off operation.

The exact details of the operation breakdown and the logical equations of the circuitry therefor will be now presented by reference to Fig. 61. First it should be recalled that the contents of the G register was previously transferred, as shown in Fig. 60, into the register of the main memory having arc address 0 and channel address C*h*0. This is necessary because all three recirculating registers are needed to carry out the multiplication process.

The step operation #49 consists of recirculating the multiplicand in the F register as symbolically noted by equation $F_0=F_2$.

The multiplier in the E register is transferred to the G register during $O_{0-11}$ so as to enable the E register to be used for accumulating the partial products. This is indicated by the portion of the $G_0$ equation, $E_2O_{0-11}$.

In order to enable the adding cycle to be carried out the proper number of times, the following method is provided. A cycle counting number equivalent to a decimal 3 is placed in the I section of the G register during step operation #49. The following step operation #50 then operates to decrease this number by one unit each time it is cycled. When this number has been reduced to 0, as evidenced during the fourth cycle by the K1 flip-flop remaining in a false state, the program counter counts to step operation #51. As a result of the previous subtraction, the content of the I section of the G register is now all 1's. Thus, utilizing the same circuitry, a unit is subtracted from this number once each cycle until it again is reduced to 0. It requires 32 cycles for this latter reduction to zero. Thus the 4 cycles of step operation #50, together with the 32 cycles of step operation #51, determine the 36 cycles of the multiplication process.

The cycle counting binary number equivalent to the decimal 3 is obtained by placing binary 1's in the $P_0O_{12}$ and $P_1O_{12}$ positions of the G register during step operation #49, as noted by the portion of the $G_0$ equation indicated as $P_0O_{12}+P_1O_{12}$. The circuits used for reducing this number to 0 during step operation #50 are defined by equations:

$$G_0=(G_2K_1+G_2'K_1')O_{12-13}$$

and $$k_1=G_2(P_0O_{12}-P_1O_{13})C$$

This process is similar to that by which the cycle counting number in the F register is reduced by one unit, as previously shown and described in Fig. 59 for the shift operation. It should be noted, however, that the opposite output of the K1 flip-flop, $K_1'$, represents the unit to be subtracted in the present subtraction routine. During the fourth cycle of step operation #50, although the subtraction process is carried out, the K1 flip-flop remains false since the above $k_1$ equation is not effective; that is, the G2 flip-flop is always false during $P_0O_{12}-P_1O_{13}$ consequently the $k_1$ equation is never true.

The program counter then counts to step operation #51 and the same circuits operate to again reduce the cycle counting number to zero.

Returning back to step operation #49, it is next to be noted that the A4 flip-flop is set false during the initial period of the word by equation ${}_0a_4=O_0C$. This flip-flop is then set true if the sign of the multiplicand in the F register and the multiplier in the E register are the same; that is, either both plus or both minus. If the signs of the above numbers are different, the A4 flip-flop remains false. Thus the A4 flip-flop if set true indicates the sign of the product is plus and if left false indicates the sign of the product is minus. This action is accomplished by equation:

$$a_4=(E_2F_2+E_2'F_2')P_0O_{12}C$$

The sign of the product as set up in the A4 flip-flop is stored until the product has been obtained by the successive addition process noted, after which it is deposited in the $P_0O_{12}$ position of the E register in the subsequent step operation #52.

Because of the method employed, whereby shifting of the partial product and multiplier is carried on simultaneously with the addition of the multiplicand to the partial product, the least significant digit of the multiplier in the G register is placed in the A1 flip-flop at the end of the word period prior to the word period during which the multiplicand is added to the partial product in accordance with this multiplier digit. This action is accomplished by equations $a_1=G_1P_2O_{13}C$ and $_0a_1=G_1'P_2O_{13}C$ which are associated with all three step operations #49, #50, and #51. Note that the digit located in $G_1P_2O_{13}$ during the end of a word period is the same digit that appears in $G_2P_0O_0$ during the following word period. This digit is thus the least significant digit of the multiplier which is the digit of interest for controlling the addition.

As will be explained shortly, the A2 flip-flop operates as the carry flip-flop for the addition process during multiplication; thus it is rendered false during step operation #49 so as to ensure that an initial carry is not present.

The step operation #49 is carried out only once, after which the program counter is caused to count to #50 since the K1 flip-flop remains false.

Step operation #50 and #51 are the same. They are repeated in order to accommodate the method of counting the addition cycles previously described.

The A1 flip-flop contains the least significant digit of the multiplier as it enters each of the adding cycle periods. If the A1 flip-flop is in a true state, the multiplicand in register F is added to the partial product in register E. The terms $(E_1F_2A_2+E_1'F_2'A_2+E_1F_2'A_2'+E_1'F_2A_2')$ of the $E_0$ equation define all the combinations of the inputs, including the carry from the previous stage as contained in flip-flop A2. The equations for the carry flip-flop are noted as $a_2=E_1F_2O_{0-11}C$ and $_0a_2=E_1'F_2'O_{0-11}C$. The derivation of these terms will be clear by noting that they are similar to the "sum" and "carry" terms derived from the table of Fig. 57. Note that instead of observing the $E_2$ term of the E register the $E_1$ term is observed. This is done to cause the E register to be shifted one binary digit to the right simultaneously with the addition process.

The timing period of the portion of the $E_0$ equation which represents the sum equation is shown to include the timing period $(P_0O_0-P_0O_{12})$. Since the E and F registers were previously cleared in the positions $P_0O_{12}$, it should be understood that this digital position of the F register will always be zero, while this position of the E register will contain an overflow digit of the partial product.

Whenever the A1 flip-flop is false, i.e., its output $A_1'$ is high in potential, then 0 is added to the partial product in register E. This effect, together with the shifting of the partial product to the right, is simply accomplished by the portion of the $E_0$ equation indicated as $$E_1A_1'(P_0O_0-P_0O_{12})$$

The shifting of the multiplier in the G register one binary position to the right during each addition process is acomplished by the portion of the $G_0$ equation indicated as $G_1O_{0-11}$.

As noted, the K1 flip-flop is rendered false at the end of each addition cycle by equation $_0k_1=P_2O_{13}C$ so as to enter the succeeding addition cycle in a false state. The state of the cycle counting number in the G register then determines whether the K1 flip-flop will be triggered into a true state so as to repeat the addition cycle, or whether it will remain in a false state, thus causing the program counter to count to the next step operation.

The contents of the F register, which represents the multiplicand, are merely recirculated by equation $F_0=F_2$ during the cyclical step operations #50 and #51, since the multiplicand does not get shifted like the other information.

Having completed 36 addition cycles, the program counter counts to step operation #52 where an additional shift operation takes place. This shift results in placing the product in the $P_1O_0-P_0O_{12}$ positions of the E register into the $P_0O_0-P_2O_{11}$ positions of the E register, the positions normally occupied by a number in a register. In addition, the sign of the product which is being stored in the A4 flip-flop is recorded into the $P_0O_{12}$ position of the E register. This action is accomplished by equation $E_0=E_1O_{0-11}+A_4P_0O_{12}$.

One other operation is provided for in step operation #52. In order to round off the product, the least significant digit of the product in the E register is stored in the A2 flip-flop, as indicated by equations $a_2=E_2P_0O_0C$ and $_0a_2=E_2'P_0O_0C$.

The K1 flip-flop remains false in passing through word block #52 so that the program counter is caused to count into step operation #53. This operation provides for adding the contents of the A2 flip-flop to the product as needed for round off. This is logically represented by equations $E_0=(E_2A_2'+E_2'A_2)O_{0-11}+E_2O_{12-13}$ and $$_0a_2=E_2'C$$

These equations state that if the A2 flip-flop (storing round off digit) is false, the product in the E register is merely recirculated as called for by $E_0=E_2A_2'O_{0-11}$. On the other hand, if the A2 flip-flop is true, the addition of the unit is accomplished by $E_0=(E_2A_2'+E_2'A_2)O_{0-11}$ and $_0a_2=E_2'C$. These equations are similar to those provided for adding a one to the control number as previously described in step operation #71 of Fig. 46.

Having completed the multiplication routine, as a result of the K1 flip-flop being triggered into a true state during step operation #53, the program counter skips so as to sequence the computer into the routine which results in returning the control number and the $m_3$ address from the (*Ch*0-arc 0) register of the main memory to the G register.

*Return control number and $m_3$*

The routine to be now described by reference to Fig. 63 operates to return the control number and $m_3$ address to the G register from which it was previously removed so as to be able to use the G register for operation purposes during the multiplication, M, and division, D, branch sequences.

This routine is comprised of the 4 word time blocks #37 through #40, inclusive, shown in Fig. 63. The operation of the first three word blocks #37, #38, and #39 is identical to the word time blocks #29, #30, and #31, respectively, shown in Fig. 60. The only differences between the two occur in the last word block of each routine. In the sequence described in Fig. 60, the control number in the G register is put away in address (*Ch*0-arc 0) of the main memory, and in the present sequence the contents of address (*Ch*0-arc 0) in the memory are returned to the G register.

The part of the process of the present routine which is similar to the previous routine comprises setting up the code for the arc address channel *Ch*16 in the A1–5 flip-flops during #37. The M1 flip-flop is then connected to the $k_1$ proposition so as to render the K1 flip-flop true during each word period that a digit 1 appears in the M1 flip-flop during $O_{4-5}$. Obviously, when the arc 0 is read, the M1 flip-flop reads a series of 0's and the K1 flip-flop is left false at the end of a word causing the program counter to count to step operation #39. The channel selector is then set to channel $Ch0$ during #39. This results in connecting the desired memory register by way of flip-flop M1 to the arithmetic diode network 168.

The present routine then proceeds into step operation #40 wherein the M1 flip-flop is read into the G register as indicated by equation $G_0=M_1$. In addition, the product, which has not as yet been deposited into the memory, is recirculated in the E register by equation $E_0=E_2$.

The program counter next counts to step operation #41 which is the first of the series of step operations which function to place the results of the computation into the register of the main memory defined by address $m_3$. This routine was previously described and shown in Fig. 54 and will not be further discussed. Having accomplished this, the operation returns to the look up command sequence again (Fig. 47) so as to look up the next command in accordance with the new control number.

*Division, D*

The process by which the computer performs division will next be explained by reference to Fig. 64.

As previousy shown in Fig. 60, if the K1 flip-flop is still false after the test carried out on the instruction in step operation #33, the program counter is caused to count to #34 which is the first step operation of the division routine.

The division process employed in the present computer is known as the non-restore method. When using the binary system, there are only two values (plus one, minus one) to consider, and only one operation (addition or subtraction, as the case may be) is necessary for each of the quotient digits. Thus, as in the mutiplication process previously described, the main part of the division process can be reduced to a cyclical step operation wherein additions (or subtractions) are carried on simultaneously with shifts.

In order to clearly describe the process of binary division as carried out by the machine, an example will first be referred to in Fig. 65 showing how binary division is carried out by longhand. This will be followed by an example showing how the computer carries out the same calculation. The example shown illustrates how the binary equivalent of decimal $^{11}/_{16}$, which is .1011, is divided by the binary equivalent of decimal $^{13}/_{16}$, which is .1101.

As shown, the divisor .1101 is placed outside the long division sign and the dividend .1011 is placed inside. By a series of successive subtractions, a quotient is formed above the long division sign. As a final operation, this quotient is rounded off by adding the binary digit, generated beyond the number of significant digits provided for, into the quotient.

Prior to the branching of the computer sequence into the division routine, the dividend was read from the proper $m_1$ address of the memory and transferred into the E register, while the divisor was picked up from the $m_2$ address of the memory and placed in the F register.

Before describing the logical circuits which define the detailed circuitry of the division process, the functions of the flip-flops in the arithmetic unit 112 during this process will be introduced so as to clarify later reference to them.

The A1 flip-flop is used for storing information which decides whether the divisor is to be added to or subtracted from the dividend (or partial remainder as it is referred to after the first subtraction). If the A1 flip-flop is set true, subtraction is called for; and if the A1 flip-flop is set false, addition is called for.

The A2 flip-flop functions as the carry flip-flop during the cyclical adding (or subtracting) process.

The A3 flip-flop is introduced into the G recirculating register loop to shift the quotient digits left during each addition cycle.

The A4 flip-flop is introduced in the E recirculating register loop to shift the dividend (partial remainder) digits left during each addition cycle.

The A5 flip-flop functions to store the sign of the quotient.

The K1 flip-flop is initially used to aid in determining whether an overflow digit will result from the division process, but its main function is to determine the action of the program counter so as to sequence the division process through its routine.

Referring to Fig. 64, the processes performed during step period #34 are those which determine the sign of the quotient, the overflow digit associated with the quotient, and those operations needed to set up the storage flip-flops in the arithmetic unit 112 so as to perform the main division routine carried out by step operation #35. The final step operation #36 is then used for rounding off the quotient and transferring the result into the E register preparatory to its being placed in the main memory register defined by address $m_3$.

Referring to step operation #34, the first operation to be described in detail is the test by which the magnitude of the two numbers in the E and F registers are compared so as to determine whether the quotient subsequently to be derived is to have an overflow digit associated with it.

The K1 flip-flop is used for this test. If the magnitude of the dividend in the E register is greater than or equal to the magnitude of the divisor in the F register, there will be an overflow associated with the subsequently derived quotient number, in which case the K1 flip-flop is set into a false state at the end of $O_{11}$. Whatever the state of the K1 flip-flop at the end of $O_{11}$, it is reversed at $P_0O_{12}$. The overflow so indicated is then deposited into the $P_1O_{12}$ position of the E register. As will be noted later, the information in this position of the E register is retained so as to represent the overflow condition of the quotient at the end of the division rountine.

The logical equations which cause the K1 flip-flop to operate as above described are:

$$k_1=[E_2'O_{0-11}+K_1'O_{12}]C \text{ and}$$
$$_0k_1=[E_2F_2'O_{0-11}K_1O_{12}+O_{13}]C$$

The additional term $O_{13}$ is the $_0k_1$ equation indicates that the K1 flip-flop is always false at the end of step operation #34, thus causing the program counter to counter to #35.

The logical equation for the E register during step operation #34 is $E_0=E_1O_{0-11}(P_2O_{11})'+K_1P_1O_{12}$. This indicates that the digits in the E register are shifted right one digital position by observing the content of flip-flop E1 during the portion of the word period defined by $O_{0-11}(P_2O_{11})'$. This is interpreted as meaning that the information in the E1 flip-flop is recorded back into the E register during $O_{0-11}$, except for the $P_2O_{11}$ pulse time. As a result, a zero pulse is deposited in $P_2O_{11}$ of the E register in place of the sign digit which, as noted later, is shifted into the A5 flip-flop. This action is necessary because the $P_2O_{11}$ position is considered a part of the magnitude of the numbers in the later step operations. The product $K_1P_1O_{12}$ in the $E_0$ equation places the overflow digit previously set up in the K1 flip-flop into the $P_1O_{12}$ position of the E register.

The F register containing the divisor is recirculated during step operation #34 as indicated by equation $$F_0=F_2O_{0-11}$$

The sign of the quotient is set up in the A5 flip-flop. Thus the A5 flip-flop is set false at $O_{11}$ pulse time prior to sensing the sign position by equation $_0a_5=O_{11}C$; and, if the sign of the quotient is positive, it is set true at the end of $P_0O_{12}$ pulse time in accord with equation $$a_5=(E_2F_2+E_2'F_2')P_0O_{12}C$$

The A1 flip-flop is initially set true according to equation $a_1=\#34C$. This indicates that the first operation to take place is to subtract the divisor from the dividend.

This results from the particular non-restore-to-zero method of division used in the present computer which requires that subtraction be the first operation.

In order to enable the subtraction to be carried out, an inital carry must exist to obtain the necessary complement of the divisor. The A2 flip-flop is set true by equation $a_2=\#34C$ to indicate the initial carry.

As a result of shifting the digits of the E register right, as above described, there is no room in this register for storing its least significant digit. Since this digit is needed, and since information is to be shifted left in the E register by use of the A4 flip-flop during the following step operation #35, this digit is retained at this time by storing it in the A4 flip-flop. This action is accomplished by equations $a_4=E_2P_0O_0C$ and ${}_0a_4=E_2'P_0O_0C$.

In order to control the number of addition cycles to be carried out by the division routine in step operation #35, a cycle counting, i.e., a marker pulse (digit 1), is placed in the $P_0O_1$ position of the G register by equation $G_0=P_0O_1$. This cycle counting pulse is caused to progress to the left in the G register one digital position each time step operation #35 recycles. When this cycle counting pulse is observed in $P_1O_{13}$ of the G register by the K1 flip-flop in step operation #35, it causes the K1 flip-flop to become false, thus ending the cycling action of the division process.

The cycling operation of the division routine will now be described in detail by refreence to step operation #35. As the A1 flip-flop is in a true state coming into this step operation, the initial operation performed is substraction of the divisor, as found in the F register, from the dividend, as found in the E register, together with a shift of the E register one digit to the left using the A4 flip-flop. The A4 flip-flop is introduced into the E register line by the equations $a_4=E_2O_{13}'C$ and ${}_0a_4=E_2'O_{13}'C$ which indicate that the shift is not carried out during the $O_{13}$ pulse positions of the word.

The subtraction operation is carried out and the partial remainder placed in the E register by the circuitry defined by the summation equation, $$E_0=\{A_1[F_2'A_4A_2+F_2A_4'A_2'+F_2A_4A_2'+F_2A_4'A_2]\}(O_{0-11}+P_0O_{12})$$

and the carry equations, $a_2=A_4F_2'A_1(O_{0-11}+P_0O_{12})C$ and ${}_0a_2=A_4'F_2A_1(O_{0-11}+P_0O_{12})C$. These equations are similar to the sum and carry equations used for binary addition as obtained from the table of Fig. 57. Note here that the flip-flop F2, which contains digits of the divisor, has its term $F_2'$ substituted for $F_2$. This causes the 1 and 0 digits of the divisor to be reversed, as needed for complementation.

As will be noted in the longhand illustration of binary division in Fig. 65, each time that the divisor is subtracted it is shifted right one binary digit position, and a digit is placed in the quotient above the long division sign one digit position to the right of the previous quotient digit.

The computer of the present invention accomplishes this same result by use of the A4 flip-flop. This results in shifting the contents of the E register one digit position to the left and depositing a digit zero in the $P_0O_0$ position of the E register. The A4 flip-flop is set false during the period $O_{13}$ so that this new least significant digit in the E register will always be zero. In addition, the G register containing the quotient is shifted one digit position to the left by introducing the A3 flip-flop into the G recirculation line according to the equations $a_3=G_2C$, ${}_0a_3=G_2'C$, and $G_0=A_3(P_0O_0)'$. As will be made clear later, this action enables the new digit of the quotient which is generated each cycle of step operation #35 to be deposited in the same digital position ($P_0O_0$) of the G register.

The A2 flip-flop at $O_{13}$ time contains the carry digit resulting from the addition (or subtraction) carried out during step operation #35. As shown in the illustration of Fig. 65, this carry digit represents the digit of the quotient. In order to make this digit available during $P_0O_0$ of the next cycling step operation #35, the digit is transferred into the A1 flip-flop. The A1 flip-flop is set false at $O_{12}$ of each word period by equation ${}_0a_1=O_{12}C$. During $O_{13}$ of each word period the A1 flip-flop is set true if the A2 flip-flop is true, i.e., if a carry has been generated as a result of the summation process.

The contents of the A1 flip-flop carrying the quotient digit are then placed into the G register during the succeeding cycling action according to the equation $G_0=A_1P_0O_0$.

The K1 flip-flop is set true during $O_0$ of each repetition of step operation #35, in accordance with the operation of the equation $k_1=O_0C$ and is set false at $P_1O_{13}$ by the operation of equation ${}_0k_1=G_2P_1O_{13}C$. This means that the latter equation is only effective when the cycle counting pulse originally placed in the $P_0O_1$ position of the G register has been shifted so that it is in $P_1O_{13}$ of the G register. This happens after the step operation has recycled 38 times. Thus, when this occurs, the computation is completed and the program counter counts 1, advancing the operation to step operation #36.

The carry found in the A2 flip-flop corresponds to the quotient digit, and in addition it also indicates the decision as to whether the divisor is to be added or subtracted into the partial product during the next cycling of step operation #35. Thus the A1 flip-flop, which stores this carry at the beginning of a word period, must be examined. In case the A1 flip-flop is false, the divisor is added without being complemented to the partial remainder. The second cycle of the addition cycle shown in the illustration is such an adding cycle.

The equations which enable this addition to take place include the summation equation, $$\{A_1'[F_2A_4A_2+F_2A_4'A_2'+F_2'A_4A_2'+F_2'A_4'A_2]\}(O_{0-11}+P_0O_{12})$$

and the carry equations, $$a_2=A_4F_2A_1'(O_{0-11}+P_0O_{12})C \text{ and}$$
$${}_0a_2=A_4'F_2'A_1'(O_{0-11}+P_0O_{12})C$$

These equations follow directly, by analogy, the equations derived from the table of Fig. 57.

It is now apparent that the content of the A2 flip-flop represents many different types of information. First, it represents the decision as to whether the divisor should be added to or subtracted from the partial remainder. Thus the A1 flip-flop is set in accordance with the A2 flip-flop since the latter decides this matter. Secondly, it represents a digit of the quotient and thus the content of the A1 flip-flop is deposited in the $P_0O_0$ position of the G register. Thirdly, when the divisor is to be subtracted during the next cycle operation, the A2 flip-flop, being "true," is already in the proper state so that it can serve as the initial carry for the complementation; and when the divisor is to be added during the next cycle, the A2 flip-flop, being "false," is set so that the initial carry into the next cycling action is zero, as is necessary.

Having completed the division computation routine in step operation #35, after recycling 38 times, the cycle counting pulse causes the program counter to count to #36.

This step operation functions to round off the quotient. The round off is accomplished by adding the carry in the A2 flip-flop to the contents of the G register during $O_{0-11}$ by the operation of equations:

$$E_0=(G_2A_2'+G_2'A_2)O_{0-11} \text{ and}$$
$${}_0a_2=G_2'O_{0-11}C$$

The action of these equations is similar to that already described for rounding off the product in the multiplication process, as shown in word block #53 of Fig. 61.

Note that the sum obtained is placed in the E register which results in transferring the quotient during the round off procedure from the G to the E register. This step operation also serves to place the sign of the quotient as previously stored in the A5 flip-flop into its proper position ($P_0O_{12}$) of the E register by equation $E_0=A_5P_0O_{12}$, and the remainder of the E register is recirculated according to the equation $E_0=E_2O'_{0-11}(P_0O_{12})'$.

The K1 flip-flop remains false in passing through word time block #36 which causes the program counter to count 1 and advance to step operation #37.

As noted in the overall flow diagram of Fig. 27, the computer now functions to return the control number and address $m_3$ to the G register, as previously described in detail in connection with Fig. 63. The computer is then sequenced according to Fig. 54 to place the results of the computation, in this case the quotient, into the register of the memory whose address is contained in the $m_3$ section of the instruction.

Having carried out the division instruction, D, the computer then returns to step operation #4 where it proceeds to carry out the step operations previously described in Fig. 47 for looking up a new command.

*Read-out*

Referring to Fig. 66, the flow diagram of the print or read-out branch sequences for the P1, P2, P3, and P4 instructions will next be shown and described. As previously noted for the flow diagram of the main sequence in Fig. 27, these read-out instructions are tested for in word blocks #10, #11, #12, and #13, respectively.

The information found in the G register prior to entering any of these read-out routines is comprised of the contents of the four sections I, $m_1$, $m_2$, and $m_3$, as shown in Fig. 3. The I section contains the code defining one of the four read-out instructions P1 to P4, inclusive, as shown in Fig. 6*b*; the $m_1$ section contains the address of the first word to be read out; the $m_2$ section contains the control number, which is the address of the next command to be executed; and the $m_3$ section contains a number $\Delta m$ whose magnitude represents the difference between the first and the last register addresses which are to be read out in numerical order during the execution of the command.

The four read-out instructions in the computer define four combinations of two binary choices. The first of these choices is concerned with whether information is to be read out from the computer onto the typewriter 130 or the tape 134 (see Fig. 1), and the second choice is concerned with whether a word only or a word along with its address is to be read out. Since the performance of the four read-out instructions is similar in many respects, the system of the present invention as shown in the flow diagram of Fig. 66 provides for sharing certain routines common to all the instructions.

As aforementioned in connection with Fig. 27, after the computer has once entered one of the branches extending down from the main sequence of the flow diagram, the instruction code information in section I of the command is not retained in the present machine since the course to be followed is built into the circuits. However, when carrying out any of the read-out instructions, it is necessary at all times to remember which of them is being performed in order to control the program counter 118 so as to route the operation through the proper word blocks after performing the common operations shared by them in the flow diagram. To this end, a pair of binary code digits characteristic of the read-out instruction to be performed is inserted in the $P_1O_3$ and $P_2O_3$ positions of the G register as one of the initial step operations of each read-out branch. It should be noted that although the $O_{0-3}$ octal periods of the G register are said to contain the $m_3$ address of the command, the $P_1O_3$ and $P_2O_3$ pulse positions of this portion of the G register are not in fact required for storing the $m_3$ address. This will be made clear by reference to Fig. 3*a*.

The pairs of code digits used to individually characterize each of the read-out instructions during the read-out operation are presented in the table of Fig. 67. Of these pairs of code digits, the $P_1O_3$ pulse position of the G register contains the code digit which represents the binary choice as to how much information is to be read out. Accordingly, a 1 in the $P_1O_3$ pulse position of the G register indicates that both an address and its associated word are to be read out, thus characterizing read-out instructions P1 and P2, while a 0 in the $P_1O_3$ pulse position indicates that the word only is to be read out, thus characterizing read-out instructions P3 and P4.

As for the $P_2O_3$ pulse position of the G register, it contains the code digit that represents the binary choice as to which read-out medium is to be used. A 1 in this position indicates that the information to be read out is to be recorded onto the magnetic tape and thus is associtaed with read-out instructions P1 and P3. A 0 in this position, on the other hand, signifies that the information is to be typed out on the electric typewriter as indicated by instructions P2 and P4.

Thus in Fig. 66, the P1, P2, P3, and P4 branches each include, as part of their preliminary step operations, the word time blocks #75, #139, #137, and #77, respectively, bearing the legend "insert code." These word blocks function to set up and enter into the $P_1O_3$ and $P_2O_3$ positions in the G register the code digits for the read-out branches as above described.

In addition to inserting into the G register the code digits significant of each of the read-out instructions to be performed, provision is also made at the beginning of branches P1 and P3, which operate to record information onto the tape, for starting the tape drive mechanism and delaying the subsequent operations for a period of approximately 7 seconds so as to enable the tape to accelerate to a steady speed before any information is recorded thereon.

Thus, referring to Fig. 66, note that each of the tape read-out branches P1 and P3 has a respective one of initial step operations #74 and #136, labelled "start tape." Referring momentarily to Fig. 68, there circuits show that any time either of the program counter outputs #74 and #136 is energized, a signal is generated on output 390 of a sum diode network 391 which, after being amplified in tube 392, is used for initiating the tape drive circuit (not shown).

To provide the delay required at this time to bring the tape drive from a dead stop up to full speed, a binary number is set up in the E register as an additional initial step operation performed during word time blocks #74 and #136. The previously mentioned word time blocks #75 and #137, which follow respective ones of these initial word time blocks, then provide for rendering effective further circuitry whereby a one is subtracted from this binary number. Thus each time word block #75 or #137 is recycled, this number is reduced by one unit. When the number has been reduced in this way to zero, the program counter is changed thus causing the operation to continue on through the sequence shown for reading out the information.

Since only the branch instructions P1 and P2 operate to read out information representing an address, these instructions share the step operations in the first part of the read-out flow diagram to be described. As seen on the left of Fig. 66, after the tape drive has been initiated and the code digits inserted in the P1 branch, or the code digits inserted in the P2 branch, the routes of these two branches merge into a common step operation #140 wherein three marker pulses are inserted in three consecutive binary positions comprising the $O_{11}$ octal period of the F register. These marker pulses are used for defining the $O_{11}$ octal period of the G register which contains the first octal digit of the address to be read out. As will be made clear, the read-out routines provide for reading out only one octal digit at a time as defined by the location of these marker pulses in the word period.

Proceeding on in the flow diagram of Fig. 66, after setting up the marker pulses, the next step operation #141 provides for testing the code digit set up in the $P_2O_3$ position of the G register so as to re-establish, i.e., inform the program counter as to whether the P1 or P2 instruction is being carried out. This is important because two paths lead from step operation #141. The horizontal path leading to word time block #142 is effective when the P2 instruction is called for, i.e., information representing an address is to be typed out on the typewriter by the routine represented by word blocks #142 through #145. On the other hand, the vertical path leading to word time block #174 is effective when the P1 instruction is called for, i.e., information is to be recorded onto the tape by the routine represented by word blocks #174 through #178.

A momentary reference to Figs. 69 and 70 at this point will clarify how this information is read out onto the electric typewriter and tape, respectively. As a result of identifying an octal digit in the G register by the marker pulses in the F register, the A1 to A3 flip-flops are set up to indicate this digit. Then, if this information is to be typed out, the network shown in Fig. 69 is made operative during step operation #143 causing one of the "digit" relays on the typewriter to be actuated. Similarly, if this information is to be recorded onto the tape, the network shown in Fig. 70 is made operative during step operation #175 causing four binary signals $J_0$, $J_1$, $J_2$, and $J_3$, which follow signals $A_1$, $A_2$, $A_3$, and $A_4$, respectively, to be recorded in separate channels on the tape.

After a single octal digit, as defined by the marker pulses, is read out to the medium called for, the routes of the P1 and P2 instructions then converge again in step operation #146 which operates to test the location of the marker pulses in the F register.

As will be noted subsequently, the marker pulses are shifted to the right (toward least significant digit) to identify the succeeding octal period after each octal digit is read out. When the marker pulses have been shifted right in this manner into the $O_8$ period of the F register, i.e., when all the octal digits representing the address have been read out, step operation #146 then functions to direct the computer out of the octal digit reading cycle.

However, if other octal digits of the address are still to be read out, the routine proceeds into the common step operations #147, #148, and #149 which function to shift the marker pulses so as to define the next octal digit to be read out. Following this, the computer then jumps back to step operation #141 wherein the code digit in the $P_2O_3$ position of the G register is again tested to determine whether the typewriter or tape read-out routiness are to be made operative.

After all the octal digits representing an address of a word are read out in this manner, the marker pulse test in word block #146 results in routing the operation into a second test code word block #154. At this point of the read-out operations, provision is made for inserting a space on the read-out medium prior to reading out information representing the word identified by the address. Thus if the code digit 1 is in the $P_2O_3$ of the G register, the path entering the routine comprised of word blocks #155 through #158 is followed which provides for energizing the space bar on the typewriter. If this $P_2O_3$ code digit is a 0, the path entering the routine comprised of word blocks #187 through #191 is followed which provides for energizing the tubes on the tape to record thereon a space signal. Figs. 69 and 70 may be again referred to in order to understand how the typewriter space bar is actuated by the "space" relay during step operation #156, and the tape record circuitry is activated so as to record the space code signals on the tape during step operation #175.

Having now read out onto the medium called for the "address" of a word in the memory, the next phase of the read-out operation to be performed is to read out the "word" in the register of the memory defined by this address.

Referring to Fig. 66, it should be noted that the instructions P1 and P2 are now routed into the routine commencing with word block #159 which provides for searching the memory for the register defined by the address in the G register and which has just been read out. This searching routine is similar to the other search routines already described, such as that shown in Fig. 49, which results in placing the word to be read out into the E register.

It is now evident by referring to the flow diagram in Fig. 66 that instructions P3 and P4, which provide for reading out the "word" only, by-pass the phase of the flow diagram already described for reading out the "address." These latter instructions, after branching off the main routine word blocks #12 and #13, enter into word blocks #136 and #77, respectively. The P3 instruction, similar to the preliminary routine of the P1 instruction described heretofore, causes the tape drive to be initiated in word block #136 and a delay to be provided, by recirculating word block #137, which enables the tape drive to accelerate to full speed. The code digits characteristic of the P3 routine are also set up in word block #137. The P4 instruction, similarly to P2, merely provides in its preliminary routine for inserting its code digits in word time block #77. After these preliminary operations, the P1 and P3 branches then merge and lead directly into the routine comprised of word blocks #159 through #162 which provides for searching the memory for the register whose contents are to be read out. It should be noted that all four of the read-out instructions are now sharing common routines.

Having located the register in the memory and routing the contents found there into the E register, the flow diagram then provides step operations for reading out this information onto the medium called for by the instruction.

The step operations and their sequential pattern provided for reading out a "word" from the E register are shown in Fig. 66 to be enclosed by the rectangle defined by broken line 394. It should be noted that the arrangement of the word blocks is almost identical to those enclosed by the rectangle defined by broken line 393 which provides for reading out an "address," as already described.

Thus note that step operation #163 provides for placing marker pulses in the F register, as previously noted for step operation #140. However, in this case the marker pulses are placed in the $O_{13}$ position of the F register since the entire word in the E register is to be read out. The $P_2O_3$ code digit in the G register is next tested in word block #164, similarly to that described in #141, to determine whether the circuits defined by word blocks #165 through #168 are to be actuated which results in transferring the octal digit defined by the marker pulse to the typewriter, or whether the circuits defined by word blocks #181 through #185 are to be actuated which results in transferring the octal digit to the tape. After an octal digit is read out, the marker pulses are then tested during step operation #169 prior to being routed into the step operations #170, #171, and #172 which serve to shift the marker pulses right, as aforementioned, so as to define the next octal digit position to be read out. After all the octal digits comprising a word are read out in this manner as signified by the marker pulses being in the $O_0$ position of the F register, the marker pulse test in #169 causes the computer operation to advance to the step operation #129 which tests the $P_2O_3$ code digit to determine whether the tab key on the typewriter, or the tab tubes for the tape are to be energized by routines comprised in word blocks #130 through #132, or in #193 through #196, respectively. The tab key and tab tubes provide a spacing on the typewriter and tape mediums so as to clearly distinguish the end of one word from the beginning of the following address or word on the read-out medium, as shown in Figs. 71 and 72.

After the information representing a "word" has been read out on the E register, and the tab signal generated, the computer is then sequenced into step operation #133 which operates to add a unit to the address of the $m_2$ section of the G register so as to define the address of the next register to be read out. This step operation also operates to subtract a unit from the $m_3$ section of the G register which contains the number, $\Delta m$, representing the range of registers of the memory to be read out in numerical order during the performance of the present command.

When the number $\Delta m$ has been reduced to zero, the read-out routine is terminated as indicated by the path leading from #133 to step operation #134. At this time the circuit in Fig. 68 is made effective, thus generating a signal to stop the tape drive. However, as long as $\Delta m$ has not as yet been reduced to zero, the word block #150 is entered into. This word block operates to test the code digit in the $P_1O_3$ position of the G register to determine the instruction being performed. If this $P_1O_3$ position contains a digit 1 (see Fig. 67), either the P1 or P2 instruction is being carried out and, consequently, the computer operation is in that event routed back to step operation #140 so as to repeat both phases of the flow diagram already described, i.e., the reading out of an "address" followed by a "word" defined by the address.

If this $P_1O_3$ position contains a digit 0, however, either instruction P3 or P4 is called for and the computer is under these conditions routed from step operation #150 to #151 and thence back to word block #159 which, as aforementioned, is the first of the series of step operations provided for searching the memory for the register to be read out. This latter route causes the computer to repeat only the last phase of the flow diagram already described i.e., reading out only the "word" portion of the data stored at the address.

Having broadly described the flow diagram of the read-out routines, the arrangement of the information as typed out on the typewriter and recorded on the tape will be shown and described. This is done to give a clear picture of what is being read out, prior to presenting the details of the read-out routines.

Fig. 71 shows what will be reproduced when the P2 read-out instruction, for example, is performed by the computer, i.e., an "address" followed by a "word" defined thereby is typed out on the electric typewriter 130. As previously noted in Fig. 69, the octal digit information as set up in the A1 to A4 flip-flops during step operation #143 determines which of the relays on the typewriter is actuated. Because the mechanical operation of the typewriter is slow relative to the electronic operation of the computer, it is necessary to delay the rate at which information is fed into the typewriter. Therefore, a length of time equivalent to 327 word periods, or approximately 0.14 second (assuming a clock rate of 100 kc.), is allotted by the computer for the mechanical actuation of each of the octal digit keys as well as the space bar on the typewriter; and a length of time of 2118 word periods, or approximately 0.89 second, is allotted by the computer for the mechanical actuation of the tab key on the typewriter.

As noted, the space bar sets up the space between the address and the word on the typewriter paper, while the tab key sets up the spacing between the word and the following address (or word) on the typewriter paper. It should be pointed out here that the tab key operation encompasses, in addition to the mechanical actuation of the tab key, the action of returning the carriage on the typewriter to print the next line. The carriage return time is relatively long which explains why a delay of 2118 word periods, or approximately .89 second is provided for the tab key operation.

Fig. 72 shows what will be reproduced when the P1 instruction is performed by the computer, i.e., an "address" and its associated "word" is recorded onto the magnetic tape. As will be noted, when recording "octal digit," "space," or "tab" signals onto the tape, the information is represented in coded form by four discrete binary signals in accordance with the states of the A1–A4 flip-flops, as shown by the table in Fig. 44. These four binary signals are recorded simultaneously by four record heads transversely aligned across the magnetic tape so as to each cooperate with a respective one of four separate tracks. These four record heads are operated, as shown in Fig. 70, by the propositions $J_0$, $J_1$, $J_2$, and $J_3$ being applied to record tubes similar to those employed for recording in the main memory, as previously shown and described.

In the operation of recording information on the magnetic tape, there is a direct relationship between the length of the signal recordings on the tracks and the word period delays provided for these operations, inasmuch as the magnetic tape is operating at a constant speed while all of these operations are taking place. The present method of recording allows four word periods for recording each binary signal followed by a period of 13 word periods during which the recording heads are inactive. The signals are thus discretely recorded in spaced areas or cells on the tape.

As indicated in Fig. 72, the presence of a magnetic record representing digit 1 on the tape is schematically indicated by a shaded cell, and the presence of a record representing a digit 0 is indicated by a blank cell.

The transverse code pattern on the tape representing the octal digits as well as the space and tab signals are identified below the schematic illustration of the magnetic tape for convenience. It should be noted that in all cases when octal digits are recorded, the A4 flip-flop is true (has a 1 content) and therefore the cell recording of proposition $J_3$ is shaded. When a space or tab signal is recorded, the A4 flip-flop is false (has a 0 content) and therefore the cell recording of proposition $J_3$ is blank. For example, the octal digit 7 is indicated by flip-flops A1, A2, A3, and A4 all being in true states. Therefore, the cell recordings of the $J_0$ through $J_3$ propositions on the tape are all shaded.

It should be evident that the magnetic tape recording operations, being electronic, are more rapid than the mechanical operations of the electric typewriter, and consequently the length of time required for any of the operations on the magnetic tape is much shorter than the length of time required to carry out the same operation on the electric typewriter. Since information is recorded on the tape with the view of later reading it back into the typewriter, for example, the time allotted for recording the digit, space, and tab signals is determined accordingly.

Having illustrated how the information is recorded onto the read-out media, the details of the read-out instruction will now be described. In review, the read-out instructions P1, P2, P3, and P4 which branch off from the main routine follow the test instruction step operations #10, #11, #12, or #13, respectively, shown in Fig. 27. This results from the fact that the K1 flip-flop is caused to be true in the $P_2O_{13}$ period of these operations.

Referring to Fig. 73, the word blocks defining the initial step operations for the P1 and P2 branch instructions are shown together since these instructions merge to share certain step operations shown in the flow diagram for reading out information representing the "address" of a word.

Operations under the P1 instruction which provides for reading out the address onto the tape commences with step operation #74. At the instant the program counter content is changed to #74, the signal generated by the sum circuit shown in Fig. 68 is amplified by tube 392 and used for energizing the tape drive circuit.

As shown below word block #74, the circuit for recirculating the G register, $G_0=G_2$, is made effective during this word period so as to recirculate the command located therein. In addition, a 1 is placed in the $P_2O_4$ position of the E register by the circuit defined by equation $E_0=P_2O_4$. This results in placing the binary number equivalent to $2^{14}$, equal to 16,384, in the $O_{0-11}$ period of the E register and clearing the rest of the E register. This number is used for controlling the number of times the next word period is to be recycled so as to provide the delay required to permit the tape recorder to accelerate to a normal speed from a standing start. This delay is approximately 7 seconds.

The K1 flip-flop, which enters step operation #74 in a false state, remains false, thus causing the program counter to count to #75 at the end of the word period.

In operation # 75, code digit 1's, characteristic of the P1 instruction as shown in the table of Fig. 67, are inserted in the $P_1O_3$ and $P_2O_3$ positions of the G register so as to remember and control the sequencing of the read-out routine as it progress from certain common operations into those unique with the P1 instruction.

The insertion of this code is accomplshed by the operations of equation $G_0=P_1O_3+P_2O_3$. The rest of the G register is recirculated by the operation of equation $G_0=G_2(P_0O_0-P_0O_3)+G_2O_{4-13}$, which means that the $G_0$ output of arithmetic network 168 will be connected to the G2 flip-flop during the timing periods noted.

A unit is subtracted from the number in the E register during $O_{0-11}$ of each word period that word block #75 is recycled as indicated by equations $$E_0=(E_2K_1+E_2'K_1')O_{0-11}$$

and $k_1=E_2O_{0-11}C$. The use of these equations for accomplishing subtraction is similar to that already described in connection with word block #50 of Fig. 61.

The K1 flip-flop is false upon its initial entry into step operation #75. During the subtraction process, if a digit 1 exists in $O_{0-11}$ of the E register, the K1 flip-flop is rendered true by equation $k_1=E_2O_{0-11}C$ and remains true during $P_2O_{13}$. As a result, the program counter is inhibited from counting and the step operation #75 is repeated. That state of affairs continues as long as a digit 1 exists in $O_{0-11}$ of the E register, i.e., as long as the number in $O_{0-11}$ is not yet reduced to zero by the subtraction of 1 during each cycle.

Since the K1 flip-flop must enter word block #75 in a false state on each recycling so as to operate properly, equation ${}_0k_1=P_2O_{13}C$ is provided for accomplishing this action.

After recycling 16,384 times, i.e., after 16,384 word periods, the number in the E register is reduced to zero, and as a result the K1 flip-flop remains false at $P_2O_{13}$ time and the program counter advances to count #76.

Step operation #76 is considered as a dummy in the flow diagram inasmuch as it merely provides for enabling the K1 flip-flop to be placed into a true state during $P_2O_{13}$ time so that the program counter will skip to step operation #140. Of course, the information in the G register must be retained and hence it is recirculated by equation $G_0=G_2$.

The above describes the initial step operations for the P1 instruction. The initial step operation #139 for the P2 instruction, which is also shown in Fig. 73, provides for placing the code digits 1 and 0 in positions $P_1O_3$ and $P_2O_3$, respectively, of the G register. This code indicates that both the address and the data in a word is to be read into and printed by the typewriter. The action of inserting the digit 1 in $P_1O_3$ and the recirculating of the information already in the G register is accomplished by equation $G_0=G_2(O_3'+P_0O_3)+P_1O_3$.

The K1 flip-flop enters #139 in a false state and remains false. Consequently, the counter advances at the end of this word to #140.

Step operation #140 which is used in common by both the P1 and P2 read-out routines, provides for inserting digit 1's into the $P_0$, $P_1$, $P_2$ pulse positions of the $O_{11}$ octal digit period in the F register by means of equation $F_0=O_{11}$. These digits serve as marker pulses for identifying the octal digit to be printed out. Since the $F_0$ equation is not effective during the rest of the word period identified by program counter #140, zeros are placed in the remaining position of the F register, i.e., the rest of the F register is cleared.

The K1 flip-flop is ensured of remaining in a false state at the end of the word period by equation ${}_0k_1=O_0C$, thus causing the program counter to advance to step operation #141 whose word block is next to be described by reference to Fig. 74.

In step operation #141 (Fig. 74), the equations $F_0=F_2$ and $G_0=G_2$ shown below its word block indicate that the informations in the F and G registers, respectively, are recirculated.

Since the octal digit to be read out is to be set up in the A1 to A4 flip-flops, as shown in the table of Fig. 44, the A4 flip-flop is first arbitrarily set to a true state by equation $a_4=\#141C$. The A1 to A3 flip-flops are then set in accordance with the binary information in the G2 flip-flop during the octal period defined by the position of the marker pulses in the F register. Thus $$a_1=G_2F_2P_0C,\ {}_0a_1=G_2'F_2P_0C,\ a_2=G_2F_2P_1C,$$

$${}_0a_2=G_2'F_2P_1C,\ a_3=G_2F_2P_2C, \text{ and } {}_0a_3=G_2'F_2P_2C.$$

Since the marker pulses were initially placed in the $O_{11}$ octal period of the F register, the A1, A2, and A3 flip-flops store the binary digits in the $O_{11}$ octal period of the G register at the end of the first passing of the computer through step operation #141.

Having shared the common operations described in #140 and #141 which consists of inserting marker pulses in $O_{11}$ of the F register and setting up the A1–A3 flip-flops accordingly, the computer further operates during #141 to test the code digit previously inserted in the $P_2O_3$ position of the G register so as to determine whether the octal digit to be read out is to be typed on the typewriter or recorded on the tape.

The K1 flip-flop is arbitrarily set false during $0_0$ of word block #141. Then, if the code digit in the $P_2O_3$ position of the G register is a 1, indicative of the tape read-out routine P1 (see Fig. 67), the K1 flip-flop is triggered into a true state by equation $k_1=G_2P_2O_3C$. Under these conditions, the program counter is caused to skip to the routine commencing with step operation #174 which operates to record the octal digit set up in A1–A3 onto the tape.

However, assuming that the code digit in the $P_2O_3$ position of the Gregiester is a 0, indicative of the typewriter read-out routine, the K1 flip-flop remains in a false state and the program counter counts to the routine commencing with step operation #142 in which are commenced the operations required to type out the octal digit in A1–A3.

In explaining the details of the succeeding word blocks in the flow diagram which operate to read out the address, it will be assumed first that the $P_2$ instruction is to be carried out, i.e., the address is to be printed out on the typewriter. This will be then followed by a description of the word blocks unique to the P1 instruction which operates to record information onto the tape.

Having advanced from word block #141 to step operation #142, first to be noted is that the F register containing the marker pulses is recirculated by the action of equation $F_0=F_2$.

As previously mentioned, in order to allow the typewriter key, identified by the A1 to A3 flip-flops previously set up, to strike the platen of the typewriter and to be returned so as to not interfere with the next digit key to be actuated, it is necessary to insert a delay in the operation of the computer at this point. Thus step operation #142 operates to place a digit 1 in the $P_1O_{13}$ position of the G register. The insertion of this digit, together with the recirculation of the useful information in the G register, is obtained by the equation:

$$G_0=G_2O_{0-10}+P_0O_{11}+P_1O_{13}$$

The binary number $2^6$ so defined in the $P_1O_{11}$–$P_1O_{13}$ period of the G register is then used for controlling the recycling of the subsequent word operation #143.

Here again the K1 flip-flop remains false causing the program counter to advance to #143 at the end of the word period.

As soon as the program counter indicates #143, the network shown in Fig. 69 is made operative causing one of the relay signal amplifying tubes to pass a signal depending on the content of the A1 to A3 flip-flops. This signal is then used to energize one of the digit relays controlling the keys on the typewriter. The signal is effective for 65 word periods which is the number of times step operation #143 is recycled.

The method of controlling the delay will now be described. As noted, during each operation of word block #143 a digit 1 is subtracted from the binary control number in the $P_1O_{11}$–$P_1O_{13}$ period of the G register. This subtraction is carried out by equations:

$$G_0=(G_2K_1+G_2'K_1')O_{11-13}(P_2O_{13})'(P_0O_{11})'$$

and $$K_1=G_2O_{11-13}(P_2O_{13})'(P_0O_{11})'C$$

It should be understood that the timing terms $$O_{11-13}(P_2O_{13})'(P_0O_{11})'$$

employed in these equations is no more than another way of logically expressing the period ($P_1O_{11}$–$P_1O_{13}$). The description of how subtraction of a unit 1 is performed by these equations is identical to that previously noted in word time block #50 of Fig. 61, for example.

As long as the delay controlling binary number in the G register has a digit 1, the K1 flip-flop is set true and left true during $P_2O_{13}$ so as to cause the program counter to stick in #143, i.e., the word operation recycles. In order to have the K1 flip-flop enter each cycle in a false state, as required, the equation $_0k_1=P_2O_{13}C$ is included with this word block.

It should be understood that it will not be until the 65th cycle of word block #143 that the K1 flip-flop will observe all 0's in the $P_1O_{11}$–$P_1O_{13}$ period of the G register. Furthermore, the result of the subtraction during this 65th cycle will introduce a series of 1's in the $P_1O_{11}$–$P_1O_{13}$ period of the G register which now represents the number for controlling the additional delay provided by the following step operation #144. The equations for step operation #144 are identical to those of #143. As before, a unit is subtracted from the delay control number in the G register until it is reduced to zero at which time the K1 flip-flop is maintained in a false state causing the program counter to advance to the next word time block #145. Here, as in the previous case, the delay control number in the G register is represented by a series of 1's. Using the same equations, the step operation #145 must be recycled 128 times in order to reduce this number to zero, resulting in the program counter advancing to step operation #146.

The two operations #144 and #145 together represent a delay of 256 word periods which is adequate time for the digit key of the typewriter to return to rest after being activated so as to not interfere with the activating of the next digit key.

It should be understood that the G register does not have sufficient unused capacity to hold a binary number comprised of more than seven binary digits and consequently the use of the two identical word blocks #144 and #145 in succession is necessary to obtain the required amount of delay. The E register and portion of the F register are available, of course, in the present routine but as will be made clear, these registers are unavailable for storing such delay control numbers in the routines to follow.

When the K1 flip-flop remains false due to the delay number being reduced to zero, the program counter counts 1 and advances to operation #146 which is next to be described by reference to Fig. 75.

After a single octal digit defined by the marker pulses in the F register has been read out, the word block #146 provides for testing the location of the marker pulses in the F register in order to determine whether all the octal digits of the address have been read out or whether the marker pulses should be shifted and the routine for activating a digit key on the typewriter repeated so as to read out an additional octal digit. The K1 flip-flop is initially set false during $O_0$ of the word period by equation $_0k_1=O_0C$.

Since the last octal digit of an address resides in $O_8$, when the marker pulses are in $O_8$ of the F register the K1 flip-flop is rendered into a true state by the action of equation $k_1=F_2O_8C$. The program counter then skips out of the read address cycle into step operation #154. However, if the marker pulses are not in $O_8$ of the F register, the K1 flip-flop remains false and the program counter counts 1 and advances into #147.

The word time blocks #147, #148, and #149 each provide for shifting the three marker pulses in the F register right one binary position. Thus together they shift the marker pulses to the next lower octal digit period so as to define the next octal digit of the address to be read out of the G register.

This shift is accomplished by connecting the $F_0$ output to the F1 flip-flop, as indicated by the equation $F_0=F_1$ below each of the word blocks #147, #148, and #149. In addition, the G register is recirculated by equation $G_0=G_2$.

The K1 flip-flop remains false during word blocks #147 and #148 so as to enable the program counter to count in an orderly fashion so as to advance through these word blocks.

The K1 flip-flop is set true during $O_0$ of word block #149 so that the program counter can skip, after the last shift in #149, back to step operation #141 already described, thus causing the routine for reading out an octal digit to repeat.

After four such cycles of operation, i.e., after the four octal digits of the address are read out, the marker pulses have been shifted into the $O_8$ position of the F2 register. As a result, the K1 flip-flop is triggered true during step operation #146, and the program counter skips into step operation #154.

Returning to step operation #141, assume next that the code digit 1 is in the $P_2O_3$ position of the G register indicating that the address in the G register is to be read out onto the tape. In this case the K1 flip-flop is triggered into a true state by operations defined by the equation $k_1=G_2P_2O_3C$ included in word block #141. As a result, the program counter is caused to skip to word block #174 shown in Fig. 76.

Just as the step operations #142 through #145 provided for actuating the digit key on the typewriter as identified by the A flip-flops, the step operations #174 through #178 operate to actuate the tape digit tubes so as to record a binary pattern representing the octal digit onto the tape.

Step operation #174 provides for recirculating the F register which contains marker pulses for identifying an octal digit of the address, by means of operations defined by equation $F_0=F_2$. The binary equivalent of decimal three is set up in the $P_1O_{11}$–$P_1O_{13}$ period of the G register by inserting 1's in positions $P_1O_{11}$ and $P_2O_{11}$.

This binary number controls the period during which the record tubes on the tape are actuated. In addition, the remaining portion of the G register is recirculated since it contains useful information about the command. These actions are accomplished in the G register by the equation:

$$G_0=G_2(O_{0-11}+P_0O_{11})+P_{1-2}O_{11}$$

In order to cause the program counter to count to #175, the K1 flip-flop, which enters #174 in a true state, is rendered false by equation ${}_0k_1=O_0C$.

The main action performed during step operation #175 is that the tape digit tubes are actuated in accordance with the contents of the A1 to A4 flip-flops which represents the octal digit to be read out. The network previously described in Fig. 70 shows how this action is obtained. Since these tubes are to be operative for four word periods, the equations:

$$G_0=(G_2K_1+G_2'K_1')O_{11-13}(P_2O_{13})'(P_0O_{11})'$$

and $k_1=G_2O_{11-13}(P_2O_{13})'(P_0O_{11})'C$ operate to subtract a unit from the binary number previously set up in $P_1O_{11}$–$P_1O_{13}$ of the G register. Until this number is reduced to zero, i.e., as long as a digit 1 appears in period $P_1O_{11}$–$P_1O_{13}$, the K1 flip-flop is rendered true at the end of the word period causing step operation #175 to be recycled. After being recycled three times, the number in the G register is reduced to zero and as a result of the fourth recycling, the K1 flip-flop is left in a false state thus causing the program counter to count to #176.

Step operation #176 is similar to #174 except that it provides for inserting digits 1's in $P_2O_{11}$ and $P_0O_{12}$ of the G register, thus providing a delay binary number of equivalent to decimal six. Step operation #177 then provides for reducing this number once each cycle by equations similar to those described for word block #175. After the seventh cycle, the program counter is actuated to count to word block #178. This latter word block operates as a dummy in the flow diagram in that it merely provides for setting the K1 flip-flop true at $O_0$ time, as indicated by equation $k_1=O_0C$· As a result, the program counter skips to #146 wherein the marker pulses are tested and the read-out cycle for the octal digit repeated if all the digits have not as yet been read out.

After four such cycles of the read-out routine used for recording digits onto the tape, the program counter skips from step operation #146 to step operation #154 shown in Fig. 77.

After reading out the address onto either the tape or the typewriter, the read-out routine next provides for initiating the space bar on the typewriter or for recording a signal indicative of the space action on the tape.

In order to decide which of these two space routines is to be followed, a test of the code digit in the $P_2O_3$ position of the G register is performed in step operation #154.

As noted, the K1 flip-flop enters word block #154 in a true state. Thus, if the code in $P_2O_3$ of the G register is 0 in this instance, the K1 flip-flop is triggered false by equation ${}_0k_1=G_2'P_2O_3C$. This actuates the program counter such that it takes the horizontal output from #154 which leads to the routine commencing with #155 for actuating the typewriter space bar, as shown in Fig. 77.

On the other hand, if the code digit in $P_2O_3$ of the G register is 1, the K1 flip-flop remains true and the program counter is actuated such that the computer takes the vertical output from #154 which leads to the routine commencing with #187 for actuating the tape space tubes, as shown in Fig. 78.

Assuming the horizontal output from #154 is followed, the details of step operations #155 through #158 will next be described which provides for actuating the typewriter space bar. The process and circuitry provided for this is almost identical to that employed for actuating the typewriter digit key as described in connection with Fig. 74. There are a few differences however and these will be described by comparing the respective step operations.

First, however, it should be noted that in the prior step operation #154, in addition to testing the code digits, the A1–A4 flip-flops are set up to indicate the space bar as shown by the table in Fig. 44. Thus the A1 and A4 flip-flops are set true and false, respectively, according to the equations $a_1=O_{0-13}C$ and ${}_0a_4=O_0C$. The settings of the A2 and A3 flip-flops are immaterial for characterizing the space bar on the typewriter.

Step operation #155 of the present process is identical to #142 already described. What it primarily amounts to is setting up a number in $P_1O_{11}$–$P_1O_{13}$ of the G register which determines the number of times the subsequent step operation #156 is to be recycled so as to determine the time the "space" relay on the typewriter is energized.

As for the remaining step operations #156, #157, and #158 of the present process, they likewise are identical with step operations #143, #144, and #145 previously described. Their performance is such as to provide additional delay time as required to permit the mechanical movements of the typewriter to come to rest before being again activated.

Assuming next that the vertical output from test operation #154 is followed, the routine for actuating the tape record tubes to indicate the space signal will next be referred to by reference to Fig. 78. As may be readily apparent from a comparison of the logical equations listed below the respective word blocks of this routine, they are identical to those provided for actuating the tape record tubes due to indicate a digit. The differences in the process are due to the differences in code signals representing the "digits" and the "space" shown in the table of Fig. 44.

As seen in the flow diagram of the read-out routine in Fig. 66, after the address has been read out on the selected medium, the P1 and P2 instructions are then sequenced into the routine provided for reading out the word identified by the address. Since the P3 and P4 instructions provide only for reading a "word," after performing certain preliminary step operations, these instructions merge in with the P1 and P2 routines after the "address" has been read out. Thus it may be considered that all four read-out instructions are sharing some of the step operations during the routine provided for reading a "word."

Referring to Fig. 79, the word blocks of the initial step operations performed by the P3 and P4 instructions, after branching from the main routine, are shown.

The P3 instruction provides for reading a word and recording the word on the tape, hence its first word block #136 indicates that the tape drive is started by the circuit previously mentioned in connection with the discussion of Fig. 68. This word block #136 is identical to word block #74 previously described for the P1 instruction. As described there, a digit 1 is inserted in the $P_2O_4$ position of the E register for controlling the delay needed to accelerate the tape drive to full speed. Thus step operation #137 is cycled in accordance with the magnitude of the delay number since it is not until this number has been reduced to zero by subtracting a unit during each cycle that the operation proceeds into word block #138. Step operation #137 provides for inserting code digits 0 and 1 in $P_1O_3$ and $P_2O_3$, respectively, of the G register so as to cause the computer to take the proper course through the read-out flow diagram. It should be noted that the only variation between word block #75 of the P1 instruction branch and #147 of the P3 instruction branch is the difference in code digits which are inserted. Continuing, the step operation #138 is no more than a dummy provided, as hereinbefore described, for enabling the K1 flip-flop to be true at the end of a word period so as to cause the program counter to skip to #159.

The P4 instruction branch has only one preliminary step operation associated therewith. The word block #77 shows that it provides for inserting code digit 0's in $P_1O_3$ and $P_2O_3$ of the G register. Having accomplished this, the P4 branch is also routed into step operation #159.

It is now apparent that all four read-out instructions share the routine comprised of word block #159 through #162 shown in Fig. 80, and during which operations the computer functions to search the memory for the register defined by the address in the $m_1$ section of the G register and to route this information into the E register. The process by which the computer functions to accomplish this has been described heretofore in connection with Fig. 49. Note that the word block descriptions and the associated logical equations are identical except for the recirculation of the E and F registers which is not necessary in the present "look up $(m_1)$" routine.

Thus following step operation #162, wherein the contents of the M1 flip-flop which follows the desired register on the drum are read into the E register, the step operation #163 is entered into.

In the flow diagram of the read-out circuits in Fig. 66, the overall process provided for reading out the "address" onto the tape or the typewriter is enclosed by the broken line rectangle 393. As previously pointed out, the overall process for reading out the "word" onto the tape or typewriter is enclosed by broken line rectangle 394. By comparing the arrangement of the word blocks in these two rectangles, it should be noted that the legends above the corresponding groups of word blocks in each is substantially identical, the only apparent variation being that the end of the process for reading out the address provides for actuating the space bar or tubes while the end of the process for reading out the word provides for actuating the tab key or tubes.

Thus word block #163 provides for inserting marker pulses in the $P_0$, $P_1$, and $P_2$ pulse positions of the $O_{13}$ section of the F register by the action of equation $F_0=O_{13}$. These marker pulses, as in the step operation #140 (Fig. 73), are used to determine by coincidence the octal digit of the word in the E register to be read out in the routine to follow.

Since the prior operations are shared in common by all the instructions, the test code step operation #164 is next performed in order to determine whether this information is to be typed on the typewriter or recorded onto the tape.

As already described in connection with word block #140, the code digit in the $P_2O_3$ position of the G register is examined in order to determine whether the digit set up in the A1 to A4 flip-flops is to be read out onto the typewriter or the tape. Thus, if either the P2 or P4 instruction is being performed, the digit 0 is found in this $P_2O_3$ position causing the routine comprised of word blocks #165 through #168 for actuating the typewriter digit key, shown in Fig. 81, to be performed. This routine is identical to that already described for reading out the address in Fig. 74.

On the other hand, if the digit 1 is found in the $P_2O_3$ position of G as a result of the test in word block #164, either the P1 or P3 instruction is being performed and the routine for actuating the tape tubes comprised of #181 and #185, as shown in Fig. 83, is made effective.

Irrespective of which medium the digit is read out to, the position of the marker pulses in the F register is checked during the repeat test step operation #163. Until the octal digit found in the $O_0$ period of the E register has been read out, the computer is sequenced from #169 to the routine defined as shift marker pulses and comprised of step operations #170 through #172 shown in Fig. 82. These step operations are identical to the step operations #147 through #149 already described in the read-out address process.

Having shifted the marker pulses into the next lower octal position, the computer is then routed back into #164, thus causing the read-out digit process to be recycled until the test in #169 indicates that all the digits have been read out.

Returning to word block #164, the route provided therefrom for actuating the tape record tubes, in case the test in word block #164 indicates that the octal digit information is to be recorded onto the tape instead of the typewriter, is presented in Fig. 83. The word blocks in this routine are identical to those presented in Fig. 76 and will not be further described.

After the computer has read out the 14 octal digits of a word in the above manner, the marker pulse test step operation #169 results in the computer proceeding into word block #129. As hereinbefore described, the code in $P_2O_3$ is examined causing the tab operation which follows the reading out of a word to be performed on the read-out medium being used.

Referring to Fig. 84, the tab operation on the typewriter is described by word blocks #130, #131, and #132. The same method is employed for the tab operation on the typewriter as the space operation previously described in Fig. 77. However, the delay time provided is longer for the tab operation since it must be adequate to permit the carriage of the typewriter to return in order to start typing a new line. Therefore, the present routine inserts two delay control numbers, one in the G register and one in the E register, for controlling the delay.

Thus note how step operation #130 inserts a digit 1 in $P_1O_{13}$ of the G register such that the binary number $2^6$ is set up in period $P_1O_{11}$–$P_1O_{13}$. The insertion of this number and the recirculation of the remaining portion of the G register is accomplished by equation:

$$G_0=G_2O_{0-10}+P_0O_{11}+P_1O_{13}$$

In addition a digit 1 is placed in the $P_2O_3$ position of the E register such that the binary number $2^{11}$ is set up in period $O_{0-11}$. The action of equation $E_0=P_2O_3$ provides for this.

Now then, in a manner similar to that shown in word block #156, the word block #131 is recycled until the number in the G register is observed to have been reduced to zero as a result of subtracting a unit therefrom once each cycle. This requires 65 cycles of word block #136 during which time the tab key relay, as shown in Fig. 69, is activated.

The computer then advances into word block #132 where an additional delay of 2049 word periods is provided by a similar process whereby a unit is subtracted once each cycle from the binary number $2^{11}$ in the E register until it has been reduced to zero. The equations for performing this subtraction process in word blocks #131 and #132 are identical to those described heretofore in connection with Fig. 77.

Assuming the tab operation is to be performed on the tape, the routine comprised of step operations #193 through #196 shown in Fig. 85 is carried out. Here as in the typewriter tab routine, binary numbers are placed in the E and G registers for controlling the delay associated with the tape recording system. Thus the binary number equivalent to decimal 3 is placed in $P_1O_{11}$–$P_1O_{13}$ of the G register, and the binary number equivalent to decimal 256 is placed in $O_{0-11}$ of the E register.

During the recycling of the step operation #194, the tape record circuitry is energized in accordance with the circuits in Fig. 70. A unit is subtracted from the binary number in the G register, and after 4 cycles, the observation that this number has been reduced to zero causes the step operation #195 to be activated. During each recycling of #195, a unit is subtracted from the binary number set up in the E register and after 257 word periods the number is observed to have been reduced to zero causing the computer to advance into step operation #196. This step operation serves merely as a dummy in the flow diagram since its use is limited to setting the K1 flip-flop to be true at $P_2O_{13}$ time so that the computer can skip out of the overall process provided for reading out a word into step operation #133.

Referring to Fig. 86, the group of word blocks #133, #134, and #150, #151 will next be described.

The sequencing of the read-out instruction from the main routine to this point of the read-out flow diagram results in reading out the first address and word, or word only, to the read-out medium. Therefore, the next word blocks to be examined operate to determine whether the read-out operation is to be terminated or whether it is to be recycled so as to read out another word from the memory.

If the read-out operation is to be terminated, the computer progresses from step operation #133 to #134 and thence to #4 (see Fig. 47) such that the computer operates to look up the next command to be executed.

However, if the read-out operation is to continue, the computer progresses from step operation #133 to #150. In #150 the code in the $P_1O_3$ position of the G register is examined to determine if either the P1 or P2 branch instructions are keyed into the flow diagram. If such is the situation, step operation #150 directs the computer back into step operation #140, i.e., the beginning of the overall routine for reading out an address.

Assuming that the code in $P_1O_{13}$ is a 0 indicating that either the branch operations P3 or P4 are keyed into the flow diagram, the computer passes from #150 to dummy step operation #151 and thence to step operation #159 of the routine provided for looking up the contents of the register defined by the address set up in the $m_1$ section of the G register. It should be clear, of course, that the reason the instructions P3 and P4 are cycled back into the flow diagram at this point is because they operate to read out only a word.

Each time step operation #133 is made effective, a unit is subtracted from the $\Delta m$ number in the $m_3$ section of the G register. The K1 flip-flop enters the step operation #133 in a false state. This subtraction action is then accomplished by the portion of the $G_0$ equation noted as $(G_2K_1+G_2'K_1')(O_{0-2}+P_0O_3)$ and the $k_1$ equation noted as $G_2(O_{0-2}+P_0O_3)C$. These equations function to perform this subtraction in a manner identical to that described heretofore.

The $G_0$ equation also provides for recirculating the control number in the $m_2$ section of the G register and the code digits characteristic of the read-out branch instruction being performed. Thus the portion of the $G_0$ equation $G_2(O_{4-7}+P_{1-2}O_3)$ is provided for accomplishing this action.

If, as a result of subtracting a 1 from $\Delta m$, the K1 flip-flop is true, indicative of the read-out cycle being repeated, the true state of the K1 flip-flop is transferred and remembered by setting the A1 flip-flop true as noted by equation $a_1=K_1O_{4-7}$. This is necessary to free the K1 flip-flop so that it may be used during $O_{8-10}+P_0O_{11}$ for performing the addition of a unit to the address $m_1$ in the G register. This addition is accomplished by the portion of the $G_0$ equation $(G_2K_1'+G_2'K_1)O_{8-10}+P_0O_{11}$ and the ${}_0k_1$ equation $G_2'(O_{8-10}+P_0O_{11})C$. The explanation of how these equations function to perform addition is similar to that heretofore presented for the equations and circuitry in word block #8 of Fig. 48*a*, for example.

The decision as to whether the program counter is to count to #134 and terminate the read-out operation or is to skip to #150 so as to recycle the read-out operation is dependent on the state of the K1 flip-flop at $P_2O_{13}$ time. Hence, after being used to perform the addition process, the K1 flip-flop is reset to the state it resided in at the end of the subtraction process $(O_{0-2}+P_0O_3)$, as rememberd by the A1 flip-flop. This explains the need for the latter portion of the $k_1$ equation, $A_1O_{12-13}C$.

Assuming K1 is true at the $P_2O_{13}$ time of #133, the #150 step operation functions to test the code digit in $P_1O_3$ of the G registers. If this digit is a 1, the K1 flip-flop remains true since the equation ${}_0k_1=G_2'P_1O_3C$ shown below word time block #150 is ineffective. The program counter thus is enabled to skip to #140 of the read-out flow diagram so as to read out the new address. However, if the code digit in $P_2O_3$ of the G register, as observed during word time block #150, is a 0, the K1 flip-flop is rendered into a false state by equation ${}_0k_1=G_2'P_1O_3C$. This causes the program counter to count to step operation #151 which is a dummy word block which provides for setting the K1 flip-flop true by equation $k_1=O_0C$ such that the program counter can again be skipped, but this time it skips to #159 of the read-out flow diagram whereby the routine for reading out a word only is repeated.

Going back to step operation #133, after the $\Delta m$ number in the G register has been reduced to a zero, the K1 flip-flop is placed in false state at $P_2O_{13}$ time and the program counter advances to step operation #134 which functions to stop the tape drive if either P1 or P3 branch instructions have been operative. In addition the G register is recirculated so as to retain the control number which defines the location in the memory of the next command to be executed. The K1 flip-flop is also set true by equation $k_1=O_0C$, thus causing the program counter to skip to the look up command routine in Fig. 47.

This completes the detailed description of the step operations for the read-out routines. By referring back to the flow diagram in Fig. 66 and the examples of how information is printed out on the typewriter and recorded on the tape in Figs. 71 and 72, it should now be clear how the present computer provides for making information processed by the computer available to the operator of the machine.

Also shown in the lower left portion of Fig. 66 is fill instruction branch routine tested for in word time block #9 of the main routine (Fig. 26). The command which calls for the fill instruction states that the computer should operate so as to fill the register of the memory having the address set up in the $m_3$ section of the G register with a word obtained from an external source (instrument, auxiliary memory, etc.) designated by the address in the $m_1$ section of the G register. Therefore, the logical equations for performing this instruction, as shown below word blocks #105 through #108 in Fig. 87, function primarily to recirculate the information in the E, F, and G registers while the more important action is carried on in external equipment (not shown). Thus during step operation #105 while the E, F, and G registers are being recirculated, the information in the $m_1$ section of the G register is transferred into an external instrument selector register. During step operations #106 and #107, while the E, F, and G registers are being recirculated, the external equipment provides for transferring the contents of the external instrument selected into a fill register L. Finally, during step operation #108, the F and G registers are recirculated, but the $E_0$ output of the arithmetic diode network 168 is effectively connected to a flip-flop L2 in the L external register so as to read the contents therein into the E register. As noted, step operation #108 causes the K1 flip-flop to be rendered true during $O_{13}$ time. This enables the program counter to skip to the first step operation #41 of the routine shown in Fig. 54 for placing the contents of the E register into the memory register defined by address $m_3$ of the command in the G register.

*Arithmetic network*

As noted in any of the figures showing the details of the word time blocks, each of the logical equations shown below the blocks correspond to one of the 17 possible logical propositions which may be effective at the output of the arithmetic diode network 168 during a word period, as previously explained in connection with Fig. 27. In review, these 17 propositions are: $E_0$, $F_0$, and $G_0$, which determine the information to be recorded onto the drum portion of the E, F, and G recirculating registers; $R_1$ and $R_2$, which generate 1's and 0's respectively, to be recorded onto any of the memory registers; and the trigger inputs $k_1$, ${}_0k_1$; $a_1$, ${}_0a_1$; $a_2$, ${}_0a_2$; $a_3$, ${}_0a_3$; $a_4$, ${}_0a_4$; $a_5$, ${}_0a_5$ for the K1, A1, A2, A3, A4, and A5 flip-flops, respectively.

As aforementioned, not all of these output propositions enter into each step operation and hence only those which are operative during a particular one of the step operations are listed below the block representing that particular step operation. The inoperative output propositions, if they were shown below the blocks, would be logically represented by equating them to zero.

It should now be apparent after having described in detail each of the word blocks shown in the flow diagrams of Figs. 27 and 66 that certain operations and, therefore, certain forms of the proposition equations occur repeatedly in several of the word time blocks. As previously described, the scheme of the present invention provides circuitry for physically generating logical products and logical sums. Therefore, by mere reference to a logical equation, the arrangement of the logical circuitry required for solving the equation can be determined directly. However, it is not necessary for a combination of logical terms to be generated by more than one device. When it is noted that a particular equation is to be used in several word time blocks, it is necessary to provide only once the circuitry representing this equation, and then to logically multiply the output of that circuitry with the program counter numbers which define when it is to be operative. The simplification of the equations and, therefore, diode networks, by this means results in a reduction of the number of terms and components required but often at the expense of complicating the recognition of the original equations. The present techniques, however, make it possible to retain in the equations the original system of thought, even though the equations proceed through several revisions, as long as these revisions are according to the well-known rules of symbolic logic.

In order to facilitate the understanding and arrangement of the composite equations for each of the 17 logical output propositions used for describing the step operations, an identification number enclosed in parentheses is placed at the left of each of the logical equations shown below the word blocks. Each of the 17 propositions may take a plurality of different forms, depending on the digital process to be performed. Thus note how the $E_0$ proposition may take the form $E_0=E_2$ which, as described, results in recirculation of the information in the E register. This form of the $E_0$ proposition is identified by the number (1), as shown at the left of the $E_0$ equation below each of the word blocks which require the E register to be recirculated, such as in word blocks #0 through #4 in Fig. 42, for example. The $E_0$ proposition may also take the form $E_0=M_1$, as previously described, results in routing information from one of the memory registers into the E recirculating register. This latter form of the $E_0$ proposition is identified by the number (2) shown to the left of the $E_0$ equation below each of the two word blocks, #17 in Fig. 49 and #162 in Fig. 80, each of which step operations require this action.

To further aid the reader to understand the arrangement of the composite equations for each of the 17 logical output propositions, each of these propositions is here presented with a list of the numbers identifying each of its equation forms, together with the word time blocks #'s in which each of the forms is operative.

*Logical propositions*

$E_0$

| | | |
|---|---|---|
| (1) PCS1 | (8) #50, #51 | (15) #65 |
| (2) #17, #162 | (9) #52 | (16) #130 |
| (3) #63 | (10) #53 | (17) #193 |
| (4) #60 | (11) #34 | (18) #74, #136 |
| (5) PCS2 | (12) #35 | (19) #92 |
| (6) #80, #82 | (13) #36 | (20) #93 |
| (7) #83 | (14) #47 | (21) #108 |

$F_0$

| | | |
|---|---|---|
| (1) PCS3 | (5) #58 | (9) #34 |
| (2) #23 | (6) #19 | (10) #140 |
| (3) #63 | (7) #46 | (11) PCS4 |
| (4) #7 | (8) #92 | (12) #163 |

$G_0$

| | | |
|---|---|---|
| (1) PCS5 | (8) #83 | (15) #137 |
| (2) #7 | (9) #49, #66 | (16) #77 |
| (3) #50, #51 | (10) #34 | (17) PCS6 |
| (4) #40 | (11) #35 | (18) PCS7 |
| (5) PCS10 | (12) #71 | (19) PCS8 |
| (6) #19, #23 | (13) #75 | (20) PCS9 |
| (7) #133 | (14) #139 | |

$R_1$ (1) #32
(2) #44, #70

$R_2$ (1) #32
(2) #44, #70

$k_1$

| | | |
|---|---|---|
| (1) PCS22 | (8) #61, #71, #108 | (15) PCS21 |
| (2) #15, #160 | (9) #50, #51 | (16) #141, #164 |
| (3) #5, #21 | (10) #34 | (17) PCS7 |
| (4) #42, #68, #90 | (11) #1 | (18) #146 |
| (5) #30, #38 | (12) #2 | (19) #169 |
| (6) #60 | (13) #3 | (20) #133 |
| (7) #59 | (14) #70 | |

${}_0k_1$

| | | |
|---|---|---|
| (1) PCS14 | (7) PCS11 | (13) #0 |
| (2) #7 | (8) PCS13 | (14) #71 |
| (3) PCS12 | (9) #46 | (15) #129, #154 |
| (4) #150 | (10) #83 | (16) #133 |
| (5) #61 | (11) #34 | |
| (6) #60 | (12) #35 | |

$a_1$

| | | |
|---|---|---|
| (1) #24, #34, #154 | (6) #47 | (11) #65 |
| (2) #16, #161 | (7) #82 | (12) #141 |
| (3) #6, #22 | (8) #80 | (13) #164 |
| (4) #43, #69, #91 | (9) #49, #50, #51 | (14) #133 |
| (5) #59 | (10) #35 | (15) #0 |

${}_0a_1$

| | | |
|---|---|---|
| (1) PCS15 | (6) #47 | (11) #65 |
| (2) #16, #161 | (7) #0 | (12) #141 |
| (3) #6, #22 | (8) #80 | (13) #164 |
| (4) #43, #69, #91 | (9) #49, #50, #51 | |
| (5) #59 | (10) #35 | |

$a_2$

| | | |
|---|---|---|
| (1) #24, #34, #129 | (6) #83 | (11) #141 |
| (2) #16, #161 | (7) #50, #51 | (12) #164 |
| (3) #6, #22 | (8) #52 | (13) #0 |
| (4) #43, #69, #91 | (9) #35 | |
| (5) #46, #59 | (10) #65 | |

${}_0a_2$

| | | |
|---|---|---|
| (1) PCS16 | (6) #80 | (11) #36 |
| (2) #16, #161 | (7) #53, #83 | (12) #65 |
| (3) #6, #22 | (8) #50, #51 | (13) #141 |
| (4) #43, #69, #91 | (9) #52 | (14) #164 |
| (5) #46, #59 | (10) #35 | (15) #0 |

$a_3$

| | | |
|---|---|---|
| (1) #129 | (4) #43, #69, #91 | (7) #65 |
| (2) #16, #161 | (5) #35, #83 | (8) #141 |
| (3) #6, #22 | (6) #0 | (9) #164 |

${}_0a_3$

| | | |
|---|---|---|
| (1) PCS17 | (4) #43, #69, #91 | (7) #65 |
| (2) #16, #161 | (5) #35, #83 | (8) #141 |
| (3) #6, #22 | (6) #0 | (9) #164 |

$a_4$

| | | |
|---|---|---|
| (1) #141, #164 | (4) #43, #69, #91 | (7) #35 |
| (2) #16, #161 | (5) #83 | (8) #34 |
| (3) #6, #22 | (6) #49 | (9) #0 |

${}_0a_4$

| | | |
|---|---|---|
| (1) PCS18 | (4) #43, #69, #91 | (7) #35 |
| (2) #16, #161 | (5) #83 | (8) #0 |
| (3) #6, #22 | (6) #34 | |

$a_5$

| | | |
|---|---|---|
| (1) PCS17 | (2) #83 | (3) #34 |

${}_0a_5$

| | |
|---|---|
| (1) PCS20 | (2) #83 |

As seen in the above lists, the $E_0$ proposition, for example, has 21 possible different equation forms in which it can exist. These forms are identified by the numbers 1 through 21, enclosed by parentheses. Placed to the right of each of these form numbers are the word time block numbers which utilize the form of the $E_0$ equation, so identified. As noted in the lists of propositions, several of the forms of equations appear in two or three word block #'s of the flow diagram. The present scheme provides for logically summing these combinations by use of the diode networks presented in Fig. 88. Thus note how program counter numbers #17 and #162, defining the word blocks using form (2) of the $E_0$ equation, are summed by network 383. Each of the other combinations of two or three program counter numbers, as shown in the lists, is generated as a separate output in Fig. 88.

Next to be noted is that some of the equation forms of the propositions are used in even greater number of word blocks. Thus, in order to simplify the composite equations of these propositions, the sums of the program counter #'s defining these word blocks are generated as separate functions and merely referred to as PCS #'s in the composite equations.

For instance, form (5) of equation $E_0$ is used when the program counter is in its 61st, 75th, 132nd, 137th, or 195th states as shown by the equation below the word blocks identified by these numbers. This results in one portion of the equation for $E_0$ being:

$$[(E_2'K_1'+E_2K_1)O_{0-11}+E_2O_{12-13}](\#61+\#75+\#132+\#137+\#195)$$

However, since the large program counter number sums, such as this case, are a bit awkward to handle, and since when taking all the program counter sums together the equations and consequently the diode networks can be greatly simplified, the above sum of the program counter #'s has been generated in a network along with other program counter sums, shown in Fig. 91, and simply designated as PCS2.

The detail breakdown of all the other PCS #'s indicated in the above lists of propositions may be determined by referring to the program counter sum equations shown in Figs. 89, 90, and 91. Each of these PCS # equations is represented by an output generated by the composite logical network shown above or adjacent it in the manner previously shown and described.

Reference will now be made to Figs. 92 through 101 which show the final composite networks and the corresponding equations, which have been devised for completely defining the action of the 17 output logical propositions during the entire operation of the computer (see Fig. 11 for $R_1$ and $R_2$). For example, Fig. 92 shows the composite equation for the $E_0$ output proposition. Generally, the overall $E_0$ equation can be considered to represent the outputs of a plurality of logical product networks summed up in a final sum network. Only one of these logical product networks is then made operative at a time, depending on whether the # output of the program counter which constitutes one of the product terms is true, i.e., at the high potential. Thus note, for example, the underlined portion of the $E_0$ equation, $M_1(\#17+\#162)$. Because this product, as seen in the network of Fig. 92, is generated on line 384 feeding into a sum circuit having a common junction 385, which in turn is fed into the sum circuit whose output 386 represents $E_0$, it is now clear that whenever the program counter content is #17 or #162 the output $E_0$ is equal to $M_1$ and none of the other portions of the $E_0$ equation or network are effective.

To further clarify this action, assume that the program counter #35 is effective during a word period. In this case the logical equations previously described and shown below word time block #35 of the division routine shown in Fig. 64 must be made effective. It can now be shown by reference to Figs. 92 through 101 that the only portions of the composite networks $E_0$, $F_0$, $G_0$, $k_1$, ${}_0k_1$, $a_1$, ${}_0a_1$, etc., respectively, which are effective during the word period that output #35 of the program counter is relatively high in potential are those which are generating the logical equations stipulated below word time block #35.

Thus during the word period that the program counter content is #35, the portions of the composite proposition diode networks generating the following forms of the propositions are made operative:

The equation $E_0$ having form (12) (as shown in word time block #35 of Fig. 64) enclosed by the dotted outline 402 in Fig. 92; the equation $F_0=F_2$ enclosed by the dotted outline 403 in Fig. 93; the equation $G_0=A_1P_0O_0+A_3(P_0O_0)'$ enclosed by the dotted outline 404 in Fig. 94; the equation $k_1=O_0C$ enclosed by the dotted outline 405 in Fig. 96 (note that PCS22 includes #35, as shown in the equation in Fig. 90); the equation ${}_0k_1=G_2P_1O_{13}C$ enclosed by the dotted outline 406 in Fig. 95; the equation $a_1=A_2O_{13}C$ enclosed by the dotted outline 407 in Fig. 97; the equation ${}_0a_1=O_{12}C$ enclosed by the dotted outline 408 in Fig. 97; the equation $a_2=(F_2A_1'+F_2'A_1)A_4(O_{0-11}+P_0O_{12})C$ enclosed by the dotted outline 409 in Fig. 98; the equation $${}_0a_2=(F_2'A_1'+F_2A_1)A_4'(O_{0-11}+P_0O_{12})C$$

enclosed by the dotted outline 410 in Fig. 98; the equation $a_3=G_2C$ enclosed by the dotted outline 411 in Fig. 99; the equation ${}_0a_3=G_2'C$ enclosed by the dotted outline 412 in Fig. 99; the equation $a_4=E_2O_{13}'C$ enclosed by the dotted outline 413 in Figure 100; and, finally the equation ${}_0a_4=(E_2'O_{13}'+O_{13})C$ enclosed by the dotted outlines 414a and 414b in Fig. 100.

It should be understood, of course, that each of the propositions representing a trigger input to a flip-flop, such as $k_1$, is multiplied by the clock pulse C in a final product circuit whose output represents the proposition.

In a similar manner, during each word period that one of the other program counter number outputs is high in potential, the portions of the composite diode networks which generate the forms of the propositions, as defined below the corresponding word time block, are simultaneously made effective, to the exclusion of all the remaining portions of the diode networks.

Returning to the flow diagram in Fig. 27, it should now be clear that by pressing the Z push button 355 on the control panel 129, the program counter 118 is reset to #0 in which the computer idles. The operator can then fill the computer with initial information, i.e., numbers and commands, by pressing the proper push buttons on the control panel which causes the computer to advance through the fill sub-sequences of the flow diagram, as already described. After this the operator then depresses the start button 354 on the control panel and the computer advances into the main computing sequence of the flow diagram out of which it branches, depending on the commands, into the various instruction sub-sequences. During each word period, the program counter operates to render certain portions of the composite proposition networks effective, and as a result of the condition of the K1 flip-flop at the end of each word period the program counter content may be changed to render other portions of the composite networks effective during the next word period. After the computing program set into the computer by the coder has been completed, and the answers read out to either the typewriter 130 or the tape 134, the halt command H then provides for again returning the computer to word block #0 in which it idles.

While the circuits as shown and described herein are admirably adapted to fulfill the objects and features of advantage previously enumerated as desirable, it is to be understood that the invention is not to be limited to the specific features shown but that the means and construction herein disclosed are susceptible of modification in form, proportion, and arrangement of parts without departing from the principle involved or sacrificing any of its advantages; and the invention is therefore claimed in embodiments of various forms all coming within the scope of the claims which follow.

What is claimed is:

1. A digital computer comprising, in combination: logical circuit means including a plurality of logical product circuit means each having input lines and an output line, and also including logical sum circuit means having input lines each connected to respective output lines of the logical product circuit means; control signal generating means including a computer clock, for generating upon respective control signal lines a plurality of distinctive types of control signals each type of which control signals may arbitrarily by designated by a respective number included in a series of numbers, said control signals being generated generally in successive serial order one at a time and each type thereof on only its respective line, and each of said control signal lines being connected to at least one logical product input line; and means responsive to operations of said logical circuit means during the effective period of a particular one of said control signals, for selecting for generation one from among a plurality of control signals not including the next such signal in serial order, whereby said computer may alternatively repeat an operation, skip one or more operations in a series of operations, or proceed with operations in serial order within the series.

2. An automatic self-sequencing digital computer comprising: control means having a plurality of control-signal lines and including means capable of normally generating characteristically different control signals on respective ones of said lines in succession, one characteristic control signal per line and generally in a predetermined serial order; network means including a plurality of logical product circuits each of which has an output line and a plurality of input lines; means for interconnecting certain control-signal lines of said control means to input lines of said network means, comprising a plurality of lines each connecting a single one of said control-signal lines to a respective group of said input lines; other means for providing binary information input signals to the input lines of certain of said logical product circuits; a logical sum circuit having input lines each connected to a logical product circuit output line; and means dependent upon operations of said logical circuits, capable of altering the generally predetermined serial order generation of the control signals and effective during generation of a particular one of said control-signals to cause selection for generation either of two control signals which two control signals include that being generated and another control signal not next in said serial order.

3. In a digital computer, the combination of a program counter having a plurality of outputs, a plurality of bistable state elements having inputs and outputs, a source of periodic timing signals, a cyclical counting circuit responsive to said timing signals, and networks responsive during each period of said timing signals to combinations of outputs from said bistable state elements, said cyclical counting circuit, and said program counter for generating signals to be applied on the inputs of said elements.

4. In a digital computer, the combination of a program counter having a plurality of output lines, each characterized by a respective output count signal; bistable state elements each having input lines and output lines providing output signals; first means supplying a succession of clock signals; second means producing timing signals and acting to demark successive operating cycles each of which cycles is characterized generally by a fixed number of said clock signals; and logical network means comprising a logical network responsive during at least part of one of the demarked operating cycles to a combination of signals comprising at least two signals selected from among the timing signals, the clock signals, the count signals and the signals from said bistable state element output lines to produce variable output signals including bistable state element input line signals and a program control signal, whereby in response to said program control signal said program counter is caused to produce a selected one from among alternative output count signals.

5. In a digital computer, the combination comprising a program counter having a plurality of outputs, a plurality of bistable state elements having inputs and outputs, a source of timing signals, a cyclical counting circuit responsive to said timing signals, a network responsive to combinations of outputs from said bistable state elements, said cyclical counting circuit, and said program counter for generating signals to be applied on the inputs of said elements, and means capable of changing the contents of said program counter once each cycle of said counting circuit whereby a different portion of said network is rendered effective.

6. A combination as defined by claim 5, said combination including means for providing information-representing input signals, and said network being responsive also to said information-representing input signals.

7. A combination as defined by claim 5, said means being also capable of causing repetition of the contents of said program counter in at least a second of successive ones of said cycles of said counting circuit, whereby the same portion of said network is rendered effective in each of successive cycles.

8. A combination as defined in claim 5, said combination including means for providing information-representing input signals, and including further means for cooperating with said network for providing output information signals produced by operation of the network in response to combinations of signals selected from among said information-representing input signals, said program counter outputs, the outputs from said bistable state elements, and the outputs from said cyclical counting circuit.

9. A digital computer comprising, in combination: a program counter capable of producing as an output any of a plurality of distinctive program-counter signals in accordance with signals supplied thereto; a plurality of bistable-state elements each having input signal lines and output signal lines for output signals; means providing a succession of timing signals; cyclic means providing repetitive series of output signals each series of which includes output signals each of which corresponds to a respective one of said timing signals; network means including a network for generating signals for input signal lines of said bistable-state elements in response to combinations of signals selected from among the bistable-state element output signals, the program-counter signals, and the timing signals; and means for selectively repeating or changing the output signal of said program counter following completion of a cycle of said cyclic means, whereby to selectively again render effective said network or render effective a different network of said network means.

10. In a computing device, a program counter comprised of a plurality of bistable state means, individual configurations of the states of which represent respectively different numbers of a series of numbers, a source of recurring timing signals, a cyclical counter responsive to said timing signals to provide repetitive series of count signals, a first network intercoupling said bistable state circuits and capable of being operated in response to a particular count signal of said cyclical counter to cause said program counter to change from a configuration of states representing a particular number to a configuration of states representing the next succeeding number in said series of numbers, a second network interrelating said bistable state circuits and capable of being operated in response to a particular count signal of said cyclical counter, to cause said program counter to reset to any one of a plurality of configuration of states representing predetermined numbers other than said next following number, and a decision bistable state circuit for selectively rendering any one of said networks operable depending on the state of said decision bistable state circuit.

11. A digital computer comprising, in combination: computer signal means including clock means, for producing timing signals; a program counter responsive to input signals including timing signals, capable of producing one at a time any of a series of distinctive program counter signals and ordinarily effective to produce the program counter signals successively in a serial order; computer means including operational circuits each of which is rendered effective by contemporaneous signals which include a respective program counter signal and a timing signal, and each of which circuits when effective provides an operational circuit output signal; and means responsive during production of a particular one of said program counter signals to an operational circuit output signal to cause said program counter to repeat said particular one of said signals.

12. In a computing device, a program counter comprised of a plurality of bistable state circuits having input and output leads and the several configurations of the states of which may be represented by respective numbers of a series of numbers, a source of recurring signals, a first network intercoupling the leads of said bistable state circuits and capable of being operated in response to said signals to cause the bistable state circuits of said program counter to assume a configuration of states thereof representative of that number in said series which next follows the number represented by the previous configuration of states so that the counter advances to the number next following in numerical order in said series, a second network capable of being operated in response to said signals when said program counter has one of configurations representing respective predetermined numbers to reset said program counter to any of a plurality of configurations including the presently effective configuration and any of other configurations representing numbers, not following in numerical order in said series, and a decision bistable state circuit for rendering either one or the other of said networks operable depending on the state thereof.

13. In a computing device, a program counter comprised of a plurality of bistable state circuits, a source of recurring timing signals, a cyclical counter responsive to said timing signals, a network intercoupling said bistable state circuits and capable of being operated in response to the final count of said cyclical counter to cause said program counter to change its number content, an auxiliary cyclical counter having a quiescent state, means for actuating said auxiliary counter in response to predetermined number contents of said program counter to advance said auxiliary counter through its cycle in response to final counts of said cyclical counter, and means included in said network for inhibiting said program counter from functioning when said auxiliary counter is not in its quiescent state.

14. In a digital computing system, a rotating member provided with a magnetizable periphery, a recirculating register comprised of a pair of heads spaced on the same channel of said member and interconnected by electronic means, a program counter, means for placing an instruction code number in said recirculating register, means included in said electronic means for adding a unit to said instruction code number during each cycle of said recirculating register, means for causing said program counter to advance to the next numerical order count at the end of a cycle when no overflow results from said addition, and means for causing said program counter to skip to a count not following a numerical order at the end of a cycle when an overflow results from said addition.

15. In a digital computer in which operations are performed in distinctive series each of which series is defined as a word and requires for the operations performed therein a time interval herein termed a word period and which word period includes a plurality of consecutive intervals of time each herein denoted by the term signal position, the combination comprising: means including computer clock means for demarking by clock signals respective intervals of time each equal in duration to any one of said consecutive intervals, and for providing cyclically repetitive series of distinctive signals each such signal representing a respective one of said signal positions, and further for demarking word periods and furnishing during any word period a word signal indicative of the operations to be effected during that word period; means including a pair of one-word-period recirculating registers each including dynamic data-translating means and a plurality of bistable state data-storing elements; and circuit means, including logical product circuit means, connected to said registers and responsive to signals supplied thereto and selected from signals including a word signal and one of said distinctive signals to gate a contemporaneous clock signal to perform one of said operations by changing the state of at least one of said bistable state elements, and which operations include the alteration of data then stored in said bistable state elements.

16. In a digital computer whose operations are sequentially divided into word periods, a program counter having a plurality of outputs only one of which may have an effective signal thereon during a word period, timing circuits for indicating sequential signal positions within a word period, a pair of one-word-period serial recirculating registers for binary information each including a flip-flop circuit, a separate group of flip-flop circuits, and circuit means selected by one of the output signals on said program counter for setting up the flip-flop circuits in said group in accordance with information serially passing through the flip-flop circuit of one of said recirculating registers during a portion of the word period identified by signals from said timing circuits.

17. In a digital computer in which operations are performed in distinctive series each of which series is defined as a word and requires for the operations performed therein a time interval herein termed a word period and which word period includes a plurality of consecutive intervals of time each denoted by the term signal position, the combination comprising: means including computer clock means for demarking by clock signals respective intervals of time each equal in duration to any one of said consecutive intervals, and for providing cyclically repetitive series of distinctive position signals each such signal representing a respective one of said signal positions, and further for demarking word periods and furnishing during any word period a word signal indicative of the operations to be effected during that word period; operative means including an arithmetical network, and including a pair of one-word-period recirculating registers, each connected and arranged to translate informational data in binary form through the operating network, each of said registers including a plurality of bistable-state data storing elements; an additional source of data in binary signal form; and said network including logical circuits responsive to contemporaneous signals including signals selected from among a word signal, one of said distinctive position signals, a clock signal, and a binary signal, and effective thereby to modify the data temporarily stored in the bistable state elements of said recirculating registers, said operative means being effective to produce binary signals representing the data in modified form.

18. Means as defined by claim 17, including a data-storage means arranged to store the binary signals representing the data in modified form.

19. In a digital computer whose operations are sequentially divided into fixed periods, a program counter comprised of a plurality of bistable state circuits which in combination define the number content therein, a source of recurring timing signals, a cyclical counter responsive to said timing signals whose cycle defines said fixed periods, means for applying the signals from said cyclical counter to said program counter to operate the latter, a group of two-position switches one for each of the bistable state circuits in said program counter, means for setting said switches to correspond to a number setting of said program counter, and means initiated by resetting said program counter to its zero content for automatically causing said program counter to skip to the number set up by said group of two-position switches.

20. In a digital computer whose operations are sequentially divided into fixed periods, a program counter comprised of a plurality of bistable state circuits which in combination define the number content therein, a source of recurring timing signals, a cyclical counter responsive to said timing signals, a group of two-position switches one for each of the bistable state circuits in said program counter, means for setting said switches to correspond to a number setting of said program counter, a counting network intercoupling said bistable state circuits and capable of being operated in response to the final count of said cyclical counter to cause said program counter to change its number content, and a reset network for said bistable state circuits capable of resetting said program counter to indicate a zero content in response to the final count of the cycle of said cyclical counter during which said program counter contains the number set up in said switches.

21. In a digital computing device or the like, a plurality of bistable state elements each having inputs and outputs, means for combining the outputs of said bistable elements in a predetermined manner to derive a stable configuration of signals, means for periodically triggering the inputs of said bistable state elements to derive a new stable configuration of signals from said combining means as a function of the preceding configuration, and means for rendering different portions of said combining means effective, whereby said bistable state elements are capable of performing a plurality of distinct functions.

22. In a digital computer: a plurality of bistable-state elements each having input means whereby its stable state may be changed, and each having an output signal indicative of the current state of the element; combining means for combining in a predetermined manner a plurality of output signals produced by said bistable-state elements, to derive a stable configuration of combining-means signals; means for triggering selected sets of the input means of the bistable-state elements at respective ones of a succession of time intervals whereby to derive a different stable configuration of combining-means signals for respective time intervals, as a function of the preceding configuration of such signals; and means for rendering effective different portions of said combining means, whereby said bistable-state elements are capable of performing a plurality of distinct functions.

23. A digital computer comprising a rotating member having a magnetizable periphery, a synchronizing channel of indexing signals on said periphery, a pair of recirculating registers on said member each comprised of a record and read head arranged so that a point on the periphery passes the record head first, means responsive to said indexing signals to generate timing signals identifying the positions in said recirculating register, an arithmetic unit comprised of sets of circuits for altering information passing through said recirculating registers, a program counter for selecting the sets of circuits effective during each cycle of said registers, one of said circuits comprising means for shifting a marker pulse in one of said registers once each cycle of said registers, and means for changing the program counter to select a new set of circuits when said marker pulse has been shifted into a predetermined position of said register as identified by a timing signal.

24. In a digital computer, the combination comprising a rotating member having a magnetizable surface, a synchronizing channel on said surface, a pair of recirculating registers each comprised of a record and read head on the same channel of said member arranged so that a point on the surface passes the record head first, means responsive to said synchronizing channel to generate timing signals identifying the positions in said recirculating registers, an arithmetic unit comprised of sets of circuits capable of serially operating on information in said recirculating registers, a program counter for selecting the sets of circuits operable during each cycle of said register, and means operable at the end of each said cycle for enabling the program counter to either change its count or recycle in the same count dependent on circuitry associated with the program counter.

25. In a digital computer, the combination comprising a rotating member having a magnetizable surface, a synchronizing channel on said surface, a pair of recirculating registers each comprised of a record and read head on the same channel of said member arranged so that a point on the surface passes the record head first, means responsive to said synchronizing channel to generate timing signals identifying the positions in said recirculating registers, an arithmetic unit comprised of sets of circuits capable of serially operating on inforamtion in said recirculating registers, a program counter for selecting the sets of circuits operable during each cycle of said registers, and means for changing the program counter to select either of two new possible sets of circuits to be operable during the subsequent cycle dependent on the results of the operation during the present cycle of said registers.

26. A digital computer comprising a cyclical drum memory, a synchronizing channel extending circumferentially about said drum, a timing pulse generating circuit responsive to signals on said synchronizing channel for generating timing pulses whose period represents the duration of a unit bit of information, a plurality of channels on said drum memory each having a record and read head spaced thereon, a memory flip-flop circuit connected to each of said read heads for reproducing as electrical signals the magnetic patterns on said channels, an arithmetic flip-flop circuit for responding to each memory flip-flop under control of said timing pulses whereby information received from the drum is synchronized with the periods of the timing pulses, a plurality of storage flip-flop circuits, an arithmetic unit comprised of sets of networks, each of said sets of networks capable of responding to output signals from said arithmetic and storage flip-flop circuits to generate unit information to be recorded onto said drum by said record heads, said network simultaneously responsive to signals set up in said arithmetic and storage flip-flop circuits to generate signals to trigger said storage flip-flops, and a program counter for rendering one of said sets of networks operable at a time.

27. In a digital computer, the combination comprising a rotating member having a magnetizable surface, a synchronizing channel on said surface, a pair of recirculating registers on said member each comprised of a record and read head on the same channel arranged so that a point on the periphery passes the record head first, means responsive to said synchronizing channel to generate timing signals identifying the positions in said recirculating registers, an arithmetic unit comprised of sets of circuits capable of altering information serially advancing through said recirculating registers, a program counter for selecting the sets of circuits effective during each cycle of said registers, one of said circuits comprising means for adding a unit to a number in one of said registers once each cycle of said registers, and means for changing the program counter to select a new set of circuits at the end of the cycle following that in which said number has a carry generated beyond its most significant digit.

28. A digital computer comprising a rotating member having a magnetizable surface, a synchronizing channel on said surface, a pair of recirculating registers on said member each comprised of a record and read head on the same channel arranged so that a point on the periphery passes the record head first, means responsive to said synchronizing channel to generate timing signals identifying the positions in said recirculating registers, an arithmetic unit comprised of sets of circuits for serially altering information in said recirculating registers, a program counter for selecting the sets of circuits effective during each cycle of said registers, one of said circuits comprising means for subtracting a unit from a number in one of said registers once each cycle of said registers, and means for changing the program counter to select a new set of circuits at the end of the cycle following that in which said number has been reduced to zero.

29. In a digital computing system, the combination comprising a rotating storage member, an indexing channel extending in the direction of rotation of said member, a timing signal generating circuit responsive to signals on said indexing channel, a plurality of channels on said member each having a record and read head angularly spaced thereon, an initial flip-flop circuit connected to respond to signals set up in each of said read heads for reproducing electrical signals corresponding to magnetic patterns recorded on said channels, a synchronized flip-flop circuit for responding to the output signals on each of said initial flip-flop circuits under control of said timing signals, a memory flip-flop circuit for receiving information from an additional source, a gating circuit for said memory flip-flop circuit, circuit means capable of responding to signals set up in said synchronized flip-flop circuits and said memory flip-flop circuit during each timing signal period to generate information to be recorded onto said member by said record heads, a plurality of storage flip-flop circuits each capable of being triggered at the end of a timing signal period in accordance with the signals set up in said circuit means during a timing signal period, and means for energizing said gating circuit in accordance with the signals set up in said storage flip-flop circuits to control the response of said circuit means to signals set up in said memory flip-flop circuit.

30. In a digital computer operating in step-by-step fashion one computer word period per step, the combination comprising: means including magnetic memory means comprising a plurality of one-word storage registers and a plurality of partial-word sections of recirculating registers; means completing said partial-word sections to form complete one-word recirculating registers and the said means including at least two flip-flop circuits per register whereby each recirculating register includes at least two bistable-state elements therein; operable means connected to said registers and effective during particular computer word steps to transfer digital data from one of said storage registers to one of said recirculating registers via a flip-flop thereof and to thereafter transfer digital data from another of said storage registers to another of said recirculating registers via a flip-flop thereof and to thereafter perform arithmetical operations upon the data in the said recirculating registers as the data is transferred from one to another of the flip-flops thereof.

31. A computer combination as defined in claim 30 in which said magnetic memory means comprises a dynamic magnetic drum memory device; and in which said operable means is effective, after performing arithmetical operations, to transfer digital data thereby produced from a recirculating register into one of said one-word storage registers; and said combination further including a counting device for sequencing the computer through one-word-period steps in accordance with a predetermined program.

32. The combination defined by claim 30, in which said magnetic memory means comprises a dynamic magnetic drum memory device, and in which said operable means is effective, after performing arithmetical operations, to transfer the digital data thereby produced, into one of said one-word storage registers.

33. A digital computer comprising, in combination: an arithmetic unit comprising a plurality of sets of logical circuits capable of performing arithmetic operations on digital information presented thereto in binary signal form in a continuing series of steps of computer operation; means, including means connected to said logical circuits and including a program counter, capable of providing distinctive different signals each of which renders effective a particular respective group of said sets of logical circuits, said counter having a first mode of operation in which different particular groups of sets of logical circuits are made effective in a predetermined serial order, and said counter having a first alternative mode of operation in which a particular group of sets of logical circuits may repetitively be made effective and a second alternative mode in which any of certain of the particular groups of sets of logical circuits may be skipped and not rendered effective in said predetermined serial order; and means, including decision flip-flop means connected to said counter and included in said arithmetic unit, effective in response to an arithmetic operation of said unit during one step of computer operation, to select from among said modes the mode of computer operation for the succeeding step of computer operations.

34. In a digital computer, means comprising an arithmetic unit comprised of a plurality of sets of circuits, said means being effective to perform operations on binary information serially received thereby during a complete word period, means including a program counter, effective to render active certain of said sets of circuits during any particular word period to perform particular operations, and means responsive to the results of operations performed by the selected units during said particular word period and effective thereby to change the program counter at the end of said word period to render active a different set of circuits for operation during the subsequent word period in accordance with results of the operations during the present word period, and during each of successive next-following word periods to render active a different set of said sets of circuits for operation during the next-following word period.

35. In a digital computer storage system, the combination comprising a rotatable member having a magnetizable surface, means to rotate said member, a plurality of storage registers arranged on the surface of said rotating member so as to be identified by coded time and space addresses, a pair of recirculating registers on said member, each utilizing an arcuate portion of the surface as an integral part thereof, said recirculating registers equal in length to a storage register, means for searching the surface of said member for a storage register as specified by a coded address located in one of said recirculating registers, and means for transferring the contents of said selected storage register into the second of said recirculating registers.

36. A digital-data-storage system comprising, in combination: rotary magnetic-drum data-storage means including transducer head means and providing a plurality of data-storage registers arranged so that each register is identifiable by a respective coded time and space address, the space address indicating a register location longitudinally of the drum and the time address indicating relative time of passage of the register past a transducer head; a recirculating register including a circumferentially extending portion of magnetic material on said first named means; means for first selecting all of said storage registers having a common time-address, and for thereafter selecting from among the selected registers that register having a specific space address whereby to select a particular storage register from among all said storage registers; and means for transferring the digital-data stored in the thus selected storage register into said recirculating register.

37. In an information storage system: a rotating member; means to rotate said member, said member having a magnetizable surface; a plurality of storage registers on the surface of said member identified by coded time and space addresses; an address channel extending about the circumference of said member identifying the time address of said registers; a plurality of channels extending about the circumference of said member, each designated by a space address; a magnetic head positioned adjacent each of said channels; a pair of recirculating registers, each utilizing an arcuate portion of the surface of said member as a delay medium; means for storing in one of said recirculating registers the address of a storage register whose contents it is desired to place in the second recirculating register; means for selecting the time address of said storage register by comparing the contents of said first register with the contents of said address channel; means for subsequently selecting the channel corresponding to the spaced address of said storage register; and means for routing the contents of the selected storage register to said second recirculating register.

38. In a digital computer: a rotating member having a magnetizable periphery; means for rotating said member; a timing signal channel, an arc address channel, and a plurality of information channels extending about the periphery of said member; a magnetic head positioned adjacent each of said channels; timing circuits responsive to signals induced by said timing signal channel and having a cycle equal in length to the arcs defined by said arc address channel; an arithmetic network; pairs of magnetic heads spaced about the periphery of said member and interconected by flip-flop circuits to said arithmetic network to define data recirculating loops equal in length to said timing cycle; a memory flip-flop circuit; gating circuits connecting the signals induced in the magnetic heads of said channels to said memory flip-flop circuit; a channel selector register for controlling said gating circuits; means for setting said channel selector register to indicate said arc address channel; means for comparing the arc addresses serially stepping through said memory flip-flop circuit with an arc address serially stepping through a flip-flop circuit in one of said recirculating loops; means following said comparison for setting said channel selector register in accordance with a channel address serially stepping through a flip-flop circuit in said recirculating loop; and means for routing the arc information serially stepping through said memory flip-flop circuit into said second recirculating loop.

39. In a digital computer: a rotating member having a magnetizable periphery; means for rotating said member; a plurality of data channels about said member containing storage registers; an arc address channel for defining the time location of said storage registers about said member; a magnetic head positioned adjacent each of said channels; pairs of magnetic heads angularly spaced about said member and interconnected by flip-flop circuits to define data recirculating loops equal in length to said storage registers; a gating circuit connecting each of the magnetic heads of said channels to a memory flip-flop circuit; a channel selector register comprised of a plurality of flip-flop circuits; means for causing said channel selector register to pass signals from said arc address channel to said memory flip-flop circuit; means for comparing the arc addresses serially stepping through said memory flip-flop circuit with an arc address serially stepping through a flip-flop circuit in one of said recirculating loops; means following said comparison for causing said channel selector register to pass signals from a data channel to said memory flip-flop circuit; and means for routing information serially stepping through said memory flip-flop circuit into said second recirculating loop.

40. In a digital computing device, the combination comprising: a rotatable member; means for rotating said member provided with a magnetizable periphery; a plurality of magnetic pattern tracks for pattern elements of varying magnetic value extending circumferentially about the periphery of said member; electromagnetic transducer heads each positioned adjacent a respective one of said tracks; arithmetic circuit means; a pair of record lines each representing a respective one of different binary signals feeding out of said circuit means; pairs of record amplifiers, each pair connected to a respective one of said heads; and means including a set of flip-flop circuits and a diode matrix driven thereby for selectively connecting said record lines to any pair of said pairs of record amplifiers.

41. In a digital computer, the combination comprising: a computer clock means providing rectangular wave periodic computer clock signals having first and second wave portions at different potential levels; magnetic-drum data-storage means providing a plurality of circumferentially disposed storage channels, and including transducer heads each having input and output lines and each disposed for cooperation with a respective storage channel to alternatively read and record digital data in the channel; signal translating means connecting the output lines of all said transducer heads to a common output junction; an electrical delay line connected to receive data-representing signals from said common junction and effective to delay received signals a fractional portion of a clock signal period and each into substantial time-overlapping relationship with a first portion of a said clock signal; a flip-flop circuit having input means including differentiating circuit means connected to said clock means and effective to trigger the flip-flop circuit incident to change from a first to a second portion of a clock signal, and output lines, and means connecting the flip-flop input means for reception of the delayed data-representing signals at said delay line; arithmetic means including logical circuitry upon which is impressed the data-representing signals produced on the output lines of said flip-flop circuit, for producing output signals representative of data resulting from said arithmetic operations upon said data-representing signals; and means for utilizing said output signals.

42. A combination as defined in claim 41, said computer clock means comprising a magnetic timing track means on the magnetic drum of said data-storage means, and also comprising means, including transducer means, cooperating with said track to produce a periodic rectangular wave signal for computer timing purposes.

43. A digital computing device comprising a rotatable member, means for rotating said member, said member provided with a magnetizable periphery, a timing track for periodic pattern elements extending circumferentially about the periphery of said member, a plurality of data tracks for pattern elements of varying magnetic value extending circumferentially about the periphery of said member, an electromagnetic head positioned adjacent each of said tracks, a cyclical counting circuit responsive to timing signals induced in the head associated with said timing track, a gating circuit connected to receive signals induced in each of the heads associated with said data tracks, a common junction for the outputs of said gating circuits, means for selectively controlling said gating circuits such that signals from only one of said data tracks is impressed on said common junction, a delay unit for delaying the signals impressed on said common junction for a time less than the period of said timing signals, a memory flip-flop circuit, means for applying the delayed signals to the trigger input of said memory flip-flop circuit, and means for resetting said memory flip-flop circuit to a known state at a predetermined count of said cyclical counting circuit.

44. In a data storage system, the combination comprising a rotatable member, means to rotate said member, said member being provided with a magnetizable periphery, a timing signal track extending circumferentially about the periphery of said member, an electromagnetic head positioned on said timing signal track, a data track extending circumferentially about the periphery of said member, a first and second electromagnetic head positioned on said last mentioned track such that data recorded by said second head is read by said first head so as to have a phase lead with respect to the periods of the timing signals induced in the timing head, a first flip-flop circuit for storing the data as sensed in the read head, a second flip-flop circuit responsive to the output of said first flip-flop and said timing head to aline the data with the periods of the timing signals, a third flip-flop circuit responsive to the output of said second flip-flop circuit and said timing signals, a network responsive to signals set up in said third flip-flop during a timing signal period to generate a direct output signal during the periods of said time signal, a fourth flip-flop circuit responsive to the signals from said network and said timing signals, and means for applying the outputs of said fourth flip-flop circuit onto said second head.

45. Apparatus of the character described in claim 44 wherein said network is made responsive to signals set up in said second flip-flop, whereby data is impressed onto said second head one timing signal period early.

46. Apparatus of the character described in claim 44 including a storage flip-flop capable of being interposed between said third flip-flop and said network whereby data is impressed onto said second head one timing signal period later.

47. A read-out circuit for a digital computer comprising a pair of simultaneously operating recirculating loops for binary information, means for inserting information to be read-out into one of said loops, means for inserting marker pulses in second of said loops, a group of flip-flop circuits, means for setting up said group of flip-flop circuits in accordance with information found in the positions of the first loop corresponding to the positions of the marker pulses in the second loop, a set of signal generating means, and means for energizing said signal generating means in accordance with the information set up in said group of flip-flop circuits.

48. A read-out circuit for a digital computer comprising a first and second recirculating loop for binary information, means for inserting marker pulses in said first loop, a group of storage flip-flop circuits, means for triggering said storage flip-flop circuits in accordance with information found in the positions of the second loop corresponding to the positions of the marker pulses in the first loop, a set of signal generating means for a tape recorder or the like, means for energizing said signal generating means in accordance with the information set up in said storage flip-flop circuits, and means for shifting the position of the marker pulses in said first loop after energizing said signal generating means.

49. A read-out circuit for a digital computer comprising a cyclical memory having a plurality of storage registers thereon, a pair of recirculating registers integrally associated with said memory, means for transferring information from one of said storage registers into one of said recirculating registers, means for inserting marker pulses into the other of said recirculating registers, a group of storage flip-flop cicuits, means for triggering said group of storage flip-flop circuits in accordance with information found in the position of the first of said recirculating registers corresponding to the positions of the marker pulses in the other of said recirculating registers, a set of digit lines each capable of being energized to actuate a relay, means for energizing one of said digit lines in accordance with information set up in said storage flip-flop circuits, and means for shifting the marker pulses in said recirculating register.

50. A read-out circuit for a digital computer comprising a pair of recirculating loops for binary information, means for setting up marker pulses in one of said loops, a group of storage flip-flop circuits, means for setting up said group of storage flip-flop circuits in accordance with information found in the position of the second recirculating loop corresponding to the positions of the marker pulses in the first loop, a set of signal generating means for a tape recorder or the like, means for energizing said signal generating means in accordance with the information set up in said storage flip-flop circuits, means for shifting the position of the marker pulses in said first loop after energizing said signal generating means, and means for setting up said storage flip-flop circuits to represent a space operation when said marker pulses have been shifted to a predetermined position of said first loop.

51. A read-out circuit for a digital computer comprising a pair of recirculating loops for binary information, means for setting up marker pulses in one of said loops, a group of storage flip-flop circuits, means for triggering said group of storage flip-flop circuits in accordance with information found in the position of the second recirculating loop corresponding to the positions of the marker pulses in the first loop, a set of relays controlling an electric typewriter, and means for energizing one of said relays in accordance with the information set up in said storage flip-flop circuits.

52. A read-out circuit for a digital computer comprising a pair of recirculating loops for binary information, means for setting up marker pulses in one of said loops, a group of storage flip-flop circuits, means for setting up said group of storage flip-flop circuits in accordance with information found in the position of the second recirculating loop corresponding to the positions of the marker pulses in the first of said loops, a set of relays corresponding to the digit keys of a typewriter, means for energizing one of said relays in accordance with the information set up in said storage flip-flop circuits, means for shifting the position of the marker pulses in said loop after a relay is energized, and means for delaying the successive energizing of said relays for a predetermined number of cycles.

53. A read-out circuit for a digital computer comprising a pair of recirculating loops for binary information, means for setting up marker pulses in one of said loops, a group of storage flip-flop circuits, means for setting up said group of storage flip-flop circuits in accordance with information found in the position of the second of said recirculating loops corresponding to the positions of the marker pulses in the first of said loops, a set of digit relays for an electric typewriter or the like, means for energizing one of said relays in accordance with the information set up in said storage flip-flop circuits, means for shifting the position of the marker pulses in said loop after a digit relay is energized, and means for actuating a space relay of the typewriter when said marker pulses have been shifted to a predetermined position of said first loop.

54. A read-out circuit for a digital computer comprising a pair of recirculating loops for binary information, a timer whose cycle has a timed relation to the operation of said recirculating loops, means for setting up marker pulses in positions of one of said loops indicated by said timer, a group of storage flip-flop circuits, means for setting up said group of storage flip-flop circuits in accordance with information found in the position of the second recirculating loop corresponding to the positions of the marker pulses in the first of said loops, a set of typewriter digit relays, means for energizing one of said relays in accordance with the information set up in said storage flip-flop circuits, and means for shifting the position of the marker pulses in said loop after a digit relay is energized.

55. A read-out system for a digital computer comprising a cyclical memory having a plurality of storage registers thereon capable of being identified by coded addresses, a first and second recirculating registers integrally associated with said memory, means for setting up a coded address and a cycle number in one of said recirculating registers, means for transferring information from the storage address identified by said coded address into a second of said recirculating registers, means for reading out the information from said second recirculating register, means for adding a unit to the coded address and subtracting a unit from the cycle number residing in said first recirculating register, and means for terminating the reading out of said storage registers from said cyclical memory in numerical order when said cycle number has been reduced to zero.

56. In a digital computing device or the like, a plurality of bistable state elements having inputs and outputs, means capable of combining the outputs of said bistable state elements in a plurality of predetermined arrangements to derive a stable configuration of high or low voltage signals, means capable of periodically triggering the inputs of said bistable state elements in accordance with the voltage signals of any one of said arrangements to derive a new stable configuration of high or low signals, and means for causing different ones of said predetermined arrangements of combining means to become effective, whereby said bistable state elements are capable of performing a plurality of distinct functions.

57. In a computing device, a program counter comprised of a plurality of bistable state circuits having input and output leads, a source of recurring signals, a first network intercoupling the leads of said bistable state circuits and capable of being operated in response to said signals to cause said program counter to advance to the next consecutive number, a second network connected to the inputs of said bistable state circuits and capable of being operated in response to said signals when said program counter has certain numbers therein to reset said program counter to a number not following a numerical order, a plurality of storage bistable state circuits, means for manually setting up coded signals in said storage bistable state circuits, and means responsive to said coded signals when said program counter has predetermined numbers therein for rendering either the first or second of said networks operable.

58. A digital computer having means for automatically sequencing computer operations, said computer comprising: signaling means capable of producing signals each of which is unique within a signal series and which signals may be produced in a predetermined order in a signal series and which signals are employed to control computer operations steps, each signal being assigned a respective computer operations step; means capable, in the absence of interference, of causing said signal means to produce said signals in said predetermined order; means including logical circuitry means comprising a plurality of logical product circuits each having a respective set of input means and a respective output means; means for applying individual ones of said signals to respective individual ones of the logical product circuit input means; said logical circuitry including a logical sum circuit having input lines each connected to a respective one of said logical product circuit output means; additional input means for providing input signals for respective ones of said logical product circuit input means to induce performance of logical operations by said logical circuitry; and means responsive to logical operations performed by said logical circuitry means to vary the order of production of signals by said signal means from said predetermined order to either of at least two alternative orders.

59. In a device for performing computations by digital processing of binary data, the combination comprising: logical circuit means; a plurality of one-word recirculating registers each comprising as a fractional part thereof a plurality of flip-flops and magnetic read-write transducer means; means, including rotary magnetic data-storage means, said storage means comprising a plurality of data-storage channels thereon, each of a set of more than one of said channels including as a part thereof a fractional part of a respective one of said registers whereby data may recirculate through a register by being written onto a respective data storage channel, being later read from said channel, passed successively through a plurality of flip-flops and transferred therefrom to a write transducer means; means, including logical circuit means, effective to derive data from data-storage channels other than those of said set, and including means electrically interposed between flip-flops of said registers and effective to alter data being circulated therethrough to perform said computations, and said logical circuit means including means for interconnecting a flip-flop of one of said registers with a flip-flop of another of said registers, for transfer of data from said one of said registers to said other of said registers.

60. In a digital computer: first means, including a plurality of data-storage means; second means, including logical circuit means, for performing logical operations upon data supplied thereto; third means, including means for alternatively reading data from or writing data into any of said data-storage means; input gating means connected to said third means and to said logical circuit means for gating data signals from said first means to said second means; output gating means connected to said third means and to said logical circuit means for gating data signals from said second means to said first means; and means including flip-flop means connected to said gating means and to said second means and responsive to operations of said logical circuit means upon signals gated thereto to assume a first of its stable states to render effective said input gating means and to the second of its stable states to render effective said output gating means, whereby operations of said logical circuit means may control transfer of data to and from said data-storage means.

61. A digital computer system, said system comprising: first means comprising a plurality of data-storage means; second means, including a plurality of sets of logical circuit means, for performing logical operations upon data supplied thereto; third means for alternatively writing data into, or reading data from, any selected one of said data-storage means; gating means connected between said third means and said logical circuit means for selectively gating data from said logical circuit means to said third means for writing the gated data into said first means and alternatively gating data from said third means to said logical circuit means for reading data from said first means into said logical circuit means; and a bistable circuit means connected to said logical circuit means and to said gating means and controlled as to active state by operations of said logical circuit means and effective in a first state to control said gating means for gating data from said first means and effective in the opposite state to gate data to said first means.

62. In a digital computer, the combination comprising: first means, including control means, for performing computer operation control functions including demarking operating periods each including a plurality of demarked shorter intervals a specified number N of which define a computer word period having N digit-positions; second means, comprising a plurality of recirculating registers each including a plurality of bistable-state circuit means and each of N-digits capacity and each capable of serially recirculating binary data therethrough and past a predetermined point therein at one end of said bistable-state circuit means and each capable of permitting modification of the data therein at the respective predetermined point; third means, including an arithmetic network means connected to said first means and to said second means and connected between bistable-state circuit means of said registers, and effective under control of said first means to alternatively modify or leave unmodified the binary data in any of said registers at the respective point therein, said third means including means connected to said first means and effective to change said control means to vary the operations of the computer.

63. In a digital computer: means including variable control means for demarking operating periods each including a word period having a prescribed number of subdivision periods and each word period representing a particular computer operation; means including a plurality of one-word recirculating registers each accommodating exactly one word-equivalent of data therein and including a recirculating register of one word length having a point past which data is stepped during circulation, said register being capable of permitting modification of the data as the data passes said point; and means including an arithmetic means, connected to said control means and to said register and selectively capable of modifying data according to any of a plurality of arithmetical operations in said register at said point or alternatively leaving unmodified the data as it recirculates in the register, under control exercised by said control means.

64. A computer as defined in claim 63, including in said first and other means, a means permitting control of said control means by said arithmetic means.

65. In a digital computer, the combination comprising: first means including a plurality of one-word recirculating registers each including an operating point, and an arithmetic unit, and means interconnecting the registers and said unit at said point for arithmetical operations thereat; second means including means for causing recirculation of binary data in any of said registers and means for effecting control of recirculation of data in a register; and means including control means effective to induce modification by said arithmetic unit of the binary data recirculating in a register according to either of a plurality of arithmetical operations as the data passes the operating point therein.

66. In a digital computing device or the like, a plurality of bistable state elements having inputs and outputs, means capable of combining the outputs of said bistable state elements in a plurality of predetermined arrangements for deriving trigger signals, means capable of recurrently triggering selected inputs of said bistable state elements in accordance with trigger signals of any one of said arrangements to derive new trigger signals, and means for causing different ones of said predetermined arrangements of combining means to become effective, whereby said bistable state elements are capable of performing a plurality of distinct functions.

67. In a digital computing device: means including a rotatable plural-channel magnetic drum data store means and including means to rotate the drum means; a plurality of magnetic transducer heads, each disposed in operative association with a respective channel of said store means; means including signal generating arithmetic circuit means and connections thereto; means, including input signal gating means, connected to route signals induced in any one of said heads to said circuit means for arithmetic manipulation thereby; means, including output signal gating means, connected to route signals generated by said circuit means to said one of said heads; and a flip-flop having respective ones of its outputs connected to respective ones of said gating means and said flip-flop having its trigger input circuits connected to said arithmetic circuit means; whereby arithmetical operations performed by said arithmetic circuit means controls the change of state of said flip-flop and the flip-flop when in a first of its two states opens said input signal gating means for read out of signals from said one of said heads to said arithmetic circuit means, and when in the second of its two states opens said output signal gating means for recording by said head on the respective channel, of signals generated by said arithmetic circuit means.

68. A device as defined in claim 67, including respective sets of gating means each set comprising an input gating means and an output gating means, and the sets of gating means each being connected to said flip-flop and to a respective one of said heads; and channel selecting means connected to said arithmetic circuit means and to said sets of gating means, for selecting for active gating any one from among all said sets of gating means.

References Cited in the file of this patent

UNITED STATES PATENTS

| | | |
|---|---|---|
| 2,540,654 | Cohen | Feb. 6, 1951 |
| 2,604,262 | Phelps | July 22, 1952 |
| 2,609,143 | Stibitz | Sept. 2, 1952 |
| 2,614,169 | Cohen et al. | Oct. 14, 1952 |
| 2,651,458 | Bennett | Sept. 8, 1953 |
| 2,686,299 | Eckert | Aug. 10, 1954 |
| 2,701,095 | Stibitz | Feb. 1, 1955 |
| 2,721,990 | McNaney | Oct. 25, 1955 |
| 2,767,908 | Thomas | Oct. 23, 1956 |
| 2,770,797 | Hamilton et al. | Nov. 13, 1956 |
| 2,771,595 | Hendrickson et al. | Nov. 20, 1956 |
| 2,777,635 | Tootill et al. | Jan. 15, 1957 |

OTHER REFERENCES

Goldstine et al.: "The Electronic Numerical Integrator and Computer (ENIAC)," Mathematical Tables, April 1946, pages 97–110.

Burks: "Super Electronic Computing Machine," Electronics Industries, July 1946, pages 62–67, and 96.

The Automatic Sequence Controlled Calculator, Howard Aiken et al., Electrical Engineering, Part I, September 1946; Part II, October 1946; Part III, November 1946.

Burks: "Electronic Computing Circuits of the ENIAC," IRE Proc., August 1947, pages 756, 767.

Brainerd et al.: "The ENIAC," Electrical Engineering, February 1948, pages 163–172.

Investigations for Design of Digital Calculating Machinery, Progress Report, No. 2, The Computation Laboratory, Contract W19–122–ac–24, November 1948. (Pages 11–31 only relied on.)

24-Digit Parallel Computer Design Plans, Engineering Research Associates, February 15, 1949.

Magnetic Drum Storage for Digital Information Processing Systems, MTAC, vol. IV, No. 29, January 1950.

High Speed Computing Devices, Engineering Research Associates, McGraw-Hill Book Co., Inc. (1950), (Pages 208–213.)

The Edvac, a functional description of: vols. 1 and 2 University of Pennsylvania, Moore School of Electrical Engineering, Research Division Report 50–9, May 3, 1951.

The Elecom, 100 General Purpose Computer, Albert Auerbach, Proceedings of the Association for Computing Machinery, 1952.

Auerbach et al.: "The Binac," Proc. IRE, January 1952, pages 14 to 26 relied on.

Williams et al.: "Universal High-Speed Digital Computers: A Magnetic Store," Proc. Inst. Elec. Eng. (Br.), April 1952; pages 94 to 106 relied on.

Mark III, Description of a Magnetic Drum Calculator, The Staff of the Harvard University Laboratory, August 22, 1952.

ERA 1101 Computer, Design Features of: by F. C. Mullaney, Electrical Engineering, November 1952.

UNITED STATES PATENT OFFICE

Certificate of Correction

Patent No. 2,954,166 September 27, 1960

Donald E. Eckdahl et al.

It is hereby certified that error appears in the above numbered patent requiring correction and that the said Letters Patent should read as corrected below.

Column 9, line 62, for "reigsters" read —registers—; column 12, line 31, for "arc 0" read —arc 0)—; column 13, line 10, for "later" read —latter—; column 16, line 6, after "single" insert —coil—; line 28, for "registor" read —register—; line 40, for "on" read —one—; column 40, line 58, for "products" read —product—; column 43, line 1, for "*n*" read —$n_1$—; line 60, for "1M" read —1 M—; lines 61 and 62, for "kohms", each occurrence, read —k ohms—; line 63, for "1M" read —1 M—; column 44, lines 19 and 46, for "kohms", each occurrence, read —k ohms—; line 62, for "volt" read —volts—; column 46, line 34, for "registry" read —register—; column 47, line 39, for "#9" read —#8—; column 58, line 11, for "are" read —is—; column 64, line 57, for "*Extract, S*" read —*Extract, E*—; column 66, line 54, strike out "decimal 5/8 is added to the binary equivalent of"; column 74, line 65, before "consequently" insert —and—; column 78, lines 39 and 41 should appear as shown below instead of as in the patent:

$$k_1=[E_2'F_2O_{0-11}+K_1'O_{12}]C \quad \text{and}$$

$$_0k_1=[E_2F_2'O_{0-11}+K_1O_{12}+O_{13}]C$$

same column 78, line 44, for "counter", second occurrence, read —count—; column 79, line 28, for "refreence" read —reference—; column 88, line 55, for "Gregiester" read —G register—; line 63, for "$P_2$" read —P2—; column 91, line 36, strike out "of"; column 97, line 60, for "require" read —requires—; column 99, line 14, after "even" insert —a—; line 22, for "equation" read —equations—; line 29, after "as" insert —in—; column 103, line 35, after "numbers" strike out the comma; column 104, line 16, for "signal" read —signals—; column 109, line 19, for "spaced" read —space—; column 112, line 35, after "cycles" and before the period insert —of said recirculating loops—; column 114, line 62, strike out "end".

Signed and sealed this 4th day of July 1961.

[SEAL]

Attest:

ERNEST W. SWIDER,
*Attesting Officer.*

DAVID L. LADD,
*Commissioner of Patents.*